US011526256B2

(12) United States Patent
Guzman et al.

(10) Patent No.: US 11,526,256 B2
(45) Date of Patent: Dec. 13, 2022

(54) USER INTERFACES FOR MANAGING USER INTERFACE SHARING

(71) Applicant: Apple Inc., Cupertino, CA (US)

(72) Inventors: Aurelio Guzman, San Jose, CA (US); Giovanni M. Agnoli, San Mateo, CA (US); Matthew Biddulph, San Francisco, CA (US); Edward Chao, Palo Alto, CA (US); Kevin Will Chen, Cupertino, CA (US); Jamie Cheng, Burlingame, CA (US); Yiqiang Nie, San Francisco, CA (US); Grant Paul, San Francisco, CA (US); Cezar Mihai Radu, Dublin, CA (US); Kevin M. Lynch, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/317,042

(22) Filed: May 11, 2021

(65) Prior Publication Data

US 2021/0349583 A1    Nov. 11, 2021

Related U.S. Application Data

(60) Provisional application No. 63/142,926, filed on Jan. 28, 2021, provisional application No. 63/023,149, filed on May 11, 2020.

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04817* (2013.01); *G06F 3/04845* (2013.01); *H04L 67/06* (2013.01)

(58) Field of Classification Search
CPC ............... G06F 3/0482; G06F 3/04817; G06F 3/04845; G06F 1/163
See application file for complete search history.

(56) References Cited

U.S. PATENT DOCUMENTS 3,148,500 A    9/1964    Thomas
4,205,628 A    6/1980    Null
(Continued)

FOREIGN PATENT DOCUMENTS

AU    2010249319 A1    6/2012
AU    2015101019 A4    9/2015
(Continued)

OTHER PUBLICATIONS

Non-Final Office Action received for U.S. Appl. No. 17/068,386, dated Jul. 15, 2021, 16 pages.
(Continued)

*Primary Examiner* — Linh K Pham
(74) *Attorney, Agent, or Firm* — Dentons US LLP

(57) ABSTRACT

The present disclosure generally relates to managing user interface sharing. A computer system receives a representation of a first user interface template that specifies an arrangement of user interface elements. The computer system receiving a request to use the first user interface template for a respective computer system that includes a plurality of installed applications. The computer system initiates a process for creating a user interface for the respective computer system using the first user interface template. The process includes, in accordance with a determination that a first application is not available on the respective computer system, displaying an alert indicating that the first application needs to be installed on the respective computer system. The process includes, in accordance with a determination that the first application is available on (Continued)

the respective computer system, forgoing displaying the alert.

27 Claims, 47 Drawing Sheets

(51) Int. Cl.
    *H04L 67/06*     (2022.01)
    *G06F 3/04845*     (2022.01)
    *G06F 3/04817*     (2022.01)

(56) References Cited

U.S. PATENT DOCUMENTS

| | | | |
|---|---|---|---|
| 4,355,380 A | 10/1982 | Huguenin et al. |
| 4,597,674 A | 7/1986 | Thompson, III |
| 4,847,819 A | 7/1989 | Hong |
| 4,945,521 A | 7/1990 | Klaus |
| 5,124,959 A | 6/1992 | Yamazaki et al. |
| 5,208,790 A | 5/1993 | Sato et al. |
| 5,220,541 A | 6/1993 | Vuilleumier |
| 5,455,808 A | 10/1995 | Grupp et al. |
| 5,500,835 A | 3/1996 | Born |
| 5,508,979 A | 4/1996 | Eisenegger |
| 5,659,693 A | 8/1997 | Hansen et al. |
| 5,825,353 A | 10/1998 | Will |
| 5,845,257 A | 12/1998 | Fu et al. |
| 5,892,519 A | 4/1999 | Hirai et al. |
| 5,986,655 A | 11/1999 | Chiu et al. |
| 5,999,195 A | 12/1999 | Santangeli |
| 6,043,818 A | 3/2000 | Nakano et al. |
| 6,084,598 A | 7/2000 | Chekerylla |
| 6,128,012 A | 10/2000 | Seidensticker et al. |
| 6,160,767 A | 12/2000 | Ho |
| 6,279,018 B1 | 8/2001 | Kudrolli et al. |
| 6,297,795 B1 | 10/2001 | Kato et al. |
| 6,359,839 B1 | 3/2002 | Schenk et al. |
| 6,441,824 B2 | 8/2002 | Hertzfeld et al. |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,525,997 B1 | 2/2003 | Narayanaswami et al. |
| 6,539,243 B1 | 3/2003 | Kimura et al. |
| 6,539,343 B2 | 3/2003 | Zhao et al. |
| 6,549,218 B1 | 4/2003 | Gershony et al. |
| 6,556,222 B1 | 4/2003 | Narayanaswami |
| 6,690,623 B1 | 2/2004 | Maano |
| 6,728,533 B2 | 4/2004 | Ishii et al. |
| 6,809,724 B1 | 10/2004 | Shiraishi et al. |
| 6,871,076 B2 | 3/2005 | Samn et al. |
| 7,203,380 B2 | 4/2007 | Chiu et al. |
| 7,257,254 B2 | 8/2007 | Tunney et al. |
| 7,302,650 B1 | 11/2007 | Allyn et al. |
| 7,378,954 B2 | 5/2008 | Wendt et al. |
| 7,479,949 B2 | 1/2009 | Jobs et al. |
| 7,515,509 B2 | 4/2009 | Klein et al. |
| 7,515,903 B1 | 4/2009 | Cast |
| 7,619,615 B1 | 11/2009 | Donoghue et al. |
| 7,637,204 B2 | 12/2009 | Sumser et al. |
| 7,751,285 B1 | 7/2010 | Cain et al. |
| 7,773,460 B2 | 8/2010 | Holt |
| 7,843,769 B2 | 11/2010 | Ishida et al. |
| 7,898,542 B1 | 3/2011 | Yu et al. |
| 7,907,476 B2 | 3/2011 | Lee |
| 8,238,876 B2 | 8/2012 | Teng et al. |
| 8,245,143 B2 | 8/2012 | Yach et al. |
| 8,364,855 B2 | 1/2013 | James et al. |
| 8,405,663 B2 | 3/2013 | Wikkerink et al. |
| 8,462,997 B2 | 6/2013 | Soldan et al. |
| 8,595,649 B2 | 11/2013 | Sherrard et al. |
| 8,725,842 B1 | 5/2014 | Al-nasser |
| 8,768,648 B2 | 7/2014 | Panther et al. |
| 8,847,903 B2 | 9/2014 | Stokes et al. |
| 8,854,925 B1 | 10/2014 | Lee et al. |
| 8,924,894 B1 | 12/2014 | Yaksick et al. |
| 8,938,394 B1 | 1/2015 | Faaborg et al. |
| 8,948,819 B2 | 2/2015 | Yun et al. |
| 8,963,894 B2 | 2/2015 | Klassen et al. |
| 9,070,092 B2 | 6/2015 | Shieh et al. |
| 9,082,314 B2 | 7/2015 | Tsai |
| 9,141,270 B1 | 9/2015 | Stuart et al. |
| 9,152,211 B2 | 10/2015 | Gunn et al. |
| 9,152,212 B2 | 10/2015 | Gunn |
| 9,171,268 B1 | 10/2015 | Penilla et al. |
| 9,173,052 B2 | 10/2015 | Hauser et al. |
| 9,197,738 B2 | 11/2015 | Peev et al. |
| 9,237,855 B2 | 1/2016 | Hong et al. |
| 9,239,605 B1 | 1/2016 | Nanda et al. |
| 9,259,615 B2 | 2/2016 | Weast et al. |
| 9,369,537 B1 | 6/2016 | Mathew et al. |
| 9,377,762 B2 | 6/2016 | Hoobler et al. |
| 9,459,781 B2 | 10/2016 | Kocienda et al. |
| 9,547,425 B2 | 1/2017 | Kocienda et al. |
| 9,568,891 B2 | 2/2017 | Adams et al. |
| 9,582,165 B2 | 2/2017 | Wilson et al. |
| 9,594,354 B1 | 3/2017 | Kahn et al. |
| 9,600,178 B2 | 3/2017 | Yun et al. |
| 9,606,695 B2 | 3/2017 | Matas |
| 9,753,436 B2 | 9/2017 | Ely et al. |
| 9,794,397 B2 | 10/2017 | Min et al. |
| 10,019,599 B1 | 7/2018 | Moran et al. |
| 10,062,133 B1 | 8/2018 | Mishra et al. |
| 10,268,432 B2 * | 4/2019 | Kyung .................. G06F 3/1454 |
| 10,304,347 B2 | 5/2019 | Wilson et al. |
| 10,356,070 B2 | 7/2019 | Cha et al. |
| 10,489,508 B2 | 11/2019 | Zhai et al. |
| 10,620,590 B1 | 4/2020 | Guzman et al. |
| 10,643,246 B1 | 5/2020 | Suprasadachandran Pillai |
| 10,684,592 B2 | 6/2020 | Chang et al. |
| 10,721,711 B2 | 7/2020 | Kirov et al. |
| 10,788,797 B1 | 9/2020 | Guzman et al. |
| 10,817,981 B1 | 10/2020 | Belkin |
| 10,852,905 B1 | 12/2020 | Guzman et al. |
| 10,878,782 B1 | 12/2020 | Guzman et al. |
| 10,908,559 B1 | 2/2021 | Guzman et al. |
| 10,936,345 B1 | 3/2021 | Guzman et al. |
| 11,009,833 B2 | 5/2021 | Essery |
| 11,050,873 B2 | 6/2021 | Kim et al. |
| 11,061,372 B1 | 7/2021 | Chen et al. |
| 2002/0054066 A1 | 5/2002 | Kikinis et al. |
| 2002/0054157 A1 | 5/2002 | Hayashi et al. |
| 2002/0054541 A1 | 5/2002 | Hall et al. |
| 2002/0059623 A1 | 5/2002 | Rodriguez et al. |
| 2002/0081976 A1 | 6/2002 | Fujisawa et al. |
| 2002/0098857 A1 | 7/2002 | Ishii |
| 2002/0131331 A1 | 9/2002 | Molander et al. |
| 2003/0002391 A1 | 1/2003 | Biggs et al. |
| 2003/0027621 A1 | 2/2003 | Libby et al. |
| 2003/0067497 A1 | 4/2003 | Pichon et al. |
| 2003/0107603 A1 | 6/2003 | Clapper |
| 2003/0164847 A1 | 9/2003 | Zaima et al. |
| 2003/0214885 A1 | 11/2003 | Powell et al. |
| 2003/0229900 A1 | 12/2003 | Reisman |
| 2004/0001105 A1 | 1/2004 | Chew et al. |
| 2004/0017733 A1 | 1/2004 | Sullivan |
| 2004/0021699 A1 | 2/2004 | Fildebrandt et al. |
| 2004/0047244 A1 | 3/2004 | Iino et al. |
| 2004/0066710 A1 | 4/2004 | Yuen et al. |
| 2004/0075699 A1 | 4/2004 | Franchi et al. |
| 2004/0075700 A1 | 4/2004 | Liu et al. |
| 2004/0083474 A1 | 4/2004 | Mckinlay et al. |
| 2004/0168107 A1 | 8/2004 | Sharp et al. |
| 2004/0181771 A1 | 9/2004 | Anonsen et al. |
| 2004/0192332 A1 | 9/2004 | Samn |
| 2004/0203342 A1 | 10/2004 | Sibecas et al. |
| 2004/0218472 A1 | 11/2004 | Narayanaswami et al. |
| 2004/0225966 A1 | 11/2004 | Besharat et al. |
| 2004/0243547 A1 | 12/2004 | Chhatrapati et al. |
| 2004/0266491 A1 | 12/2004 | Howard et al. |
| 2005/0041667 A1 | 2/2005 | Miller et al. |
| 2005/0052446 A1 | 3/2005 | Plut |
| 2005/0094492 A1 | 5/2005 | Rosevear et al. |
| 2005/0124389 A1 | 6/2005 | Yang |

(56) References Cited

U.S. PATENT DOCUMENTS

| | | |
|---|---|---|
| 2005/0139852 A1 | 6/2005 | Chen et al. |
| 2005/0156873 A1 | 7/2005 | Walter et al. |
| 2005/0188856 A1 | 9/2005 | Sumser et al. |
| 2005/0190653 A1 | 9/2005 | Chen |
| 2005/0198319 A1 | 9/2005 | Chan et al. |
| 2005/0200611 A1 | 9/2005 | Goto et al. |
| 2005/0261031 A1 | 11/2005 | Seo et al. |
| 2005/0278757 A1 | 12/2005 | Grossman et al. |
| 2006/0007785 A1 | 1/2006 | Fernandez et al. |
| 2006/0020904 A1 | 1/2006 | Aaltonen et al. |
| 2006/0035628 A1 | 2/2006 | Miller et al. |
| 2006/0085765 A1 | 4/2006 | Peterson et al. |
| 2006/0092770 A1 | 5/2006 | Demas |
| 2006/0123362 A1 | 6/2006 | Keely |
| 2006/0166708 A1 | 7/2006 | Kim et al. |
| 2006/0214935 A1 | 9/2006 | Boyd et al. |
| 2006/0277469 A1 | 12/2006 | Chaudhri et al. |
| 2007/0004451 A1 | 1/2007 | C. Anderson |
| 2007/0006096 A1 | 1/2007 | Kim et al. |
| 2007/0021153 A1 | 1/2007 | Novak |
| 2007/0052851 A1 | 3/2007 | Ochs et al. |
| 2007/0055947 A1 | 3/2007 | Ostojic et al. |
| 2007/0057775 A1 | 3/2007 | O'Reilly et al. |
| 2007/0094330 A1 | 4/2007 | Russell et al. |
| 2007/0101279 A1 | 5/2007 | Chaudhri et al. |
| 2007/0113181 A1 | 5/2007 | Blattner et al. |
| 2007/0146344 A1 | 6/2007 | Martin et al. |
| 2007/0192718 A1 | 8/2007 | Voorhees et al. |
| 2007/0211042 A1 | 9/2007 | Kim et al. |
| 2007/0213955 A1 | 9/2007 | Ishida et al. |
| 2007/0236475 A1 | 10/2007 | Wherry |
| 2007/0239754 A1 | 10/2007 | Schnitman et al. |
| 2007/0250772 A1 | 10/2007 | Milosevski |
| 2007/0261537 A1 | 11/2007 | Eronen et al. |
| 2007/0279190 A1 | 12/2007 | Lugt et al. |
| 2007/0287140 A1 | 12/2007 | Liebowitz |
| 2008/0071885 A1 | 3/2008 | Hardy et al. |
| 2008/0082930 A1 | 4/2008 | Omernick et al. |
| 2008/0095470 A1 | 4/2008 | Chao et al. |
| 2008/0127268 A1 | 5/2008 | Bergeron et al. |
| 2008/0130421 A1 | 6/2008 | Akaiwa et al. |
| 2008/0150959 A1 | 6/2008 | Marui et al. |
| 2008/0151700 A1 | 6/2008 | Inoue et al. |
| 2008/0167834 A1 | 7/2008 | Herz et al. |
| 2008/0168396 A1 | 7/2008 | Matas et al. |
| 2008/0186808 A1 | 8/2008 | Lee |
| 2008/0192021 A1 | 8/2008 | Lim et al. |
| 2008/0201438 A1 | 8/2008 | Mandre et al. |
| 2008/0201647 A1 | 8/2008 | Lagerstedt et al. |
| 2008/0215240 A1 | 9/2008 | Howard et al. |
| 2008/0246778 A1 | 10/2008 | Ham et al. |
| 2008/0247519 A1 | 10/2008 | Abella et al. |
| 2008/0270934 A1 | 10/2008 | Firebaugh et al. |
| 2009/0012988 A1 | 1/2009 | Brown |
| 2009/0051327 A1 | 2/2009 | Bohne |
| 2009/0058821 A1 | 3/2009 | Chaudhri et al. |
| 2009/0059730 A1 | 3/2009 | Lyons et al. |
| 2009/0068984 A1 | 3/2009 | Burnett |
| 2009/0070675 A1 | 3/2009 | Li |
| 2009/0077497 A1 | 3/2009 | Cho et al. |
| 2009/0143114 A1 | 6/2009 | Vargas et al. |
| 2009/0146962 A1 | 6/2009 | Ahonen et al. |
| 2009/0158173 A1 | 6/2009 | Palahnuk et al. |
| 2009/0164923 A1 | 6/2009 | Ovi et al. |
| 2009/0178007 A1 | 7/2009 | Matas et al. |
| 2009/0178008 A1 | 7/2009 | Herz et al. |
| 2009/0183080 A1 | 7/2009 | Thakkar et al. |
| 2009/0199130 A1 | 8/2009 | Tsern et al. |
| 2009/0249247 A1 | 10/2009 | Tseng et al. |
| 2009/0259958 A1 | 10/2009 | Ban |
| 2009/0262088 A1 | 10/2009 | Moll-Carrillo et al. |
| 2009/0264116 A1 | 10/2009 | Thompson et al. |
| 2009/0279392 A1 | 11/2009 | Scott et al. |
| 2009/0284389 A1 | 11/2009 | Klassen et al. |
| 2009/0287470 A1 | 11/2009 | Farnsworth et al. |
| 2009/0300146 A1 | 12/2009 | Park et al. |
| 2009/0300598 A1 | 12/2009 | Choi |
| 2009/0305732 A1 | 12/2009 | Marcellino et al. |
| 2009/0312059 A1 | 12/2009 | Pratt et al. |
| 2009/0319467 A1 | 12/2009 | Berg et al. |
| 2009/0327886 A1 | 12/2009 | Whytock et al. |
| 2010/0026640 A1 | 2/2010 | Kim et al. |
| 2010/0060586 A1 | 3/2010 | Pisula et al. |
| 2010/0062905 A1 | 3/2010 | Rottier et al. |
| 2010/0064255 A1 | 3/2010 | Rottler et al. |
| 2010/0069035 A1 | 3/2010 | Johnson |
| 2010/0081473 A1 | 4/2010 | Chatterjee et al. |
| 2010/0085203 A1 | 4/2010 | Kahn et al. |
| 2010/0110082 A1 | 5/2010 | Myrick et al. |
| 2010/0124152 A1 | 5/2010 | Lee |
| 2010/0146437 A1 | 6/2010 | Woodcock et al. |
| 2010/0149573 A1 | 6/2010 | Pat et al. |
| 2010/0156833 A1 | 6/2010 | Kim et al. |
| 2010/0157742 A1 | 6/2010 | Relyea et al. |
| 2010/0167712 A1 | 7/2010 | Stallings et al. |
| 2010/0205563 A1 | 8/2010 | Haapsaari et al. |
| 2010/0217657 A1 | 8/2010 | Gazdzinski et al. |
| 2010/0218089 A1 | 8/2010 | Chao et al. |
| 2010/0223563 A1 | 9/2010 | Green |
| 2010/0225495 A1 | 9/2010 | Marui |
| 2010/0226213 A1 | 9/2010 | Drugge |
| 2010/0235726 A1 | 9/2010 | Ording et al. |
| 2010/0243516 A1 | 9/2010 | Martin et al. |
| 2010/0257469 A1 | 10/2010 | Kim et al. |
| 2010/0281374 A1 | 11/2010 | Schulz et al. |
| 2010/0289723 A1 | 11/2010 | London |
| 2010/0309149 A1 | 12/2010 | Blumenberg et al. |
| 2011/0000968 A1 | 1/2011 | Phillips et al. |
| 2011/0003665 A1 | 1/2011 | Burton et al. |
| 2011/0004835 A1 | 1/2011 | Yanchar et al. |
| 2011/0022294 A1 | 1/2011 | Apley |
| 2011/0025719 A1 | 2/2011 | Yanase et al. |
| 2011/0029870 A1 | 2/2011 | May et al. |
| 2011/0047014 A1 | 2/2011 | De |
| 2011/0061010 A1 | 3/2011 | Wasko et al. |
| 2011/0070924 A1 | 3/2011 | Kim et al. |
| 2011/0071818 A1 | 3/2011 | Jiang |
| 2011/0076992 A1 | 3/2011 | Chou et al. |
| 2011/0078624 A1 | 3/2011 | Missig et al. |
| 2011/0080411 A1 | 4/2011 | Wikkerink et al. |
| 2011/0083111 A1 | 4/2011 | Forutanpour et al. |
| 2011/0098928 A1 | 4/2011 | Hoffman et al. |
| 2011/0109540 A1 | 5/2011 | Milne et al. |
| 2011/0138329 A1 | 6/2011 | Wells et al. |
| 2011/0151415 A1 | 6/2011 | Darling et al. |
| 2011/0157046 A1 | 6/2011 | Lee et al. |
| 2011/0166777 A1 | 7/2011 | Chavakula |
| 2011/0173221 A1 | 7/2011 | Ahiakpor et al. |
| 2011/0179372 A1 | 7/2011 | Moore et al. |
| 2011/0181521 A1 | 7/2011 | Reid et al. |
| 2011/0182151 A1 | 7/2011 | Geyer et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202883 A1 | 8/2011 | Oh et al. |
| 2011/0205851 A1 | 8/2011 | Harris |
| 2011/0218765 A1 | 9/2011 | Rogers et al. |
| 2011/0230986 A1 | 9/2011 | Lafortune et al. |
| 2011/0234152 A1 | 9/2011 | Frossen et al. |
| 2011/0237221 A1 | 9/2011 | Prakash et al. |
| 2011/0248992 A1 | 10/2011 | Van et al. |
| 2011/0256848 A1 | 10/2011 | Bok et al. |
| 2011/0261079 A1 | 10/2011 | Ingrassia et al. |
| 2011/0281342 A1 | 11/2011 | Porsch et al. |
| 2011/0296324 A1 | 12/2011 | Goossens et al. |
| 2011/0306421 A1 | 12/2011 | Nishimoto et al. |
| 2011/0316858 A1 | 12/2011 | Shen et al. |
| 2011/0320938 A1 | 12/2011 | Schorsch et al. |
| 2012/0001922 A1 | 1/2012 | Escher et al. |
| 2012/0013552 A1 | 1/2012 | Ahn |
| 2012/0028707 A1 | 2/2012 | Raitt et al. |
| 2012/0036220 A1 | 2/2012 | Dare et al. |
| 2012/0047447 A1 | 2/2012 | Haq |
| 2012/0059787 A1 | 3/2012 | Brown et al. |

(56) References Cited

U.S. PATENT DOCUMENTS

| | | |
|---|---|---|
| 2012/0062470 A1 | 3/2012 | Chang et al. |
| 2012/0079375 A1 | 3/2012 | Ogino et al. |
| 2012/0084729 A1 | 4/2012 | Lin et al. |
| 2012/0092383 A1 | 4/2012 | Hysek et al. |
| 2012/0110438 A1 | 5/2012 | Peraza et al. |
| 2012/0116550 A1 | 5/2012 | Hoffman et al. |
| 2012/0117507 A1 | 5/2012 | Tseng et al. |
| 2012/0124499 A1 | 5/2012 | Tsai et al. |
| 2012/0150327 A1 | 6/2012 | Altman et al. |
| 2012/0154156 A1 | 6/2012 | Kuntzel |
| 2012/0182226 A1 | 7/2012 | Tuli |
| 2012/0197523 A1 | 8/2012 | Kirsch |
| 2012/0218201 A1 | 8/2012 | Tamas et al. |
| 2012/0231849 A1 | 9/2012 | Yamashita et al. |
| 2012/0243735 A1 | 9/2012 | Wu et al. |
| 2012/0254804 A1 | 10/2012 | Sheha et al. |
| 2012/0254810 A1 | 10/2012 | Heck et al. |
| 2012/0288139 A1 | 11/2012 | Singhar |
| 2012/0297346 A1 | 11/2012 | Hoffknecht et al. |
| 2012/0304084 A1 | 11/2012 | Kim et al. |
| 2012/0319984 A1 | 12/2012 | Borovsky et al. |
| 2012/0324390 A1 | 12/2012 | Tao et al. |
| 2013/0007665 A1 | 1/2013 | Chaudhri et al. |
| 2013/0019175 A1 | 1/2013 | Kotler et al. |
| 2013/0021236 A1 | 1/2013 | Bender et al. |
| 2013/0030892 A1 | 1/2013 | Liu et al. |
| 2013/0044072 A1 | 2/2013 | Kobayashi et al. |
| 2013/0050263 A1 | 2/2013 | Khoe et al. |
| 2013/0055147 A1 | 2/2013 | Vasudev et al. |
| 2013/0057566 A1 | 3/2013 | Kriese et al. |
| 2013/0063084 A1 | 3/2013 | Tilvis et al. |
| 2013/0063383 A1 | 3/2013 | Anderssonreimer et al. |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0107674 A1 | 5/2013 | Gossweiler et al. |
| 2013/0111550 A1 | 5/2013 | Naveh et al. |
| 2013/0111579 A1 | 5/2013 | Newman et al. |
| 2013/0116967 A1 | 5/2013 | Akcasu et al. |
| 2013/0132888 A1 | 5/2013 | Tijssen |
| 2013/0141371 A1 | 6/2013 | Hallford et al. |
| 2013/0143512 A1 | 6/2013 | Hernandez et al. |
| 2013/0147825 A1 | 6/2013 | Martin et al. |
| 2013/0157646 A1 | 6/2013 | Ferren et al. |
| 2013/0185813 A1 | 7/2013 | Shim et al. |
| 2013/0191785 A1 | 7/2013 | Wu et al. |
| 2013/0205194 A1 | 8/2013 | Decker et al. |
| 2013/0215044 A1 | 8/2013 | Ahn et al. |
| 2013/0222271 A1 | 8/2013 | Alberth et al. |
| 2013/0225152 A1 | 8/2013 | Matthews et al. |
| 2013/0232443 A1 | 9/2013 | Ryu et al. |
| 2013/0234964 A1 | 9/2013 | Kim et al. |
| 2013/0239060 A1 | 9/2013 | Kang et al. |
| 2013/0239063 A1 | 9/2013 | Ubillos et al. |
| 2013/0254705 A1 | 9/2013 | Mooring et al. |
| 2013/0305189 A1 | 11/2013 | Kim |
| 2013/0314204 A1 | 11/2013 | Ho et al. |
| 2013/0316763 A1 | 11/2013 | Kader |
| 2013/0318437 A1 | 11/2013 | Jung et al. |
| 2013/0318466 A1 | 11/2013 | Estrada et al. |
| 2013/0322218 A1 | 12/2013 | Burkhardt et al. |
| 2013/0326418 A1 | 12/2013 | Utsuki et al. |
| 2013/0332856 A1 | 12/2013 | Sanders et al. |
| 2013/0345978 A1 | 12/2013 | Lush et al. |
| 2013/0345980 A1 | 12/2013 | Van Os et al. |
| 2014/0013414 A1 | 1/2014 | Bruck et al. |
| 2014/0022183 A1 | 1/2014 | Ayoub et al. |
| 2014/0037109 A1 | 2/2014 | Ban |
| 2014/0043367 A1 | 2/2014 | Sakaino et al. |
| 2014/0047525 A1 | 2/2014 | Bonhoff |
| 2014/0055495 A1 | 2/2014 | Kim et al. |
| 2014/0059493 A1 | 2/2014 | Kim |
| 2014/0068755 A1 | 3/2014 | King et al. |
| 2014/0074570 A1 | 3/2014 | Hope et al. |
| 2014/0082533 A1 | 3/2014 | Kelley et al. |
| 2014/0094224 A1 | 4/2014 | Lozovoy et al. |
| 2014/0101169 A1 | 4/2014 | Kurata et al. |
| 2014/0126336 A1 | 5/2014 | Goeller et al. |
| 2014/0129959 A1 | 5/2014 | Battles et al. |
| 2014/0135631 A1 | 5/2014 | Brumback et al. |
| 2014/0139454 A1 | 5/2014 | Mistry et al. |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0157189 A1 | 6/2014 | Morita |
| 2014/0157321 A1 | 6/2014 | Kurita et al. |
| 2014/0164907 A1 | 6/2014 | Jung et al. |
| 2014/0173439 A1 | 6/2014 | Gutierrez et al. |
| 2014/0179272 A1 | 6/2014 | Zhang et al. |
| 2014/0189578 A1 | 7/2014 | Shuttleworth et al. |
| 2014/0189584 A1 | 7/2014 | Weng et al. |
| 2014/0200691 A1 | 7/2014 | Lee et al. |
| 2014/0201655 A1 | 7/2014 | Mahaffey et al. |
| 2014/0229752 A1 | 8/2014 | Lee et al. |
| 2014/0244009 A1 | 8/2014 | Mestas |
| 2014/0244165 A1 | 8/2014 | Bells et al. |
| 2014/0245161 A1 | 8/2014 | Yuen et al. |
| 2014/0245177 A1 | 8/2014 | Maklouf et al. |
| 2014/0250374 A1 | 9/2014 | Ohki et al. |
| 2014/0250391 A1 | 9/2014 | Jong et al. |
| 2014/0253487 A1 | 9/2014 | Bezinge et al. |
| 2014/0258935 A1 | 9/2014 | Nishida et al. |
| 2014/0267303 A1 | 9/2014 | Larkin et al. |
| 2014/0276244 A1 | 9/2014 | Kamyar |
| 2014/0282103 A1 | 9/2014 | Crandall |
| 2014/0282153 A1 | 9/2014 | Christiansen et al. |
| 2014/0282254 A1 | 9/2014 | Feiereisen et al. |
| 2014/0289660 A1 | 9/2014 | Min |
| 2014/0293755 A1 | 10/2014 | Geiser et al. |
| 2014/0304664 A1 | 10/2014 | Lee et al. |
| 2014/0310350 A1 | 10/2014 | Borggaard et al. |
| 2014/0310618 A1 | 10/2014 | Venkatesh |
| 2014/0317543 A1 | 10/2014 | Kim |
| 2014/0325384 A1 | 10/2014 | Kobayashi |
| 2014/0325408 A1 | 10/2014 | Leppanen et al. |
| 2014/0328151 A1 | 11/2014 | Serber |
| 2014/0331314 A1 | 11/2014 | Fujioka |
| 2014/0342792 A1 | 11/2014 | Markus |
| 2014/0344723 A1 | 11/2014 | Malik et al. |
| 2014/0344951 A1 | 11/2014 | Brewer |
| 2014/0347275 A1 | 11/2014 | Jung et al. |
| 2014/0359477 A1 | 12/2014 | Chen |
| 2014/0362105 A1 | 12/2014 | Kocienda et al. |
| 2014/0371887 A1 | 12/2014 | Hoffman et al. |
| 2014/0380229 A1 | 12/2014 | Volodin et al. |
| 2015/0011204 A1 | 1/2015 | Seo et al. |
| 2015/0015500 A1 | 1/2015 | Lee et al. |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0026615 A1 | 1/2015 | Choi et al. |
| 2015/0037545 A1 | 2/2015 | Sun |
| 2015/0043046 A1 | 2/2015 | Iwamoto |
| 2015/0049033 A1 | 2/2015 | Kim et al. |
| 2015/0052461 A1 | 2/2015 | Sullivan et al. |
| 2015/0055197 A1 | 2/2015 | Romanoff et al. |
| 2015/0058651 A1 | 2/2015 | Choi et al. |
| 2015/0062130 A1 | 3/2015 | Ho |
| 2015/0067596 A1 | 3/2015 | Brown et al. |
| 2015/0071043 A1 | 3/2015 | Kubota |
| 2015/0082193 A1 | 3/2015 | Wallace et al. |
| 2015/0083970 A1 | 3/2015 | Koh et al. |
| 2015/0100621 A1 | 4/2015 | Pan |
| 2015/0105125 A1 | 4/2015 | Min et al. |
| 2015/0106221 A1 | 4/2015 | Tapley et al. |
| 2015/0106752 A1 | 4/2015 | Yang |
| 2015/0111558 A1 | 4/2015 | Yang |
| 2015/0112700 A1 | 4/2015 | Sublett et al. |
| 2015/0113468 A1 | 4/2015 | Clark |
| 2015/0117162 A1 | 4/2015 | Tsai et al. |
| 2015/0118657 A1 | 4/2015 | Shrake et al. |
| 2015/0128078 A1 | 5/2015 | Oh et al. |
| 2015/0143234 A1 | 5/2015 | Norris, III |
| 2015/0160806 A1 | 6/2015 | Fey et al. |

(56) References Cited

U.S. PATENT DOCUMENTS

| | | |
|---|---|---|
| 2015/0160812 A1 | 6/2015 | Yuan et al. |
| 2015/0160856 A1 | 6/2015 | Jang et al. |
| 2015/0163210 A1 | 6/2015 | Meyers et al. |
| 2015/0172438 A1 | 6/2015 | Yang |
| 2015/0185703 A1 | 7/2015 | Tanaka |
| 2015/0185995 A1 | 7/2015 | Shoemaker et al. |
| 2015/0194137 A1 | 7/2015 | Wyatt |
| 2015/0205509 A1 | 7/2015 | Scriven et al. |
| 2015/0207922 A1 | 7/2015 | Kobayashi et al. |
| 2015/0217163 A1 | 8/2015 | Amis et al. |
| 2015/0248235 A1 | 9/2015 | Offenberg et al. |
| 2015/0253736 A1 | 9/2015 | Watterson |
| 2015/0253740 A1 | 9/2015 | Nishijima et al. |
| 2015/0254875 A1 | 9/2015 | Zhang |
| 2015/0277545 A1 | 10/2015 | Flowers et al. |
| 2015/0286372 A1 | 10/2015 | Swindell et al. |
| 2015/0286391 A1 | 10/2015 | Jacobs et al. |
| 2015/0301506 A1 | 10/2015 | Koumaiha |
| 2015/0301608 A1 | 10/2015 | Nagaraju et al. |
| 2015/0302624 A1 | 10/2015 | Burke |
| 2015/0317945 A1 | 11/2015 | Andress et al. |
| 2015/0339261 A1 | 11/2015 | Jha et al. |
| 2015/0346694 A1 | 12/2015 | Hoobler et al. |
| 2015/0355830 A1 | 12/2015 | Chaudhri et al. |
| 2015/0365892 A1 | 12/2015 | Ma et al. |
| 2015/0366518 A1 | 12/2015 | Sampson |
| 2015/0370469 A1 | 12/2015 | Leong et al. |
| 2015/0379476 A1 | 12/2015 | Chaudhri et al. |
| 2016/0004393 A1 | 1/2016 | Faaborg et al. |
| 2016/0022202 A1 | 1/2016 | Peterson et al. |
| 2016/0027420 A1 | 1/2016 | Eronen |
| 2016/0034133 A1 | 2/2016 | Wilson et al. |
| 2016/0034148 A1* | 2/2016 | Wilson .................... G06F 1/163 715/835 |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0044091 A1 | 2/2016 | Doumet |
| 2016/0048283 A1 | 2/2016 | Yang et al. |
| 2016/0054710 A1 | 2/2016 | Jo et al. |
| 2016/0054892 A1 | 2/2016 | Kim et al. |
| 2016/0058337 A1 | 3/2016 | Blahnik et al. |
| 2016/0062450 A1 | 3/2016 | Han et al. |
| 2016/0062540 A1 | 3/2016 | Yang et al. |
| 2016/0062570 A1 | 3/2016 | Dascola et al. |
| 2016/0062572 A1 | 3/2016 | Yang et al. |
| 2016/0062589 A1 | 3/2016 | Wan et al. |
| 2016/0062630 A1 | 3/2016 | Anzures et al. |
| 2016/0073034 A1 | 3/2016 | Mukherjee et al. |
| 2016/0085397 A1 | 3/2016 | Jain |
| 2016/0091867 A1 | 3/2016 | Mansour et al. |
| 2016/0098137 A1 | 4/2016 | Kim et al. |
| 2016/0134840 A1 | 5/2016 | Mcculloch |
| 2016/0142763 A1 | 5/2016 | Kim et al. |
| 2016/0165037 A1 | 6/2016 | Youn et al. |
| 2016/0170731 A1 | 6/2016 | Maddern et al. |
| 2016/0179353 A1 | 6/2016 | Iskander |
| 2016/0180568 A1 | 6/2016 | Bullivant et al. |
| 2016/0188179 A1 | 6/2016 | Roh |
| 2016/0188181 A1 | 6/2016 | Smith |
| 2016/0191511 A1 | 6/2016 | Tijerina et al. |
| 2016/0217601 A1 | 7/2016 | Tsuda et al. |
| 2016/0261675 A1 | 9/2016 | Block et al. |
| 2016/0266548 A1 | 9/2016 | Akiyama |
| 2016/0283094 A1 | 9/2016 | Choi |
| 2016/0320756 A1 | 11/2016 | Lee et al. |
| 2016/0327911 A1 | 11/2016 | Bim et al. |
| 2016/0327915 A1 | 11/2016 | Katzer et al. |
| 2016/0332025 A1 | 11/2016 | Repka |
| 2016/0342327 A1 | 11/2016 | Chi et al. |
| 2016/0357354 A1 | 12/2016 | Chen et al. |
| 2016/0357386 A1 | 12/2016 | Choi |
| 2016/0358311 A1 | 12/2016 | Chen et al. |
| 2017/0011210 A1 | 1/2017 | Cheong et al. |
| 2017/0039535 A1 | 2/2017 | Park et al. |
| 2017/0045993 A1 | 2/2017 | Oh et al. |
| 2017/0046024 A1 | 2/2017 | Dascola et al. |
| 2017/0046052 A1 | 2/2017 | Lee et al. |
| 2017/0053542 A1 | 2/2017 | Wilson et al. |
| 2017/0061934 A1 | 3/2017 | Shin |
| 2017/0068407 A1 | 3/2017 | Wilson et al. |
| 2017/0075305 A1 | 3/2017 | Ryu et al. |
| 2017/0075316 A1 | 3/2017 | Berdinis et al. |
| 2017/0082983 A1 | 3/2017 | Katzer et al. |
| 2017/0109011 A1 | 4/2017 | Jiang |
| 2017/0123571 A1 | 5/2017 | Huang et al. |
| 2017/0123640 A1 | 5/2017 | Wilson et al. |
| 2017/0134321 A1 | 5/2017 | Ushio et al. |
| 2017/0149795 A1 | 5/2017 | Day, II |
| 2017/0160898 A1 | 6/2017 | Lee et al. |
| 2017/0176950 A1 | 6/2017 | Jung et al. |
| 2017/0186399 A1 | 6/2017 | Moritani et al. |
| 2017/0209766 A1 | 7/2017 | Riley et al. |
| 2017/0230236 A1 | 8/2017 | Kim et al. |
| 2017/0255169 A1 | 9/2017 | Lee et al. |
| 2017/0257426 A1 | 9/2017 | Wilbur et al. |
| 2017/0266494 A1 | 9/2017 | Crankson et al. |
| 2017/0269715 A1 | 9/2017 | Kim et al. |
| 2017/0269792 A1 | 9/2017 | Xu et al. |
| 2017/0277136 A1 | 9/2017 | Minami et al. |
| 2017/0286913 A1 | 10/2017 | Liu et al. |
| 2017/0287312 A1 | 10/2017 | Schofield et al. |
| 2017/0294174 A1 | 10/2017 | Albadawi et al. |
| 2017/0300013 A1 | 10/2017 | Satou et al. |
| 2017/0322658 A1 | 11/2017 | Lee et al. |
| 2017/0322711 A1 | 11/2017 | Robinson et al. |
| 2017/0325196 A1 | 11/2017 | Cho et al. |
| 2017/0337554 A1 | 11/2017 | Mokhasi et al. |
| 2017/0354845 A1 | 12/2017 | Williams et al. |
| 2017/0357329 A1 | 12/2017 | Park et al. |
| 2017/0357358 A1 | 12/2017 | Teutschler et al. |
| 2017/0357426 A1* | 12/2017 | Wilson ................ G06F 3/04847 |
| 2017/0357427 A1 | 12/2017 | Wilson et al. |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0052428 A1 | 2/2018 | Abramov |
| 2018/0059903 A1 | 3/2018 | Lim et al. |
| 2018/0061308 A1 | 3/2018 | Bae et al. |
| 2018/0067633 A1 | 3/2018 | Wilson et al. |
| 2018/0074462 A1 | 3/2018 | Helder et al. |
| 2018/0081515 A1* | 3/2018 | Block .................... G06F 3/0481 |
| 2018/0088537 A1 | 3/2018 | Murai |
| 2018/0088797 A1 | 3/2018 | Mcatee et al. |
| 2018/0097925 A1 | 4/2018 | Ryu et al. |
| 2018/0120927 A1 | 5/2018 | Ma et al. |
| 2018/0121060 A1 | 5/2018 | Jeong et al. |
| 2018/0136810 A1 | 5/2018 | Martin et al. |
| 2018/0150212 A1 | 5/2018 | Chen et al. |
| 2018/0150443 A1 | 5/2018 | Singleton |
| 2018/0157452 A1 | 6/2018 | Nelson et al. |
| 2018/0181078 A1 | 6/2018 | Imamura |
| 2018/0181381 A1 | 6/2018 | Michaely et al. |
| 2018/0188925 A1 | 7/2018 | Na et al. |
| 2018/0246635 A1 | 8/2018 | Baer et al. |
| 2018/0246639 A1 | 8/2018 | Han et al. |
| 2018/0260080 A1 | 9/2018 | Cho |
| 2018/0261183 A1 | 9/2018 | Gou et al. |
| 2018/0275739 A1 | 9/2018 | Minami et al. |
| 2018/0288560 A1 | 10/2018 | Naik et al. |
| 2018/0316783 A1 | 11/2018 | Ye et al. |
| 2018/0321842 A1 | 11/2018 | Lee et al. |
| 2018/0329587 A1* | 11/2018 | Ko ...................... G06F 3/04842 |
| 2018/0335927 A1 | 11/2018 | Anzures et al. |
| 2018/0343023 A1 | 11/2018 | Park et al. |
| 2018/0352435 A1 | 12/2018 | Donley et al. |
| 2018/0374429 A1 | 12/2018 | Nakamura |
| 2019/0069244 A1 | 2/2019 | Jeon et al. |
| 2019/0121300 A1* | 4/2019 | Peterson ............... G04G 99/006 |
| 2019/0139207 A1 | 5/2019 | Jeong et al. |
| 2019/0212707 A1 | 7/2019 | Minami et al. |
| 2019/0213037 A1 | 7/2019 | Kim et al. |
| 2019/0235748 A1 | 8/2019 | Seol et al. |
| 2019/0250813 A1 | 8/2019 | Block et al. |

(56) References Cited

U.S. PATENT DOCUMENTS

| | | | |
|---|---|---|---|
| 2019/0279520 A1 | 9/2019 | Wilson et al. |
| 2019/0281154 A1 | 9/2019 | Choi et al. |
| 2019/0302972 A1 | 10/2019 | Kline et al. |
| 2019/0339860 A1 | 11/2019 | Chen et al. |
| 2019/0340348 A1 | 11/2019 | Yu et al. |
| 2019/0349469 A1 | 11/2019 | Skogen et al. |
| 2020/0042311 A1 | 2/2020 | Shin |
| 2020/0050332 A1 | 2/2020 | Yang et al. |
| 2020/0068095 A1 | 2/2020 | Nabetani |
| 2020/0125037 A1 | 4/2020 | Jo et al. |
| 2020/0133206 A1 | 4/2020 | Jo et al. |
| 2020/0249632 A1 | 8/2020 | Olwal et al. |
| 2020/0264567 A1* | 8/2020 | Ok .................. G04G 21/04 |
| 2020/0342144 A1 | 10/2020 | Alameh et al. |
| 2020/0348827 A1 | 11/2020 | Wilson et al. |
| 2020/0356063 A1 | 11/2020 | Guzman et al. |
| 2020/0356224 A1 | 11/2020 | Wilson |
| 2020/0356242 A1 | 11/2020 | Wilson et al. |
| 2020/0356252 A1 | 11/2020 | Ko et al. |
| 2020/0359204 A1 | 11/2020 | Hawkins et al. |
| 2020/0379413 A1 | 12/2020 | Chen et al. |
| 2021/0042028 A1 | 2/2021 | Block et al. |
| 2021/0048929 A1 | 2/2021 | Agnoli et al. |
| 2021/0149694 A1 | 5/2021 | Guzman et al. |
| 2021/0216654 A1 | 7/2021 | Ko et al. |
| 2021/0294438 A1 | 9/2021 | Yang et al. |
| 2021/0349426 A1 | 11/2021 | Chen et al. |
| 2021/0349427 A1 | 11/2021 | Chen et al. |
| 2021/0349611 A1 | 11/2021 | Chen et al. |
| 2021/0349741 A1 | 11/2021 | Guzman et al. |
| 2022/0157184 A1 | 5/2022 | Wilson et al. |
| 2022/0198984 A1 | 6/2022 | Connor et al. |
| 2022/0214785 A1 | 7/2022 | Giv |
| 2022/0221964 A1 | 7/2022 | Ko et al. |
| 2022/0229537 A1 | 7/2022 | Chen et al. |
| 2022/0236867 A1 | 7/2022 | Chen et al. |
| 2022/0276780 A1 | 9/2022 | Ko et al. |

FOREIGN PATENT DOCUMENTS

| | | |
|---|---|---|
| AU | 2015101639 A4 | 12/2015 |
| CA | 2356232 A1 | 3/2002 |
| CA | 2781636 A1 | 7/2010 |
| CA | 2800123 C | 7/2016 |
| CA | 2986980 A1 | 5/2019 |
| CH | 707412 A2 | 6/2014 |
| CN | 1337638 A | 2/2002 |
| CN | 1397904 A | 2/2003 |
| CN | 1536511 A | 10/2004 |
| CN | 1610866 A | 4/2005 |
| CN | 1997957 A | 7/2007 |
| CN | 101382438 A | 3/2009 |
| CN | 101505320 A | 8/2009 |
| CN | 101627349 A | 1/2010 |
| CN | 101702112 A | 5/2010 |
| CN | 101819486 A | 9/2010 |
| CN | 101939740 A | 1/2011 |
| CN | 101981987 A | 2/2011 |
| CN | 102681648 A | 9/2012 |
| CN | 102687176 A | 9/2012 |
| CN | 102750070 A | 10/2012 |
| CN | 103154954 A | 6/2013 |
| CN | 103399480 A | 11/2013 |
| CN | 103544920 A | 1/2014 |
| CN | 103562832 A | 2/2014 |
| CN | 103607660 A | 2/2014 |
| CN | 103649897 A | 3/2014 |
| CN | 103902165 A | 7/2014 |
| CN | 103914238 A | 7/2014 |
| CN | 103973899 A | 8/2014 |
| CN | 203773233 U | 8/2014 |
| CN | 104281405 A | 1/2015 |
| CN | 104487929 A | 4/2015 |
| CN | 104501043 A | 4/2015 |
| CN | 104580576 A | 4/2015 |
| CN | 105204931 A | 12/2015 |
| CN | 105260049 A | 1/2016 |
| CN | 105264479 A | 1/2016 |
| CN | 105335087 A | 2/2016 |
| CN | 105388966 A | 3/2016 |
| CN | 105389078 A | 3/2016 |
| CN | 105389107 A | 3/2016 |
| CN | 105453016 A | 3/2016 |
| CN | 205608658 U | 9/2016 |
| CN | 106056848 A | 10/2016 |
| CN | 106486044 A | 3/2017 |
| CN | 106605201 A | 4/2017 |
| CN | 107239101 A | 10/2017 |
| CN | 107643677 A | 1/2018 |
| CN | 107870560 A | 4/2018 |
| CN | 108255049 A | 7/2018 |
| CN | 109196469 A | 1/2019 |
| CN | 109313655 A | 2/2019 |
| CN | 109690445 A | 4/2019 |
| DE | 202017105858 U1 | 3/2018 |
| EP | 0579093 A1 | 1/1994 |
| EP | 0831629 A2 | 3/1998 |
| EP | 1659504 A2 | 5/2006 |
| EP | 1674889 A1 | 6/2006 |
| EP | 1674977 A2 | 6/2006 |
| EP | 1750242 A2 | 2/2007 |
| EP | 1832969 A2 | 9/2007 |
| EP | 1855170 A2 | 11/2007 |
| EP | 2120115 A2 | 11/2009 |
| EP | 2194508 A1 | 6/2010 |
| EP | 2204702 A1 | 7/2010 |
| EP | 2290922 A1 | 3/2011 |
| EP | 2312512 A1 | 4/2011 |
| EP | 2360902 A2 | 8/2011 |
| EP | 2413577 A2 | 2/2012 |
| EP | 2423810 A1 | 2/2012 |
| EP | 2426902 A1 | 3/2012 |
| EP | 2600215 A1 | 6/2013 |
| EP | 2629483 A1 | 8/2013 |
| EP | 2738640 A2 | 6/2014 |
| EP | 2942932 A1 | 11/2015 |
| EP | 2990887 A2 | 3/2016 |
| EP | 2993602 A1 | 3/2016 |
| EP | 3056949 A1 | 8/2016 |
| EP | 3101958 A1 | 12/2016 |
| EP | 3376342 A1 | 9/2018 |
| EP | 3401770 A1 | 11/2018 |
| GB | 2475669 A | 6/2011 |
| JP | 49-134364 A | 12/1974 |
| JP | 53-31170 A | 3/1978 |
| JP | 56-621 A | 1/1981 |
| JP | 3007616 U | 2/1995 |
| JP | 8-110955 A | 4/1996 |
| JP | 9-251084 A | 9/1997 |
| JP | 10-143636 A | 5/1998 |
| JP | 11-109066 A | 4/1999 |
| JP | 11-160470 A | 6/1999 |
| JP | 11-232013 A | 8/1999 |
| JP | 3062531 B2 | 7/2000 |
| JP | 2001-144884 A | 5/2001 |
| JP | 2001-147282 A | 5/2001 |
| JP | 2001-273064 A | 10/2001 |
| JP | 2001-313886 A | 11/2001 |
| JP | 2001-318852 A | 11/2001 |
| JP | 2002-73486 A | 3/2002 |
| JP | 2002-507718 A | 3/2002 |
| JP | 2002-251238 A | 9/2002 |
| JP | 2002-271451 A | 9/2002 |
| JP | 2003-9404 A | 1/2003 |
| JP | 2003-233616 A | 8/2003 |
| JP | 2003-296246 A | 10/2003 |
| JP | 2004-28918 A | 1/2004 |
| JP | 2004-184396 A | 7/2004 |
| JP | 2005-521890 A | 7/2005 |
| JP | 2005-339017 A | 12/2005 |
| JP | 2006-101505 A | 4/2006 |
| JP | 2006-293340 A | 10/2006 |
| JP | 2008-175800 A | 7/2008 |
| JP | 2009-147889 A | 7/2009 |

(56) References Cited

FOREIGN PATENT DOCUMENTS

| | | |
|---|---|---|
| JP | 2009-293960 A | 12/2009 |
| JP | 2010-124181 A | 6/2010 |
| JP | 2010-257051 A | 11/2010 |
| JP | 3168099 U | 6/2011 |
| JP | 2011-159172 A | 8/2011 |
| JP | 2011-217000 A | 10/2011 |
| JP | 2012-32306 A | 2/2012 |
| JP | 2012-53642 A | 3/2012 |
| JP | 2012-505478 A | 3/2012 |
| JP | 2012-109778 A | 6/2012 |
| JP | 2012-147432 A | 8/2012 |
| JP | 2012-517630 A | 8/2012 |
| JP | 2012-203537 A | 10/2012 |
| JP | 2012-203832 A | 10/2012 |
| JP | 2012-531607 A | 12/2012 |
| JP | 2013-3671 A | 1/2013 |
| JP | 2013-29925 A | 2/2013 |
| JP | 2013-92989 A | 5/2013 |
| JP | 2013-232230 A | 11/2013 |
| JP | 2014-35766 A | 2/2014 |
| JP | 2014-123197 A | 7/2014 |
| JP | 2014-143575 A | 8/2014 |
| JP | 2014-519126 A | 8/2014 |
| JP | 2014-216868 A | 11/2014 |
| JP | 5630676 B2 | 11/2014 |
| JP | 2015-210587 A | 11/2015 |
| JP | 2016-13151 A | 1/2016 |
| JP | 2017-527026 A | 9/2017 |
| JP | 2017-531225 A | 10/2017 |
| JP | 2017-531230 A | 10/2017 |
| JP | 2018-514838 A | 6/2018 |
| JP | 2018-113544 A | 7/2018 |
| JP | 2018-116067 A | 7/2018 |
| KR | 10-2004-0107489 A | 12/2004 |
| KR | 20-0425314 Y1 | 9/2006 |
| KR | 10-2007-0025292 A | 3/2007 |
| KR | 10-2008-0058246 A | 6/2008 |
| KR | 10-2009-0112132 A | 10/2009 |
| KR | 10-2011-0093729 A | 8/2011 |
| KR | 10-2012-0132134 A | 12/2012 |
| KR | 10-2013-0109466 A | 10/2013 |
| KR | 10-2014-0025552 A | 3/2014 |
| KR | 10-2014-0064687 A | 5/2014 |
| KR | 10-2015-0038711 A | 4/2015 |
| KR | 10-2015-0081140 A | 7/2015 |
| KR | 10-2016-0026314 A | 3/2016 |
| KR | 10-2017-0032471 A | 3/2017 |
| KR | 10-2017-0076452 A | 7/2017 |
| KR | 10-2017-0081391 A | 7/2017 |
| KR | 10-2017-0082698 A | 7/2017 |
| KR | 10-2018-0011581 A | 2/2018 |
| KR | 10-2019-0020850 A | 3/2019 |
| KR | 10-2019-0071285 A | 6/2019 |
| TW | 498240 B | 8/2002 |
| TW | 546942 B | 8/2003 |
| TW | 200512616 A | 4/2005 |
| TW | 200850058 A | 12/2008 |
| TW | 200915698 A | 4/2009 |
| TW | 1348803 B | 9/2011 |
| TW | 201232486 A | 8/2012 |
| TW | 201419115 A | 5/2014 |
| WO | 1998/40795 A1 | 9/1998 |
| WO | 2001/71433 A1 | 9/2001 |
| WO | 2002/054157 A1 | 7/2002 |
| WO | 2003/048872 A1 | 6/2003 |
| WO | 03/085460 A2 | 10/2003 |
| WO | 2006/012343 A2 | 2/2006 |
| WO | 2006/112641 A1 | 10/2006 |
| WO | 2007/018881 A2 | 2/2007 |
| WO | 2008/114491 A1 | 9/2008 |
| WO | 2009/053775 A1 | 4/2009 |
| WO | 2009/146857 A2 | 12/2009 |
| WO | 2010/017627 A1 | 2/2010 |
| WO | 2011/000893 A1 | 1/2011 |
| WO | 2011/062871 A2 | 5/2011 |
| WO | 2011/099819 A2 | 8/2011 |
| WO | 2012/021507 A2 | 2/2012 |
| WO | 2012/161434 A2 | 11/2012 |
| WO | 2012/170446 A2 | 12/2012 |
| WO | 2013/051048 A1 | 4/2013 |
| WO | 2013/093558 A1 | 6/2013 |
| WO | 2013/136548 A1 | 9/2013 |
| WO | 2013/169842 A2 | 11/2013 |
| WO | 2013/169846 A1 | 11/2013 |
| WO | 2013/169849 A2 | 11/2013 |
| WO | 2013/169875 A2 | 11/2013 |
| WO | 2013/169882 A2 | 11/2013 |
| WO | 2014/078114 A1 | 5/2014 |
| WO | 2014/081181 A1 | 5/2014 |
| WO | 2014/105274 A1 | 7/2014 |
| WO | 2014/105278 A1 | 7/2014 |
| WO | 2014/189197 A1 | 11/2014 |
| WO | 2014/200730 A1 | 12/2014 |
| WO | 2015/023419 A1 | 2/2015 |
| WO | 2015/029313 A1 | 3/2015 |
| WO | 2015/065402 A1 | 5/2015 |
| WO | 2015/163536 A1 | 10/2015 |
| WO | 2016/022203 A1 | 2/2016 |
| WO | 2016/022204 A1 | 2/2016 |
| WO | 2016/022205 A1 | 2/2016 |
| WO | 2016/022496 A2 | 2/2016 |
| WO | 2016/032076 A1 | 3/2016 |
| WO | 2016/036427 A1 | 3/2016 |
| WO | 2016/036522 A2 | 3/2016 |
| WO | 2016/057062 A1 | 4/2016 |
| WO | 2016/099097 A1 | 6/2016 |
| WO | 2016/144385 A1 | 9/2016 |
| WO | 2016/144563 A1 | 9/2016 |
| WO | 2016/144977 A1 | 9/2016 |
| WO | 2017/062621 A1 | 4/2017 |
| WO | 2017/213777 A1 | 12/2017 |
| WO | 2017/213937 A1 | 12/2017 |
| WO | 2018/048700 A1 | 3/2018 |
| WO | 2018/213451 A1 | 11/2018 |
| WO | 2019/200350 A1 | 10/2019 |
| WO | 2019/217086 A2 | 11/2019 |
| WO | 2019/217249 A2 | 11/2019 |
| WO | 2021/050190 A1 | 3/2021 |

OTHER PUBLICATIONS

Notice of Acceptance received for Australian Patent Application No. 2020309093, dated Jul. 8, 2021, 3 pages.
Notice of Acceptance received for Australian Patent Application No. 2021202834, dated Jul. 15, 2021, 3 pages.
Notice of Allowance received for U.S. Appl. No. 16/582,020, dated Jul. 27, 2021, 29 pages.
Office Action received for Australian Patent Application No. 2020239749, dated Jul. 16, 2021, 5 pages.
Office Action received for Korean Patent Application No. 10-2020-7028759, dated Jun. 29, 2021, 12 pages (5 pages of English Translation and 7 pages of Official Copy).
Applicant Initiated Interview Summary received for U.S. Appl. No. 16/582,020, dated Jul. 9, 2021, 4 pages.
Applicant-Initiated Interview Summary received for U.S. Appl. No. 15/405,122, dated Jul. 7, 2021, 4 pages.
Applicant-Initiated Interview Summary received for U.S. Appl. No. 17/031,654, dated Feb. 1, 2021, 2 pages.
Non-Final Office Action received for U.S. Appl. No. 17/031,654, dated Nov. 19, 2020, 12 pages.
Non-Final Office Action received for U.S. Appl. No. 17/031,671, dated Apr. 30, 2021, 27 pages.
Non-Final Office Action received for U.S. Appl. No. 17/031,765, dated Jun. 28, 2021, 32 pages.
Notice of Acceptance received for Australian Patent Application No. 2020239670, dated Jul. 2, 2021, 3 pages.
Notice of Acceptance received for Australian Patent Application No. 2021202836, dated Jun. 25, 2021, 3 pages.
Notice of Allowance received for Chinese Patent Application No. 201780033973.7, dated Jul. 7, 2021, 5 pages (1 page of English Translation and 4 pages of Official Copy).

(56) References Cited

OTHER PUBLICATIONS

Notice of Allowance received for Japanese Patent Application No. 2020-551465, dated Jun. 28, 2021, 4 pages (1 page of English Translation and 3 pages of Official Copy).
Notice of Allowance received for U.S. Appl. No. 17/031,654, dated Feb. 10, 2021, 9 pages.
Notice of Allowance received for U.S. Appl. No. 17/031,654, dated May 27, 2021, 8 pages.
Office Action received for Australian Patent Application No. 2019267413, dated Jun. 29, 2021, 3 pages.
Office Action received for Australian Patent Application No. 2020239774, dated Jun. 28, 2021, 8 pages.
Office Action received for Danish Patent Application No. PA202070624, dated Jun. 16, 2021, 5 pages.
Office Action received for Danish Patent Application No. PA202070625, dated Jun. 16, 2021, 3 pages.
Office Action received for European Patent Application No. 17810723.1, dated Jul. 9, 2021, 8 pages.
Office Action received for European Patent Application No. 20172197.4, dated Jul. 8, 2021, 5 pages.
Search Report and Opinion received for Danish Patent Application No. PA202070623, dated Dec. 21, 2020, 9 pages.
Search Report and Opinion received for Danish Patent Application No. PA202070624, dated Dec. 10, 2020, 10 pages.
Search Report and Opinion received for Danish Patent Application No. PA202070625, dated Dec. 17, 2020, 9 pages.
Wade Cliff, "Get the most out of Nova Launcher: Changing Icon Sizes", Online available at: https://www.androidguys.com/tips-tools/get-nova-launcher-changing-icon-sizes/, Nov. 16, 2015, 6 pages.
Advisory Action received for U.S. Appl. No. 14/841,606, dated Feb. 28, 2019, 3 pages.
2RaZ Tech&Moto, "Sony Smartwatch 2 update—new feartures and watchface creator NEW!!!", Online available at:—https://www.youtube.com/watch?v=k3jjBv7QZSk, May 8, 2014, 3 pages.
Advisory Action received for U.S. Appl. No. 14/815,898, dated Aug. 30, 2016, 3 pages.
Advisory Action received for U.S. Appl. No. 14/846,511, dated Oct. 22, 2019, 5 pages.
Advisory Action received for U.S. Appl. No. 14/846,511, dated Sep. 19, 2018, 8 pages.
Advisory Action received for U.S. Appl. No. 15/421,865, dated Apr. 16, 2020, 7 pages.
Advisory Action received for U.S. Appl. No. 15/554,204, dated Mar. 12, 2020, 3 pages.
Advisory Action received for U.S. Appl. No. 16/389,722, dated Mar. 9, 2021, 5 pages.
Advisory Action received for U.S. Appl. No. 16/582,020, dated Aug. 3, 2020, 4 pages.
AdyClock—Night Alarm Clock, App for android, Google play store page: https://web.archive.org/web/20130924223153/https://play.google.com/store/apps/details?id=com.adyclock&hl=en, Sep. 24, 2013, 2 pages.
Airshow, "Airshow App for Mobile Devices", 2012, 4 pages.
Andro Dollar, "Huawei Watch GT Always on Mode UPDATE is finally here! ????", Online Available at: https://www.youtube.com/watch?v=AJw_FIAf7v4, Jun. 6, 2019, 4 pages.
Android Central, "BeWeather weather app for Android", Available online at: <https://www.youtube.com/watch?v=G2EY2K-XkSI>, Sep. 1, 2011, 1 page.
Android Central, "Changing the watchface on your Android Weardevice", Retrieved from: https://www.youtube.com/watch?v=YYwFe2K_qil, Jul. 2, 2014, 4 pages.
Android Tips, "Create a Minimal Lock Screen with WidgetLocker", Online Available at: http://appstap192.blogspot.com/2012/01/create-minimal-lock-screen-with.html, Jan. 18, 2012, 6 pages.
AOD too dim. I've answered my own question to help others, Online Available: https://forums.androidcentral.com/samsung-galaxy-s9-s9-plus/874444-aod-too-dim-ive-answered-my-own-question-help-others.html, Mar. 11, 2018, 3 pages.

APK Root, "Butterfly 3D Live Wallpaper 1.0 APK", Available at <http://net-suckga-ilauncher2.apk-dl.com/butterfly-3d-live-wallpaper>, Feb. 26, 2013, 7 pages.
Applicant Initiated Interview Summary received for U.S. Appl. No. 14/846,511, dated Apr. 20, 2020, 4 pages.
Applicant Initiated Interview Summary received for U.S. Appl. No. 16/389,722, dated Jul. 7, 2020, 5 pages.
Applicant Initiated Interview Summary received for U.S. Appl. No. 16/582,020, dated Jul. 14, 2020, 5 pages.
Applicant Initiated Interview Summary received for U.S. Appl. No. 16/582,020, dated Mar. 25, 2020, 5 pages.
Applicant Initiated Interview Summary received for U.S. Appl. No. 16/584,445, dated Mar. 17, 2020, 5 pages.
Applicant Initiated Interview Summary received for U.S. Appl. No. 16/585,399, dated Mar. 25, 2020, 3 pages.
Applicant-Initiated Interview Summary received for U.S. Appl. No. 15/405,122, dated Dec. 22, 2020, 5 pages.
Applicant-Initiated Interview Summary received for U.S. Appl. No. 15/405,122, dated May 21, 2020, 5 pages.
Applicant-Initiated Interview Summary received for U.S. Appl. No. 15/421,865, dated Dec. 15, 2020, 6 pages.
Applicant-Initiated Interview Summary received for U.S. Appl. No. 15/421,865, dated Feb. 3, 2020, 5 pages.
Applicant-Initiated Interview Summary received for U.S. Appl. No. 15/554,204, dated Jan. 31, 2020, 3 pages.
Applicant-Initiated Interview Summary received for U.S. Appl. No. 15/554,204, dated Oct. 11, 2019, 5 pages.
Applicant-Initiated Interview Summary received for U.S. Appl. No. 15/798,235, dated Feb. 3, 2020, 3 pages.
Applicant-Initiated Interview Summary received for U.S. Appl. No. 16/389,722, dated Feb. 11, 2021, 4 pages.
Applicant-Initiated Interview Summary received for U.S. Appl. No. 16/401,934, dated Feb. 23, 2021, 8 pages.
Applicant-Initiated Interview Summary received for U.S. Appl. No. 16/418,786, dated Mar. 30, 2021, 4 pages.
Applicant-Initiated Interview Summary received for U.S. Appl. No. 16/584,281, dated Mar. 9, 2020, 5 pages.
Applicant-Initiated Interview Summary received for U.S. Appl. No. 16/584,281, dated Sep. 14, 2020, 6 pages.
Applicant-Initiated Interview Summary received for U.S. Appl. No. 16/585,714, dated Jul. 20, 2020, 5 pages.
Applicant-Initiated Interview Summary received for U.S. Appl. No. 16/585,721, dated Aug. 31, 2020, 5 pages.
Applicant-Initiated Interview Summary received for U.S. Appl. No. 16/585,721, dated Mar. 13, 2020, 5 pages.
Applicant-Initiated Interview Summary received for U.S. Appl. No. 16/659,507, dated Nov. 17, 2020, 3 pages.
Applicant-Initiated Interview Summary received for U.S. Appl. No. 16/861,651, dated Mar. 25, 2021, 6 pages.
Applicant-Initiated Interview Summary received for U.S. Appl. No. 16/997,588, dated Jan. 29, 2021, 3 pages.
Applicant-Initiated Interview Summary received for U.S. Appl. No. 16/997,588, dated May 12, 2021, 2 pages.
Avdonin, Nikita, "Astroviewer 3D", Available at <:https://www.youtube.comjwatch?v=zY0tsIx3JHY/>, Nov. 5, 2013, 2 pages.
Baar, Marius, "Fitbit Ace—Unboxing, Setup and 24 Hour Test", YouTube [online] [video], Retrieved from: <https://youtu.be/ekvkfqOyrls>. See especially 4:44, Oct. 24, 2018, 3 pages.
Barbosa, Jonathan, "Weather Clock 2.1 for Android", APKPure, Online Available at: https://apkpure.com/weather-clock/com.urbandroid.wclock, Oct. 15, 2015, 3 pages.
Big Phil TV, "Gear S3 Watch faces with great always on display (A O D)", Available online at: https://www.youtube.com/watch?v=2cxMnrMiGU8, Apr. 5, 2017, 3 pages.
Bogdanov, Alexei, "SKMEI 1016", XP054977588, Available online at <URL:https://www.youtube.com/watch?v=E4q4Fug05Fw>, Jun. 21, 2014, 2 pages (Official Copy Only) (See Communication under 37 CFR § 1.98(a) (3)).
Brief Communication regarding Oral Proceedings received for European Patent Application No. 15730925.3, mailed on Feb. 18, 2020, 7 pages.

(56) References Cited

OTHER PUBLICATIONS

Brief Communication regarding Oral Proceedings received for European Patent Application No. 17206177.2, mailed on Nov. 21, 2019, 5 pages.
Brightness on lock screen, Online Available at: https://www.reddit.com/r/galaxys10/comments/b4d5fb/brightness_on_lock_screen/, 2019, 1 page.
Cancellation of Oral Proceedings received for European Patent Application No. 17206177.2, mailed on Dec. 4, 2019, 2 pages.
Castellini, Rick, "Google Earth", Retrieved from <https://www.youtube.com/watch?v=bgjMSBXsFZQ>, Feb. 12, 2013, 3 pages.
Cengic, Suad, "Samsung Gear S3—Display Always on! Cool!", Available online at: https://www.youtube.com/watch?v=ceeDinbPwOY, Mar. 10, 2017, 3 pages.
Clark, Josh, "Designing Great iPhone Apps", O'Reilly Japan Co., O'Reilly Tim, May 24, 2012, vol. 1, 5 pages (Official Copy Only) (See Communication under 37 CFR § 1.98(a) (3)).
Corrected Notice of Allowance received for U.S. Appl. No. 14/815,879, dated Jul. 13, 2017, 3 pages.
Corrected Notice of Allowance received for U.S. Appl. No. 14/815,879, dated Jul. 28, 2017, 3 pages.
Corrected Notice of Allowance received for U.S. Appl. No. 14/815,879, dated Sep. 21, 2017, 2 pages.
Corrected Notice of Allowance received for U.S. Appl. No. 15/183,663, dated Feb. 25, 2019, 3 pages.
Corrected Notice of Allowance received for U.S. Appl. No. 15/183,663, dated Mar. 27, 2019, 2 pages.
Corrected Notice of Allowance received for U.S. Appl. No. 15/355,956, dated Jan. 3, 2020, 2 pages.
Corrected Notice of Allowance received for U.S. Appl. No. 15/554,204, dated Aug. 19, 2020, 3 pages.
Corrected Notice of Allowance received for U.S. Appl. No. 15/798,257, dated Aug. 26, 2019, 2 pages.
Corrected Notice of Allowance received for U.S. Appl. No. 15/798,257, dated Jul. 9, 2019, 2 pages.
Corrected Notice of Allowance received for U.S. Appl. No. 15/798,257, dated Jun. 12, 2019, 2 pages.
Cyr, Jim, "Apple Watch—Customize Modular Watch Face", available online at: https://www.youtube.com/watch?v=02W93HbKIK8, May 13, 2015, 2 pages.
Dan, "Get This Look: 'Minimal' Zooper Widget", Online Available at:https://www.androidguys.com/featured/customize/get-look-minimal-zooper-widget/, Mar. 7, 2014, 2 pages.
Decision on Acceptance received for Australian Patent Application No. 2015298710, dated Jul. 19, 2019, 18 pages.
Decision on Acceptance received for Australian Patent Application No. 2018201089, dated Apr. 20, 2021, 28 pages.
Decision on Appeal received for U.S. Appl. No. 14/815,890, dated Nov. 24, 2020, 13 pages.
Decision on Opposition received for Australian PatentApplication No. 2015298710, mailed on Aug. 9, 2019, 4 pages.
Decision on Opposition received for Australian Patent Application No. 2015298710, mailed on Aug. 20, 2018, 20 pages.
Decision to Grant Received for Danish Patent Application No. PA201770397, dated Feb. 6, 2018, 2 pages.
Decision to Grant received for Danish Patent Application No. PA201770791, dated Jul. 7, 2020, 2 pages.
Decision to Grant received for Danish Patent Application No. PA201970596, dated Feb. 26, 2021, 2 pages.
Decision to Grant received for Danish Patent Application No. PA202070609, dated May 3, 2021, 2 pages.
Decision to Grant received for European Patent Application No. 15747595.5, dated Jul. 16, 2020, 2 pages.
Decision to Grant received for European Patent Application No. 17206177.2, dated Aug. 6, 2020, 2 pages.
Decision to Refuse received for European Patent Application No. 15730924.6, dated Mar. 15, 2019, 12 pages.
Deluxe Moon-Guide, available online at:—https://web.archive.org/web/20130520161057/http://www.lifewaresolutions.com/deluxe_moon_guide_ip.html, May 20, 2013, 5 pages.

Digital alarm clock app for Android, Goggle play store digital alarm clock description page, Mar. 25, 2015, 3 pages.
Droid Life, "How to: Use Always-on Apps with Android Wear", Available online at: https://www.youtube.com/watch?v=_-xYB9EBTaA, Jun. 26, 2015, 3 pages.
Ebpman Tech Reviews, "LG G3 Tips: How to customize the clock face", Available online at: https://www.youtube.com/watch?v=evraMWFb1fY, Jul. 25, 2014, 1 page.
Elecont, "Weather clock—hourly forecast description", Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.
European Search Report received for European Patent Application No. 17206177.2, dated Apr. 30, 2018, 4 pages.
European Search Report received for European Patent Application No. 20172197.4, dated Jul. 28, 2020, 4 pages.
Evgenyevich, Sergey, "Earth & Moon in HD Gyro 3D", Available at <https://www.youtube.com/watch?v=IRwNcaSYrls/>, Dec. 1, 2013, 2 pages.
Examiner's Answer to Appeal Brief received for U.S. Appl. No. 14/815,890, dated Mar. 20, 2020, 16 pages.
Extended European Search Report received for European Patent Application No. 16762356.0, dated Nov. 9, 2018, 10 Pages.
Extended European Search Report received for European Patent Application No. 16837432.0, dated Mar. 11, 2019, 10 pages.
Extended European Search Report received for European Patent Application No. 17810723.1, dated Nov. 12, 2019, 9 pages.
Extended European Search Report received for European Patent Application No. 20185974.1, dated Oct. 28, 2020, 7 pages.
Feist, Jonathan, "Android customization—how to create a custom clock widget using Zooper Widget", Available Online at: https://www.androidauthority.com/zooper-widget-clock-366476/, May 15, 2014, 10 pages.
Feldman, Ari, "Excerpts from: Designing Arcade Computer Game Graphics", Available online at: http://www.phatcode.net/res/269/files/dacgg.pdf, Jan. 1, 2001, 35 pages.
Final Office Action received for U.S. Appl. No. 14/815,890, dated Feb. 26, 2018, 20 pages.
Final Office Action received for U.S. Appl. No. 14/815,890, dated May 14, 2019, 22 pages.
Final Office Action received for U.S. Appl. No. 14/815,890, dated Nov. 21, 2016, 18 pages.
Final Office Action received for U.S. Appl. No. 14/815,898, dated Jun. 9, 2016, 19 pages.
Final Office Action received for U.S. Appl. No. 14/821,667, dated Apr. 26, 2018, 13 pages.
Final Office Action received for U.S. Appl. No. 14/841,606, dated Sep. 7, 2018, 34 pages.
Final Office Action received for U.S. Appl. No. 14/846,511 dated May 10, 2018, 21 pages.
Final Office Action received for U.S. Appl. No. 14/846,511, dated Aug. 11, 2020, 25 pages.
Final Office Action received for U.S. Appl. No. 14/846,511, dated Jun. 5, 2019, 24 pages.
Final Office Action received for U.S. Appl. No. 15/405,122, dated Jan. 21, 2020, 36 pages.
Final Office Action received for U.S. Appl. No. 15/421,865, dated Dec. 2, 2019, 19 pages.
Final Office Action received for U.S. Appl. No. 15/421,865, dated Mar. 19, 2021, 20 pages.
Final Office Action received for U.S. Appl. No. 15/554,204, dated Oct. 31, 2019, 22 pages.
Final Office Action received for U.S. Appl. No. 15/798,235, dated Oct. 9, 2018, 45 pages.
Final Office Action received for U.S. Appl. No. 15/798,235, dated Oct. 18, 2019, 25 pages.
Final Office Action received for U.S. Appl. No. 15/881,544, dated Jan. 29, 2019, 14 pages.
Final Office Action received for U.S. Appl. No. 16/389,722, dated Dec. 8, 2020, 18 pages.
Final Office Action received for U.S. Appl. No. 16/418,786, dated Jan. 13, 2021, 14 pages.

(56) References Cited

OTHER PUBLICATIONS

Final Office Action received for U.S. Appl. No. 16/582,020, dated Apr. 28, 2020, 31 pages.
Final Office Action received for U.S. Appl. No. 16/584,281, dated Apr. 15, 2020, 26 pages.
Final Office Action received for U.S. Appl. No. 16/585,721, dated Apr. 1, 2020, 28 pages.
Final Office Action received for U.S. Appl. No. 16/861,651, dated Apr. 20, 2021, 14 pages.
Final Office Action received for U.S. Appl. No. 16/997,588, dated Mar. 30, 2021, 23 pages.
Final Office Action received for U.S. Appl. No. 14/815,879, dated Mar. 24, 2016, 46 pages.
First Action Interview received for U.S. Appl. No. 14/815,890, dated Aug. 12, 2016, 3 pages.
Fitbit surge Fitness Watch, Manual version 1.0, May 7, 2015, 48 pages.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Fukuda, Kazuhiro, "XperiaZ1 Perfect Manual", Sotec Co., Ltd., No. 1, Nov. 15, 2013, pp. 217-218.
Gazer, "iPhone 4S Super Manual", Shuwa System Co., Saito Kazukuni, vol. 1, Jun. 6, 2013, 7 pages (Official Copy Only) (See Communication under 37 CFR § 1.98(a) (3)).
Geary, David, "Programming HTML5 Canvas", O'Reilly Japan, Inc., Jul. 23, 2014, No. 1, pp. 327-330.
Geek, "How to Put the Day of the Week into the Windows Taskbar Clock", available online at: https://www.howtogeek.com/194103/how-to-put-the-day-of-the-week-into-the-windows-taskbar-clock/, 2014, 3 pages.
Google Earth 7.0.1.8244, retrieved from the Internet: http://dl.google.com/dl/earth/client/ge7/release_7_0_1/googleearth-win-bundle-7.0.1.8244.exe, Oct. 29, 2012, 1 page.
Google Earth on Android—AndroidCentral.com, Available online at:—https://www.youtube.com/watch?v=1WxN1RunrE4, Feb. 22, 2010, 1 page.
GottaBeMobile, "How to Change Watch Faces on Android Wear", available online at URL:https://www.youtube.com/watch?v=B8iRGkGq6a8, Jul. 9, 2014, 4 pages.
Intention to Grant received for Danish PatentApplication No. PA201570496, dated Feb. 17, 2016, 6 pages.
Intention to Grant Received for Danish Patent Application No. PA201770397, dated Aug. 18, 2017, 7 pages.
Intention to Grant received for Danish Patent Application No. PA201770791, dated Feb. 19, 2020, 2 pages.
Intention to Grant Received for Danish Patent Application No. PA201970596, dated Dec. 1, 2020, 2 pages.
Intention to Grant received for Danish Patent Application No. PA201970597, dated Apr. 20, 2021, 2 pages.
Intention to Grant received for Danish Patent Application No. PA202070609, dated Jan. 14, 2021, 2 pages.
Intention to Grant received for European Patent Application No. 15730925.3, dated May 28, 2020, 10 pages.
Intention to Grant received for European Patent Application No. 15747595.5, dated Feb. 17, 2020, 8 pages.
Intention to Grant received for European Patent Application No. 17206177.2, dated Feb. 24, 2020, 8 pages.
International Preliminary Report on Patentability received for PCT Application No. PCT/US2016/037686, dated Mar. 1, 2018, 12 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Preliminary Report on Patentability received for PCT Patent Application No. PCT/US2015/053353, dated Sep. 21, 2017, 15 pages.
International Preliminary Report on Patentability received for PCT Patent Application No. PCT/US2015/054223, dated Dec. 14, 2017, 18 pages.
International Preliminary Report on Patentability received for PCT Patent Application No. PCT/US2016/021403, dated Sep. 21, 2017, 21 pages.
International Preliminary Report on Patentability received for PCT Patent Application No. PCT/US2016/035090, dated Dec. 14, 2017, 14 pages.
International Preliminary Report on Patentability received for PCT Patent Application No. PCT/US2017/034834, dated Dec. 20, 2018, 9 pages.
International Preliminary Report on Patentability received for PCT Patent Application No. PCT/US2018/032164, dated Nov. 21, 2019, 11 pages.
International Preliminary Report on Patentability received for PCT Patent Application No. PCT/US2019/030770, dated Nov. 19, 2020, 14 pages.
International Search Report and Written Opinion received for PCT Application No. PCT/US2015/034604, dated Nov. 9, 2015, 30 pages.
International Search Report and Written Opinion received for PCT Patent Application No. PCT/US2015/034606, dated Dec. 2, 2015, 17 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.
International Search Report and Written Opinion received for PCT Patent Application No. PCT/US2015/053353, dated May 9, 2016, 21 pages.
International Search Report and Written Opinion received for PCT Patent Application No. PCT/US2015/054223, dated Jul. 6, 2016, 25 pages.
International Search Report and Written Opinion received for PCT Patent Application No. PCT/US2016/021403, dated May 12, 2016, 23 pages.
International Search Report and Written Opinion received for PCT Patent Application No. PCT/US2016/035090, dated Oct. 4, 2016, 17 pages.
International Search Report and Written Opinion received for PCT Patent Application No. PCT/US2016/037686, dated Sep. 9, 2016, 19 pages.
International Search Report and Written Opinion received for PCT Patent Application No. PCT/US2017/034834, dated Aug. 23, 2017, 10 pages.
International Search Report and Written Opinion received for PCT Patent Application No. PCT/US2018/032164, dated Oct. 18, 2018, 16 Pages.
International Search Report and Written Opinion received for PCT Patent Application No. PCT/US2019/030770, dated Oct. 31, 2019, 23 pages.
International Search Report and Written Opinion received for PCT Patent Application No. PCT/US2020/030079, dated Sep. 4, 2020, 18 pages.
International Search Report and Written Opinion received for PCT Patent Application No. PCT/US2020/031536, dated Sep. 23, 2020, 16 pages.

(56) References Cited

OTHER PUBLICATIONS

International Search Report and Written Opinion received for PCT Patent Application No. PCT/US2020/031575, dated Aug. 20, 2020, 14 pages.
International Search Report and Written Opinion received for PCT Patent Application No. PCT/US2020/045814, dated Jan. 20, 2021, 16 pages.
International Search Report and Written Opinion received for PCT Patent Application No. PCT/US2015/034607, dated Dec. 1, 2015, 23 pages.
Internet Blog Post, "[PC] Pre-Customization of Black Desert's Characters", Online Available at:—<https://blog.naver.com/hsh6051/220209813968>, Dec. 14, 2014, 41 pages (21 pages of English Translation and 20 pages of Official Copy).
Invitation to Additional Fees and Partial International Search Report received for PCT PatentApplication No. PCT/US2015/034604 dated Sep. 4, 2015, 6 pages.
Invitation to Additional Fees and Partial International Search Report received for PCT PatentApplication No. PCT/US2015/034606 dated Sep. 9, 2015, 6 pages.
Invitation to Pay Additional Fee received for European Patent Application No. 15747595.5, dated Feb. 9, 2018, 6 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/044473, dated Nov. 3, 2015, 5 pages.
Invitation to Pay Additional Fees received for PCT Patent Application No. PCT/US2015/044485, dated Nov. 3, 2015, 7 pages.
Invitation to Pay Additional fees received for PCT Patent Application No. PCT/US2015/053353, dated Jan. 21, 2016, 7 pages.
Invitation to pay additional fees received for PCT Patent Application No. PCT/US2015/054223, dated Mar. 9, 2016, 9 pages.
Invitation to Pay Additional Fees received for PCT Patent Application No. PCT/US2016/035090, dated Jul. 15, 2016, 2 pages.
Invitation to Pay Additional Fees received for PCT Patent Application No. PCT/US2018/032164, dated Aug. 21, 2018, 10 pages.
Invitation to Pay Additional Fees received for PCT Patent Application No. PCT/US2019/030770, dated Jul. 26, 2019, 12 pages.
Invitation to Pay Additional Fees received for PCT Patent Application No. PCT/US2020/030079, dated Jul. 14, 2020, 12 pages.
Invitation to Pay Additional Fees received for PCT Patent Application No. PCT/US2020/031536, dated Jul. 31, 2020, 9 pages.
Invitation to Pay Additional Fees received for PCT Patent Application No. PCT/US2020/045814, dated Nov. 18, 2020, 11 pages.
ISO 9241-13:1998, "Ergonomic requirements for office work with visual display terminals (VDTs)", Part 13: User guidance, International Standard ISO, Zuerich, CH, vol. 9241-13, Jul. 15, 1998, 40 pages.
Kenney, Briley, "How to Customize a Smartwatch and other Personalization Questions", Available online at: <https://smartwatches.org/learn/customize-smartwatch/>, Jan. 23, 2014, 3 pages.
Kidizoom Smartwatch, Available online at <URL:https://www.vtechnl.com/media/downloads/Kidizoom-Smart-Watch.pdf>, Jun. 24, 2014, 23 pages.
"Link to Way back Machine with link to Google Play showing different layouts of complications associated with a clock face", available online at <https://play.google.com/store/apps/details?id=com.levelup.beautifulwidgets.free&hl=da >, 6 pages.
Living Earth, available at: http;//www.livingearthapp.com/, 2014, 6 pages.
Looking for a launcher that changes the default homescreen or widgets based on wifi, location, or other context., Online Available at: https://www.reddit.com/r/androidapps/comments/35lu90/looking_for_a_launcher_that_changes_the_default/, 2015, 2 pages.
Minutes of Oral Proceedings received for European Patent Application No. 15730924.6, mailed on Mar. 13, 2019, 4 pages.
Minutes of Oral Proceedings received for European Patent Application No. 15730925.3, mailed on May 26, 2020, 11 pages.
MS Excel 2013, Jan. 29, 2013, 2 pages.
My Mate VINCE, "Setting up the Fitbit Alta HR Activity Tracker on Apple iOS", Online available at:—<https://youtu.be/FdwRF4lfvFc>, Jun. 18, 2017, 3 pages.
Nerdtalk, "The Best Android Clock Widgets", available at: https://www.youtube.com/watch?v=E1bAprWByfU, Apr. 25, 2011, 1 page.
New, but unsigned—Easy Stopwatch for Symbian, XP55393563, Available online at <http://www.allaboutsymbian.com/flow/item/19490_New_but_unsigned-Easy_StopWatc.php>, Mar. 15, 2014, 15 pages.
Night Display (Alarm Clock) App, Google Play Store Night Display (Alarm Clock) Description page., available at <https://web.archive.org/web/20141007124222/https://play.google.com/store/apps/details?id=com.srk.nighttimedisplay&hl=en>, Oct. 7, 2014, pp. 1-3.
Non-Final Office Action received for U.S. Appl. No. 14/815,890, dated Jun. 6, 2017, 19 pages.
Non-Final Office Action received for U.S. Appl. No. 14/815,890, dated Oct. 19, 2015, 5 pages.
Non-Final Office Action received for U.S. Appl. No. 15/881,544, dated Jun. 7, 2018, 15 pages.
Non-Final Office Action received for U.S. Appl. No. 15/554,204, dated Apr. 17, 2019, 19 pages.
Non-Final Office Action received for U.S. Appl. No. 14/815,879, dated Dec. 15, 2016, 33 pages.
Non-Final Office Action received for U.S. Appl. No. 14/815,890, dated Dec. 18, 2018, 21 pages.
Non-Final Office Action received for U.S. Appl. No. 14/821,667, dated Feb. 4, 2019, 13 pages.
Non-Final Office Action received for U.S. Appl. No. 14/821,667, dated Jul. 14, 2017, 12 pages.
Non-Final Office Action received for U.S. Appl. No. 14/839,889, dated Mar. 7, 2017, 26 pages.
Non-Final Office Action received for U.S. Appl. No. 14/841,606, dated Dec. 7, 2017, 30 pages.
Non-Final Office Action received for U.S. Appl. No. 14/841,606, dated May 8, 2019, 28 pages.
Non-Final Office Action received for U.S. Appl. No. 14/846,511 dated Jan. 7, 2020, 25 pages.
Non-Final Office Action received for U.S. Appl. No. 14/846,511 dated Oct. 27, 2017, 15 pages.
Non-Final Office Action received for U.S. Appl. No. 15/183,663, dated Jul. 9, 2018, 13 pages.
Non-Final Office Action received for U.S. Appl. No. 15/355,956, dated May 31, 2019, 32 pages.
Non-Final Office Action received for U.S. Appl. No. 15/405,122, dated Apr. 2, 2021, 35 pages.
Non-Final Office Action received for U.S. Appl. No. 15/405,122, dated May 31, 2019, 43 pages.
Non-Final Office Action received for U.S. Appl. No. 15/405,122, dated Sep. 24, 2020, 30 pages.
Non-Final Office Action received for U.S. Appl. No. 15/421,865, dated Mar. 21, 2019, 18 pages.
Non-Final Office Action received for U.S. Appl. No. 15/421,865, dated Oct. 7, 2020, 20 pages.
Non-Final Office Action received for U.S. Appl. No. 15/798,235, dated Apr. 24, 2019, 25 pages.
Non-Final Office Action received for U.S. Appl. No. 15/798,235, dated Mar. 14, 2018, 58 pages.
Non-Final Office Action received for U.S. Appl. No. 16/389,722, dated Apr. 3, 2020, 15 pages.
Non-Final Office Action received for U.S. Appl. No. 16/401,934, dated Dec. 11, 2020, 26 pages.
Non-Final Office Action received for U.S. Appl. No. 16/418,786, dated Apr. 24, 2020, 16 pages.
Non-Final Office Action received for U.S. Appl. No. 16/582,020, dated Apr. 5, 2021, 29 pages.
Non-Final Office Action received for U.S. Appl. No. 16/582,020, dated Jan. 13, 2020, 39 pages.
Non-Final Office Action received for U.S. Appl. No. 16/584,281, dated Dec. 10, 2019, 23 pages.
Non-Final Office Action received for U.S. Appl. No. 16/584,445, dated Dec. 26, 2019, 19 pages.
Non-Final Office Action received for U.S. Appl. No. 16/585,399, dated Jan. 23, 2020, 28 pages.

(56) References Cited

OTHER PUBLICATIONS

Non-Final Office Action received for U.S. Appl. No. 16/585,714, dated Apr. 16, 2020, 18 pages.
Non-Final Office Action received for U.S. Appl. No. 16/585,721, dated Dec. 27, 2019, 25 pages.
Non-Final Office Action received for U.S. Appl. No. 16/659,507, dated Oct. 7, 2020, 16 pages.
Non-Final Office Action received for U.S. Appl. No. 16/861,651, dated Nov. 27, 2020, 11 pages.
Non-Final Office Action received for U.S. Appl. No. 16/997,588, dated Dec. 14, 2020, 21 pages.
Non-Final Office Action received for U.S. Appl. No. 14/846,511, dated Nov. 30, 2018, 22 Pages.
Non-Final Office Action received for U.S. Appl. No. 14/815,879, dated Nov. 6, 2015, 35 pages.
Non-Final Office Action received for U.S. Appl. No. 14/815,898, dated Dec. 1, 2015, 22 pages.
Non-Final Office Action received for U.S. Appl. No. 14/815,907, dated Jan. 12, 2016, 22 pages.
Non-Final Office Action received for U.S. Appl. No. 14/815,909, dated Nov. 27, 2015, 12 pages.
Notice of Acceptance received for Australian Patent Application No. 2015298710, dated Oct. 8, 2019, 3 pages.
Notice of Acceptance received for Australian Patent Application No. 2016229847, dated Sep. 12, 2018, 3 pages.
Notice of Acceptance received for Australian Patent Application No. 2017277813, dated Jun. 16, 2020, 3 pages.
Notice of Acceptance received for Australian Patent Application No. 2018279037, dated May 13, 2020, 3 pages.
Notice of Acceptance received for Australian Patent Application No. 2019208225, dated Jan. 21, 2021, 3 pages.
Notice of Acceptance received for Australian Patent Application No. 2020204506, dated Apr. 8, 2021, 3 pages.
Notice of Allowance received for Chinese Patent Application No. 201510479088.4, dated Jan. 21, 2021, 2 pages (1 page. of English Translation and 1 page. of Official Copy).
Notice of Allowance received for Chinese Patent Application No. 201510481525.6, dated May 27, 2019, 2 pages (1 page. of English Translation and 1 page. of Official Copy).
Notice of Allowance received for Chinese Patent Application No. 201510483268.X, dated Nov. 6, 2019, 2 pages (1 page. of English Translation and 1 page. of Official Copy).
Notice of Allowance received for Chinese Patent Application No. 201510483305.7, dated Jan. 8, 2019, 3 pages (1 page. of English Translation and 2 pages of Official Copy).
Notice of Allowance received for Chinese Patent Application No. 201510484514.3, dated Jun. 6, 2019, 2 pages (1 page. of English Translation and 1 page. of Official Copy).
Notice of Allowance received for Chinese Patent Application No. 201520594249.X, dated Jul. 12, 2016, 4 pages (2 pages of English Translation and 2 pages of Official Copy).
Notice of Allowance received for Chinese Patent Application No. 201680013193.1, dated May 7, 2021, 5 pages (1 page. of English Translation and 4 pages of Official Copy).
Notice of Allowance received for Chinese Patent Application No. 201680047983.1, dated Apr. 28, 2021, 3 pages (1 page. of English Translation and 2 pages of Official Copy).
Notice of Allowance received for Chinese Patent Application No. 201810037665.8, dated Jul. 9, 2019, 4 pages (1 page. of English Translation and 3 pages of Official Copy).
Notice of Allowance received for Danish Patent Application No. PA201570495, dated Feb. 22, 2017, 1 page.
Notice of Allowance received for Danish Patent Application No. PA201570496, dated Apr. 18, 2016, 2 pages.
Notice of Allowance received for Japanese Patent Application No. 2017-505450, dated Mar. 9, 2018, 10 pages (7 pages of English Translation and 3 pages of Official Copy).
Notice of Allowance received for Japanese Patent Application No. 2017-505842, dated Mar. 16, 2020, 4 pages (1 page. of English Translation and 3 pages of Official Copy).
Notice of Allowance received for Japanese Patent Application No. 2017-505847, dated May 20, 2019, 4 pages (1 page. of English Translation and 3 pages of Official Copy).
Notice of Allowance received for Japanese Patent Application No. 2017-545918, dated Jul. 22, 2019, 4 pages (1 page. of English Translation and 3 pages of Official Copy).
Notice of Allowance received for Japanese Patent Application No. 2018-074971, dated Apr. 23, 2019, 4 pages (1 page. of English Translation and 3 pages of Official Copy).
Notice of Allowance received for Japanese Patent Application No. 2018-537840, dated Mar. 19, 2020, 4 pages (1 page. of English Translation and 3 pages of Official Copy).
Notice of Allowance received for Japanese Patent Application No. 2019-096219, dated Jun. 26, 2020, 4 pages (1 page. of English Translation and 3 pages of Official Copy).
Notice of Allowance received for Japanese Patent Application No. 2019-151358, dated Jan. 22, 2021, 4 pages (1 page. of English Translation and 3 pages of Official Copy).
Notice of Allowance received for Korean Patent Application No. 10-2017-7005939, dated Mar. 30, 2018, 5 pages (2 pages of English Translation and 3 pages of Official Copy).
Notice of Allowance received for Korean Patent Application No. 10-2018-7018904, dated Jun. 26, 2020, 4 pages (1 page. of English Translation and 3 pages of Official copy).
Notice of Allowance received for Korean Patent Application No. 10-2018-7022101, dated Oct. 14, 2019, 4 pages (1 page. of English Translation and 3 pages of Official Copy).
Notice of Allowance received for Korean Patent Application No. 10-2020-7001340, dated May 10, 2021, 5 pages (2 pages of English Translation and 3 pages of Official Copy).
Notice of Allowance received for Korean Patent Application No. 10-2021-7002597, dated Feb. 25, 2021, 5 pages (1 page. of English Translation and 4 pages of Official Copy).
Notice of Allowance received for Taiwanese Patent Application No. 104124962, dated Jul. 27, 2017, 3 pages (Official Copy Only) (See Communication under 37 CFR 1.98(a) (3)).
Notice of Allowance received for Taiwanese Patent Application No. 104124963, dated Sep. 28, 2017, 5 pages (1 page. of English Translation of Search report and 4 pages of Official Copy).
Notice of Allowance received for Taiwanese Patent Application No. 104124995, dated Jul. 27, 2017, 3 pages (Official Copy Only) (See Communication under 37 CFR 1.98(a) (3)).
Notice of Allowance received for Taiwanese Patent Application No. 104124997, dated Jun. 16, 2017, 5 pages (1 page. of English Translation of Search report and 4 pages of Official Copy).
Notice of Allowance received for Taiwanese Patent Application No. 104124998, dated Mar. 31, 2017, 3 pages (Official copy Only).
Notice of Allowance received for Taiwanese Patent Application No. 104134740, dated Dec. 8, 2016, 5 pages (1 page. of English Translation of Search Report and 4 pages of Official Copy).
Notice of Allowance received for U.S. Appl. No. 14/815,879, dated Jun. 26, 2017, 8 pages.
Notice of Allowance received for U.S. Appl. No. 14/815,890, dated Feb. 12, 2021, 8 pages.
Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Jul. 28, 2016, 9 pages.
Notice of Allowance received for U.S. Appl. No. 14/815,907, dated Nov. 30, 2016, 2 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Notice of Allowance received for U.S. Appl. No. 14/815,909, dated Sep. 6, 2016, 2 pages.
Notice of Allowance received for U.S. Appl. No. 14/821,667, dated Jun. 12, 2019, 9 pages.

(56) References Cited

OTHER PUBLICATIONS

Notice of Allowance received for U.S. Appl. No. 14/839,889, dated Oct. 30, 2017, 16 pages.
Notice of Allowance received for U.S. Appl. No. 15/183,663, dated Jan. 17, 2019, 6 pages.
Notice of Allowance received for U.S. Appl. No. 15/355,956, dated Nov. 22, 2019, 29 pages.
Notice of Allowance received for U.S. Appl. No. 15/554,204, dated Jul. 13, 2020, 10 pages.
Notice of Allowance received for U.S. Appl. No. 15/798,235, dated Apr. 1, 2020, 8 pages.
Notice of Allowance received for U.S. Appl. No. 15/798,235, dated Sep. 22, 2020, 8 pages.
Notice of Allowance received for U.S. Appl. No. 15/798,257, dated May 22, 2019, 14 pages.
Notice of Allowance received for U.S. Appl. No. 15/881,544, dated Jun. 26, 2019, 6 pages.
Notice of Allowance received for U.S. Appl. No. 15/881,544, dated Nov. 7, 2019, 5 pages.
Notice of Allowance received for U.S. Appl. No. 16/584,281, dated Nov. 18, 2020, 8 pages.
Notice of Allowance received for U.S. Appl. No. 16/584,281, dated Sep. 29, 2020, 5 pages.
Notice of Allowance received for U.S. Appl. No. 16/584,445, dated Apr. 17, 2020, 9 pages.
Notice of Allowance received for U.S. Appl. No. 16/584,445, dated Jul. 23, 2020, 8 pages.
Notice of Allowance received for U.S. Appl. No. 16/584,445, dated Jun. 24, 2020, 5 pages.
Notice of Allowance received for U.S. Appl. No. 16/584,445, dated May 29, 2020, 5 pages.
Notice of Allowance received for U.S. Appl. No. 16/584,445, dated Oct. 21, 2020, 6 pages.
Notice of Allowance received for U.S. Appl. No. 16/585,366, dated Jan. 2, 2020, 6 pages.
Notice of Allowance received for U.S. Appl. No. 16/585,399, dated Jul. 21, 2020, 9 pages.
Notice of Allowance received for U.S. Appl. No. 16/585,714, dated Jan. 8, 2021, 8 pages.
Notice of Allowance received for U.S. Appl. No. 16/585,714, dated Jan. 27, 2021, 2 pages.
Notice of Allowance received for U.S. Appl. No. 16/585,714, dated Sep. 25, 2020, 15 pages.
Notice of Allowance received for U.S. Appl. No. 16/585,721, dated Oct. 30, 2020, 9 pages.
Notice of Allowance received for U.S. Appl. No. 16/585,721, dated Sep. 30, 2020, 15 pages.
Notice of Allowance received for U.S. Appl. No. 16/659,507, dated Feb. 24, 2021, 7 pages.
Nova Launcher—Lock Screen Edit, Online Available at: https://forums.androidcentral.com/ask-question/835057-nova-launcher-lock-screen-edit.html, Sep. 2017, 2 pages.
Nova, "Tour of the Solar System", Retrieved from <http://www.pbs.org/wgbh/nova/space/tour-solar-system.html>, May 24, 2013, 14 pages.
Obara, YuuTA, "iPhone Application Selection for University Students", Shuwa System Co., Saito Kazukuni, vol. 1, May 16, 2013, 4 pages (Official Copy Only) (See Communication under 37 CFR§ 1.98(a) (3)).
Octoba, "Just Install It—Utilizing Method for Android Application Business", ASCII Media Works Co. Takano Kiyoshi, vol. 1, Apr. 25, 2013, 6 pages (Official Copy Only) (See Communication under 37 CFR § 1.98(a) (3)).
Office Action and Search Report received for Danish Patent Application No. PA201970598, dated Jan. 28, 2020, 6 pages.
Office Action received for Australian PatentApplication No. 2015101019, dated Oct. 14, 2015, 3 pages.
Office Action received for Australian Patent Application No. 2015101019, dated Apr. 7, 2016, 4 pages.
Office Action received for Australian Patent Application No. 2015101020, dated Oct. 26, 2015, 8 pages.
Office Action received for Australian Patent Application No. 2015101021, dated Apr. 26, 2016, 4 pages.
Office Action received for Australian Patent Application No. 2015101021, dated Oct. 28, 2015, 10 pages.
Office Action received for Australian Patent Application No. 2015298710, dated Apr. 13, 2017, 3 pages.
Office Action received for Australian Patent Application No. 2015298710, dated Feb. 15, 2017, 2 pages.
Office Action received for Australian Patent Application No. 2015298710, dated Nov. 6, 2018, 4 pages.
Office Action received for Australian Patent Application No. 2015298710, dated Sep. 24, 2018, 4 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Australian Patent Application No. 2016229847, dated Jul. 3, 2018, 4 pages.
Office Action received for Australian Patent Application No. 2017277813, dated Jun. 11, 2019, 3 pages.
Office Action received for Australian Patent Application No. 2017277813, dated Mar. 20, 2020, 4 pages.
Office Action received for Australian Patent Application No. 2018201089, dated Jul. 23, 2020, 4 pages.
Office Action received for Australian Patent Application No. 2018201089, dated Oct. 11, 2019, 4 pages.
Office Action received for Australian Patent Application No. 2018206770, dated Apr. 30, 2019, 4 pages.
Office Action received for Australian Patent Application No. 2018206770, dated Jul. 16, 2019, 5 pages.
Office Action received for Australian Patent Application No. 2018206770, dated Jul. 25, 2018, 5 pages.
Office Action received for Australian Patent Application No. 2018206770, dated Mar. 5, 2019, 3 pages.
Office Action received for Australian Patent Application No. 2018279037, dated Jan. 17, 2020, 4 pages.
Office Action received for Australian Patent Application No. 2018279037, dated Jun. 18, 2019, 5 pages.
Office Action received for Australian Patent Application No. 2019208225, dated Dec. 21, 2020, 3 pages.
Office Action received for Australian Patent Application No. 2019208225, dated Mar. 20, 2020, 3 pages.
Office Action received for Australian Patent Application No. 2020102158, dated Apr. 27, 2021, 5 pages.
Office Action received for Australian Patent Application No. 2020102158, dated Dec. 8, 2020, 9 pages.
Office Action received for Australian PatentApplication No. 2020204506, dated Dec. 7, 2020, 6 pages.
Office Action received for Australian Patent Application No. 2020239670, dated Mar. 3, 2021, 4 pages.
Office Action received for Australian Patent Application No. 2020309093, dated Jan. 21, 2021, 3 pages.
Office Action received for Australian Patent Application No. 2015101019, dated Feb. 12, 2016, 4 pages.
Office Action received for Chinese Patent Application No. 201520595384.6, dated Mar. 25, 2016, 3 pages (1 page. of English Translation and 2 pages of Official copy).
Office Action received for Chinese Patent Application No. 201510479088.4, dated Apr. 22, 2020, 7 pages (3 pages of English Translation and 4 pages of Official Copy).
Office Action received for Chinese Patent Application No. 201510479088.4, dated Mar. 12, 2018, 20 pages (6 pages of English Translation and 14 pages of Official Copy).
Office Action received for Chinese Patent Application No. 201510479088.4, dated May 7, 2019, 6 pages (3 pages of English Translation and 3 pages of Official Copy).

(56) References Cited

OTHER PUBLICATIONS

Office Action received for Chinese Patent Application No. 201510481525.6, dated Aug. 29, 2018, 10 pages (5 pages of English Translation and 5 pages of Official copy).
Office Action received for Chinese Patent Application No. 201510481525.6, dated Nov. 29, 2017, 9 pages (3 pages of English Translation and 6 pages of Official Copy).
Office Action received for Chinese Patent Application No. 201510483268.X, dated Apr. 16, 2019, 6 pages (3 pages of English Translation and 3 pages of Official Copy).
Office Action received for Chinese Patent Application No. 201510483268.X, dated Dec. 1, 2017, 11 pages (5 pages of English Translation and 6 pages of Official Copy).
Office Action received for Chinese Patent Application No. 201510483268.X, dated Oct. 19, 2018, 10 pages (5 pages of English Translation and 5 pages of Official Copy).
Office action received for Chinese Patent Application No. 201510483305.7, dated Aug. 31, 2018, 10 pages (5 pages of English Translation and 5 pages of Official copy).
Office action received for Chinese Patent Application No. 201510483305.7, dated Dec. 1, 2017, 13 pages (5 pages of English Translation and 8 pages of Official Copy).
Office Action received for Chinese Patent Application No. 201510484514.3, dated Apr. 4, 2018, 12 pages (5 pages of English Translation and 7 pages of Official Copy).
Office Action received for Chinese Patent Application No. 201510484514.3, dated Dec. 24, 2018, 13 pages (6 pages of English Translation and 7 pages of Official Copy).
Office Action received for Chinese Patent Application No. 201520594249.X, dated Mar. 25, 2016, 3 pages (1 page. of English Translation and 2 pages of Official copy).
Office Action received for Chinese Patent Application No. 201520595384.6, dated Dec. 30, 2016, 2 pages (Official Copy Only) (See Communication under 37 CFR § 1.98(a) (3)).
Office Action received for Chinese Patent Application No. 201520595384.6, dated Jul. 22, 2016, 3 pages (1 page. of English Translation and 2 pages of Official Copy).
Office Action received for Chinese Patent Application No. 201520595385.0, dated Dec. 30, 2016, 2 pages (Official Copy Only) (See Communication under 37 CFR § 1.98(a) (3)).
Office Action received for Chinese Patent Application No. 201520595385.0, dated Jul. 22, 2016, 3 pages (1 page. of English Translation and 2 pages of Official Copy).
Office Action received for Chinese Patent Application No. 201520595385.0, dated Mar. 25, 2016, 3 pages (1 page. of English Translation and 2 pages of Official copy).
Office Action Received for Chinese Patent Application No. 201520595408.8, dated Dec. 9, 2015, 4 pages (2 pages of English Translation and 2 pages of Official Copy).
Office Action Received for Chinese Patent Application No. 201520595408.8, dated Dec. 30, 2016, 2 pages (Official Copy Only) (See Communication under 37 CFR § 1.98(a) (3)).
Office Action received for Chinese Patent Application No. 201520595408.8, dated Jul. 25, 2016, 3 pages (1 page. of English Translation and 2 pages of Official Copy).
Office Action received for Chinese Patent Application No. 201520595408.8, dated Mar. 25, 2016, 3 pages (1 page. of English Translation and 2 pages of Official copy).
Office Action received for Chinese Patent Application No. 201520595538.1, dated Dec. 30, 2016, 2 pages (Official Copy Only) (See Communication under 37 CFR § 1.98(a) (3)).
Office Action received for Chinese Patent Application No. 201520595538.1, dated Jul. 22, 2016, 3 pages (1 page. of English Translation and 2 pages of Official Copy).
Office Action received for Chinese Patent Application No. 201520595538.1, dated Mar. 25, 2016, 3 pages (1 page. of English Translation and 2 pages of Official copy).
Office Action received for Chinese Patent Application No. 201680013193.1, dated Feb. 1, 2021, 8 pages (3 pages of English Translation and 5 pages of Official Copy).
Office Action received for Chinese Patent Application No. 201680013193.1, dated Mar. 25, 2020, 21 pages (8 pages of English Translation and 13 pages of Official Copy).
Office Action received for Chinese Patent Application No. 201680013193.1, dated Sep. 7, 2020, 6 pages (3 pages of English Translation and 3 pages of Official Copy).
Office Action received for Chinese Patent Application No. 201680047983.1, dated Feb. 1, 2021, 6 pages (3 pages of English Translation and 3 pages of Official Copy).
Office Action received for Chinese Patent Application No. 201680047983.1, dated Jul. 1, 2020, 6 pages (3 pages of English Translation and 3 pages of Official Copy).
Office Action received for Chinese Patent Application No. 201680047983.1, dated Mar. 18, 2019, 18 pages (6 pages of English Translation and 12 pages of Official Copy).
Office Action received for Chinese Patent Application No. 201680047983.1, dated Nov. 28, 2019, 9 pages (4 pages of English Translation and 5 pages of Official Copy).
Office Action received for Chinese Patent Application No. 201780033973.7, dated Jan. 22, 2021, 27 pages (11 pages of English Translation and 16 pages of Official Copy).
Office Action received for Chinese Patent Application No. 201810037665.8, dated Dec. 7, 2018, 10 pages (5 pages of English Translation and 5 pages of Official Copy).
Office Action received for Chinese Patent Application No. 201910906898.1, dated Sep. 9, 2020, 8 pages (3 pages of English Translation and 5 pages of Official Copy).
Office Action Received for Chinese Patent Application No. 201520594249.X, dated Dec. 9, 2015, 4 pages (2 pages of English Translation and 2 pages of Official Copy).
Office Action Received for Chinese Patent Application No. 201520595384.6, dated Dec. 9, 2015, 4 pages (2 pages of English Translation and 2 pages of Official Copy).
Office Action Received for Chinese Patent Application No. 201520595385.0, dated Dec. 9, 2015, 4 pages (2 pages of English Translation and 2 pages of Official Copy).
Office Action Received for Chinese Patent Application No. 201520595538.1, dated Dec. 9, 2015, 4 pages (2 pages of English Translation and 2 pages of Official Copy).
Office Action received for Danish Patent Application No. PA201570495, dated Dec. 9, 2016, 2 pages.
Office action received for Danish Patent Application No. PA201570495, dated May 4, 2016, 8 pages.
Office Action received for Danish Patent Application No. PA201570495, dated Oct. 29, 2015, 7 pages.
Office Action received for Danish Patent Application No. PA201570497, dated Feb. 21, 2017, 3 pages.
Office Action received for Danish Patent Application No. PA201570497, dated May 17, 2016, 6 pages.
Office Action received for Danish Patent Application No. PA201570497, dated Nov. 15, 2016, 2 pages.
Office Action received for Danish Patent Application No. PA201570497, dated Oct. 24, 2017, 2 pages.
Office Action received for Danish Patent Application No. PA201570498, dated Feb. 6, 2017, 2 pages.
Office Action received for Danish Patent Application No. PA201570498, dated Jun. 2, 2016, 8 pages.
Office Action received for Danish Patent Application No. PA201570498, dated Oct. 26, 2017, 5 pages.
Office Action received for Danish Patent Application No. PA201570498, dated Oct. 30, 2015, 7 pages.
Office Action received for Danish Patent Application No. PA201570499, dated Feb. 14, 2017, 2 pages.
Office Action received for Danish Patent Application No. PA201570499, dated Jun. 16, 2016, 8 pages.
Office Action received for Danish Patent Application No. PA201570499, dated Jun. 19, 2018, 4 pages.
Office Action received for Danish Patent Application No. PA201570499, dated Nov. 1, 2017, 6 pages.
Office Action received for Danish Patent Application No. PA201570499, dated Nov. 3, 2015, 7 pages.
Office Action Received for Danish Patent Application No. PA201570768, dated Sep. 13, 2016, 8 pages.

(56) References Cited

OTHER PUBLICATIONS

Office Action received for Danish Patent Application No. PA201570770, dated Apr. 7, 2017, 7 pages.
Office Action received for Danish Patent Application No. PA201570770, dated Mar. 17, 2016, 9 pages.
Office Action received for Danish Patent Application No. PA201570770, dated Sep. 12, 2016, 6 pages.
Office Action received for Danish Patent Application No. PA201770791, dated Jan. 31, 2018, 8 pages.
Office Action received for Danish Patent Application No. PA201770791, dated Jul. 13, 2018, 2 pages.
Office Action received for Danish Patent Application No. PA201770791, dated Jun. 11, 2019, 3 pages.
Office Action received for Danish Patent Application No. PA201970596, dated May 6, 2020, 4 pages.
Office Action received for Danish Patent Application No. PA201970597, dated Oct. 29, 2020, 4 pages.
Office Action received for Danish Patent Application No. PA201970598, dated Apr. 15, 2021, 6 pages.
Office Action received for Danish Patent Application No. PA201970598, dated Oct. 9, 2020, 4 pages.
Office Action received for Danish Patent Application No. PA201970599, dated Jan. 23, 2020, 6 pages.
Office Action received for Danish Patent Application No. PA201970599, dated Mar. 1, 2021, 4 pages.
Office Action received for Danish Patent Application No. PA201970599, dated May 27, 2020, 4 pages.
Office Action received for Danish Patent Application No. PA202070609, dated Dec. 10, 2020, 8 pages.
Office Action received for Danish Patent Application No. PA201570496, dated Oct. 29, 2015, 6 pages.
Office Action received for Danish Patent Application No. PA201570497, dated Oct. 30, 2015, 6 pages.
Office Action received for European Patent Application No. 15730924.6, dated Dec. 12, 2017, 8 pages.
Office Action received for European Patent Application No. 15730925.3, dated Apr. 12, 2018, 8 pages.
Office Action received for European Patent Application No. 15747595.5, dated Apr. 15, 2019, 4 pages.
Office Action received for European Patent Application No. 15747595.5, dated Jun. 27, 2018, 8 pages.
Office Action received for European Patent Application No. 16762356.0, dated Dec. 11, 2020, 7 pages.
Office Action received for European Patent Application No. 16837432.0, dated Jan. 10, 2020, 7 pages.
Office Action received for European Patent Application No. 16837432.0, dated Jan. 27, 2021, 7 pages.
Office Action received for European Patent Application No. 17206177.2, dated May 15, 2018, 6 pages.
Office Action received for European Patent Application No. 20172197.4, dated Aug. 5, 2020, 6 pages.
Office Action received for European Patent Application No. 15730925.3, dated Feb. 27, 2019, 5 pages.
Office Action received for German Patent Application No. 112015003083.2, dated Mar. 9, 2018, 12 pages (5 pages of English Translation and 7 pages of Official Copy).
Office Action received for Japanese Patent Application No. 2017-505450, dated Jun. 20, 2017, 8 pages (4 pages of English Translation and 4 pages of Official Copy).
Office Action received for Japanese Patent Application No. 2017-505842, dated Feb. 22, 2019, 11 pages (6 pages of English Translation and 5 pages of Official Copy).
Office Action received for Japanese Patent Application No. 2017-505842, dated Sep. 9, 2019, 7 pages (3 pages of English Translation and 4 pages of Official Copy).
Office Action received for Japanese Patent Application No. 2017-505847, dated Feb. 12, 2019, 13 pages (6 pages of English Translation and 7 pages of Official Copy).
Office Action received for Japanese Patent Application No. 2017-545918, dated Sep. 14, 2018, 12 pages (7 pages of English Translation and 5 pages of Official copy).
Office Action received for Japanese Patent Application No. 2018-074971, dated Jan. 28, 2019, 6 pages (3 pages of English Translation and 3 pages of Official Copy).
Office Action received for Japanese Patent Application No. 2018-537840, dated Jul. 8, 2019, 15 pages (8 pages of English Translation and 7 pages of Official copy).
Office Action received for Japanese Patent Application No. 2019-151358, dated Oct. 2, 2020, 5 pages (2 pages of English Translation and 3 pages of Official Copy).
Office Action received for Japanese Patent Application No. 2020-074878, dated Sep. 7, 2020, 13 pages (7 pages of English Translation and 6 pages of Official Copy).
Office Action received for Korean Patent Application No. 10-2017-7005939, dated Jun. 30, 2017, 6 pages (2 pages of English Translation and 4 pages of Official copy).
Office Action received for Korean Patent Application No. 10-2017-7024570, dated Jul. 10, 2019, 6 pages (3 pages of English Translation and 3 pages of Official Copy).
Office Action received for Korean Patent Application No. 10-2017-7024570, dated Sep. 28, 2018, 14 pages (6 pages of English Translation and 8 pages of Official copy).
Office Action received for Korean Patent Application No. 10-2018-7018904, dated Aug. 20, 2019, 8 pages (3 pages of English Translation and 5 pages of Official Copy).
Office Action received for Korean Patent Application No. 10-2018-7022101, dated Feb. 14, 2019, 15 pages (6 pages of English Translation and 9 pages of Official Copy).
Office Action received for Korean Patent Application No. 10-2018-7022101, dated Jul. 9, 2019, 10 pages (5 pages of English Translation and 5 pages of Official Copy).
Office Action received for Korean Patent Application No. 10-2019-7029673, dated Apr. 8, 2021, 7 pages (3 pages of English Translation and 4 pages of Official Copy).
Office Action received for Korean Patent Application No. 10-2019-7029673, dated Nov. 5, 2019, 10 pages (4 pages of English Translation and 6 pages of Official Copy).
Office Action received for Korean Patent Application No. 10-2019-7029673, dated Sep. 3, 2020, 9 pages (4 pages of English Translation and 5 pages of Official Copy).
Office Action received for Korean Patent Application No. 10-2020-7001340, dated Mar. 26, 2021, 13 pages (6 pages of English Translation and 7 pages of Official Copy).
Office Action received for Korean Patent Application No. 10-2020-7001340, dated Sep. 24, 2020, 19 pages (8 pages of English Translation and 11 pages of Official Copy).
Office Action received for Korean Patent Application No. 10-2020-7026036, dated Dec. 7, 2020, 8 pages (3 pages of English Translation and 5 pages of Official Copy).
Office Action received for Netherland Patent Application No. 2015245, dated Jan. 24, 2017, 11 pages (1 page. of English Translation and 10 pages of Official Copy).
Office Action received for Netherlands Patent Application No. 2015239, dated Oct. 28, 2016, 13 pages (5 pages of English Translation and 8 pages of Official Copy).
Office Action Received for Taiwanese Patent Application No. 104124962, dated Nov. 29, 2016, 6 pages (3 pages of English Translation and 3 pages of Official Copy).
Office Action received for Taiwanese Patent Application No. 104124963, dated Jan. 5, 2017, 11 pages (5 pages of English Translation and 6 pages of Official Copy).
Office Action received for Taiwanese Patent Application No. 104124995, dated Dec. 1, 2016, 6 pages (3 pages of English Translation and 3 pages of Official Copy).
Office Action received for Taiwanese Patent Application No. 104124997, dated Dec. 8, 2016, 12 pages (5 pages of English Translation and 7 pages of Official Copy).
Office Action received for Taiwanese Patent Application No. 104124998, dated Nov. 29, 2016, 6 pages (3 pages of English Translation and 3 pages of Official Copy).

(56) References Cited

OTHER PUBLICATIONS

Office Action received for Taiwanese Patent Application No. 104126627, dated Nov. 29, 2016, 9 pages (4 pages of English Translation and 5 pages of Official Copy).
Office Action received for Taiwanese Patent Application No. 104126627, dated Aug. 30, 2018, 22 pages (9 pages of English Translation and 13 pages of Official Copy).
Office Action received for Taiwanese Patent Application No. 104126627, dated Dec. 20, 2018, 4 pages (2 pages of English Translation and 2 pages of Official Copy).
Office Action received for Taiwanese Patent Application No. 104126627, dated Oct. 16, 2017, 7 pages (3 pages of English Translation and 4 pages of Official Copy).
Office Action received for Taiwanese Patent Application No. 104132636, dated Dec. 13, 2018, 26 pages (9 pages of English Translation and 17 pages of Official Copy).
Office Action received for Taiwanese Patent Application No. 104132636, dated Mar. 23, 2017, 25 pages (10 pages of English Translation and 15 pages of Official copy).
Office Action received for Taiwanese Patent Application No. 104132636, dated Oct. 31, 2017, 10 pages (4 pages of English Translation and 6 pages of Official Copy).
Omar Romero, "Sony Smartwatch 2 Custom Watchfaces Tutorial", Retrieved From: <https://www.youtube.com/watch?v=80dbxqwSQR8>, May 1, 2014, 2 pages.
Online Alarm Clock, https://web.archive.org/web/20150505081746/http://www.online-stopwatch.com/online-alarm-clock, May 5, 2015, 2 pages.
Pentax K20D Operating Manual, http://www.ricoh-imaging.eu/en/operating-manuals-download.html, 2008, pp. 173-174.
Phandroid, "New Android Wear Wrist Gestures in Marshmallow", Available online at: https://www.youtube.com/watch?v=0WhKuklpQ9A, Feb. 11, 2016, 3 pages.
Phlam, dev, "Clockwork Tomato Presentation", Retrieved fromthe Internet: URL:https://www.youtube.com/watch?v=2IQDx9REn0E, Apr. 29, 2016, 6 pages.
Pre-Interview First Office Action received for U.S. Appl. No. 14/815,890, dated May 26, 2016, 4 pages.
Record of Oral Hearing received for U.S. Appl. No. 14/815,890, mailed on Nov. 20, 2020, 18 pages.
Rehman, A, "Install Android 4.2 Gesture-Based Keyboard & Clock App on Jelly Bean 4.1 or Higher", Excerpts From, Available online at <http://www.addictivetips.com/android/install-android-4-2-keyboard-clock-app-apk-on-jelly-bean-4-1-x/>, Nov. 3, 2012, 4 pages.
Restriction Requirement received for U.S. Appl. No. 14/815,890, dated Feb. 22, 2016, 5 pages.
Result of Consultation received for European Patent Application No. 15730925.3, dated Nov. 24, 2020, 4 pages.
Reuse Animations—Synfig Animation Studio, Available online at: https://wiki.synfig.org/index.php?title=Doc:Reuse_Animations&oldid=18173, May 20, 2013, 5 pages.
Rowinski, Dan, "Why the All-In-One Smartwatch Isn't Happening Any Time Soon", Online available at:—https://web.archive.org/web/20140123074218if_/https://readwrite.com/2014/01/20/smartwatch-wearable-fitness-remote-contol/, Jan. 20, 2014, 6 pages.
Search Report and Opinion received for Danish Patent Application No. PA201970596, dated Dec. 4, 2019, 11 pages.
Search Report and Opinion received for Danish Patent Application No. PA201970597, dated Dec. 18, 2019, 10 pages.
Search Report and Opinion received for Danish Patent Application No. PA201970598, dated Oct. 31, 2019, 9 pages.
Search Report and Opinion received for Danish Patent Application No. PA201970599, dated Nov. 8, 2019, 12 pages.
Search Report and Opinion received for Danish Patent Application No. PA202070610, dated Jan. 8, 2021, 9 pages.
Search Report and Opinion Received for Netherland Patent Application No. 2015232, dated Jan. 25, 2017, 9 pages (1 page. of English Translation and 8 pages of Official Copy).
Search Report and Opinion received for Netherlands Patent Application No. 2015242, dated Jul. 4, 2017, 20 pages (10 pages of English Translation of Search Opinion and 10 pages of official copy).
Search Report and Opinion received for Netherlands Patent Application No. 2018531, dated Jul. 27, 2017, 14 pages (6 pages of English Translation and 8 pages of Official Copy).
Search Report received for Danish Patent Application No. 201570768, dated Mar. 17, 2016, 11 pages.
Shiota, Shinji, "Windows 7 Dojo", Weekly ASCII, Ascii Mediaworks Inc., vol. 798, Aug. 31, 2010, 3 pages.
Singh, Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 1 page.
Smartwatch, "App Earth Space HD Live Wallpaper APK for SmartWatch", Version 1.7, Android version 2.2, Aug. 27, 2013, 1 page.
Solar Walk Free, Vito Technology, Jun. 19, 2014, 9 pages.
Sony, "Live View™ micro display", Extended User Guide, Aug. 2010, 27 pages.
Sony, "Sony SmartWatch", User Guide, Dec. 2011, 18 pages.
StateofTech, "Samsung Galaxy Gear Tips—Installing and Customizing Clock Faces", Online available at:—https://www.youtube.com/watch?v=p2GzpL3xlUo, Dec. 12, 2013, 3 pages.
StateofTech, "Samsung Galaxy Gear Tips—Change the Clock Face", Retrieved from: https://www.youtube.com/watch?v=GOom7AZUAjY, Dec. 11, 2013, 2 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 16762356.0, mailed on May 10, 2021, 10 pages.
Summons to Attend Oral Proceedings received for European Patent Application No. 17206177.2, mailed on Jun. 3, 2019, 8 pages.
Sun Set, "Sun Set solar image clock", Available at <https://web.archive.orgjweb/20140719005410/http://www.sunsetclock.com/>, 2013, 5 pages.
Supplemental Notice of Allowance received for U.S. Appl. No. 14/815,890, dated Mar. 10, 2021, 2 pages.
Supplemental Notice of Allowance received for U.S. Appl. No. 16/585,399, dated Aug. 26, 2020, 2 pages.
Talkandroid, "Android Wear walkthrough", Available online at: https://www.youtube.com/watch?v=4xntpZac4sw, Jun. 30, 2014, 1 page.
TechCloud, "How to Create Custom Watch Face for Samsung Galaxy Gear Smartwatch just in Few Seconds", Online available at:—https://www.youtube.com/watch?v=6rO-_SREDjQ, Oct. 9, 2013. 3 pages.
The Simply Alarm app for Pebble, available online at <https://web.archive.org/web/20150517070400>/http://www.rebootsramblings.ca/n/sahhelp/https://www.youtube.com/watch?v=IVp1scQPw08, May 17, 2015, 1 page.
TheUnlockr, "How to Change the Watch Face on the Galaxy Gear", Online available at:—https://www.youtube.com/watch?v=Z7EBG5aBiZg, Jan. 3, 2014, 3 pages.
Tropical Fish 14, Available online at: https://www.turbosquid.com/3d-models/tropical-fish-3d-model/388510, Feb. 4, 2008, 2 pages.
Tweedie, Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
UIKit User Interface Catalog : Page Controls, Available online at https://web.archive.org/web/20140703123442/https://developer.apple.com/library/ios/documentation/userexperience/conceptual/UIKitUICatalog/UIPageControl.html, Dec. 16, 2013, 4 pages.
Vidstube, "Bitmoji Clockface on Fitbit Versa Sense/Versa 3/Versa 2", Available online at : <https://www.youtube.com/watch?v=4V_xDnSLeHE>, Jun. 30, 2019, 1 page.
Viticci, Frederico, "Checking Time Zones with Living Earth—MacStories", Available at <https://www.macstories.net/reviews/checking-time-zones-with-living-earth/>, Dec. 11, 2013, pp. 1-5.

(56) References Cited

OTHER PUBLICATIONS

Wade, Cliff, "Get the most out of Nova Launcher: Changing Icon Sizes", Online Available at: https://www.androidguys.com/tips-tools/get-nova-launcher-changing-icon-sizes/, Nov. 16, 2015, 3 pages.
Wade, Cliff, "Get the most out of Nova Launcher: Customizing the Dock (Contest Included)", Online Available at: https://www.androidguys.com/tips-tools/get-nova-launcher-customizing-dockcontest-included/, Dec. 1, 2015, 5 pages.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M-I-C-K-E-Y, M-O-U-S-E. Mickey Mouse . . . ?", Online Available at: https://forums.watchuseek.com/f2/watch-every-father-needs-m-i-c-k-e-y-m-o-u-s-e-mickey-mouse-855069.html, 2013, 3 pages.
WearableZone, "How to Set Up Your Fitbit Profile", Online available at:—<https://youtu.be/jsWPtcDWiJM>, Jun. 6, 2016, 3 pages.
Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Woolsey, Amanda, "How to Customize the Clock on the Apple Watch", Available online at: <https://www.youtube.com/watch?v=t-3Bckdd9B4>, Apr. 25, 2015, 1 page.
Xdream, "TickTalk Video User Manual", YouTube [online] [video], Online available at: <https://youtu.be/jYhq3DwmVzo>, Mar. 17, 2017, 3 pages.
Xperia ZL2 SOL25, "Instruction Manual", Detailed version, KDDI Corporation, No. 1, vol. 1, Jun. 2014, 4 pages.
Zephyrnix, "Steam's in-Game Home menu", Online Available at:<https://www.youtube.com/watch?v=jLoRFiPkcUw>, see 0;00-1;06, Feb. 15, 2011, 3 pages.
Zukerman, Erez, "6 Beautiful, Interesting & Versatile Timer Apps [Android]", available at: http://www.makeuseof.com/tag/beautiful-interesting-versatile-timer-apps-android/, May 18, 2012, 5 pages.
Applicant-Initiated Interview Summary received for U.S. Appl. No. 17/041,350, dated Aug. 18, 2021, 2 pages.
Intention to Grant received for European Patent Application No. 15730925.3, dated Aug. 16, 2021, 10 pages.
Invitation to Pay Additional Fees received for PCT Patent Application No. PCT/US2021/031669, dated Aug. 19, 2021, 9 pages.
Notice of Allowance received for Korean Patent Application No. 10-2019-7029673, dated Aug. 3, 2021, 3 pages (1 page of English Translation and 2 pages of Official Copy).
Notice of Allowance received for Korean Patent Application No. 10-2021-7013453, dated Aug. 11, 2021, 5 pages (2 pages of English Translation and 3 pages of Official Copy).
Notice of Allowance received for Korean Patent Application No. 10-2021-7013454, dated Aug. 12, 2021, 4 pages (1 page of English Translation and 3 pages of Official Copy).
Notice of Allowance received for U.S. Appl. No. 16/867,002, dated Aug. 20, 2021, 12 pages.
Applicant-Initiated Interview Summary received for U.S. Appl. No. 16/935,002, dated Sep. 21, 2021, 4 pages.
Applicant-Initiated Interview Summary received for U.S. Appl. No. 17/031,765, dated Sep. 22, 2021, 5 pages.
Applicant-Initiated Interview Summary received for U.S. Appl. No. 17/068,386, dated Sep. 21, 2021, 2 pages.
Final Office Action received for U.S. Appl. No. 17/041,350, dated Sep. 17, 2021, 25 pages.
Supplemental Notice of Allowance received for U.S. Appl. No. 16/867,002, dated Sep. 9, 2021, 2 pages.
Extended European Search Report received for European Patent Application No. 21169911.1, dated Sep. 20, 2021, 9 pages.
Extended European Search Report received for European Patent Application No. 21177569.7, dated Sep. 20, 2021, 8 pages.
International Search Report and Written Opinion received for PCT Patent Application No. PCT/US2021/031212, dated Sep. 21, 2021, 21 pages.
Non-Final Office Action received for U.S. Appl. No. 16/418,786, dated Oct. 4, 2021, 10 pages.
Non-Final Office Action received for U.S. Appl. No. 16/861,651, dated Sep. 30, 2021, 16 pages.
Notice of Allowance received for U.S. Appl. No. 16/997,588, dated Sep. 30, 2021, 12 pages.
Office Action received for Japanese Patent Application No. 2020-124605, dated Sep. 3, 2021, 5 pages (2 pages of English Translation and 3 pages of Official Copy).
Applicant-Initiated Interview Summary received for U.S. Appl. No. 16/389,722, dated Sep. 7, 2021, 4 pages.
Applicant-Initiated Interview Summary received for U.S. Appl. No. 16/861,651, dated Sep. 3, 2021, 5 pages.
Applicant-Initiated Interview Summary received for U.S. Appl. No. 16/943,737, dated Sep. 7, 2021, 4 pages.
Decision to Grant received for Danish Patent Application No. PA201970597, dated Aug. 19, 2021, 2 pages.
Final Office Action received for U.S. Appl. No. 17/031,671, dated Sep. 7, 2021, 27 pages.
Office Action received for Danish Patent Application No. PA202070623, dated Aug. 24, 2021, 3 pages.
Applicant-Initiated Interview Summary received for U.S. Appl. No. 15/421,865, dated Jun. 30, 2021, 6 pages.
Certificate of Examination received for Australian Patent Application No. 2020102158, dated Jun. 8, 2021, 2 pages.
Examiner's Answer to Appeal Brief received for U.S. Appl. No. 14/846,511, dated Jun. 14, 2021, 15 pages.
Final Office Action received for U.S. Appl. No. 16/401,934, dated Jun. 14, 2021, 30 pages.
Jean, "Our Pact Parental Control Review", Available online at : https://www.bewebsmart.com/parental-controls/our-pact-parental-control-review/, Jun. 25, 2016, 25 pages.
Non-Final Office Action received for U.S. Appl. No. 16/389,722, dated Jun. 3, 2021, 17 pages.
Non-Final Office Action received for U.S. Appl. No. 16/935,002, dated Jun. 25, 2021, 20 pages.
Non-Final Office Action received for U.S. Appl. No. 16/943,737, dated Jun. 25, 2021, 18 pages.
Non-Final Office Action received for U.S. Appl. No. 17/041,350, dated Jun. 10, 2021, 24 pages.
Notice of Acceptance received for Australian Patent Application No. 2018201089, dated May 28, 2021, 3 pages.
Notice of Allowance received for Japanese Patent Application No. 2020-074878, dated May 28, 2021, 4 pages (1 page of English Translation and 3 pages of Official Copy).
Office Action received for Australian Patent Application No. 2021202834, dated May 28, 2021, 2 pages.
Office Action received for Danish Patent Application No. PA202070610, dated Jun. 18, 2021, 8 pages.
Office Action received for Korean Patent Application No. 10-2021-7013453, dated Jun. 5, 2021, 6 pages (2 pages of English Translation and 4 pages of Official Copy).
Office Action received for Korean Patent Application No. 10-2021-7013454, dated Jun. 5, 2021, 6 pages (2 pages of English Translation and 4 pages of Official Copy).
Phonebuff, "Hybrid Stopwatch & Timer Android App Review", Available Online at: https://www.youtube.com/watch?v=B43oCFPiWvY, Apr. 4, 2012, 7 pages.
Rosa et al., "Stripe Generator—a Free Tool for the Web Design Community", Available online at: http://www.stripegenerator.com/, Mar. 28, 2019, 2 pages.
Search Report received for Netherlands Patent Application No. 2015236, dated Apr. 21, 2021, 19 pages (13 pages of English Translation and 6 pages of Official Copy).
Applicant Initiated Interview Summary received for U.S. Appl. No. 17/031,671, dated Nov. 8, 2021, 5 pages.
Final Office Action received for U.S. Appl. No. 15/405,122, dated Nov. 5, 2021, 45 pages.

(56) References Cited

OTHER PUBLICATIONS

Final Office Action received for U.S. Appl. No. 17/031,765, dated Oct. 29, 2021, 34 pages.
Non-Final Office Action received for U.S. Appl. No. 17/068,386, dated Oct. 28, 2021, 20 pages.
Notice of Allowance received for Chinese Patent Application No. 201910906898.1, dated Oct. 28, 2021, 4 pages (1 page of English Translation and 3 pages of Official Copy).
Notice of Allowance received for Korean Patent Application No. 10-2020-7028759, dated Oct. 19, 2021, 4 pages (1 page of English Translation and 3 pages of Official Copy).
Notice of Allowance received for U.S. Appl. No. 16/401,934, dated Nov. 1, 2021, 11 pages.
Notice of Allowance received for U.S. Appl. No. 17/087,845, dated Oct. 28, 2021, 9 pages.
Applicant-Initiated Interview Summary received for U.S. Appl. No. 17/041,350, dated Feb. 2, 2022, 2 pages.
Final Office Action received for U.S. Appl. No. 16/943,737, dated Feb. 4, 2022, 24 pages.
Notice of Allowance received for Korean Patent Application No. 10-2021-7034748, dated Jan. 27, 2022, 6 pages (2 pages of English Translation and 4 pages of Official Copy).
Notice of Allowance received for U.S. Appl. No. 16/401,934, dated Feb. 2, 2022, 8 pages.
Office Action received for Australian Patent Application No. 2020239749, dated Jan. 21, 2022, 4 pages.
Advisory Action received for U.S. Appl. No. 15/405,122, dated Apr. 18, 2022, 5 pages.
Applicant-Initiated Interview Summary received for U.S. Appl. No. 17/373,163, dated Apr. 11, 2022, 2 pages.
Office Action received for Chinese Patent Application No. 202110783860.7, dated Mar. 10, 2022, 15 pages (5 pages of English Translation and 10 pages of Official Copy).
Result of Consultation received for European Patent Application No. 20185974.1, dated Apr. 4, 2022, 4 pages.
Supplemental Notice of Allowance received for U.S. Appl. No. 16/997,588, dated Apr. 20, 2022, 4 pages.
Applicant-Initiated Interview Summary received for U.S. Appl. No. 17/031,765, dated Dec. 15, 2021, 4 pages.
Decision to Grant received for European Patent Application No. 15730925.3, dated Dec. 9, 2021, 2 pages.
Final Office Action received for U.S. Appl. No. 16/389,722, dated Dec. 6, 2021, 19 pages.
Invitation to Pay Search Fees received for European Patent Application No. 20761084.1, dated Dec. 7, 2021, 3 pages.
Notice of Acceptance received for Australian Patent Application No. 2019267413, dated Nov. 23, 2021, 3 pages.
Notice of Allowance received for U.S. Appl. No. 16/418,786, dated Dec. 9, 2021, 9 pages.
Office Action received for Chinese Patent Application No. 202110453180.9, dated Nov. 8, 2021, 21 pages (11 pages of English Translation and 10 pages of Official Copy).
Result of Consultation received for European Patent Application No. 16762356.0, dated Nov. 29, 2021, 3 pages.
Applicant-Initiated Interview Summary received for U.S. Appl. No. 16/861,651, dated Dec. 29, 2021, 5 pages.
Corrected Notice of Allowance received for U.S. Appl. No. 16/401,934, dated Dec. 23, 2021, 3 pages.
Decision on Appeal received for U.S. Appl. No. 14/846,511, dated Dec. 29, 2021, 20 pages.
Intention to Grant received for European Patent Application No. 16762356.0, dated Dec. 23, 2021, 8 pages.
Minutes of Oral Proceedings received for European Patent Application No. 16762356.0, mailed on Dec. 17, 2021, 5 pages.
Non-Final Office Action received for U.S. Appl. No. 15/421,865, dated Dec. 29, 2021, 23 pages.
Non-Final received for U.S. Appl. No. 17/078,896, dated Dec. 24, 2021, 17 pages.
Notice of Acceptance received for Australian Patent Application No. 2020269232, dated Dec. 16. 2021, 3 pages.

Office Action received for Australian Patent Application No. 2020250323, dated Dec. 14, 2021, 2 pages.
Office Action received for Chinese Patent Application No. 202110454541.1, dated Oct. 20, 2021, 19 pages (10 pages of English Translation and 9 pages of Official Copy).
Office Action received for Indian Patent Application No. 202017041557, dated Dec. 8, 2021, 8 pages.
Office Action received for Japanese Patent Application No. 2020-124605, dated Dec. 17, 2021, 2 pages (1 page of English Translation and 1 page of Official Copy).
Office Action received for Korean Patent Application No. 10-2021-706246, dated Nov. 26, 2021, 5 pages (2 pages of English Translation and 3 pages of Official Copy).
International Preliminary Report on Patentability received for PCT Patent Application No. PCT/US2020/030079, dated Nov. 18, 2021, 12 pages.
International Preliminary Report on Patentability received for PCT Patent Application No. PCT/US2020/031536, dated Nov. 18, 2021, 11 pages.
International Preliminary Report on Patentability received for PCT Patent Application No. PCT/US2020/031575, dated Nov. 18, 2021, 9 pages.
Office Action received for Korean Patent Application No. 10-2021-7036016, dated Nov. 10, 2021, 13 pages (6 pages of English Translation and 7 pages of Official Copy).
Advisory Action received for U.S. Appl. No. 16/943,737, dated Jun. 1, 2022, 6 pages.
Applicant Initiated Interview Summary received for U.S. Appl. No. 17/031,671, dated Jun. 13, 2022, 7 pages.
Notice of Allowance received for Chinese Patent Application No. 202110454541.1, dated May 31, 2022, 6 pages (3 pages of English Translation and 3 pages of Official Copy).
Notice of Allowance received for U.S. Appl. No. 16/418,786, dated Jun. 14, 2022, 9 pages.
Office Action received for European Patent Application No. 21169911.1, dated Jun. 3, 2022, 5 pages.
Office Action received for European Patent Application No. 21177569.7, dated Jun. 9, 2022, 5 pages.
Applicant Initiated Interview Summary received for U.S. Appl. No. 17/031,671, dated Aug. 2, 2021, 5 pages.
Corrected Notice of Allowance received for U.S. Appl. No. 16/582,020, dated Aug. 11, 2021, 2 pages.
Invitation to Pay Additional Fees received for PCT Patent Application No. PCT/US2021/031212, dated Jul. 28, 2021, 19 pages.
Notice of Allowance received for Korean Patent Application No. 10-2020-7026036, dated Jul. 26, 2021, 4 pages (1 page of English Translation and 3 pages of Official Copy).
Office Action received for Chinese Patent Application No. 201910906898.1, dated Jun. 23, 2021, 6 pages (3 pages of English Translation and 3 pages of Official Copy).
Notice of Acceptance received for Australian Patent Application No. 2020239749, dated May 27, 2022, 3 pages.
Notice of Allowance received for Japanese Patent Application No. 2021-565837, dated May 16, 2022, 4 pages (1 page of English Translation and 3 pages of Official Copy).
Office Action received for Danish Patent Application No. PA202070623, dated May 23, 2022, 3 pages.
Corrected Notice of Allowance received for U.S. Appl. No. 17/041,350, dated Mar. 15, 2022, 3 pages.
International Preliminary Report on Patentability received for PCT Patent Application No. PCT/US2020/045814, dated Mar. 17, 2022, 12 pages.
Non-Final Office Action received for U.S. Appl. No. 17/341,839, dated Mar. 17, 2022, 14 pages.
Notice of Acceptance received for Australian Patent Application No. 2020250323, dated Feb. 28, 2022, 3 pages.
Notice of Allowance received for Chinese Patent Application No. 202110194015.6, dated Mar. 9, 2022, 6 pages (3 pages of English Translation and 3 pages of Official Copy).
Notice of Allowance received for Korean Patent Application No. 10-2021-7036246, dated Mar. 2, 2022, 5 pages (1 page of English Translation and 4 pages of Official Copy).

(56) References Cited

OTHER PUBLICATIONS

Notice of Allowance received for Korean Patent Application No. 10-2021-7036678, dated Mar. 7, 2022, 5 pages (1 page of English Translation and 4 pages of Official Copy).
Notice of Allowance received for Korean Patent Application No. 10-2022-7001721, dated Feb. 28, 2022, 5 pages (1 page of English Translation and 4 pages of Official Copy).
Notice of Allowance received for U.S. Appl. No. 16/997,588, dated Mar. 18, 2022, 9 pages.
Office Action received for Australian Patent Application No. 2021203216, dated Mar. 7, 2022, 8 pages.
Office Action received for Danish Patent Application No. PA202070610, dated Mar. 14, 2022, 7 pages.
Supplemental Notice of Allowance received for U.S. Appl. No. 16/867,002, dated Mar. 16, 2022, 2 pages.
Jurick et al., "Iphone Hacks", Tips & Tools for Unlocking the Power of Your iPhone & iPod touch, Available at Online: URL: https://api.pageplace.de/preview/DT0400.9780596550974_A23629666/preview-9780596550974_A23629666.pdf >, Apr. 2009, 49 pages.
Applicant-Initiated Interview Summary received for U.S. Appl. No. 16/389,722, dated Feb. 18, 2022, 5 pages.
Office Action received for Australian Patent Application No. 2021202797, dated Feb. 4, 2022, 5 pages.
Office Action received for Danish Patent Application No. PA202070624, dated Feb. 4, 2022, 4 pages.
Office Action received for Danish Patent Application No. PA202070625, dated Feb. 8, 2022, 2 pages.
Applicant-Initiated Interview Summary received for U.S. Appl. No. 17/068,386, dated Jan. 13, 2022, 2 pages.
Final Office Action received for U.S. Appl. No. 16/861,651, dated Jan. 26, 2022, 16 pages.
Ilovex," Stripe Generator", a tool that makes it easy to create striped materials, Online available at: https://www.ilovex.co.jp/blog/system/webconsulting/stripe-generator.html, May 2, 2012, 3 pages (Official Copy Only) (See Communication under 37 CFR § 1.98(a) (3)).
Kasai Yoshino, "Apple Watch Absolute Basics—Season 3—The key is to customize the dial", Mynavi Corporation, Online Available at: https://news.mynavi.jp/article/20171104-apple watch/, Nov. 4, 2017, 5 pages (Official Copy only) (See Communication under 37 CFR § 1.98(a) (3)).
Non-Final Office Action received for U.S. Appl. No. 17/373,163, dated Jan. 27, 2022, 14 pages.
Notice of Acceptance received for Australian Patent Application No. 2020239774, dated Jan. 5, 2022, 3 pages.
Office Action received for European Patent Application No. 20729346.5, dated Jan. 17, 2022, 8 pages.
Office Action received for Japanese Patent Application No. 2020-159825 dated Dec. 10, 2021, 4 pages (2 pages of English Translation and 2 pages of Official Copy).
Office Action received for Japanese Patent Application No. 2020-562622, dated Jan. 7, 2022, 13 pages (6 pages of English Translation and 7 pages of Official Copy).
Applicant-Initiated Interview Summary received for U.S. Appl. No. 15/405,122, dated Mar. 1, 2022, 4 pages.
Applicant-Initiated Interview Summary received for U.S. Appl. No. 15/421,865, dated Feb. 28, 2022, 5 pages.
Corrected Notice of Allowance received for U.S. Appl. No. 16/401,934, dated Feb. 28, 2022, 3 pages.
Final Office Action received for U.S. Appl. No. 17/068,386, dated Mar. 3, 2022, 29 pages.
Notice of Allowance received for U.S. Appl. No. 16/867,002, dated Mar. 1, 2022, 7 pages.
Notice of Allowance received for U.S. Appl. No. 17/041,350, dated Feb. 24, 2022, 6 pages.
Notice of Allowance received for U.S. Appl. No. 17/087,845, dated Mar. 3, 2022, 9 pages.
Office Action received for Japanese Patent Application No. 2021-023661, dated Feb. 25, 2022, 6 pages (3 pages of English Translation and 3 pages of Official Copy).

Corrected Notice of Allowance received for U.S. Appl. No. 16/418,786, dated Jan. 5, 2022, 3 pages.
Final Office Action received for U.S. Appl. No. 16/935,002, dated Jan. 5, 2022, 25 pages.
Office Action received for Japanese Patent Application No. 2020-159823, dated Dec. 23, 2021, 8 pages (4 pages of English Translation and 4 pages of Official Copy).
Office Action received for Korean Patent Application No. 10-2021-7036678, dated Dec. 22, 2021, 6 pages (2 pages of English Translation and 4 pages of Official Copy).
Applicant-Initiated Interview Summary received for U.S. Appl. No. 17/031,765, dated May 23, 2022, 5 pages.
Notice of Acceptance received for Australian Patent Application No. 2021202797, dated May 9, 2022, 3 pages.
Notice of Allowance received for U.S. Appl. No. 17/078,896, dated May 13, 2022, 8 pages.
Office Action received for Australian Patent Application No. 2022202292, dated May 10, 2022, 2 pages.
Office Action received for European Patent Application No. 20761084.1, dated May 9, 2022, 9 pages.
Office Action received for Japanese Patent Application No. 2020-124605, dated May 13, 2022, 6 pages (3 pages of English Translation and 3 pages of Official Copy).
Corrected Notice of Allowance received for U.S. Appl. No. 16/418,786, dated Jun. 23, 2022, 2 pages.
Corrected Notice of Allowance received for U.S. Appl. No. 17/373,163, dated Jun. 27, 2022, 5 pages.
Office Action received for Korean Patent Application No. 10-2020-0123852, dated Jun. 9, 2022, 10 pages (4 pages of English Translation and 6 pages of Official Copy).
Office Action received for Korean Patent Application No. 10-2020-0123857, dated Jun. 9, 2022, 12 pages (5 pages of English Translation and 7 pages of Official Copy).
Office Action received for Korean Patent Application No. 10-2020-0123887, dated Jun. 9, 2022, 5 pages (2 pages of English Translation and 3 pages of Official Copy).
Office Action received for Korean Patent Application No. 10-2020-7032187, dated Jun. 10, 2022, 16 pages (7 pages of English Translation and 9 pages of Official Copy).
International Search Report and Written Opinion received for PCT Patent Application No. PCT/US2021/031669, dated Oct. 13, 2021, 17 pages.
Office Action received for Australian Patent Application No. 2020239774, dated Oct. 5, 2021, 3 pages.
Office Action received for Chinese Patent Application No. 202110194015.6, dated Sep. 28, 2021, 13 pages (6 pages of English Translation and 7 pages of Official Copy).
Office Action received for Korean Patent Application No. 10-2021-7025301, dated Oct. 15, 2021, 5 pages (2 pages of English Translation and 3 pages of Official Copy).
Supplemental Notice of Allowance received for U.S. Appl. No. 16/997,588, dated Oct. 22, 2021, 4 pages.
Corrected Notice of Allowance received for U.S. Appl. No. 17/041,350, dated Apr. 4, 2022, 3 pages.
Non-Final Office Action received for U.S. Appl. No. 16/418,786, dated Mar. 28, 2022, 14 pages.
Non-Final Office Action received for U.S. Appl. No. 17/031,671, dated Apr. 1, 2022, 32 pages.
Non-Final Office Action received for U.S. Appl. No. 17/031,765, dated Mar. 29, 2022, 33 pages.
Notice of Allowance received for Japanese Patent Application No. 2020-159825, dated Mar. 25, 2022, 5 pages (1 page of English Translation and 4 pages of Official Copy).
Notice of Allowance received for Korean Patent Application No. 10-2021-7025301, dated Mar. 16, 2022, 4 pages (1 page of English Translation and 3 pages of Official Copy).
Office Action received for Japanese Patent Application No. 2020-159824, dated Dec. 17, 2021, 13 pages (7 pages of English Translation and 6 pages of Official Copy).
Advisory Action received for U.S. Appl. No. 16/935,002, dated May 6, 2022, 3 Pages.
Applicant-Initiated Interview Summary received for U.S. Appl. No. 16/418,786, dated May 9, 2022, 2 pages.

(56) References Cited

OTHER PUBLICATIONS

Applicant-Initiated Interview Summary received for U.S. Appl. No. 16/943,737, dated Apr. 29, 2022, 6 pages.
Applicant-Initiated Interview Summary received for U.S. Appl. No. 17/078,896, dated Apr. 25, 2022, 2 pages.
Applicant-Initiated Interview Summary received for U.S. Appl. No. 17/341,839, dated Apr. 29, 2022, 2 pages.
Decision to Grant received for European Patent Application No. 16762356.0, dated Apr. 26, 2022, 2 pages.
Intention to Grant received for European Patent Application No. 20185974.1, dated Apr. 28, 2022, 8 pages.
Notice of Allowance received for U.S. Appl. No. 17/373,163, dated May 11, 2022, 8 pages.
Office Action received for Indian Patent Application No. 202118025047, dated Apr. 26, 2022, 6 pages.
Advisory Action received for U.S. Appl. No. 16/861,651, dated Jul. 29, 2022, 4 pages.
Applicant-Initiated Interview Summary received for U.S. Appl. No. 16/418,786, dated Sep. 23, 2022, 2 pages.
Applicant-Initiated Interview Summary received for U.S. Appl. No. 17/341,839, dated Sep. 16, 2022, 2 pages.
Applicant-Initiated Interview Summary received for U.S. Appl. No. 17/591,184, dated Sep. 23, 2022, 2 pages.
Corrected Notice of Allowance received for U.S. Appl. No. 17/373,163, dated Jul. 15, 2022, 5 pages.
Decision to Grant received for European Patent Application No. 20185974.1, dated Aug. 19, 2022, 3 pages.
Decision to Refuse received for Japanese Patent Application No. 2020-159824, dated Sep. 30, 2022, 6 pages (3 pages of English Translation and 3 pages of Official Copy).
Extended European Search Report received for European Patent Application No. 22173249.8, dated Aug. 19, 2022, 15 pages.
Final Office Action received for U.S. Appl. No. 15/421,865, dated Jul. 12, 2022, 27 pages.
Final Office Action received for U.S. Appl. No. 17/031,765, dated Sep. 12, 2022, 37 pages.
Final Office Action received for U.S. Appl. No. 17/341,839, dated Jul. 18, 2022, 15 pages.
Google, "Android User's Guide", Retrieved from the Internet: https://static.googleusercontent.com/media/www.google.com/en//help/hc/pdfs/mobile/AndroidUsersGuide-30-100.pdf, Feb. 23, 2011, 140 pages.
Intention to Grant received for Danish Patent Application No. PA202070623, dated Jul. 20, 2022, 2 pages.
Invitation to Pay Search Fees received for European Patent Application No. 20730136.7, dated Jul. 1, 2022, 4 pages.
Lein et al., "Patternizer", Available online at: https://patternizer.com/, Apr. 2016, 5 pages.
Non-Final Office Action received for U.S. Appl. No. 16/389,722, dated Jul. 7, 2022, 16 pages.
Non-Final Office Action received for U.S. Appl. No. 16/418,786, dated Aug. 1, 2022, 18 pages.
Non-Final Office Action received for U.S. Appl. No. 17/556,165, dated Sep. 7, 2022, 15 pages.
Non-Final Office Action received for U.S. Appl. No. 17/591,184, dated Aug. 4, 2022, 18 pages.
Notice of Acceptance received for Australian Patent Application No. 2021203216, dated Jul. 26, 2022, 3 pages.
Notice of Acceptance received for Australian Patent Application No. 2021245228, dated Oct. 4, 2022, 3 pages.
Notice of Acceptance received for Australian Patent Application No. 2022202292, dated Jul. 6, 2022, 3 pages.
Notice of Acceptance received for Australian Patent Application No. 2022220279, dated Sep. 27, 2022, 3 pages.
Notice of Allowance received for Danish Patent Application No. PA202070623, dated Sep. 20, 2022, 2 pages.
Notice of Allowance received for Japanese Patent Application No. 2020-562622, dated Aug. 26, 2022, 4 pages (1 page of English Translation and 3 pages of Official Copy).
Notice of Allowance received for Japanese Patent Application No. 2021-105941, dated Jul. 4, 2022, 4 pages (1 page of English Translation and 3 pages of Official Copy).
Notice of Allowance received for Japanese Patent Application No. 2021-122610, dated Aug. 5, 2022, 4 pages (1 page of English Translation and 3 pages of Official Copy).
Notice of Allowance received for Japanese Patent Application No. 2022-512865, dated Oct. 3, 2022, 4 pages (1 page of English Translation and 3 pages of Official Copy).
Notice of Allowance received for U.S. Appl. No. 17/341,839, dated Oct. 5, 2022, 5 pages.
Notice of Allowance received for U.S. Appl. No. 17/373,163, dated Jul. 27, 2022, 8 pages.
Office Action received for Australian Patent Application No. 2021245228, dated Aug. 31, 2022, 2 pages.
Office Action received for Australian Patent Application No. 2021250863, dated Oct. 6, 2022, 6 pages.
Office Action received for Chinese Patent Application No. 202110453180.9, dated Jun. 16, 2022, 14 pages (7 pages of English Translation and 7 pages of Official Copy).
Office Action received for Chinese Patent Application No. 202111457936.3, dated Jul. 5, 2022, 18 pages (9 pages of English Translation and 9 pages of Official Copy).
Office Action received for Danish Patent Application No. PA202070625, dated Sep. 23, 2022, 4 pages.
Office Action received for European Patent Application No. 20729346.5, dated Jul. 28, 2022, 9 pages.
Office Action received for European Patent Application No. 20730136.7, dated Oct. 6, 2022, 11 pages.
Office Action received for Indian Patent Application No. 202017048447, dated Sep. 5, 2022, 6 pages.
Office Action received for Japanese Patent Application No. 2020-159823, dated Aug. 15, 2022, 6 pages (3 pages of English Translation and 3 pages of Official Copy).
Office Action received for Japanese Patent Application No. 2021-023661, dated Oct. 3, 2022, 8 pages (4 pages of English Translation and 4 pages of Official Copy).
Office Action received for Korean Patent Application No. 10-2022-7019205, dated Sep. 21, 2022, 6 pages (2 pages of English Translation and 4 pages of Official Copy).
"Programmatically download APK from google play store", retrieved from the Internet: https://stackoverflow.com/questions/13703982/prog ram maticallydownload-apk-from-google-play-store/13704021#13704021, Dec. 10, 2012, 2 pages.
Summons to Attend Oral Proceedings received for European Patent Application No. 17810723.1, mailed on Jul. 5, 2022, 8 pages.

\* cited by examiner

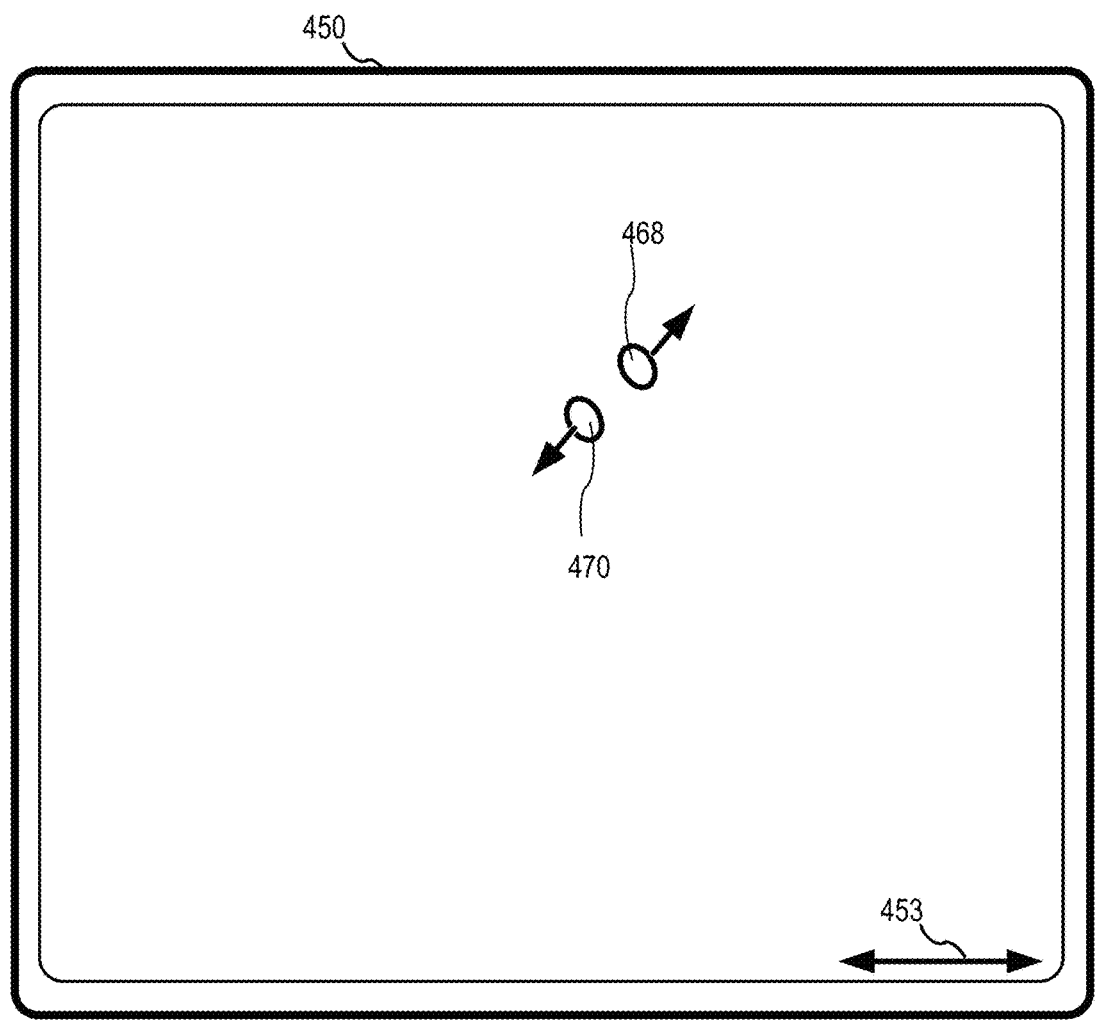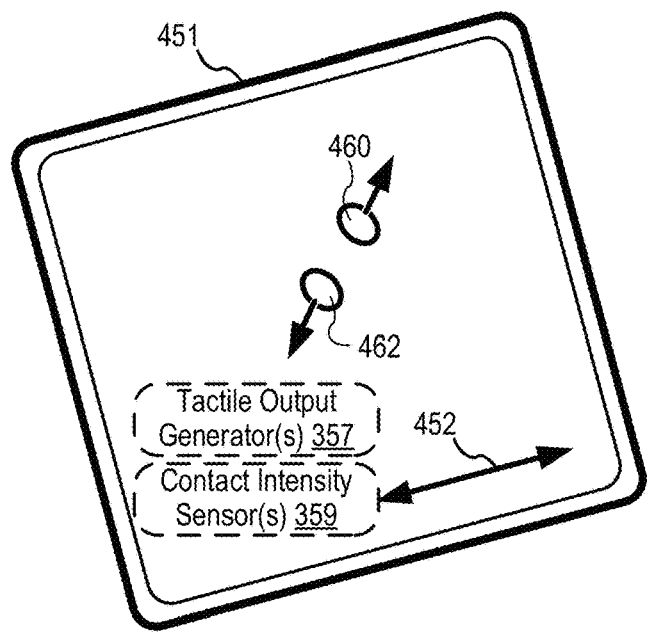
FIG. 4B

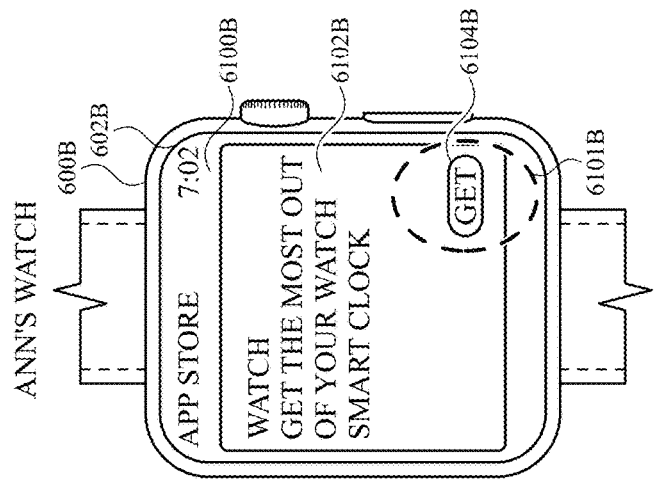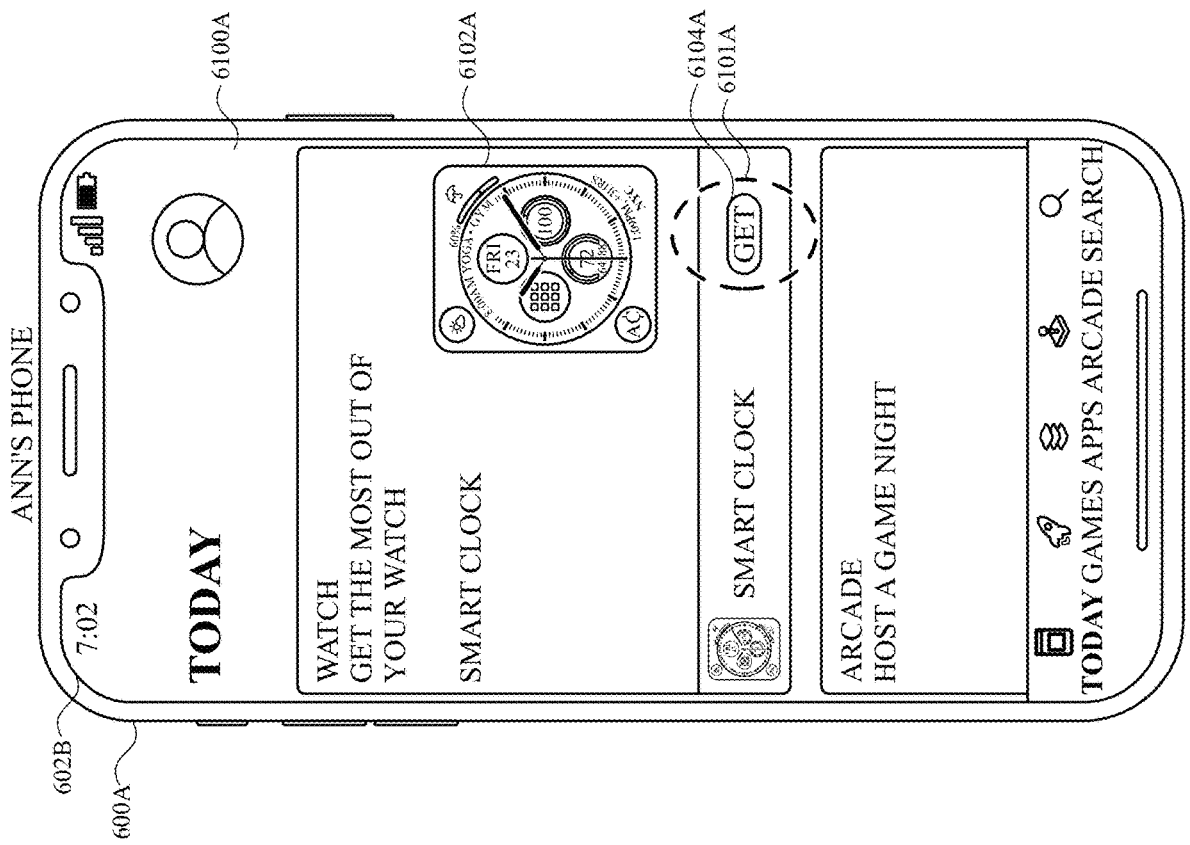
FIG. 6B

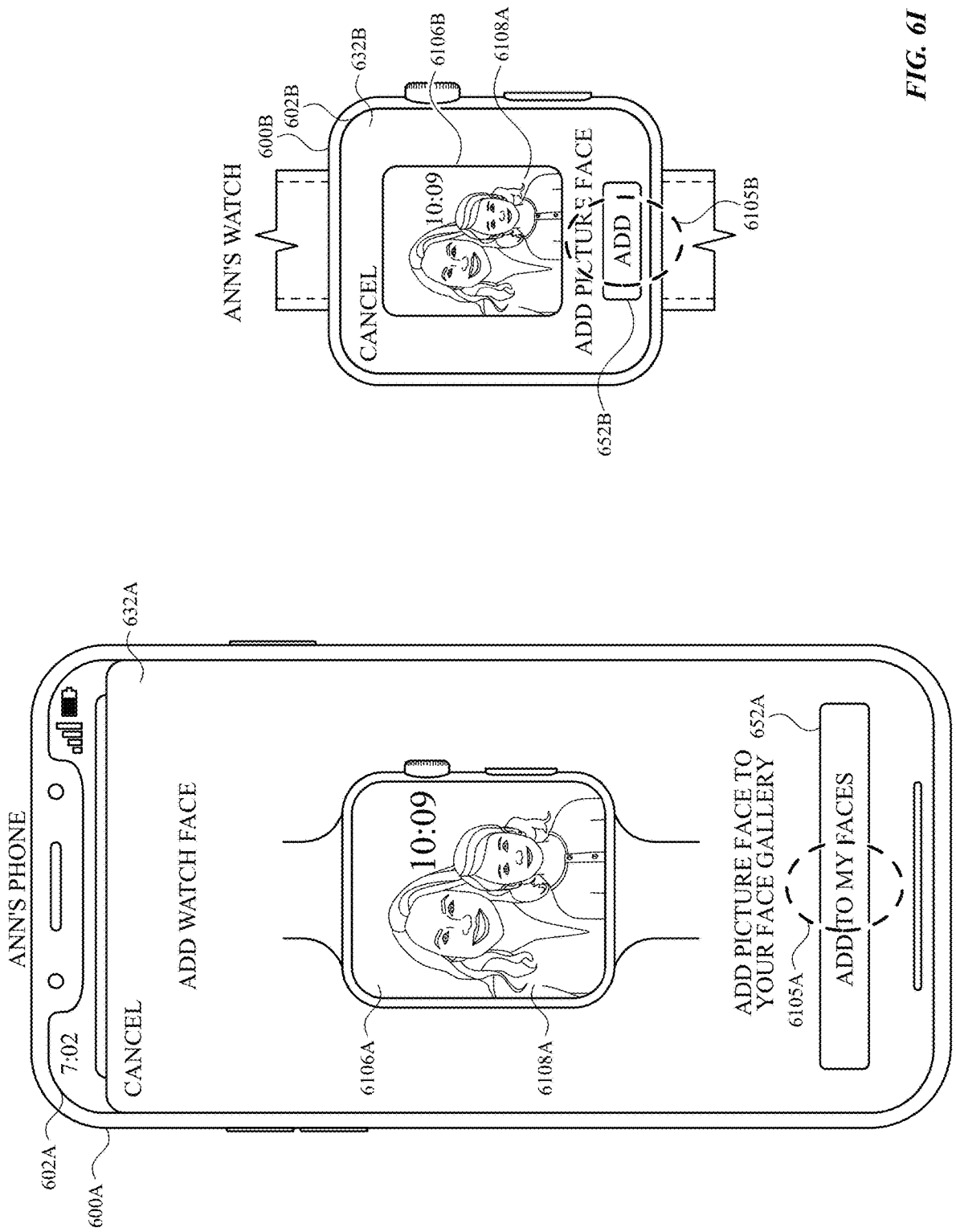

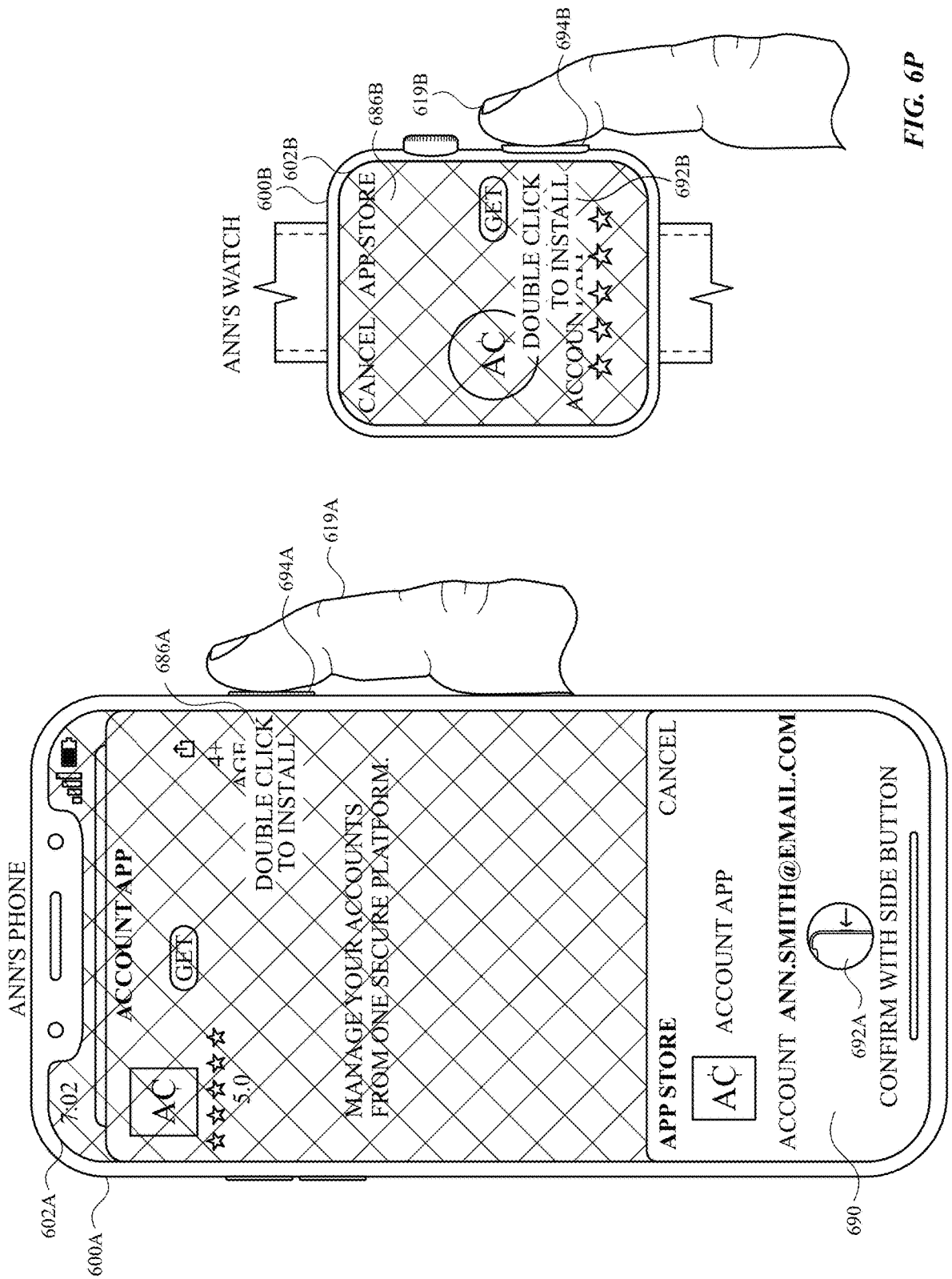

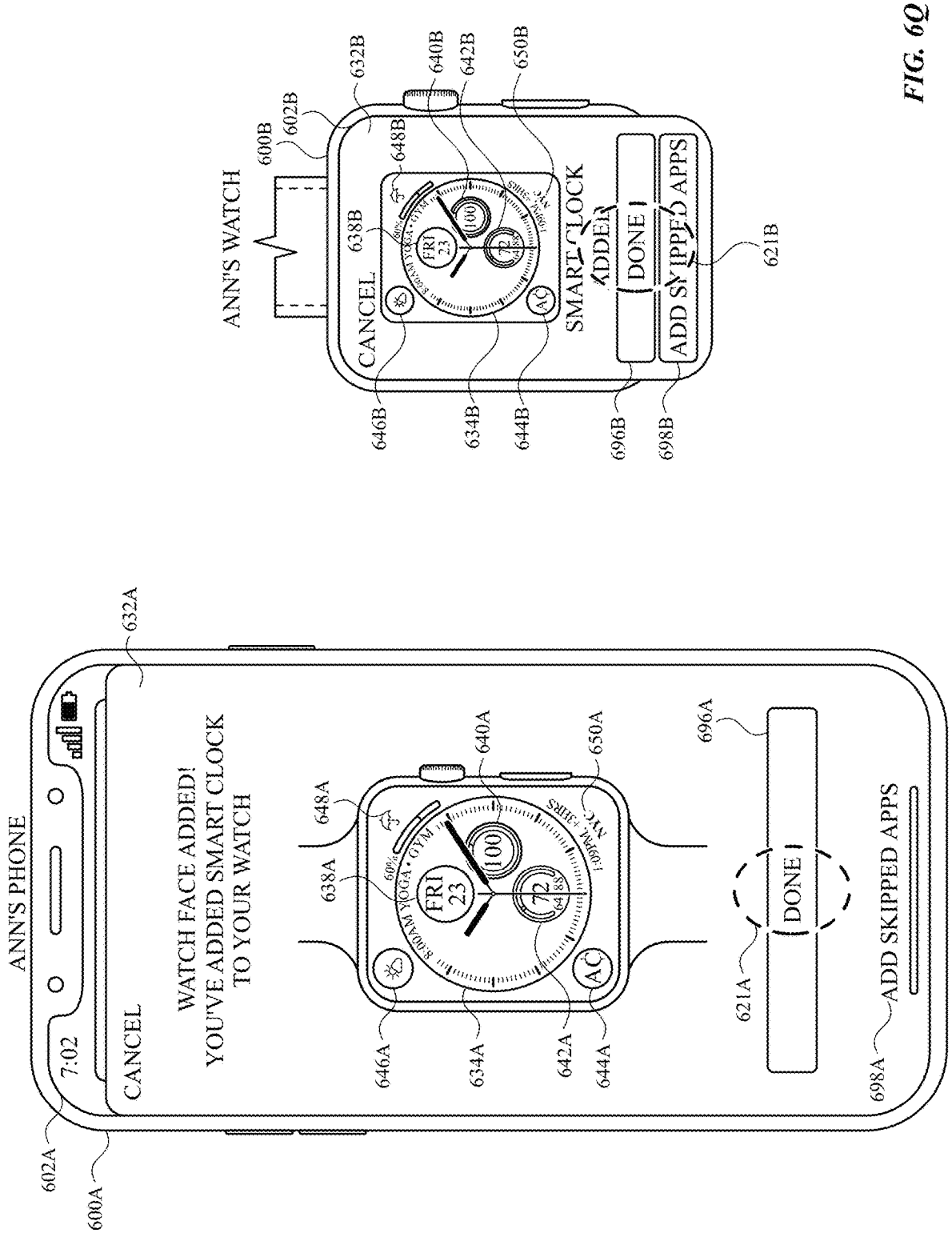

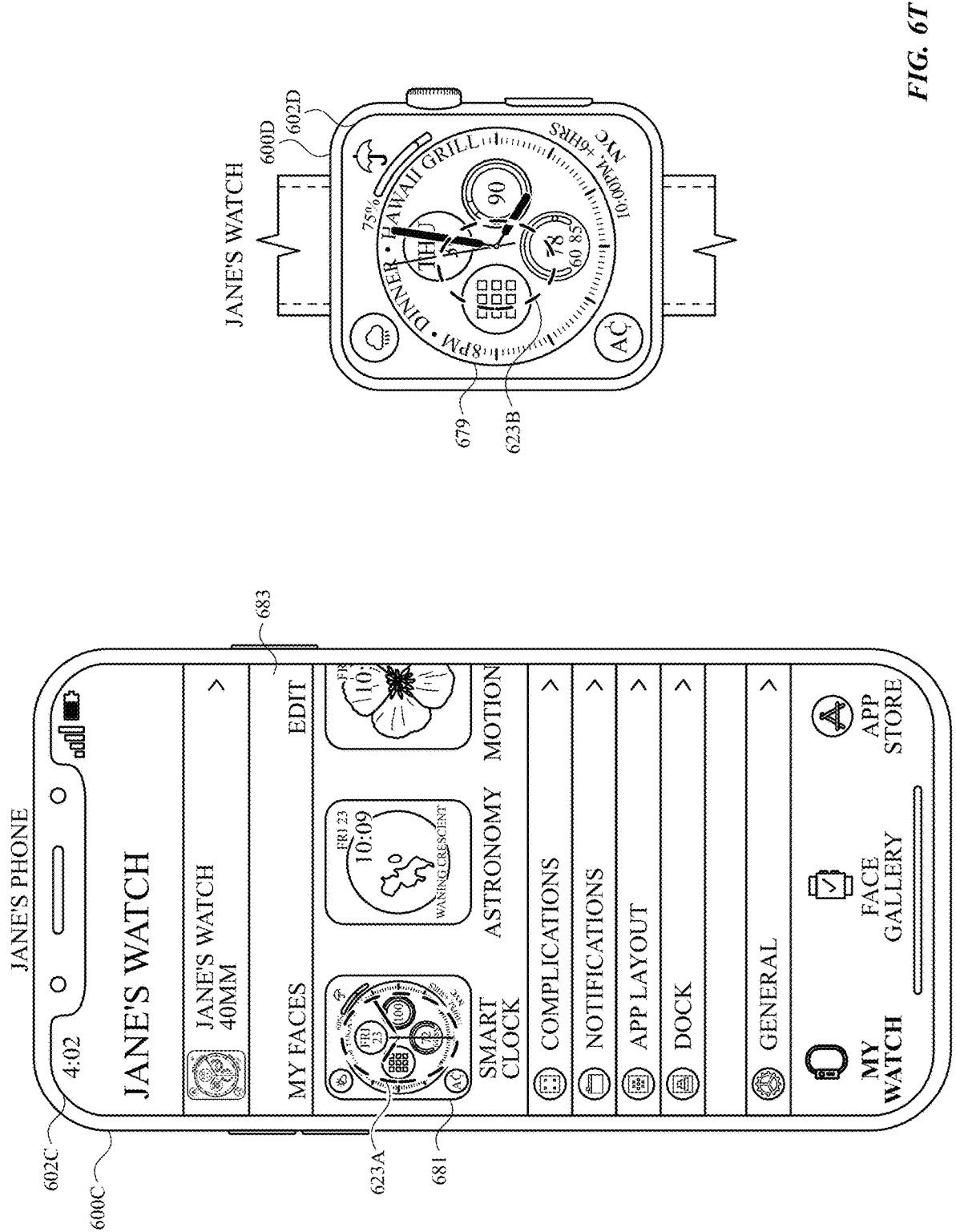

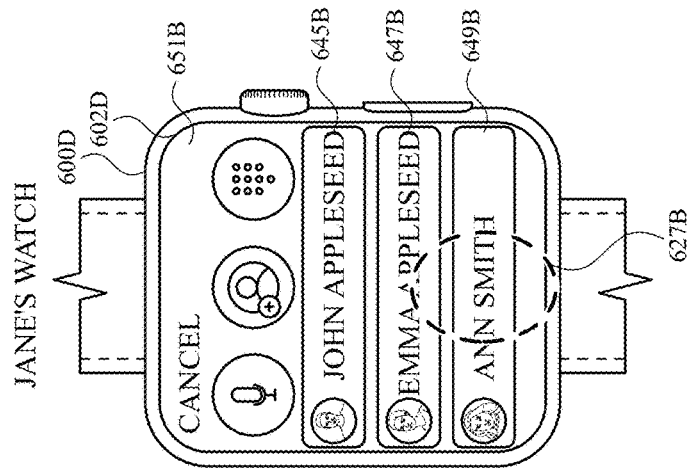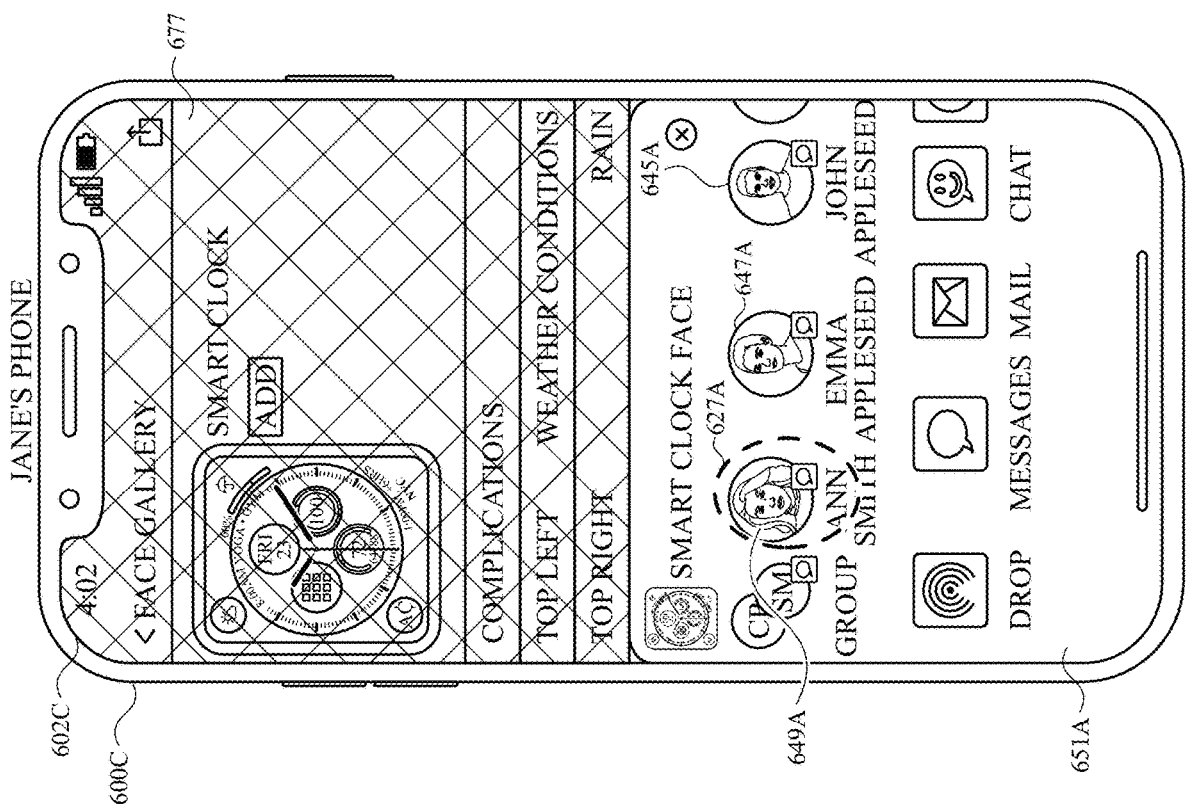
FIG. 6V

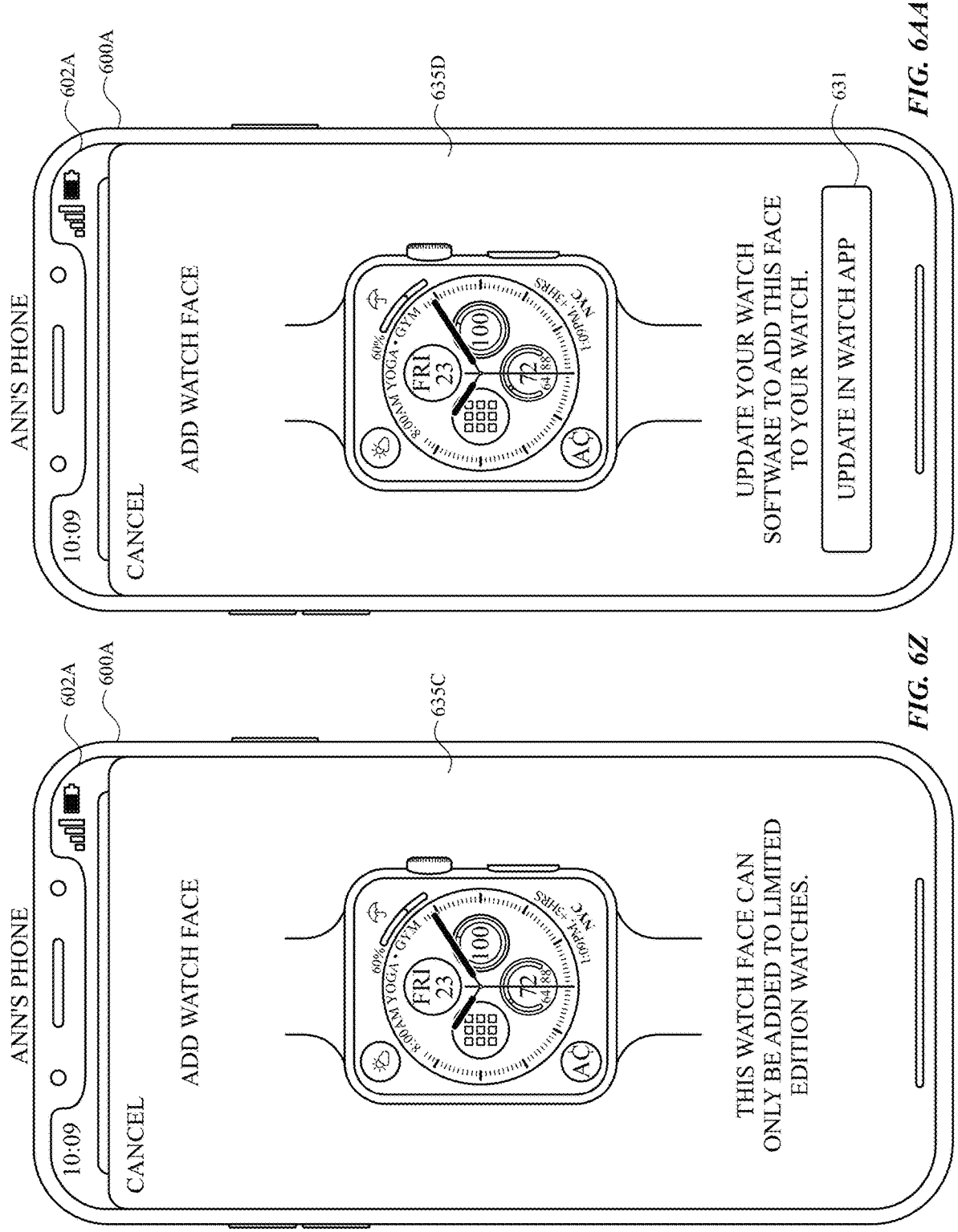

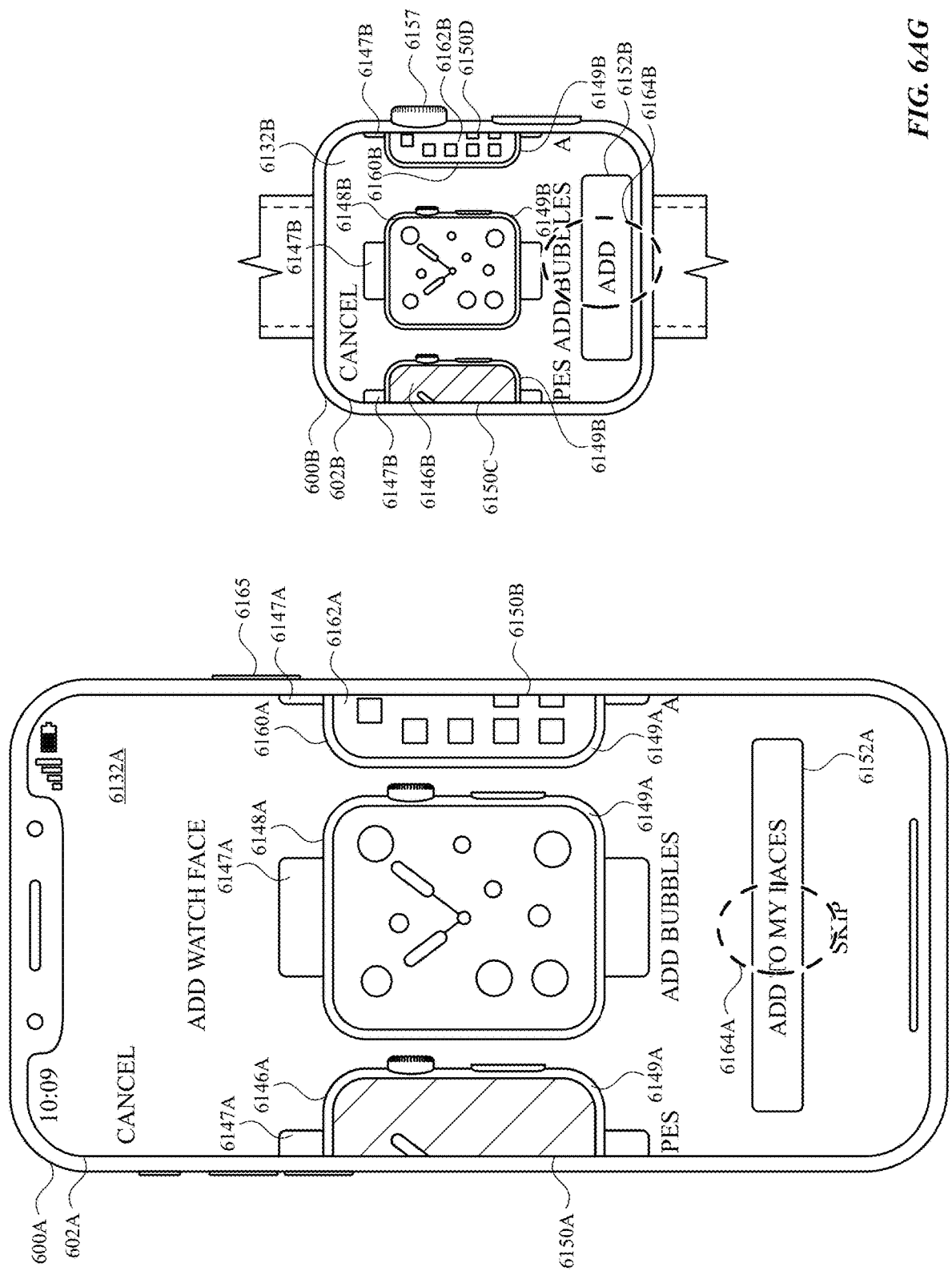

700 ↘

702
Receive a representation of a first user interface template that specifies an arrangement of user interface elements including a first user interface element corresponding to a first application and one or more other user interface elements corresponding to software that is different from the first application.

704
The one or more other user interface elements include a second user interface element corresponding to a second application different from the first application and a third user interface element corresponding to a third application different from the first application and the second application.

706
The representation of the user interface specifies elements for the first application that is not available on the respective computer system, a second application that is not available on the respective computer system and a third application that is not available on the respective computer system.

708
Receive a request to use the first user interface template for a respective computer system that includes a plurality of installed applications.

710
In response to receiving the request to use the first user interface template for the respective computer system:

712
Initiate a process for creating a user interface for the respective computer system using the first user interface template.

714
The process for creating the user interface for the respective computer system using the first user interface template includes:

716
In accordance with a determination that the first application is not available on the respective computer system, display, via the display generation component, an alert indicating that the first application needs to be installed on the respective computer system in order for the first user interface template to be used to create a user interface for the respective computer system that includes the first user interface element from the first user interface template.

718
In accordance with a determination that the first application is available on the respective computer system, forgo displaying, via the display generation component, the alert indicating that the first application needs to be installed on the respective computer system in order for the first user interface template to be used to create a user interface for the respective computer system that includes the first user interface element from the first user interface template.

720
In accordance with a determination that the second application is not available on the respective computer system, display, via the display generation component, a second alert indicating that the second application needs to be installed on the respective computer system in order for the first user interface template to be used to create a user interface for the respective computer system that includes the second user interface element from the first user interface template.

722
In accordance with a determination that the second application is available on the respective computer system, forgoing displaying, via the display generation component, the second alert indicating that the second application needs to be installed on the respective computer system in order for the first user interface template to be used to create a user interface for the respective computer system that includes the second user interface element from the first user interface template.

*FIG. 7B*

724
In accordance with the determination that the first application is not available on the respective computer system:

726
Display, via the display generation component, an affordance that, when activated, initiates a process for installing the first application on the respective computer system.

728
In accordance with a determination that the affordance was not activated, continue the process for creating the user interface for the respective computer system using the first user interface template without installing the first application on the respective computer system, wherein the first user interface template is configured to not include the first user interface element corresponding to the first application.

730
While displaying the affordance, detect an activation of the affordance, and in response to detecting the activation of the affordance, initiate the process for installing the first application on the respective computer system.

732
Display the alert.

734
In accordance with a determination that the second application is not available on the respective computer system, display, via the display generation component, a second alert indicating that the second application needs to be installed on the respective computer system in order for the first user interface template to be used to create a user interface for the respective computer system that includes the second user interface element from the first user interface template.

736
Display the second alert.

738
In accordance with a determination that the third application is not available on the respective computer system, display, via the display generation component, a third alert indicating that the third application needs to be installed on the respective computer system in order for the first user interface template to be used to create a user interface for the respective computer system that includes the third user interface element from the first user interface template.

740
Display, via the display generation component, a user interface for the first user interface element that includes a representation of the first user interface template and one or more selectable user interface objects associated with the first user interface element, wherein the representation of the first user interface template includes the first user interface element corresponding to the first application.

742
While displaying the representation of the first user interface template, and after receiving one or more inputs corresponding to a decision as to whether to make the first application available, receive an input corresponding to a request to display a user interface for a second user interface element that includes a representation of the first user interface template and one or more selectable user interface objects associated with the second user interface element.

744
In response to receiving the request to display a user interface for the second user interface element:

746
In accordance with a determination that the first application was selected for installation on the respective computer system, display the user interface for the second user interface element includes displaying a representation of the first user interface element.

748
In accordance with a determination that the first application was not selected for installation on the respective computer system, display the user interface for the second user interface element includes displaying the representation of the first user interface template without displaying the first user interface element.

750
While displaying the representation of the first user interface template, and after receiving one or more inputs corresponding to a decision as to whether to make the second application available, receive an input corresponding to a request to display a user interface for a third user interface element that includes a representation of the first user interface template and one or more selectable user interface objects associated with the third user interface element.

752
In response to receiving the request to display a user interface for the third user interface element:

754
In accordance with a determination that the second application was selected for installation on the respective computer system, display the user interface for the third user interface element includes displaying a representation of the second user interface element.

756
In accordance with a determination that the second application was not selected for installation on the respective computer system, display the user interface for the third user interface element includes displaying the representation of the first user interface template without displaying the second user interface element.

*FIG. 7F*

USER INTERFACES FOR MANAGING USER INTERFACE SHARING

CROSS-REFERENCE TO RELATED APPLICATIONS

This application claims priority to U.S. Provisional Application Ser. No. 63/142,926, filed Jan. 28, 2021, entitled "USER INTERFACES FOR MANAGING USER INTERFACE SHARING," and U.S. Provisional Application Ser. No. 63/023,149, filed May 11, 2020, entitled "USER INTERFACES FOR MANAGING USER INTERFACE SHARING," the entire contents of each of which are hereby incorporated by reference in their entirety.

FIELD

The present disclosure relates generally to computer user interfaces, and more specifically to techniques for managing user interface sharing.

BACKGROUND

An electronic device can display user interfaces that include one or more features. The one or more features of a respective user interface that can be customized before being enabled for use on the electronic device.

BRIEF SUMMARY

Some techniques for managing user interface sharing using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated systems or devices.

Accordingly, the present technique provides electronic devices with faster, more efficient methods and interfaces for managing user interface sharing. Such methods and interfaces optionally complement or replace other methods for managing user interface sharing. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component is described. The method comprises: receiving a representation of a first user interface template that specifies an arrangement of user interface elements including a first user interface element corresponding to a first application and one or more other user interface elements corresponding to software that is different from the first application; subsequent to receiving the representation of the first user interface template, receiving a request to use the first user interface template for a respective computer system that includes a plurality of installed applications; and in response to receiving the request to use the first user interface template for the respective computer system, initiating a process for creating a user interface for the respective computer system using the first user interface template, wherein the process for creating the user interface for the respective computer system using the first user interface template includes: in accordance with a determination that the first application is not available on the respective computer system, displaying, via the display generation component, an alert indicating that the first application needs to be installed on the respective computer system in order for the first user interface template to be used to create a user interface for the respective computer system that includes the first user interface element from the first user interface template; and in accordance with a determination that the first application is available on the respective computer system, forgoing displaying, via the display generation component, the alert indicating that the first application needs to be installed on the respective computer system in order for the first user interface template to be used to create a user interface for the respective computer system that includes the first user interface element from the first user interface template.

In accordance with some embodiments, a non-transitory computer-readable storage medium storing one or more programs configured to be executed by one or more processors of computer system that is in communication with a display generation component is described. The one or more programs include instructions for: receiving a representation of a first user interface template that specifies an arrangement of user interface elements including a first user interface element corresponding to a first application and one or more other user interface elements corresponding to software that is different from the first application; subsequent to receiving the representation of the first user interface template, receiving a request to use the first user interface template for a respective computer system that includes a plurality of installed applications; and in response to receiving the request to use the first user interface template for the respective computer system, initiating a process for creating a user interface for the respective computer system using the first user interface template, wherein the process for creating the user interface for the respective computer system using the first user interface template includes: in accordance with a determination that the first application is not available on the respective computer system, displaying, via the display generation component, an alert indicating that the first application needs to be installed on the respective computer system in order for the first user interface template to be used to create a user interface for the respective computer system that includes the first user interface element from the first user interface template; and in accordance with a determination that the first application is available on the respective computer system, forgoing displaying, via the display generation component, the alert indicating that the first application needs to be installed on the respective computer system in order for the first user interface template to be used to create a user interface for the respective computer system that includes the first user interface element from the first user interface template.

In accordance with some embodiments, a transitory computer-readable storage medium storing one or more programs configured to be executed by one or more processors of computer system that is in communication with a display generation component is described. The one or more programs include instructions for: receiving a representation of a first user interface template that specifies an arrangement of user interface elements including a first user interface element corresponding to a first application and one or more other user interface elements corresponding to software that is different from the first application; subsequent to receiving the representation of the first user interface template, receiving a request to use the first user interface template for a respective computer system that includes a plurality of installed applications; and in response to receiving the request to use the first user interface template for the respective computer system, initiating a process for creating a user interface for the respective computer system using the first user interface template, wherein the process for creating the user interface for the respective computer system using the first user interface template includes: in accordance with a determination that the first application is not available on the respective computer system, displaying, via the display generation component, an alert indicating that the first application needs to be installed on the respective computer system in order for the first user interface template to be used to create a user interface for the respective computer system that includes the first user interface element from the first user interface template; and in accordance with a determination that the first application is available on the respective computer system, forgoing displaying, via the display generation component, the alert indicating that the first application needs to be installed on the respective computer system in order for the first user interface template to be used to create a user interface for the respective computer system that includes the first user interface element from the first user interface template.

In accordance with some embodiments, a computer system comprising a display generation component, one or more processors, and memory storing one or more programs configured to be executed by the one or more processors is described. The one or more programs including instructions for: receiving a representation of a first user interface template that specifies an arrangement of user interface elements including a first user interface element corresponding to a first application and one or more other user interface elements corresponding to software that is different from the first application; subsequent to receiving the representation of the first user interface template, receiving a request to use the first user interface template for a respective computer system that includes a plurality of installed applications; and in response to receiving the request to use the first user interface template for the respective computer system, initiating a process for creating a user interface for the respective computer system using the first user interface template, wherein the process for creating the user interface for the respective computer system using the first user interface template includes: in accordance with a determination that the first application is not available on the respective computer system, displaying, via the display generation component, an alert indicating that the first application needs to be installed on the respective computer system in order for the first user interface template to be used to create a user interface for the respective computer system that includes the first user interface element from the first user interface template; and in accordance with a determination that the first application is available on the respective computer system, forgoing displaying, via the display generation component, the alert indicating that the first application needs to be installed on the respective computer system in order for the first user interface template to be used to create a user interface for the respective computer system that includes the first user interface element from the first user interface template.

In accordance with some embodiments, a computer system is described. The computer system comprises: a display generation component; means for receiving a representation of a first user interface template that specifies an arrangement of user interface elements including a first user interface element corresponding to a first application and one or more other user interface elements corresponding to software that is different from the first application; means for, subsequent to receiving the representation of the first user interface template, receiving a request to use the first user interface template for a respective computer system that includes a plurality of installed applications; and means for, in response to receiving the request to use the first user interface template for the respective computer system, initiating a process for creating a user interface for the respective computer system using the first user interface template, wherein the process for creating the user interface for the respective computer system using the first user interface template includes: in accordance with a determination that the first application is not available on the respective computer system, displaying, via the display generation component, an alert indicating that the first application needs to be installed on the respective computer system in order for the first user interface template to be used to create a user interface for the respective computer system that includes the first user interface element from the first user interface template; and in accordance with a determination that the first application is available on the respective computer system, forgoing displaying, via the display generation component, the alert indicating that the first application needs to be installed on the respective computer system in order for the first user interface template to be used to create a user interface for the respective computer system that includes the first user interface element from the first user interface template.

In accordance with some embodiments, a method performed at a computer system that is in communication with a display generation component and one or more input devices is described. The method comprises: receiving a request to display a user interface for selecting one or more watch faces to add to a library of watch faces for a respective computer system; in response to receiving the request to display the user interface for selecting one or more watch faces to add to a library of watch faces for the respective computer system: in accordance with a determination that the request is associated with two or more watch faces, displaying, via the display generation component, the user interface for selecting one or more watch faces to add to a library of watch faces for the respective computer system, including displaying: a first graphical representation of a first watch face of the two or more watch faces associated with the request; and a second graphical representation of a second watch face of the two or more watch faces associated with the request; while displaying the user interface for selecting one or more watch faces to add to a library of watch faces for the respective computer system, receiving, via the one or more input devices, an input; and in response to receiving the input: in accordance with a determination that the input corresponds to selection of the first watch face, initiating a process for adding the first watch face to a library of watch faces for the respective computer system; and in accordance with a determination that the input corresponds to selection of the second watch face, initiating a process for adding the second watch face to a library of watch faces for the respective computer system.

In accordance with some embodiments, a non-transitory computer-readable storage medium storing one or more programs configured to be executed by one or more processors of computer system that is in communication with a display generation component and one or more input devices is described. The one or more programs include instructions for: receiving a request to display a user interface for selecting one or more watch faces to add to a library of watch faces for a respective computer system; in response to receiving the request to display the user interface for selecting one or more watch faces to add to a library of watch faces for the respective computer system: in accordance with a determination that the request is associated with two or more watch faces, displaying, via the display generation component, the user interface for selecting one or more watch faces to add to a library of watch faces for the respective computer system, including displaying: a first graphical representation of a first watch face of the two or more watch faces associated with the request; and a second graphical representation of a second watch face of the two or more watch faces associated with the request; while displaying the user interface for selecting one or more watch faces to add to a library of watch faces for the respective computer system, receiving, via the one or more input devices, an input; and in response to receiving the input: in accordance with a determination that the input corresponds to selection of the first watch face, initiating a process for adding the first watch face to a library of watch faces for the respective computer system; and in accordance with a determination that the input corresponds to selection of the second watch face, initiating a process for adding the second watch face to a library of watch faces for the respective computer system.

In accordance with some embodiments, a transitory computer-readable storage medium storing one or more programs configured to be executed by one or more processors of computer system that is in communication with a display generation component and one or more input devices is described. The one or more programs include instructions for: receiving a request to display a user interface for selecting one or more watch faces to add to a library of watch faces for a respective computer system; in response to receiving the request to display the user interface for selecting one or more watch faces to add to a library of watch faces for the respective computer system: in accordance with a determination that the request is associated with two or more watch faces, displaying, via the display generation component, the user interface for selecting one or more watch faces to add to a library of watch faces for the respective computer system, including displaying: a first graphical representation of a first watch face of the two or more watch faces associated with the request; and a second graphical representation of a second watch face of the two or more watch faces associated with the request; while displaying the user interface for selecting one or more watch faces to add to a library of watch faces for the respective computer system, receiving, via the one or more input devices, an input; and in response to receiving the input: in accordance with a determination that the input corresponds to selection of the first watch face, initiating a process for adding the first watch face to a library of watch faces for the respective computer system; and in accordance with a determination that the input corresponds to selection of the second watch face, initiating a process for adding the second watch face to a library of watch faces for the respective computer system.

In accordance with some embodiments, a computer system comprising a display generation component, and one or more input devices, one or more processors, and memory storing one or more programs configured to be executed by the one or more processors is described. The one or more programs including instructions for: receiving a request to display a user interface for selecting one or more watch faces to add to a library of watch faces for a respective computer system; in response to receiving the request to display the user interface for selecting one or more watch faces to add to a library of watch faces for the respective computer system: in accordance with a determination that the request is associated with two or more watch faces, displaying, via the display generation component, the user interface for selecting one or more watch faces to add to a library of watch faces for the respective computer system, including displaying: a first graphical representation of a first watch face of the two or more watch faces associated with the request; and a second graphical representation of a second watch face of the two or more watch faces associated with the request; while displaying the user interface for selecting one or more watch faces to add to a library of watch faces for the respective computer system, receiving, via the one or more input devices, an input; and in response to receiving the input: in accordance with a determination that the input corresponds to selection of the first watch face, initiating a process for adding the first watch face to a library of watch faces for the respective computer system; and in accordance with a determination that the input corresponds to selection of the second watch face, initiating a process for adding the second watch face to a library of watch faces for the respective computer system.

In accordance with some embodiments, a computer system is described. The computer system comprises: a display generation component, one or more input devices, means for receiving a request to display a user interface for selecting one or more watch faces to add to a library of watch faces for a respective computer system; means for, in response to receiving the request to display the user interface for selecting one or more watch faces to add to a library of watch faces for the respective computer system: in accordance with a determination that the request is associated with two or more watch faces, displaying, via the display generation component, the user interface for selecting one or more watch faces to add to a library of watch faces for the respective computer system, including displaying: a first graphical representation of a first watch face of the two or more watch faces associated with the request; and a second graphical representation of a second watch face of the two or more watch faces associated with the request; means for, while displaying the user interface for selecting one or more watch faces to add to a library of watch faces for the respective computer system, receiving, via the one or more input devices, an input; and means for, in response to receiving the input: in accordance with a determination that the input corresponds to selection of the first watch face, initiating a process for adding the first watch face to a library of watch faces for the respective computer system; and in accordance with a determination that the input corresponds to selection of the second watch face, initiating a process for adding the second watch face to a library of watch faces for the respective computer system.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing user interface sharing, thereby increasing the effectiveness, efficiency, and user satisfaction with such devices. Such methods and interfaces may complement or replace other methods for managing user interface sharing.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7F is a flow diagram illustrating methods of managing user interface sharing, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing user interface sharing. For example, there is a need for user interfaces that enable quick and easy setup of a user interface that has been shared via a user interface template. For another example, there is a need for user interfaces that enable convenient downloading of an application(s) for which installation may be needed to complete the setup of a user interface that has been shared via a user interface template. For another example, there is a need for user interfaces that enable the completion of the setup of a user interface that has been shared via a user interface template without installing one or more applications that enable respective features of the user interface template. Such techniques can reduce the cognitive burden on a user who accesses user interface sharing, thereby enhancing productivity. Further, such techniques can reduce processor and battery power otherwise wasted on redundant user inputs.

Figure 8A:
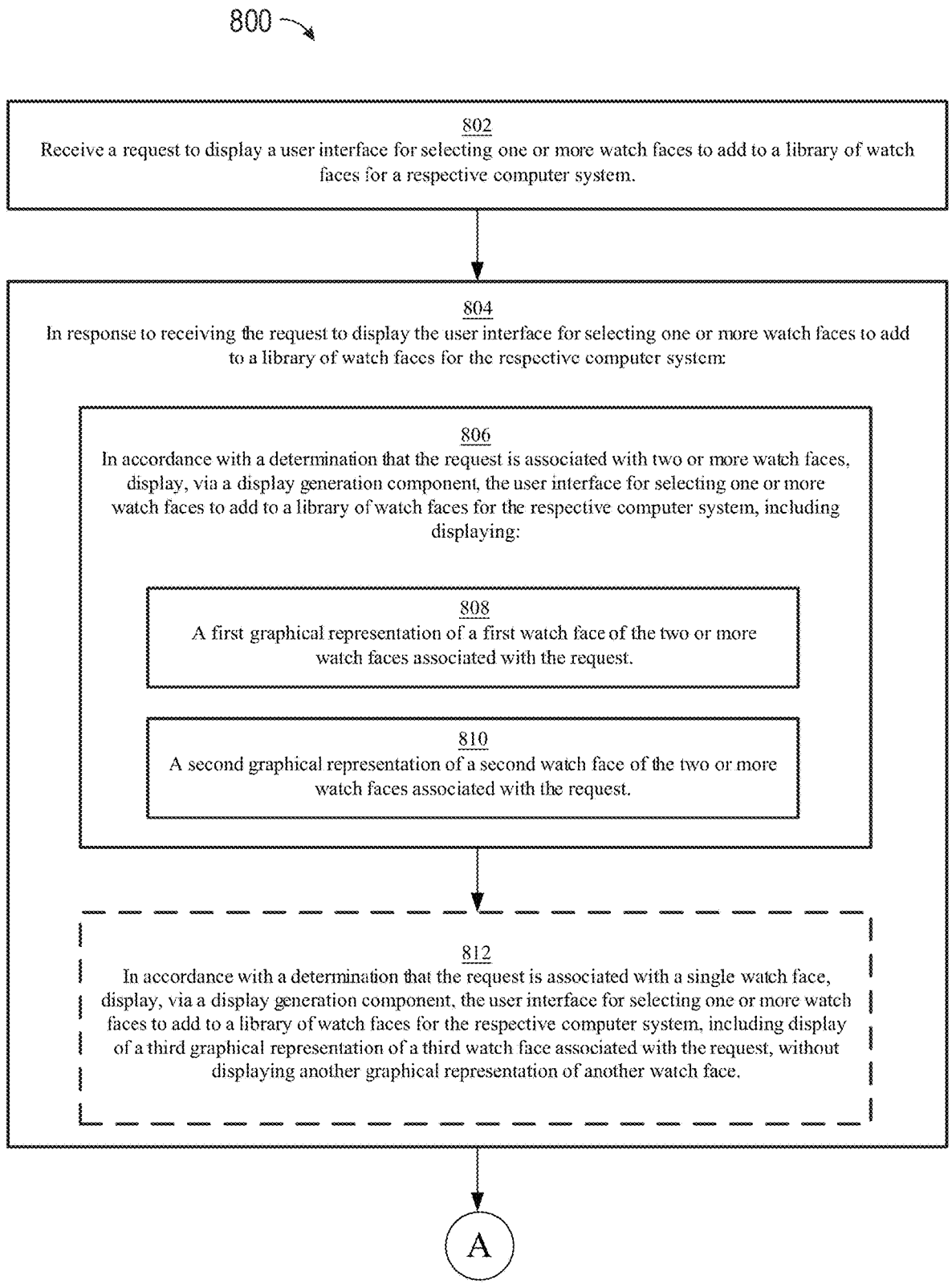
FIGS. 8A-8B is a flow diagram illustrating methods of managing user interface sharing of one or more user interfaces, in accordance with some embodiments.
Figure 8B:
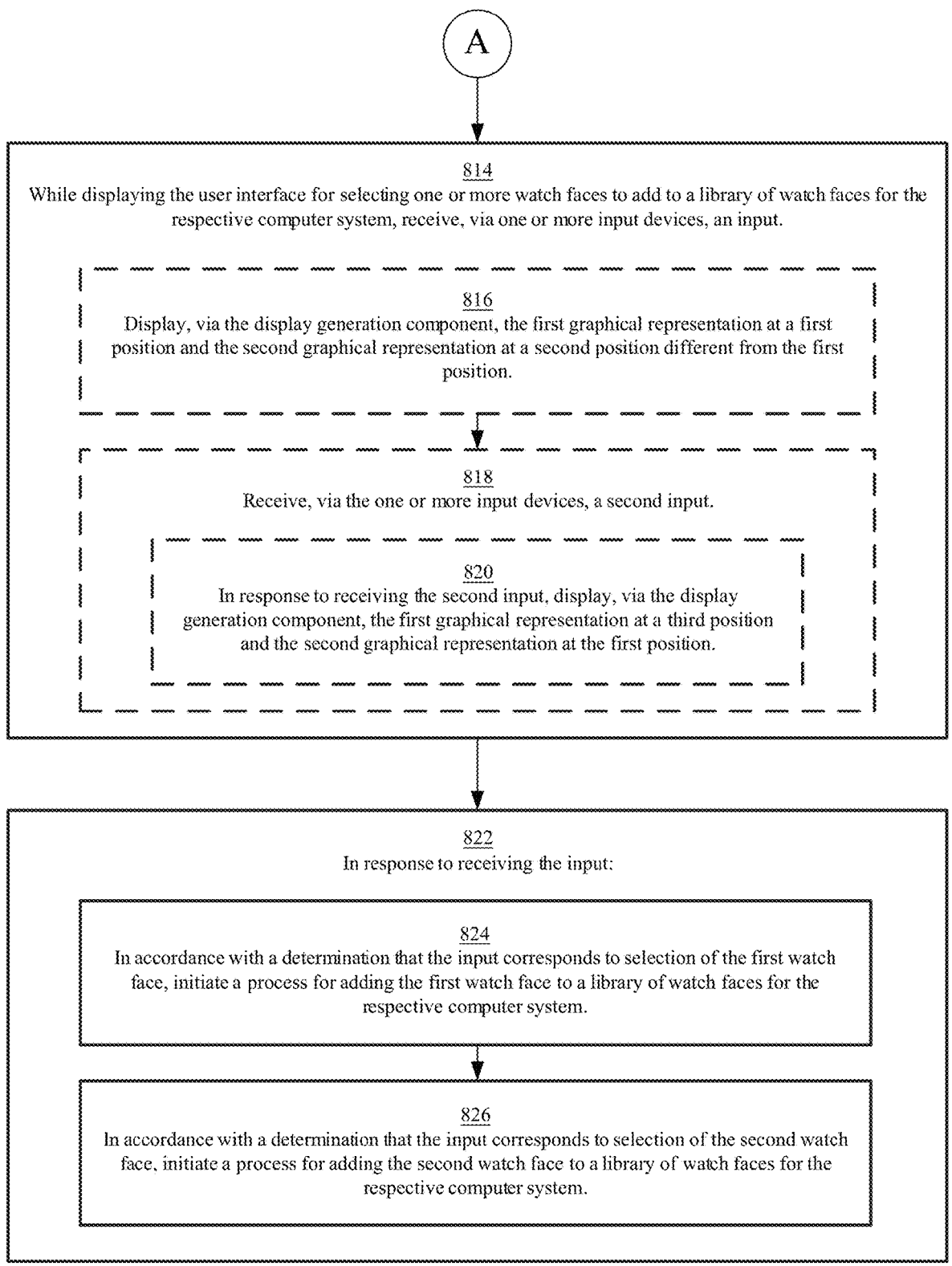

Below, FIGS. 1A-1B, 2, 3, 4A-4B, and 5A-5B provide a description of exemplary devices for performing the techniques for managing event notifications. FIGS. 6A-6AH illustrate exemplary user interfaces for managing user interface sharing using a computer system, in accordance with some embodiments. FIGS. 7A-7F is a flow diagram illustrating methods of managing user interface sharing, in accordance with some embodiments. FIGS. 8A-8B is a flow diagram illustrating methods of managing user interface sharing, in accordance with some embodiments. The user interfaces in FIGS. 6A-6AH are used to illustrate the processes described below, including the processes in FIGS. 7A-7F and FIGS. 8A-8B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
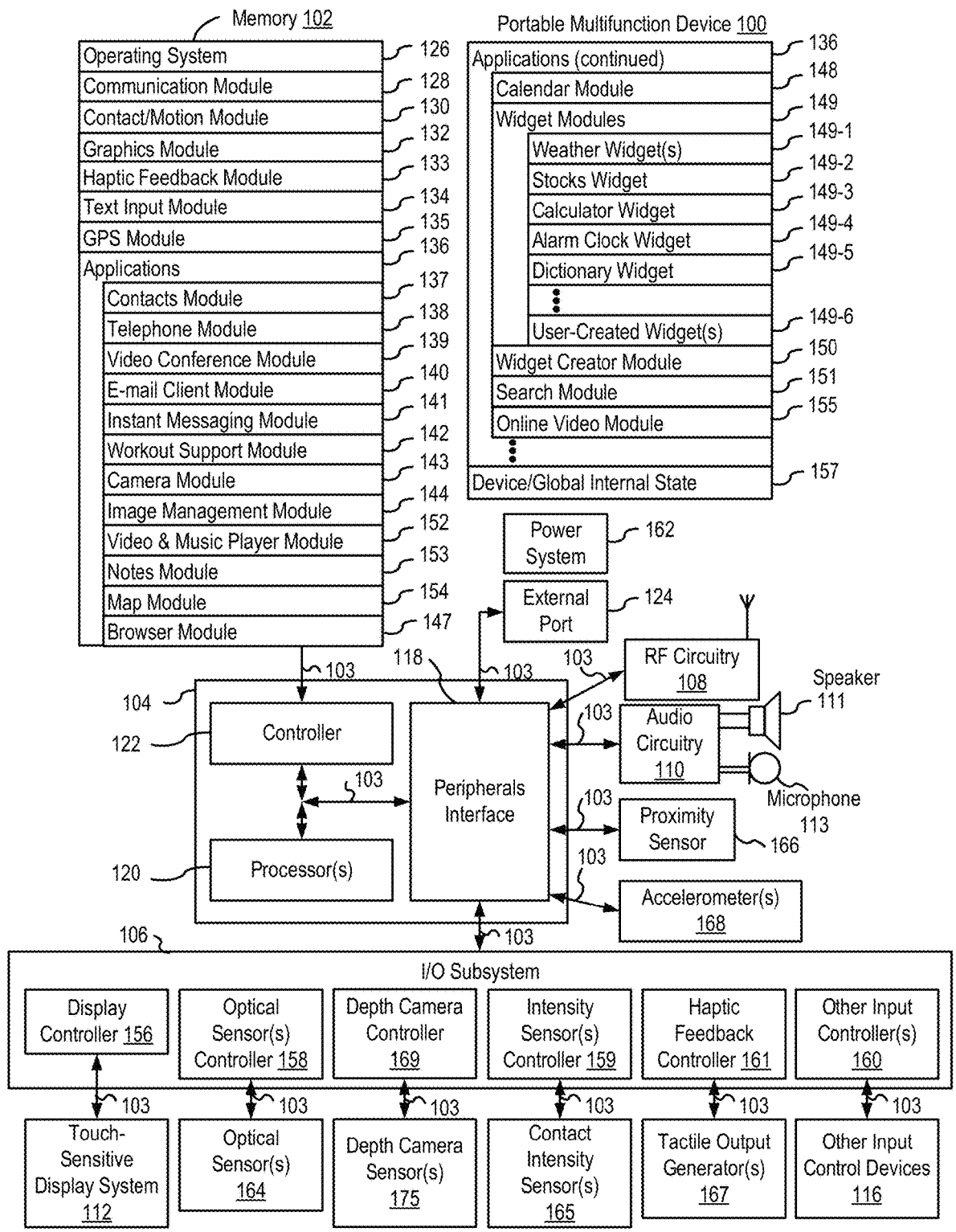
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips. RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user.

Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
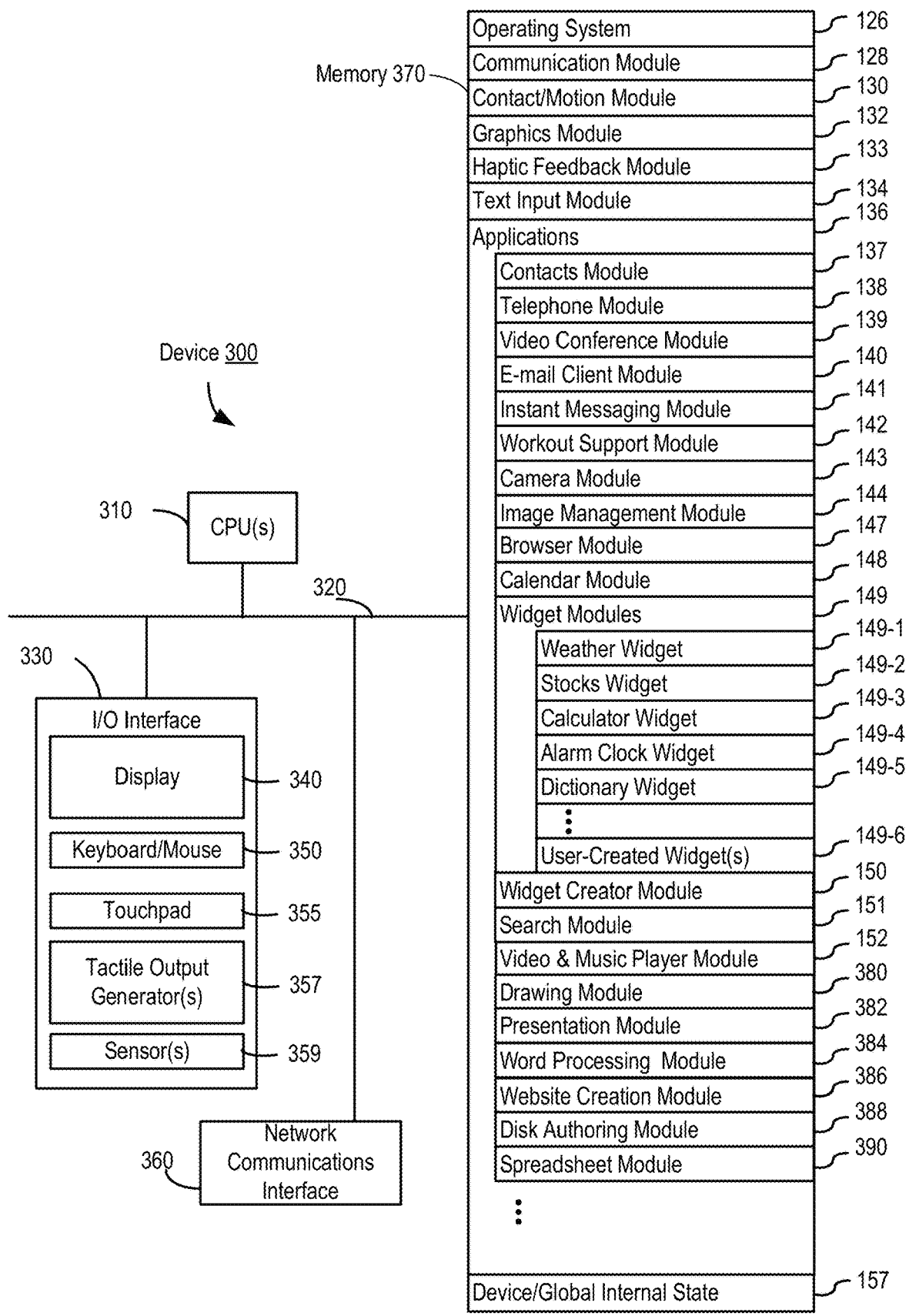
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
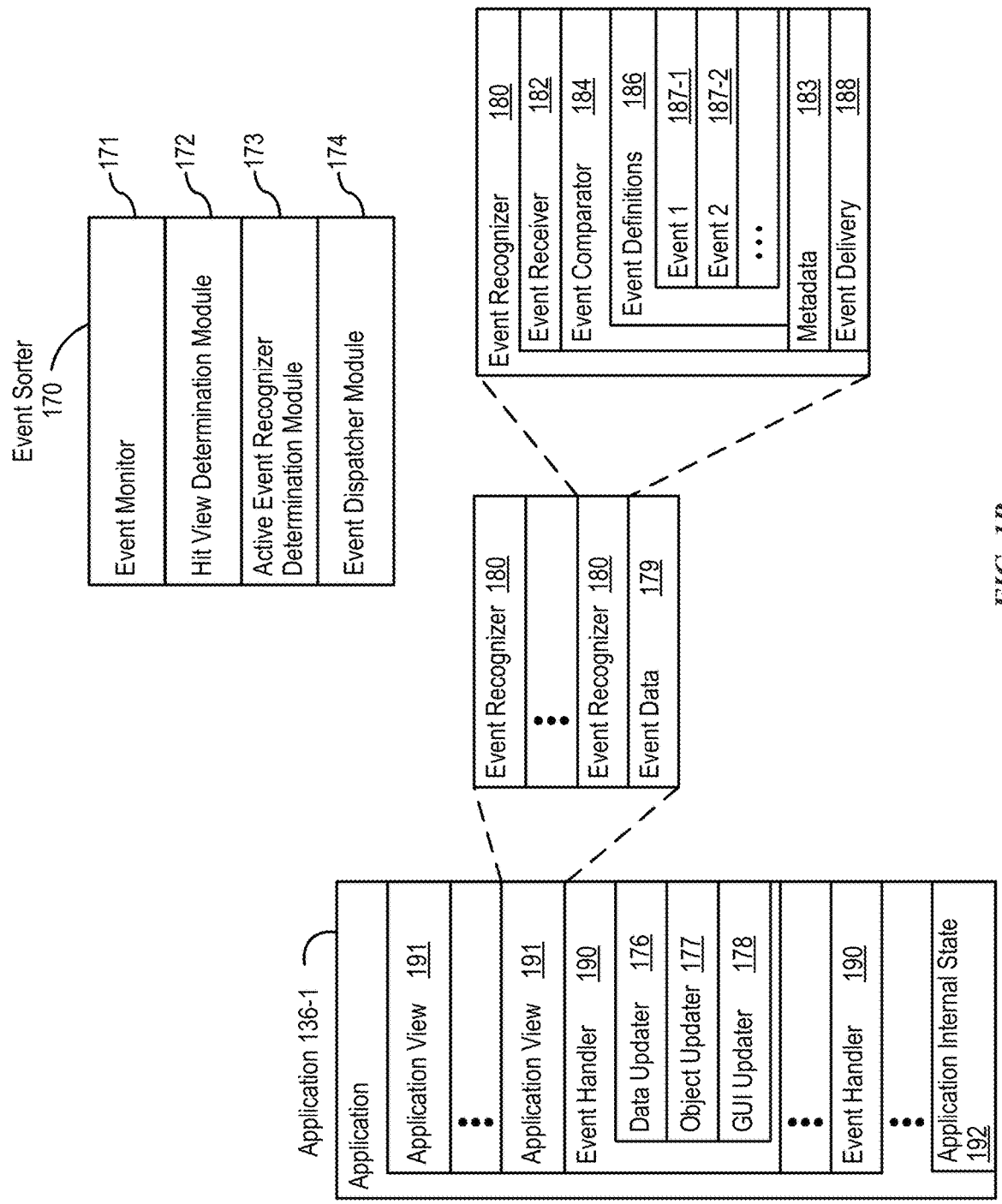
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
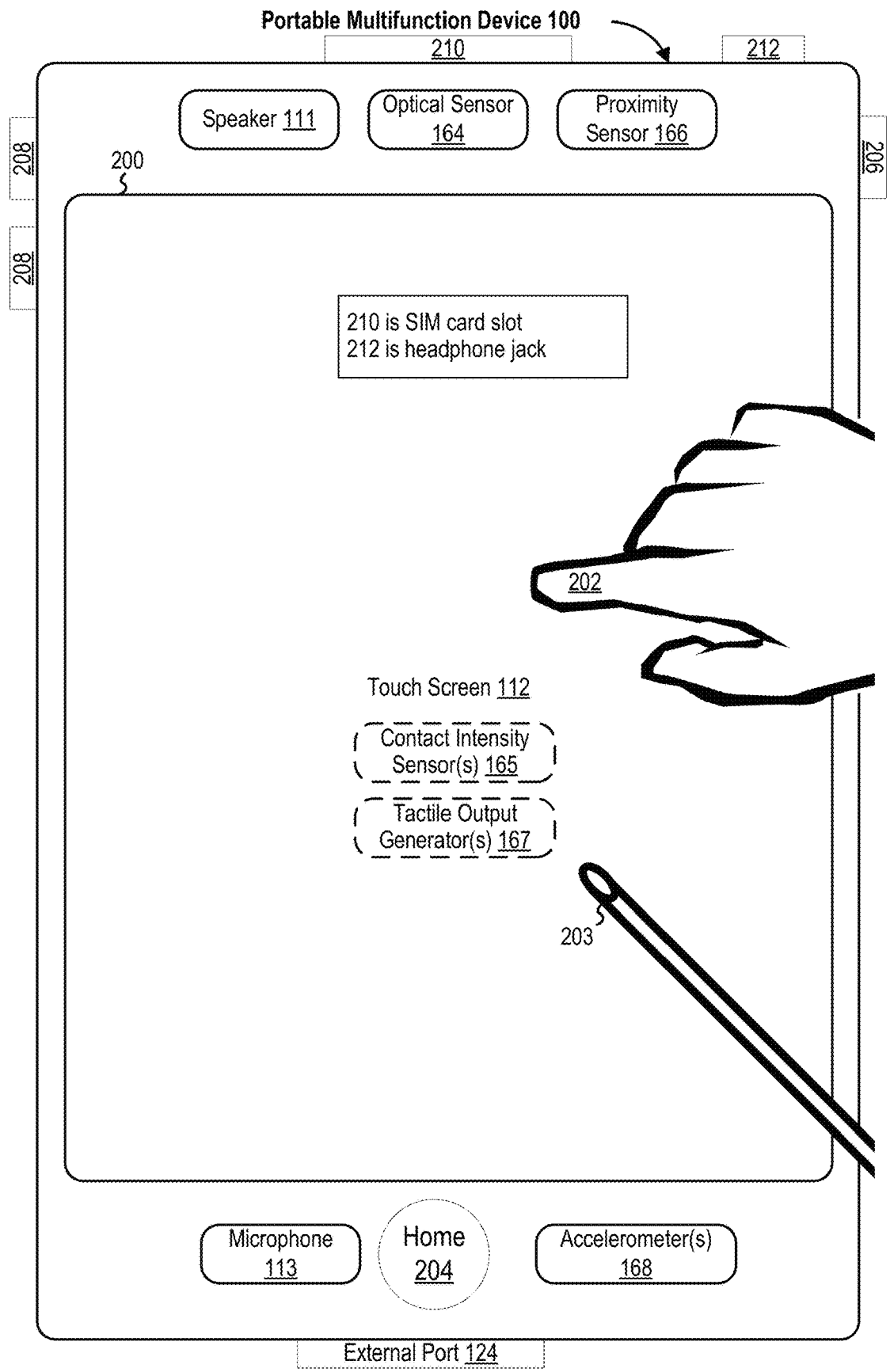
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
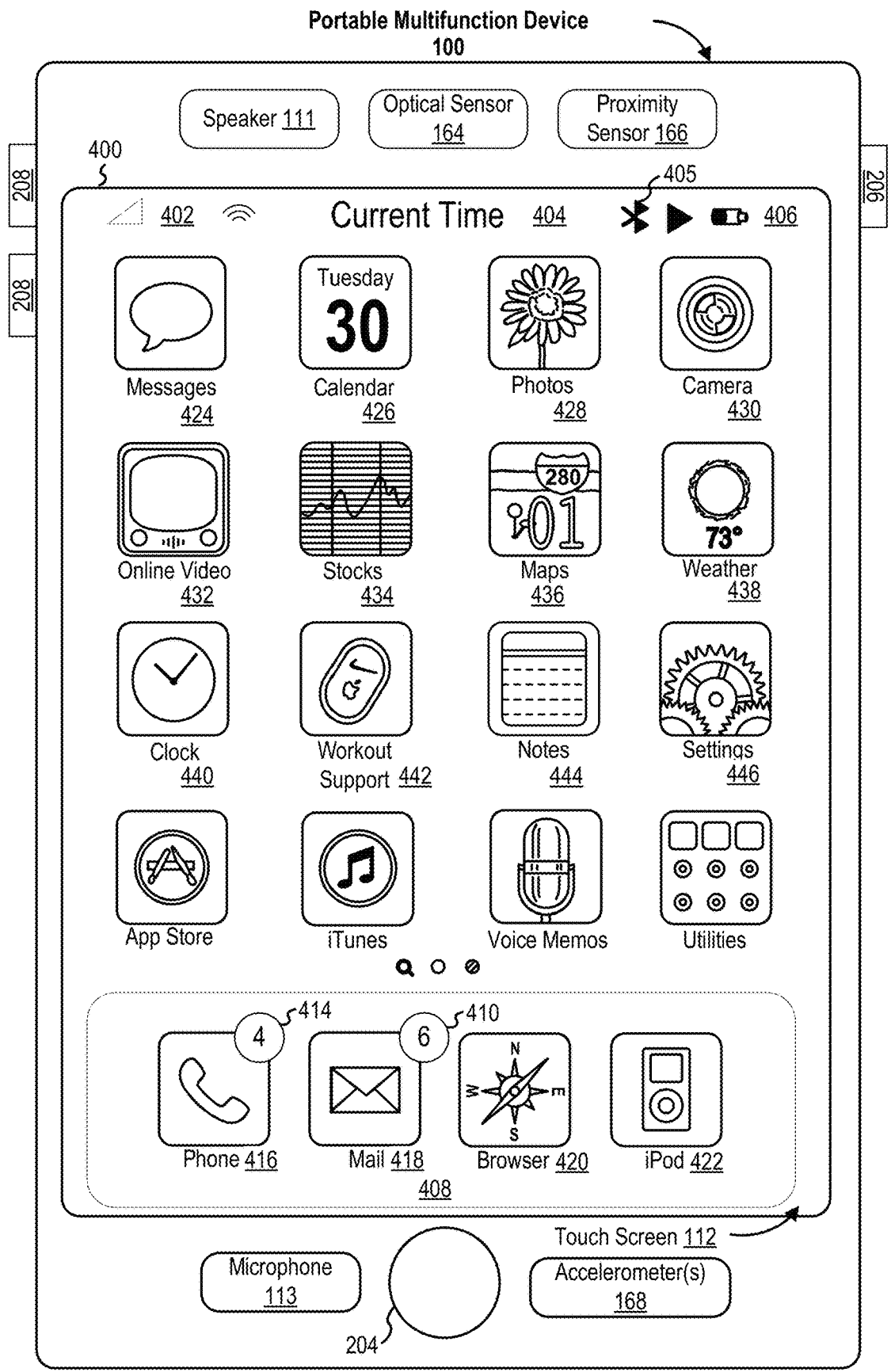
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
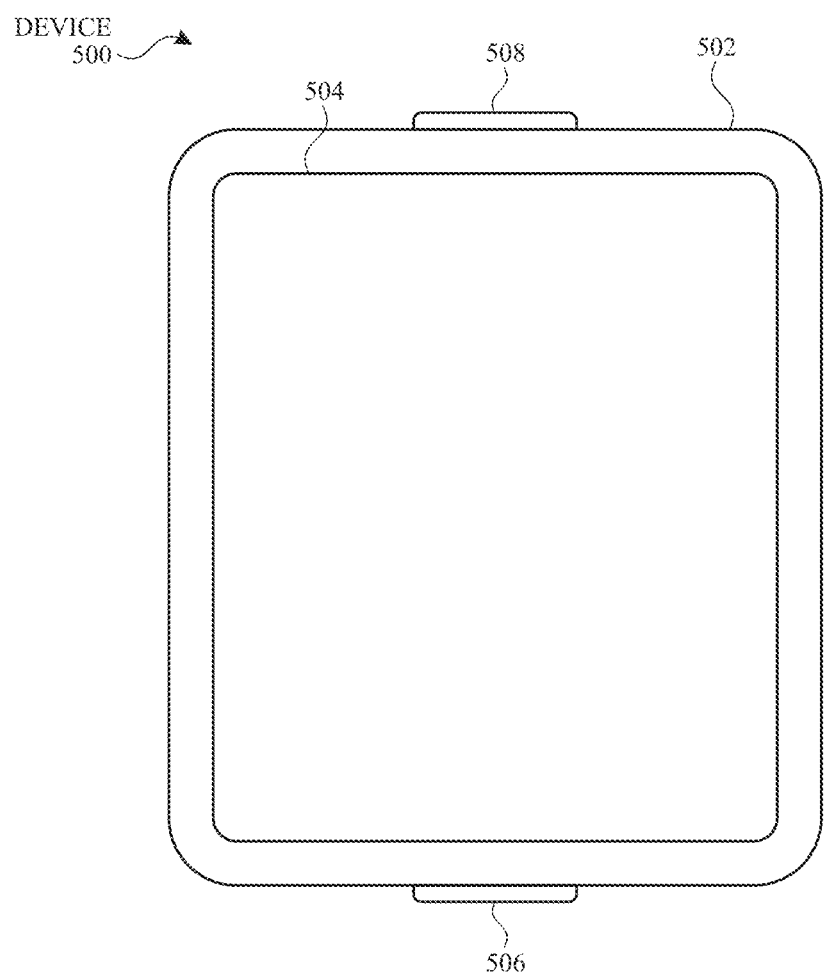
FIG. 5A illustrates a personal electronic device in accordance with some embodiments.
Figure 6A:
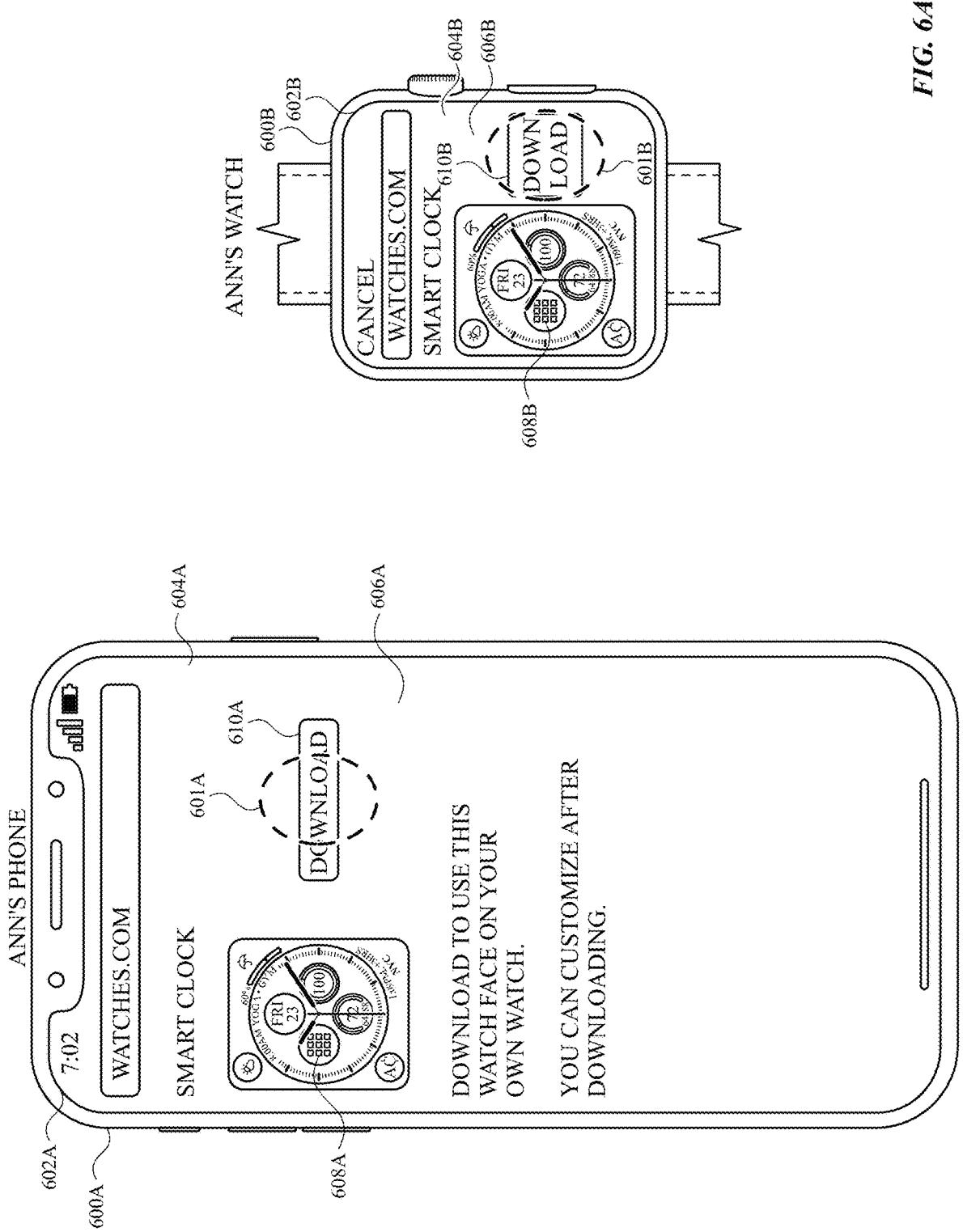
FIGS. 6A-6AH illustrate exemplary user interfaces for managing user interface sharing using a computer system, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
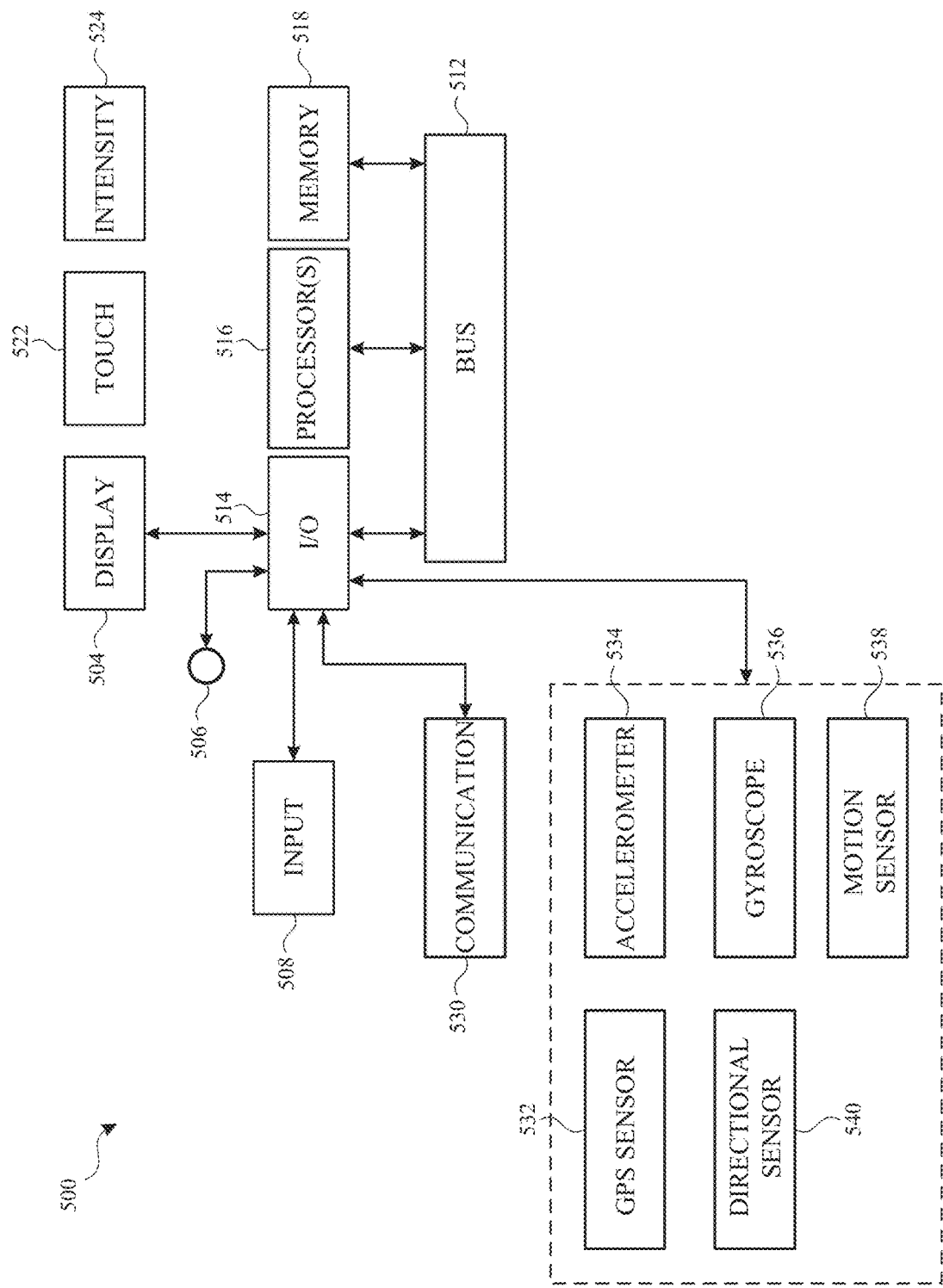
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 800 (FIGS. 7A-7F and FIGS. 8A-8B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

Attention is now directed towards embodiments of user interfaces ("UI") and associated processes that are implemented on an electronic device, such as portable multifunction device 100, device 300, or device 500.

FIGS. 6A-6AH illustrate exemplary user interfaces for managing user interface sharing using a computer system (e.g., 600A, 600B, 600C, 600D; an electronic device, such as a smartphone or smartwatch), in accordance with some embodiments. The user interfaces in these figures are used to illustrate the processes described below, including the processes in FIGS. 7A-7F and FIGS. 8A-8B.

FIG. 6A illustrates a computer system 600A (e.g., a smartphone) and a computer system 600B (e.g., a smartwatch). In some embodiments, computer system 600A is paired with computer system 600B. In some embodiments, computer system 600A can be used to control and/or manage configurations and settings on computer system 600B (e.g., via a companion application for computer system 600B that is accessible on computer system 600A).

FIG. 6A illustrates a method for downloading the first user interface template on a computer system (e.g., computer system 600A or 600B) from a link (e.g., a hyperlink).

In FIG. 6A, computer system 600A displays, via a display generation component 602A, a user interface 604A of a browser application (e.g., a web browser), where user interface 604A is showing a webpage 606A for downloading a first user interface template onto a respective computer system (e.g., a respective electronic device). In some embodiments, the first user interface template corresponds to a user interface that includes one or more user interface elements that correspond to one or more respective applications. In some embodiments, the first user interface template corresponds to a user interface that can be used as a watch user interface (e.g., a watch face) on an electronic device (e.g., a smartwatch), where the watch user interface includes one or more watch complications (e.g., also referred to as "complications") that correspond to one or more respective applications, as will be described in greater detail below with reference to FIG. 6F.

In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on the display. In some embodiments, complications occupy respective locations at particular regions of a watch face (e.g., lower-right, lower-left, upper-right, and/or upper-left).

In some embodiments, the first user interface template corresponds to a user interface that can be used as a background user interface on an electronic device (e.g., a mobile device; a smartwatch; a smartphone; a tablet).

In FIG. 6A, webpage 606A includes a representation 608A (e.g., a preview) of the first user interface template and an affordance 610A (e.g., a hyperlink; a selectable user interface object; an activatable user interface object) for initiating the downloading of the first user interface template onto the respective computer system (e.g., onto computer system 600B).

Similarly, in FIG. 6A, computer system 600B displays, via a display generation component 602B, a user interface 604B of a browser application (e.g., a web browser), where user interface 604B is displaying webpage 606B that corresponds to webpage 606A displayed on computer system 600A, and where webpage 606B includes a representation 608B (e.g., a preview) of the first user interface template and an affordance 610B (e.g., a hyperlink; a selectable user interface object; an activatable user interface object) for initiating the downloading of the first user interface template onto computer system 600B.

In FIG. 6A, while displaying webpage 606A, computer system 600A receives (e.g., detects) an input 601A directed to affordance 601A. In some embodiments, input 601A is a touch input on display generation component 602A. In response to detecting input 601A on affordance 610A, computer system 600A displays, via display generation component 602A, a user interface 632A for customizing the user interface corresponding to the downloaded first user interface template, as shown in FIG. 6F (e.g., such that the first user interface template can be used to create a user interface that can be used (e.g., as a watch user interface).

Similarly, while displaying webpage 606B, computer system 600B receives (e.g., detects) an input 601B on affordance 610B. In some embodiments, input 601B is a touch input on display generation component 602B. In response to detecting input 601B on affordance 610B, computer system 600B displays, via display generation component 602B, a user interface 632B for customizing the user interface corresponding to the first user interface template downloaded on computer system 600B, as shown in FIG. 6F.

FIG. 6B illustrates a method for downloading the first user interface template on a computer system (e.g., computer system 600A or 600B) from an application store.

In FIG. 6B, computer system 600A displays, via display generation component 602A, a user interface 6100A of an application store. In some embodiments, the application store includes a page (e.g., a "TODAY" page; a tab) that shows one or more user interface templates that are available for download. In some embodiments, the first user interface template can be downloaded from the application store. In FIG. 6B, user interface 6100A of the application store includes a user interface element 6102A (e.g., a platter) (e.g., including a representation of the first user interface template) indicating that the first user interface template can be downloaded, and an affordance 6104A corresponding to user interface element 6102A for downloading the first user interface template.

While displaying affordance 6104A, computer system 600A receives (e.g., detects) an input 6101A on affordance 6104A. In response to detecting input 6101A on affordance 6104A, computer system 600A initiates a process for downloading the first user interface template. In some embodiments, in response to (e.g., or while) downloading the first user interface template, computer system 600A displays, via display generation component 602A, user interface 632A for customizing the user interface corresponding to the downloaded first user interface template, as shown in FIG. 6F.

Similarly, in FIG. 6B, computer system 600B displays, via display generation component 602B, a user interface 6100B of the application store, where user interface 6100A of the application store includes a user interface element 6102B (e.g., a platter) indicating that the first user interface template can be downloaded, and an affordance 6104B for downloading the first user interface template on computer system 600B.

While displaying affordance 6104B, computer system 600B receives (e.g., detects) an input 6101B on affordance 6104B. In response to detecting input 6101B on affordance 6104B, computer system 600B initiates a process for downloading the first user interface template. In some embodiments, in response to (e.g., or while) downloading the first user interface template, computer system 600B displays, via display generation component 602B, user interface 632B for customizing the user interface corresponding to the first user interface template downloaded on computer system 600B, as shown in FIG. 6F.

In some embodiments, prior to initiating the process for downloading the first user interface template, the computer system (e.g., computer system 600A or 600B) requests authorization to download the first user interface template. In some embodiments, the authorization includes biometric authentication (e.g., facial recognition authentication; fingerprint authentication; iris/retina scan authentication). In some embodiments, the authorization includes password or passcode authentication. In some embodiments, the authorization includes confirmation via a user input on a mechanical input device (e.g., a hardware button) of the computer system.

As discussed in greater detail below with reference to FIGS. 6F-6G, first user interface template includes one or more complications that require corresponding applications to be installed on a respective computer system for a user interface (e.g., a watch user interface) created from first user interface template for use on the respective computer system. In some embodiments, if one or more of the required applications is not installed on the respective computer when the first user interface template is downloaded from the application store as in FIG. 6B, the computer system (e.g., computer system 600A or 600B) downloads the missing application(s) with the first user interface template (e.g., concurrently downloads the missing application(s) with and/or immediately after downloading the first user interface template). In some embodiments, the authorization requested to download the first user interface template also authorizes the downloading of the missing application(s) (e.g., thus, the computer system requests a single authorization (e.g., biometric authentication; password or passcode authentication) to download the first use interface template and the missing application(s)).

Figure 6C:
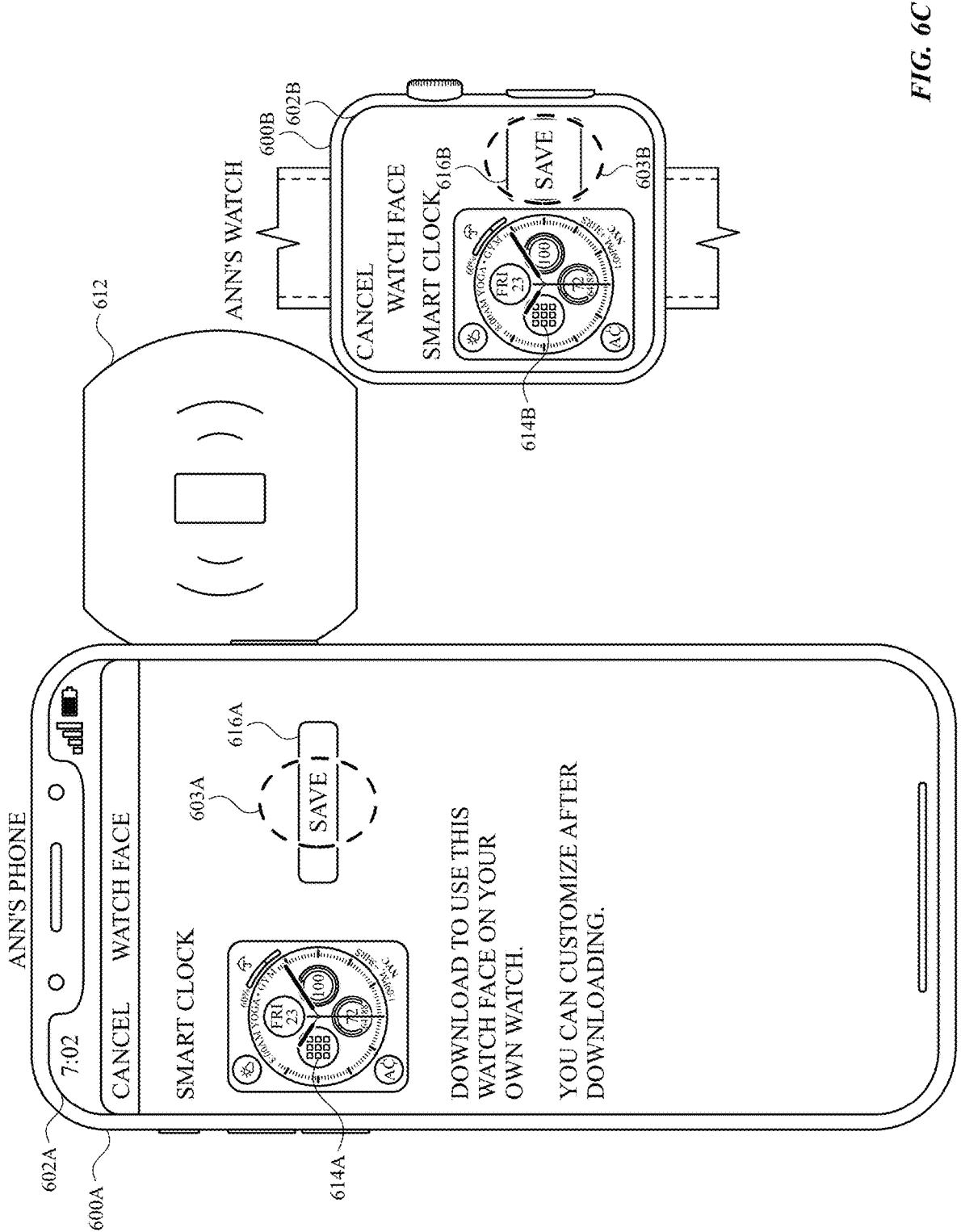

FIG. 6C illustrates a method for receiving the first user interface template from a contactless wireless terminal (e.g., a NFC terminal) to be stored on a computer system (e.g., computer system 600A or 600B).

In FIG. 6C, computer system 600A receives (e.g., via NFC), from a contactless wireless terminal 612 (e.g., also referred to as a NFC terminal 612), the first user interface template. In some embodiments, in response to receiving the first user interface template from NFC terminal 612, computer system 600A displays, via display generation component 602A, a preview 614A of the first user interface template and an affordance 616A for storing the first user interface template on computer system 600A and/or causing the first user interface template to be stored on the respective computer system (e.g., computer system 600B).

Similarly, in FIG. 6C, computer system 600B receives (e.g., via NFC), from NFC terminal 612, the first user interface template. In some embodiments, in response to receiving the first user interface template from NFC terminal 612, computer system 600B displays, via display generation component 602B, a preview 614B of the first user interface template and an affordance 616B for storing the first user interface template on computer system 600B.

In FIG. 6C, while displaying affordance 616A, computer system 600A receives (e.g., detects) an input 603A on affordance 616A. In some embodiments, input 603A is a touch input on display generation component 602A. In response to receiving input 603A on affordance 616A, computer system 600A displays, via display generation component 602A, user interface 632A for creating a user interface (e.g., a watch user interface) from the first user interface template for use on the respective computer system (e.g., on computer system 600B), as shown in FIG. 6F.

Similarly, in FIG. 6C, while displaying affordance 616B, computer system 600B receives (e.g., detects) an input 603B on affordance 616B. In some embodiments, input 603B is a touch input on display generation component 602B. In response to receiving input 603B on affordance 616B, computer system 600B displays, via display generation component 602B, user interface 632B for creating a user interface (e.g., a watch user interface) from the first user interface template for use on computer system 600B, as shown in FIG. 6F.

Figure 6D:
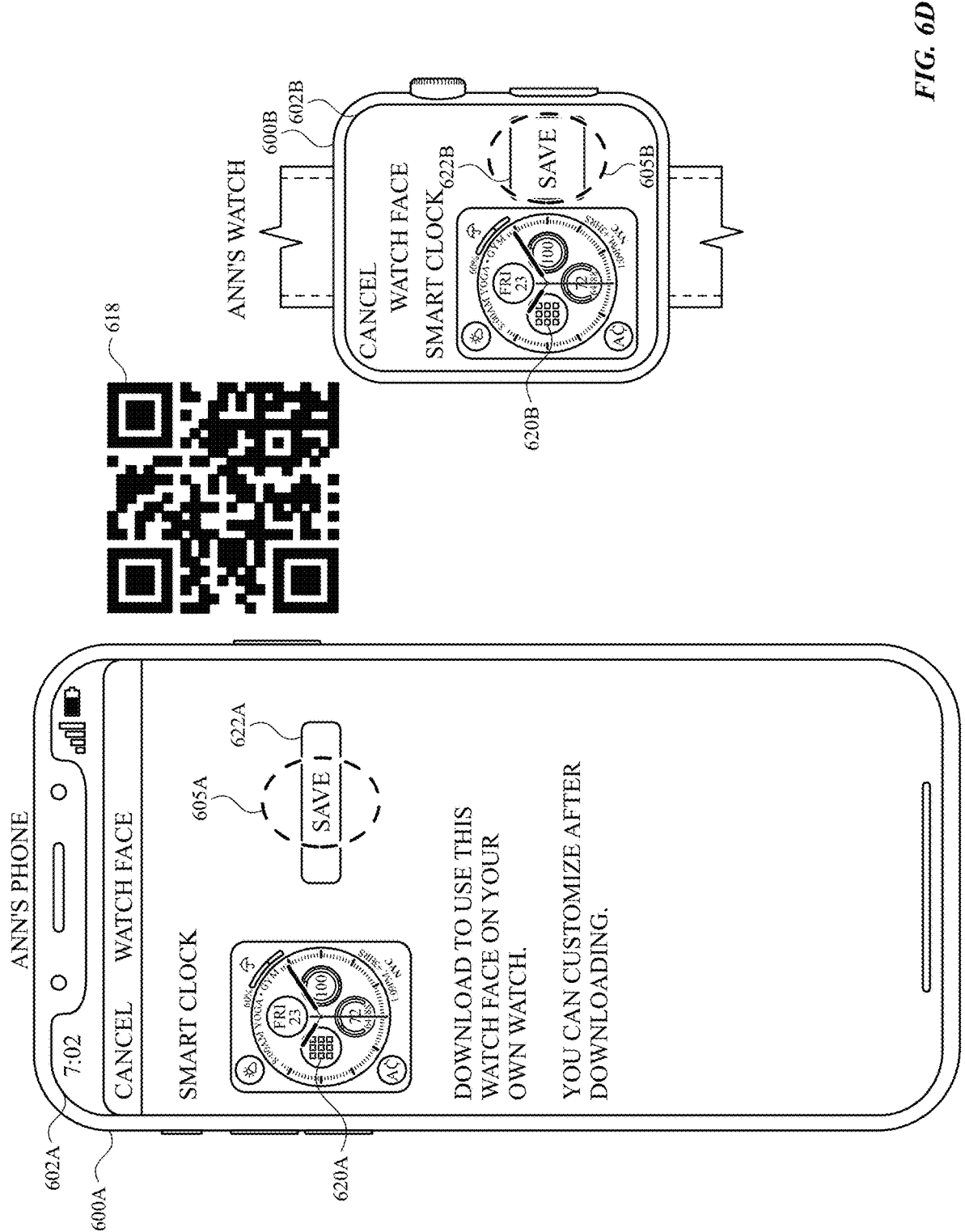

FIG. 6D illustrates a method for receiving (e.g., detecting) the first user interface template via a QR code to be stored on a computer system (e.g., on computer system 600A or 600B).

In FIG. 6D, computer system 600A detects (e.g., via one or more cameras of computer system 600A) a QR code 618. In some embodiments, in response to detecting QR code 618, computer system 600A displays, via display generation component 602A, a preview 620A of the first user interface template that has been detected from QR code 618 and an affordance 622A for storing the first user interface template on computer system 600A and/or causing the detected first user interface template to be stored on the respective computer system (e.g., on computer system 600B).

Similarly, in FIG. 6D, computer system 600B detects (e.g., via one or more cameras of computer system 600B) QR code 618. In some embodiments, in response to detecting QR code 618, computer system 600B displays, via display generation component 602B, a preview 620B of the first user interface template that has been detected from QR code 618 and an affordance 622B for storing the first user interface template on computer system 600B.

In FIG. 6D, while displaying affordance 622A, computer system 600A receives (e.g., detects) an input 605A on affordance 622A. In some embodiments, input 605A is a touch input on display generation component 602A. In response to receiving input 605A on affordance 622A, computer system 600A displays, via display generation component 602A, user interface 632A for creating a user interface (e.g., a watch user interface) from the first user interface template for use on the respective computer system (e.g., on computer system 600B), as shown in FIG. 6F.

Similarly, in FIG. 6D, while displaying affordance 622B, computer system 600B receives (e.g., detects) an input 605B on affordance 622B. In response to detecting input 605B on affordance 622B, computer system 600B displays, via display generation component 602B, user interface 632B for creating a user interface (e.g., a watch user interface) from the first user interface template to be used on computer system 600B, as shown in FIG. 6F.

Figure 6E:
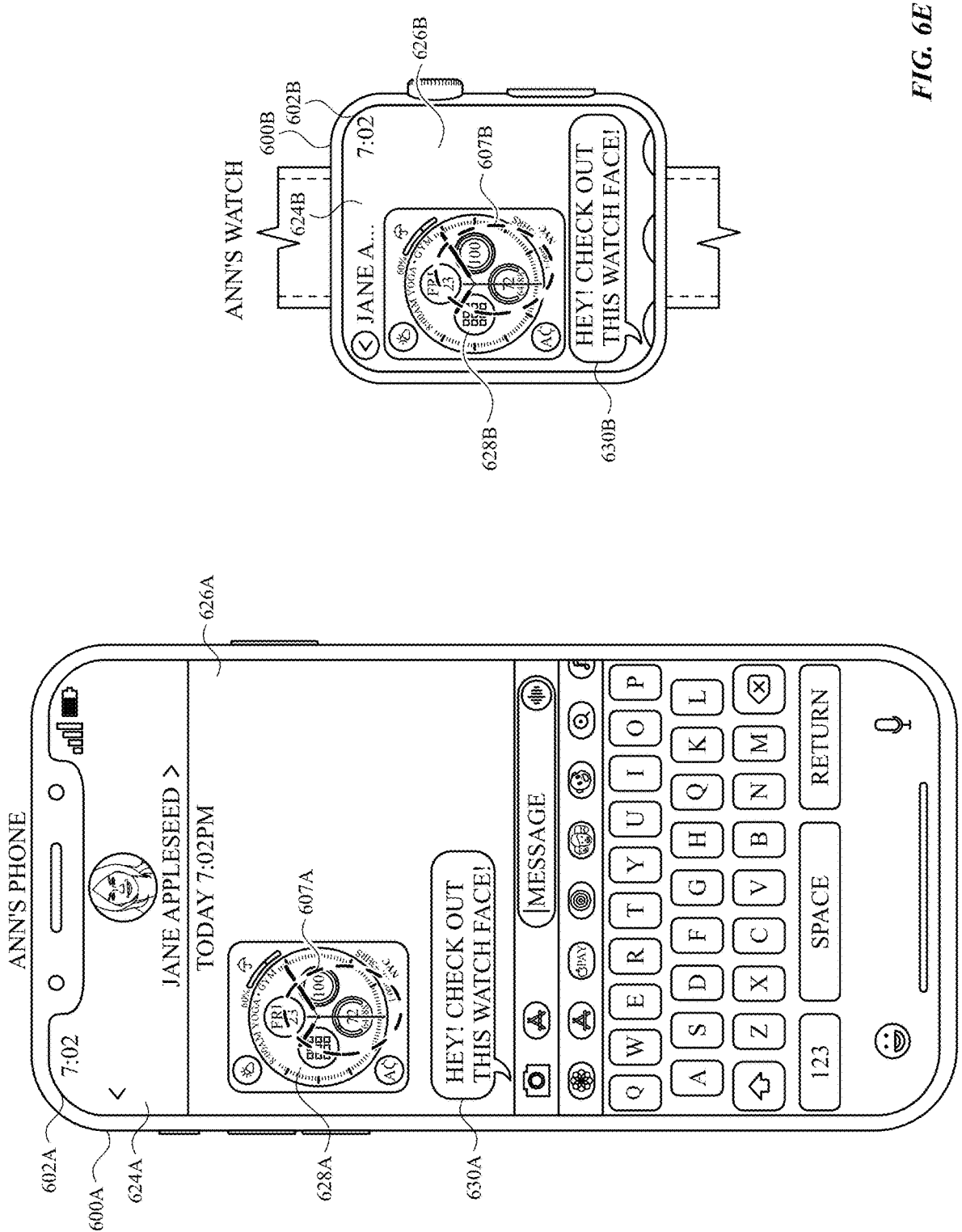
Figure 6F:
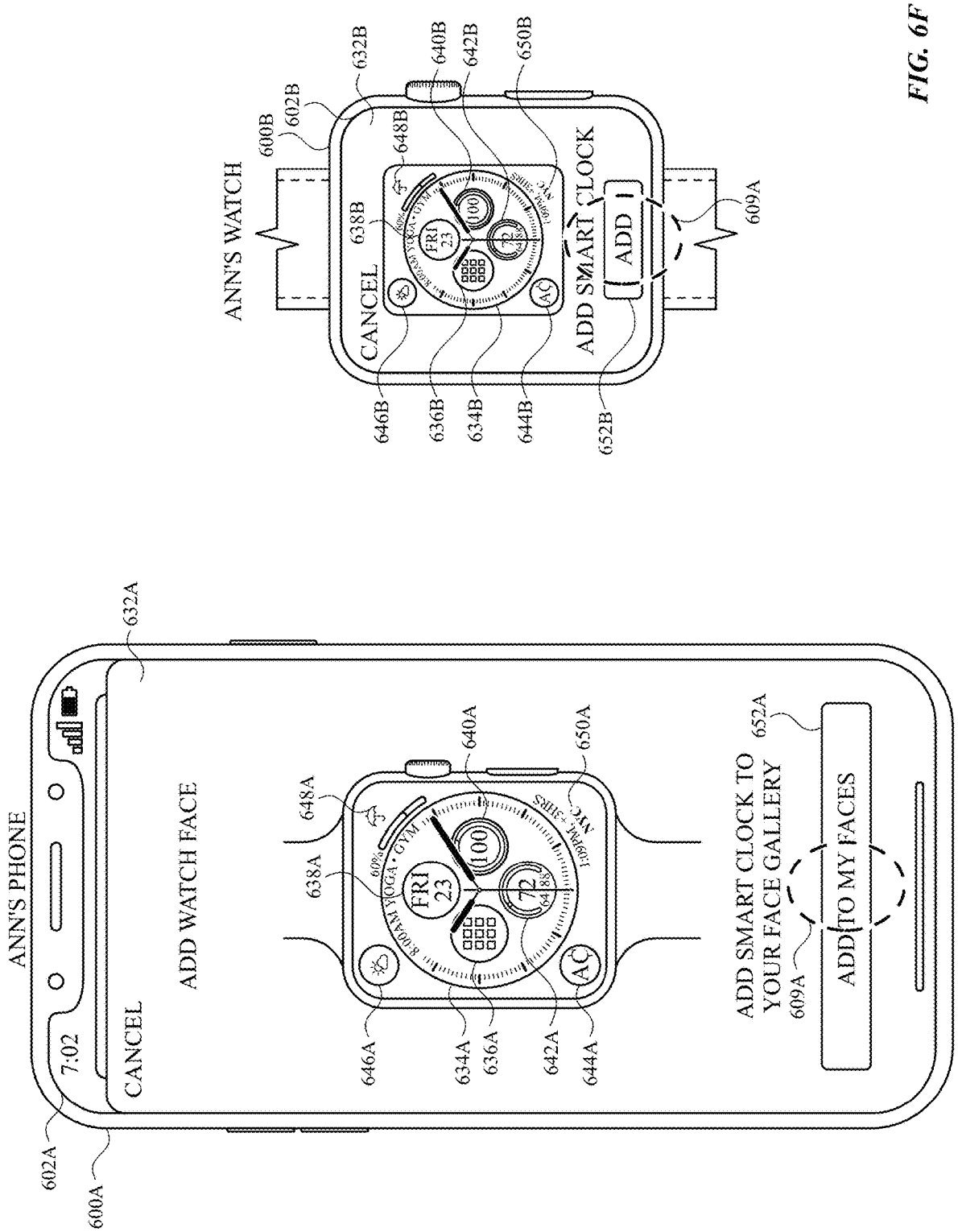

FIG. 6E illustrates a method for receiving the first user interface template via a messaging application.

In FIG. 6E, computer system 600A displays, via display generation component 602A, a user interface 624A of a messaging application (e.g., a text messaging application; a chat application; an electronic mail application), where user interface 624A of the messaging application is displaying a message conversation 626A with a message participant (e.g., "Jane Appleseed"), and where message conversation 626A includes a received electronic communication that includes (e.g., as an attachment) the first user interface template (e.g., shown as preview 628A in message conversation 626A) and a message 630A associated with the first user interface template (e.g., a message from the message participant that was received as part of the electronic communication that includes the first user interface template).

Similarly, in FIG. 6E, computer system 600A displays, via display generation component 602A, a user interface 624B of the messaging application, where user interface 624A of the messaging application is displaying a message conversation 626B with the message participant (e.g., "Jane Appleseed"), and where message conversation 626A includes a received electronic communication that includes (e.g., as an attachment) the first user interface template (e.g., shown as preview 628B in message conversation 626B) and a message 630B associated with the first user interface template (e.g., a message from the message participant that was received as part of the electronic communication that includes the first user interface template).

In FIG. 6E, while displaying message conversation 626A, computer system 600A receives (e.g., detects) an input 607A directed to downloading and storing the first user interface template. In some embodiments, input 607A is a touch input (e.g., or a press-and-hold input) on preview 628A, as in FIG. 6E. In some embodiments, input 607A is a touch input on a download affordance associated with the electronic communication. In response to (e.g., or subsequent to) receiving input 607A, computer system 600A displays, via display generation component 602A, user interface 632A for creating a user interface (e.g., a watch user interface) from the first user interface template to be used on the respective computer system (e.g., on computer system 600B), as shown in FIG. 6F.

Similarly, in FIG. 6E, while displaying message conversation 626B, computer system 600B receives (e.g., detects) an input 607B directed to downloading and storing the first user interface template on computer system 600B. In some embodiments, input 607B is a touch input (e.g., or a press-and-hold input) on preview 628B, as in FIG. 6E. In some embodiments, input 607B is a touch input on a download affordance associated with the electronic communication. In response to (e.g., or subsequent to) receiving input 607B, computer system 600B displays, via display generation component 602B, user interface 632B for creating a user interface (e.g., a watch user interface) from the first user interface template to be used on computer system 600B, as shown in FIG. 6F.

FIG. 6F illustrates computer system 600A displaying user interface 632A for creating a user interface (e.g., a watch user interface) from the first user interface template to be used on the respective computer system (e.g., on computer system 600B) and computer system 600B displaying the corresponding user interface 632B for creating a user interface (e.g., a watch user interface) from the first user interface template to be used on computer system 600B. In some embodiments, as is the case in FIGS. 6A-6AH, the first user interface template is a watch user interface (e.g., a watch face) that can be used on a type of computer system (e.g., a smartwatch), where the watch user interface includes one or more complications that correspond to respective applications, and where a respective application needs to be installed on the respective computer system in order for a corresponding complication to be used in the computer system through the watch user interface.

In FIG. 6F, in response to (e.g., or subsequent to) downloading, receiving, and/or detecting the first user interface template (e.g., as described above with reference to FIGS. 6A-6E), computer system 600A displays, via display generation component 602A, user interface 632A, where user interface 632A includes a preview 634A of the first user interface template.

In FIG. 6F, the respective computer system for which the user interface corresponding to the first user interface template will be used (e.g., computer system 600B) includes (e.g., has already installed) respective applications corresponding to all of the complications that are included with the first user interface template (e.g., all of the respective applications are already installed on and thus available on computer system 600B). Thus, no additional applications need to be downloaded and installed on the respective computer system (e.g., computer system 600B) for all complications of the first user interface template to be used.

As shown in FIG. 6F, user interface 632A includes a plurality of complication previews 636A, 638A, 640A, 642A, 644A, 646A, 648A, and 650A. Because all of the respective applications are already installed on, and thus are available on, the respective computer system (e.g., computer system 600B), all of complication previews 636A-650A correspond to respective complications for available applications, and computer system 600A does not visually indicate (e.g., does not highlight) any of complication previews 636A-650A (e.g., as computer system 600A (e.g., only)

visually indicates (e.g., highlights) a complication preview corresponding to a complication for which the application is not available).

In FIG. 6F, in response to (e.g., or subsequent to) downloading, receiving, and/or detecting the first user interface template (e.g., as described above with reference to FIGS. 6A-6E), computer system 600B displays, via display generation component 602B, user interface 632B, where user interface 632B includes a preview 634B of the first user interface template, and where computer system 600B already includes (e.g., has already installed) all respective applications corresponding to all complications that are included with the first user interface template.

As shown in FIG. 6F, user interface 632B includes a plurality of complication previews 636B, 638B, 640B, 642B, 644B, 646B, 648B, and 650B. Because all of the respective applications are already installed on, and thus are available on, computer system 600B, all of complication previews 636B-650B correspond to respective complications for available applications, and computer system 600B does not visually indicate (e.g., does not highlight) any of complication previews 636B-650B (e.g., as computer system 600B (e.g., only) visually indicates (e.g., highlights) a complication preview corresponding to a complication for which the application is not available).

In FIG. 6F, because all of the respective applications are already installed on, and thus available on, the respective computer system (e.g., on computer system 600B), computer system 600A displays, in user interface 632A, an affordance 652A for adding the user interface corresponding to the first user interface template to a user interface library for the respective computer system (e.g., a collection of user interfaces (e.g., watch user interfaces; watch faces) that can be used on computer system 600B). While displaying affordance 652A, computer system 600A receives (e.g., detects) an input 609A on affordance 652A. In some embodiments, input 609A is a touch input on display generation component 602A. In response to receiving input 609A, computer system 600A displays, via display generation component 602A, a companion application (e.g., an application that can be used to edit or configure features and settings of a paired computer system) for the respective computer system (e.g., a companion application for computer system 600B), as shown in FIG. 6G.

Similarly, in FIG. 6F, because all of the respective applications are already installed on, and thus available on, computer system 600B, computer system 600B displays, in user interface 632B, an affordance 652B for adding the user interface corresponding to the first user interface template to the user interface library for computer system 600B. While displaying affordance 652B, computer system 600B receives (e.g., detects) an input 609B on affordance 652B. In some embodiments, input 609B is a touch input on display generation component 602B. In response to receiving input 609B, computer system 600B displays, via display generation component 602B, a watch user interface corresponding to the first user interface template configured in FIG. 6F, as shown in FIG. 6G.

Figure 6G:
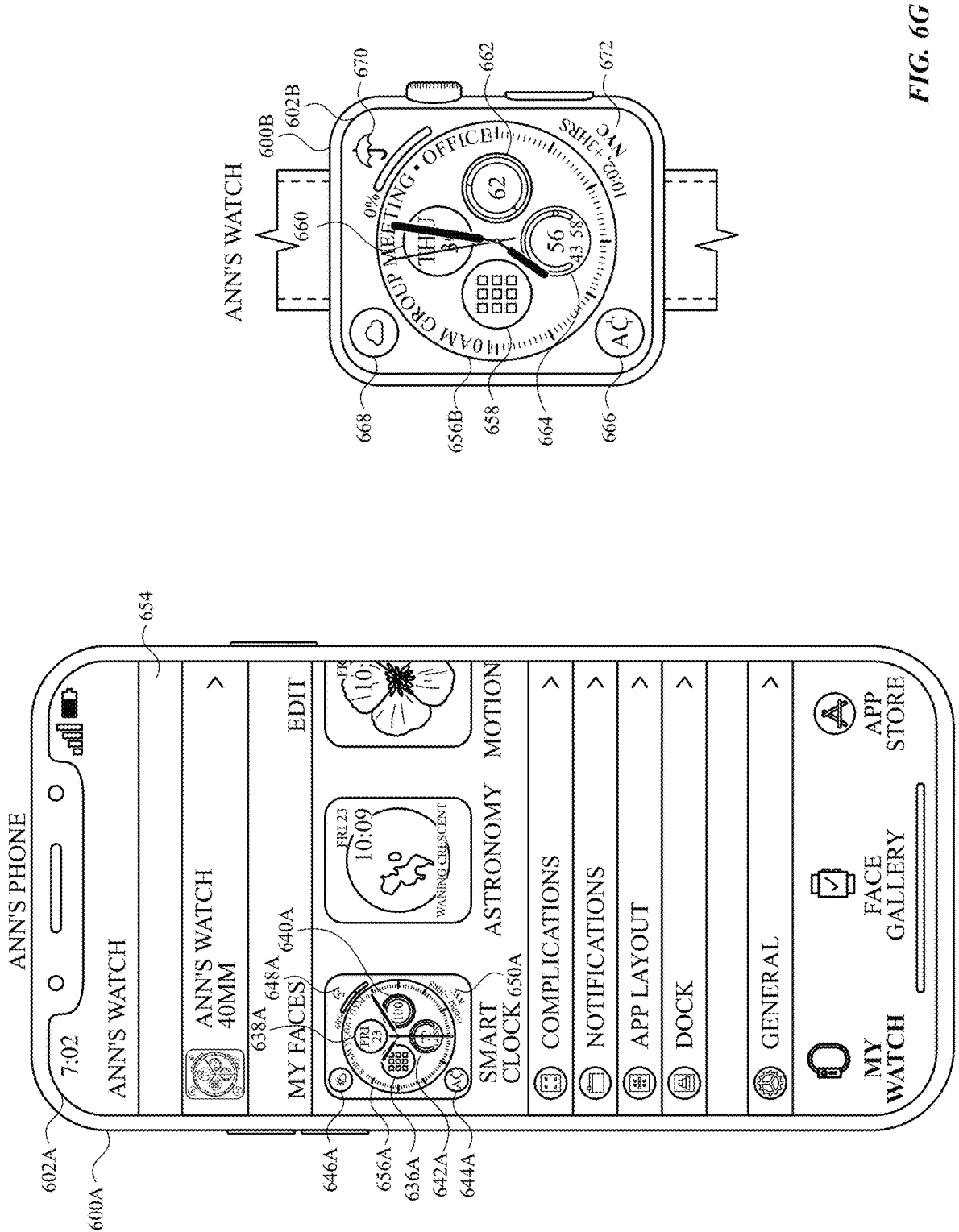

In FIG. 6G, user interface 654 of the companion application includes a plurality of watch user interface previews that can be used as a watch user interface on the respective computer system (e.g., on computer system 600B), including a watch user interface preview 656A (including complication previews 636A-650A) corresponding to the watch user interface configured in FIG. 6F and shown as watch user interface 656B on computer system 600B in FIG. 6G. As shown by computer system 600B, watch user interface 656B includes complications 658, 660, 662, 664, 666, 668, 670, and 672, corresponding to complication previews 636B, 638B, 640B, 642B, 644B, 646B, 648B, and 650B from FIG. 6F, respectively, where complications 658, 660, 662, 664, 666, 668, 670, and 672 can be used to perform operations on computer system 600B corresponding to the respective applications.

In some embodiments, for certain types of complications of a watch user interface that is created from a received user interface template (e.g., watch user interface 656B created from the first user interface template), how one or more settings of a respective compilation of the watch user interface are set depends (e.g., at least partially) on the type of the respective complications and/or a logic-based (e.g., a smart) algorithm.

For example, watch user interface 656B includes calendar complication 660 corresponding to a calendar application of computer system 600B. In some embodiments (e.g., upon completing the configuration/setup of watch user interface 656B in FIG. 6F), settings of calendar complication 660 are automatically (e.g., without user input) set to settings of the calendar application that is installed on computer system 600B and calendar complication 660 retrieves information (e.g., schedule information) from a user account that is associated with the calendar application that is installed on computer system 600B, as opposed to maintaining the calendar complication settings and/or information that had originally been associated with the first user interface template (e.g., based on a respective computer system of the sender/creator of the first user interface template) when the first user interface template was initially downloaded, received, and/or detected on computer system 600.

For another example, watch user interface 656B includes weather complication 668 corresponding to a weather application of computer system 600B. In some embodiments (e.g., upon completing the configuration/setup of watch user interface 656B in FIG. 6F), settings of weather complication 668 are automatically (e.g., without user input) set to the settings of the weather application that is installed on computer system 600B, as opposed to maintaining the weather complication settings and/or information that had originally been associated with the first user interface template (e.g., based on a respective computer system of the sender/creator of the first user interface template) when the first user interface template was initially downloaded, received, and/or detected on computer system 600.

For another example, watch user interface 656B includes world clock complication 672 corresponding to a world clock application of computer system 600B. In some embodiments (e.g., upon completing the configuration/setup of watch user interface 656B in FIG. 6F), settings of world clock complication 672 are automatically (e.g., without user input) transferred over from the world clock complication settings that had originally been associated with the first user interface template (e.g., based on a respective computer system of the sender/creator of the first user interface template) when the first user interface template was initially downloaded, received, and/or detected on computer system 600B. For example, if the world clock complication had been, prior to being configured/setup for use on computer system 600B, set to a current location of its respective computer system, the location of the world clock complication 672 is automatically (e.g., without user input) set to the current location of computer system 600B upon completion of the configuration/setup of watch user interface 656B for use on computer system 600B. For another example, if the world clock compilation had been, prior to being configured/setup for use on computer system 600B, set to a predetermined location (e.g., a set location; a selected location; a particular location), the location setting of the world clock complication 672 is automatically (e.g., without user input) maintained to be the same predetermined location upon completion of the configuration/setup of watch user interface 656B for use on computer system 600B (e.g., instead of being modified to be the current location of computer system 600B).

FIGS. 6H-6K illustrates a method for configuring the first user interface template for use on the respective computer system (e.g., computer system 600B), where the first user interface template corresponds to a photo watch user interface (e.g., a photo watch face).

In some embodiments, a respective photo watch user interface includes an indication of a current time and is associated with a plurality of selected photos that are displayed (e.g., one-by-one) as a background of the respective photo watch user interface. In some embodiments, the plurality of selected photos (e.g., up to a predetermined maximum number of photos, such as 6 photos, 12 photos, or 24 photos) are selected to be included in the respective photo watch user interface. In some embodiments, the currently-displayed photo of the respective photo watch user interface changes automatically (e.g., based on time; randomly). In some embodiments, the currently-displayed photo of the respective photo watch user interface changes based on predetermined criteria (e.g., in response to detecting a predefined movement of the respective computer system, such as, e.g., a wrist raise). In some embodiments, a user interface template corresponding to the respective photo watch user interface, when downloaded, received, and/or detected by computer system 600A or computer system 600B, includes the plurality of selected photos that are included with (e.g., shared with, and thus downloaded, received, and/or detected by computer system 600A or computer system 600B together with) the respective user interface template. In some embodiments, the plurality of photos corresponds to photos that were designated for the respective photo watch user interface on a source computer system/source device of the respective user interface template corresponding to the respective photo watch user interface (e.g., selected by a user that created the respective user interface template on the source computer system/source device), and are shared together with the respective user interface template from the source computer system/source device. In some embodiments, a photo watch user interface includes complications, and the processes described in FIGS. 6A-6G and 6L-6AB with respect to watch user interfaces also apply to photo watch user interfaces.

Figure 6H:
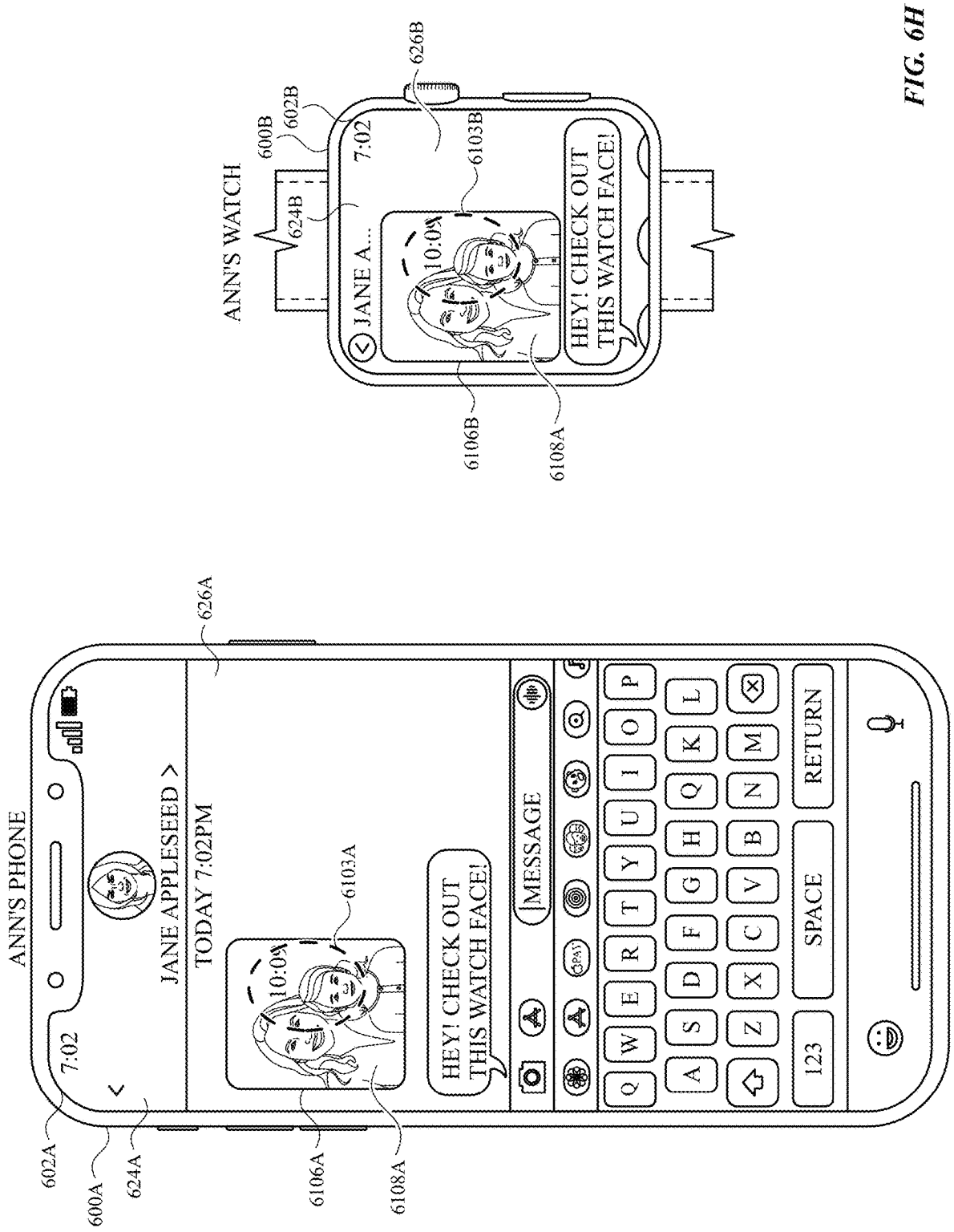

In FIG. 6H, computer system 600A displays, via display generation component 602A, user interface 624A of the messaging application, where user interface 624A of the messaging application is displaying message conversation 626A with a message participant (e.g., "Jane Appleseed"). Message conversation 626A includes a received electronic communication that includes (e.g., as an attachment) the first user interface template (e.g., shown as preview 6106A in message conversation 626A) interface, the plurality of selected photos associated with the first user interface template, including photo 6108A, and a message 630A associated with the received electronic communication. While displaying preview 6106A corresponding to the photo watch user interface, computer system 600A receives (e.g., detects) an input 6103A directed to preview 6106A. In some embodiments, input 6103A is a touch input on display generation component 602A.

Similarly, in FIG. 6H, computer system 600B displays, via display generation component 602B, user interface 624B of the messaging application, where user interface 624B of the messaging application is displaying message conversation 626B with the message participant (e.g., "Jane Appleseed"). Message conversation 626A includes a received electronic communication that includes (e.g., as an attachment) the first user interface template (e.g., shown as preview 6106B in message conversation 626B), the plurality of selected photos associated with the first user interface template, including photo 6108A, and a message 630B associated with the received electronic communication. While displaying preview 6106B corresponding to the photo watch user interface, computer system 600B receives (e.g., detects) an input 6103B directed to preview 6106B. In some embodiments, input 6103B is a touch input on display generation component 602B.

In response to (e.g., or subsequent to) receiving input 6103A, computer device 600A displays, via displays, via display generation component 602A, user interface 632A for creating a watch user interface based on the first user interface template, as shown in FIG. 6I. Similarly, in response to (e.g., or subsequent to) receiving input 6103B, computer device 600B displays, via displays, via display generation component 602B, user interface 632B for creating a watch user interface based on the first user interface template, as shown in FIG. 6I.

In FIG. 6I, computer device 600A displays, concurrently with preview 6106A (showing photo 6108A) of the photo watch user interface in user interface 632A, an affordance 652A for initiating a process for creating a photo watch user interface for the respective computer system (e.g., for computer system 600B) based on the photo watch user interface corresponding to preview 6106A. While displaying user interface 632A with preview 6106A and affordance 652A, computer system 600A receives (e.g., detects) an input 6105A on affordance 652A. In some embodiments, input 6105A is a touch input on display generation component 602A.

Similarly, in FIG. 6I, computer device 600B displays, concurrently with preview 6106B (showing photo 6108A) of the photo watch user interface in user interface 632B, an affordance 652B for initiating a process for creating a photo watch user interface for the respective computer system (e.g., for computer system 600B) based on the photo watch user interface corresponding to preview 6106B. While displaying user interface 632B with preview 6106B and affordance 652B, computer system 600B receives (e.g., detects) an input 6105B on affordance 652B. In some embodiments, input 6105B is a touch input on display generation component 602B.

Figure 6J:
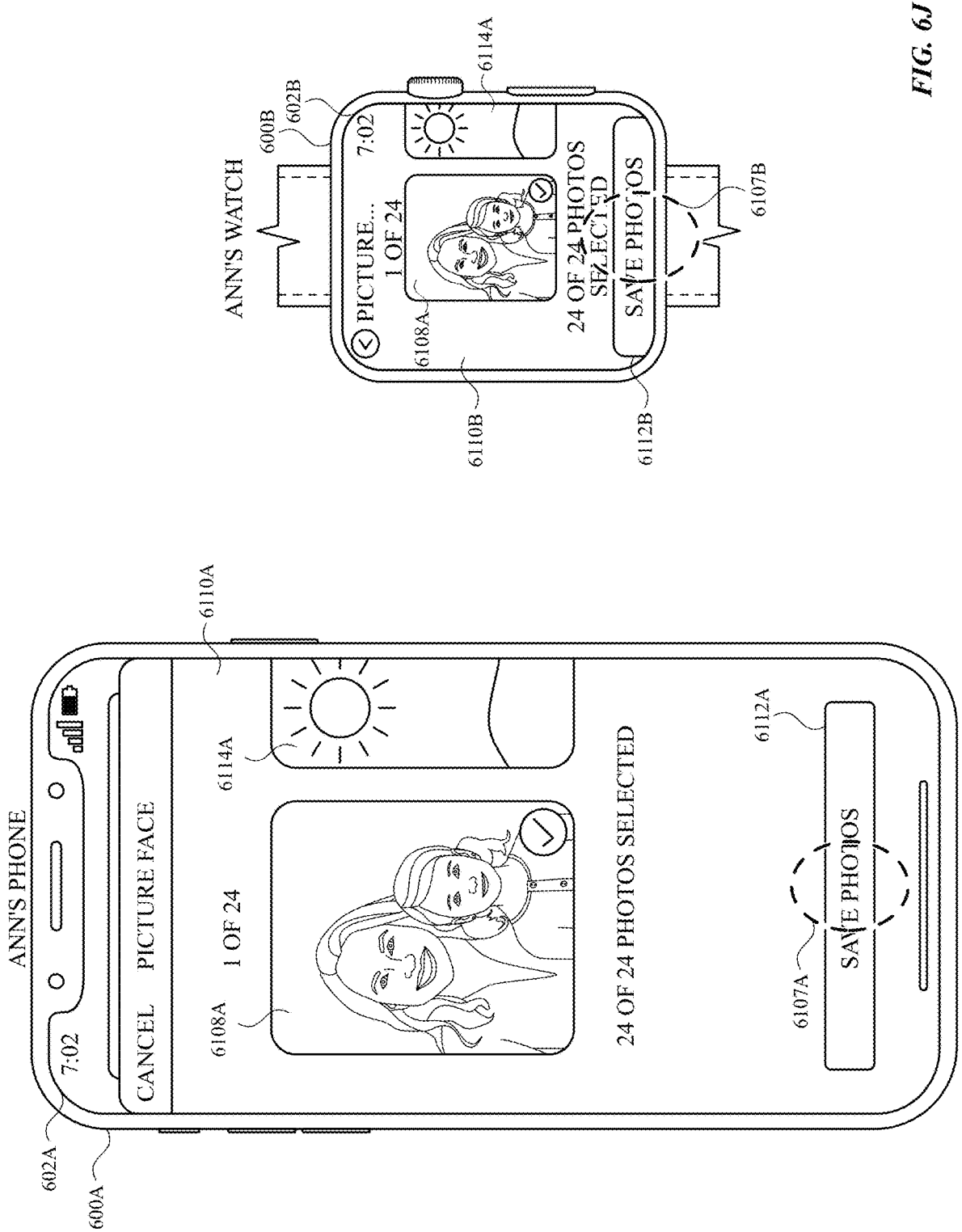

In response to receiving input 6105A, computer system 600A displays, via display generation component 602A, a user interface 6110A (e.g., a photo-picker user interface) that includes the plurality of photos associated with (and received with) the photo watch user interface, including photo 6108A, as shown in FIG. 6J. Similarly, in response to receiving input 6105B, computer system 600B displays, via display generation component 602B, a user interface 6110B (e.g., a photo-picker user interface) that includes the plurality of photos associated with (and received with) the photo watch user interface, including photo 6108A, as shown in FIG. 6J.

In FIG. 6J, user interface 6110A includes the plurality of associated photos (e.g., where a user can navigate (e.g., scroll) through the photos), including photo 6108A and 6114A, where all of the plurality of photos (e.g., 24 of 24 photos) are currently selected to be included with the photo watch user interface corresponding to preview 6106A. In some embodiments, all associated photos are initially (e.g., when user interface 6110A is launched) selected to be used in the photo watch user interface, and one or more of the plurality of associated photos can be de-selected (by the user) via user interface 6110A such that the remaining selected photos will be displayed as the background in the photo watch user interface if the photo watch user interface is used as the current watch user interface on the respective computer system (e.g., on computer system 600B). In some embodiments, one or more of the plurality of associated photos that are selected (e.g., remains selected) are stored on computer system 600A and/or on the respective computer system (e.g., on computer system 600B). In some embodiments, one or more of the plurality of associated photos that are not selected (e.g., were de-selected by the user) are not stored on computer system 600A and/or the respective computer system (e.g., on computer system 600B) (e.g., and are instead removed/deleted).

While displaying the plurality of photos in user interface 6110A, computer system 600A concurrently displays an affordance 6112A for completing the configuration/setup of the photo watch user interface with the currently-selected photos. While displaying user interface 6110A with all of the plurality of associated photos selected (e.g., because none of the photos were de-selected by the user), computer system 600A receives (e.g., detects) an input 6107A directed to affordance 6112A. In some embodiments, input 6107A is a touch input on display generation component 602A.

Similarly, in FIG. 6J, corresponding user interface 6110B includes the plurality of associated photos, including photo 6108A and 6114A, where all of the plurality of photos (e.g., 24 of 24 photos) are currently selected to be included with the photo watch user interface corresponding to preview 6106A. In some embodiments, one or more of the plurality of associated photos that are selected (e.g., remains selected) are stored on computer system 600B. In some embodiments, one or more of the plurality of associated photos that are not selected (e.g., were de-selected by the user) are not stored on computer system 600B (e.g., and are instead removed/ deleted). While displaying the plurality of photos in user interface 6110B, computer system 600B concurrently displays an affordance 6112B for completing the configuration/ setup of the photo watch user interface with the currently-selected photos. While displaying user interface 6110B with all of the plurality of associated photos selected (e.g., because none of the photos were de-selected by the user), computer system 600B receives (e.g., detects) an input 6107B directed to affordance 6112B. In some embodiments, input 6107B is a touch input on display generation component 602B.

Figure 6K:
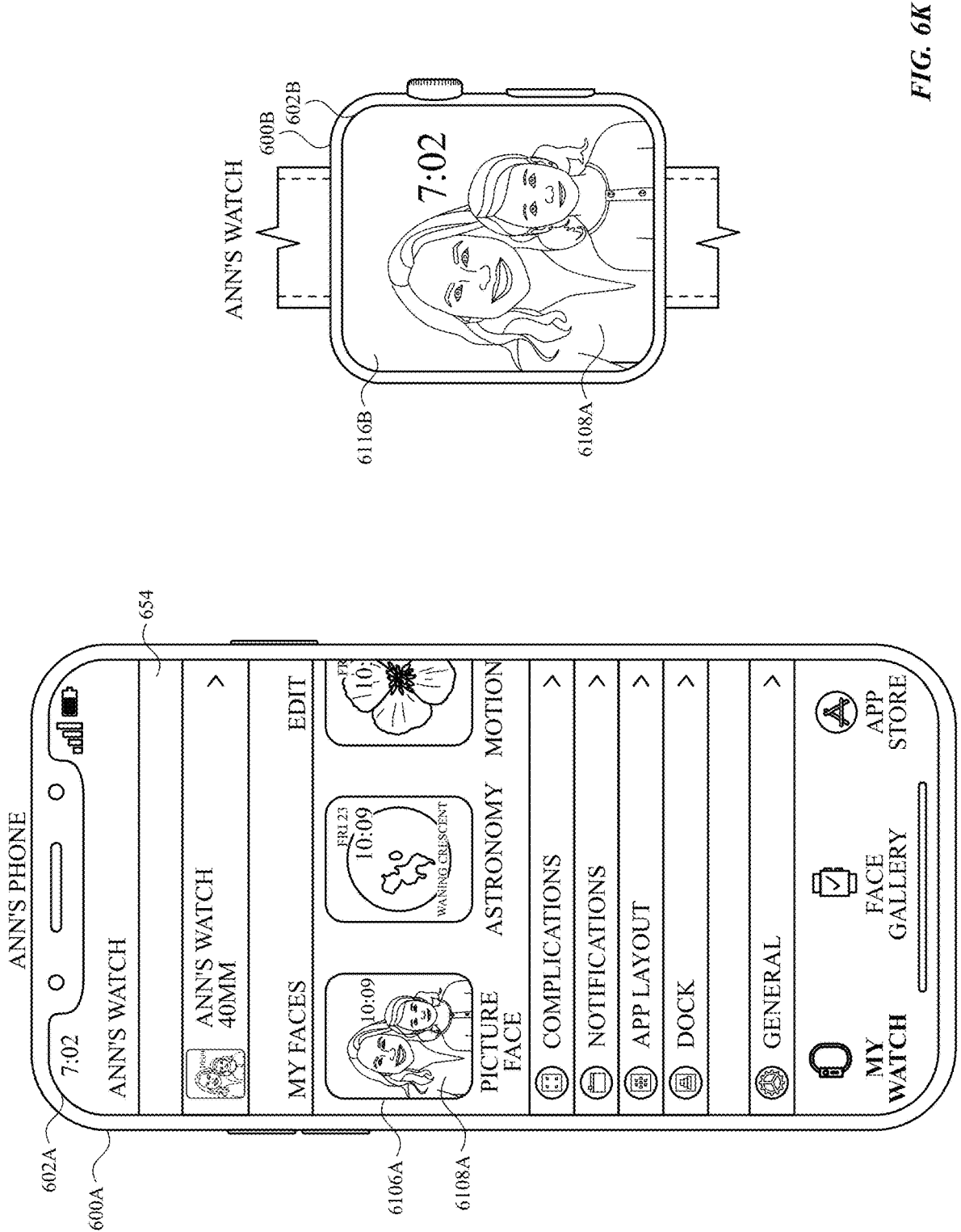

In response to receiving input 6107A on affordance 6112A, computer system 600A displays, via display generation component 602A, user interface 654 of the companion application, as shown in FIG. 6K. Similarly, in response to receiving input 6107B on affordance 6112B, computer system displays, via display generation component 602B, a photo watch user interface 6116B corresponding to the photo watch user interface configured in FIG. 6J set as the current watch user interface, as shown in FIG. 6K.

In FIG. 6K, user interface 654 of the companion application includes, as one of the plurality of watch user interface previews that can be used as a watch user interface on the respective computer system (e.g., on computer system 600B), photo watch user interface preview 6106A corresponding to the photo watch user interface configured in FIG. 6J, and corresponding to photo watch user interface 6116B displayed in computer system 600B as the current watch user interface.

Figure 6L:
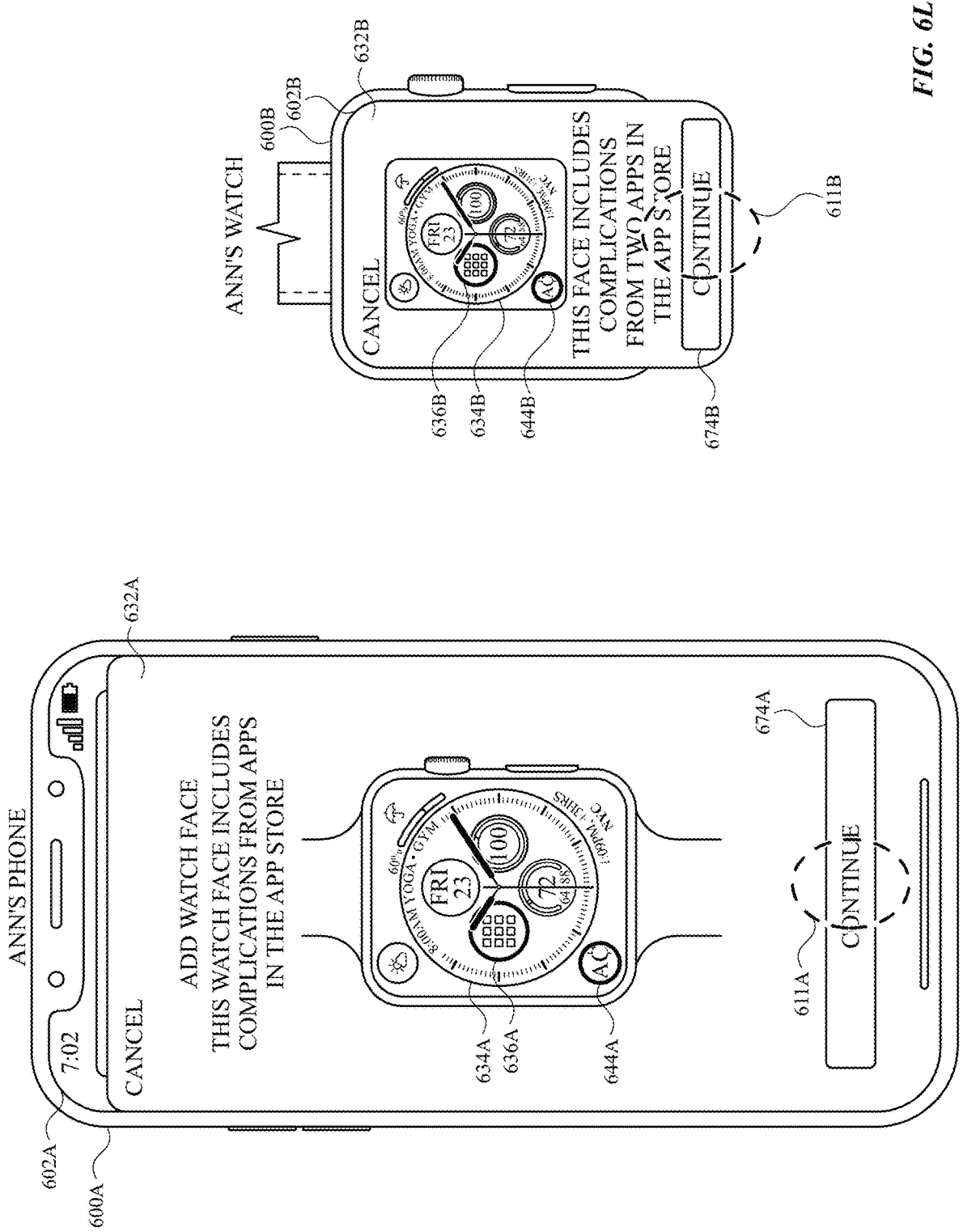

FIG. 6L illustrates computer system 600A displaying, via display generation component 602A, user interface 632A where two of the respective eight applications—the first application corresponding to complication preview 636A and the fifth application corresponding to the complication preview 644A—are not available on (e.g., not downloaded on; not installed on) the respective computer system (e.g., computer system 600B). In some embodiments, the unavailable applications correspond to third-party applications (e.g., as opposed to first-party applications developed and published by the same entity controlling the operating system of computer system 600B), where the third-party applications are available for download onto the respective computer system (e.g., onto computer system 600B) via a source (e.g., a website or an application store) that is accessible on computer system 600A and/or the respective computer system (e.g., computer system 600B).

In FIG. 6L, because the first application and the fifth application are not available on the respective computer system (e.g., on computer system 600B), computer system 600A visually indicates (e.g., dims; highlights) complication previews 636A and 644A, thereby indicating that the first and fifth applications are currently not available on the respective computer system (e.g., computer system 600B). In some embodiments, visually indicating complication previews 636A and 644A includes visually highlighting complication previews 636A and 644A while not visually highlighting the other complication previews. In some embodiments, visually indicating complication previews 636A and 644A includes dimming (e.g., darkening; shading) complication previews 636A and 644A while not dimming the other complication previews. visually indicating complication previews 636A and 644A includes not dimming complication previews 636A and 644A while dimming the other complication previews.

FIG. 6L similarly illustrates computer system 600B displaying, via display generation component 602B, user interface 632B where the first application corresponding to complication preview 636B and the fifth application corresponding to the complication preview 644B are not available on computer system 600B. In FIG. 6L, because the first application and the fifth application are not available on computer system 600B, computer system 600B visually indicates (e.g., dims; highlights) complication previews 636B and 644B, thereby indicating that the first and fifth applications are currently not available on computer system 600B.

In FIG. 6L, computer system 600A displays, in user interface 632A, an affordance 674A for continuing with the configuration/setup process for enabling the user interface corresponding to preview 634A to be used on the respective computer system (e.g., on computer system 600B). While displaying affordance 674A, computer system 600A receives (e.g., detects) an input 611A on affordance 674A. In some embodiments, input 611A is a touch input on display generation component 602A.

Similarly, in FIG. 6L, computer system 600B displays, in user interface 632B, an affordance 674B for continuing with the configuration/setup process for enabling the user interface corresponding to preview 634B to be used on computer system 600B. While displaying affordance 674B, computer system 600B receives (e.g., detects) an input 611B on affordance 674B. In some embodiments, input 611B is a touch input on display generation component 602B.

In some embodiments, if the computer system (computer system 600A or 600B) does not receive an input on the affordance (affordance 674A or 674B) for continuing with the configuration/setup process for a predetermined time period (e.g., 10 seconds; 15 seconds; 30 seconds), the computer system automatically (e.g., without any further user input) completes the configuration/setup process, where a new watch user interface generated from the first user interface template becomes available for use on the respective computer system (e.g., on computer system 600B) without including complications that correspond to the unavailable applications.

Figure 6M:
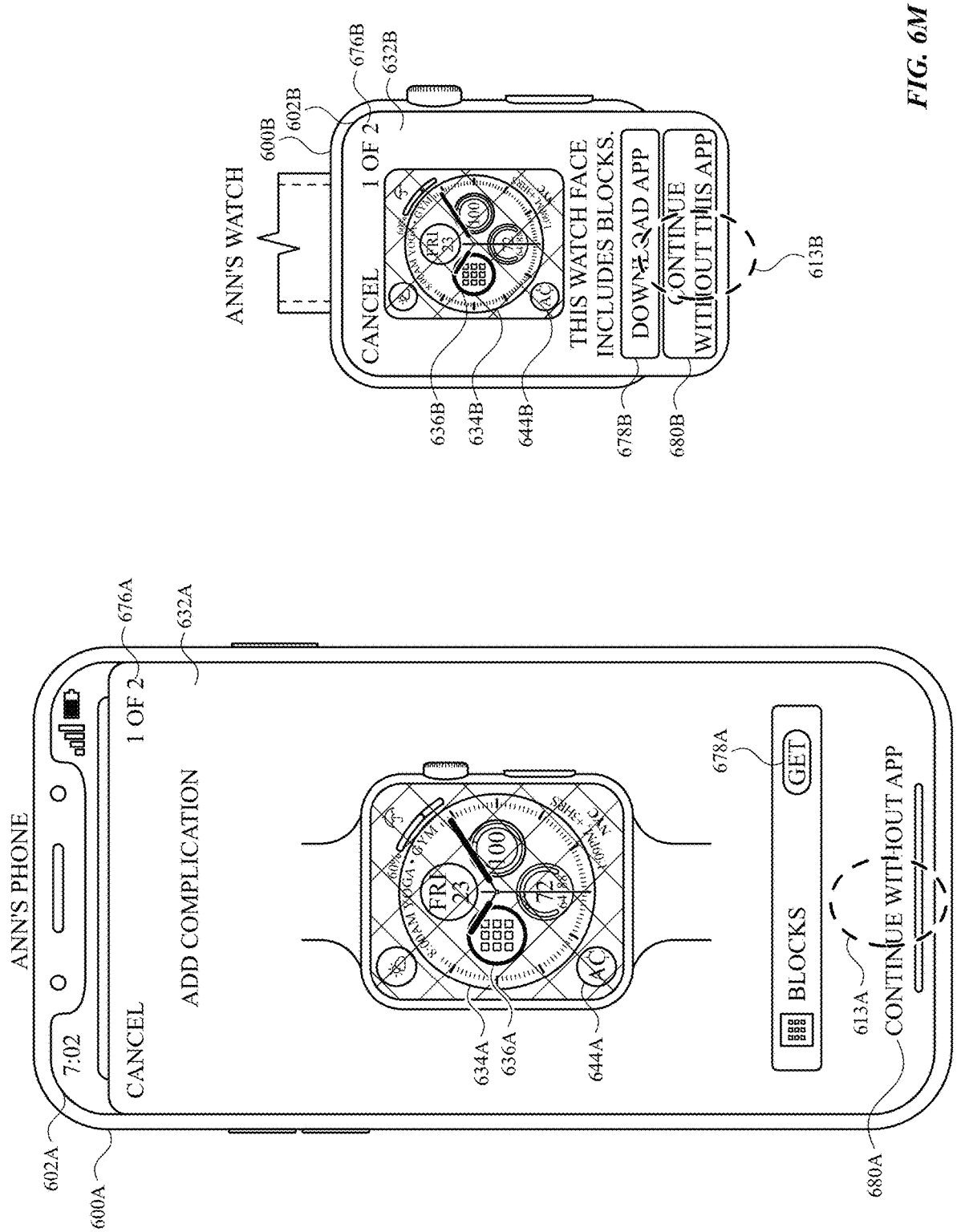

In response to receiving input 611A on affordance 674A, computer system 600A displays, via display generation component 602A, user interface 632A as shown in FIG. 6M. Similarly, in response to receiving input 611B on affordance 674B, computer system 600B displays, via display generation component 620B, user interface 632B as shown in FIG. 6M.

In FIG. 6M, computer system 600A visually highlights complication preview 636A corresponding to the first application without visually highlighting the other complication previews (including not visually highlighting complication preview 644A corresponding to the unavailable fifth application), thereby indicating that the current step in the configuration/setup process relates to first application corresponding to complication preview 636A. In some embodiments, computer system 600A concurrently displays, in user interface 632A, an indication 676A (e.g., text information) that the current step in the configuration/setup process relates to one of the complications of the first user interface template for which the respective application is not available on the respective computer system (e.g., on computer system 600B), and of the current stage within the configuration/setup process (e.g., "1 of 2").

While visually highlighting complication preview 636A, computer system 600A displays, in user interface 632A, an affordance 678A for downloading (e.g., via an application store) the first application corresponding to complication preview 636A, and an affordance 680A for continuing the configuration/setup process without downloading the first application. While displaying affordances 678A and 680A, computer system 600A receives (e.g., detects) an input 613A on affordance 680A.

Similarly, in FIG. 6M, computer system 600B visually highlights complication preview 636B corresponding to the first application without visually highlighting the other complication previews (including not visually highlighting complication preview 644B corresponding to the unavailable fifth application). In some embodiments, computer system 600B concurrently displays, in user interface 632B, an indication 676B (e.g., text information) that the current step in the configuration/setup process relates to one of the complications of the first user interface template for which the respective application is not available on computer system 600B, and of the current stage within the configuration/setup process (e.g., "1 of 2").

While visually highlighting complication preview 636B, computer system 600B displays, in user interface 632B, an affordance 678B for downloading (e.g., via an application store) the first application corresponding to complication preview 636B, and an affordance 680B for continuing the configuration/setup process without downloading the first application. While displaying affordances 678B and 680B, computer system 600B receives (e.g., detects) an input 613B on affordance 680B.

Figure 6N:
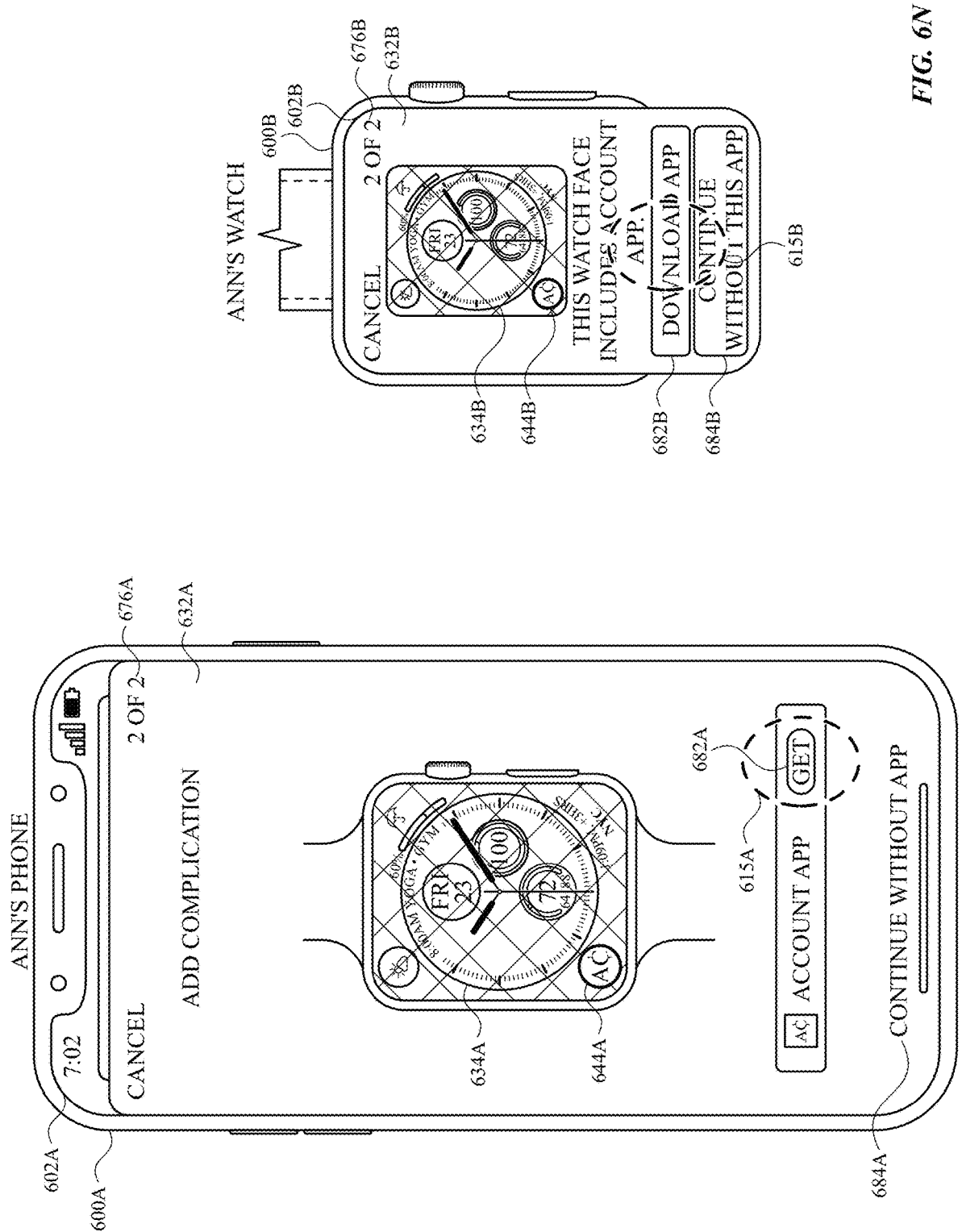

In response to receiving input 613A, computer system 600A displays, via display generation component 602A, user interface 632A as in FIG. 6N. Similarly, in response to receiving input 613B, computer system 600B displays, via display generation component 602B, user interface 632B as in FIG. 6N.

In FIG. 6N, because the first application was not downloaded, preview 634A does not (e.g., no longer) include complication preview 636A corresponding to the first application that was not downloaded.

In FIG. 6N, computer system 600A visually highlights complication preview 644A corresponding to the fifth application without visually highlighting the other complication previews in preview 634A, thereby indicating that the current step in the configuration/setup process relates to the fifth application. In some embodiments, computer system 600A updates display of, in user interface 632A, indication 676A (e.g., text information) of the current step in the configuration/setup process to indicate the current stage within the configuration/setup process (e.g., "2 of 2").

While visually highlighting complication preview 644A, computer system 600A displays, in user interface 632A, an affordance 682A for downloading (e.g., via an application store) the fifth application, and an affordance 684A for continuing the configuration/setup process without downloading the fifth application. While displaying affordances 682A and 684A, computer system 600A receives (e.g., detects) an input 615A on affordance 682A.

Similarly, in FIG. 6N, because the first application was not downloaded, preview 634B does not (e.g., no longer) include complication preview 636B corresponding to the first application that was not downloaded.

In FIG. 6N, computer system 600B visually highlights complication preview 644B corresponding to the fifth application without visually highlighting the other complication previews in preview 634B, thereby indicating that the current step in the configuration/setup process relates to the fifth application. In some embodiments, computer system 600B updates display of, in user interface 632B, indication 676B (e.g., text information) of the current step in the configuration/setup process to indicate the current stage within the configuration/setup process (e.g., "2 of 2").

While visually highlighting complication preview 644B, computer system 600B displays, in user interface 632B, an affordance 682B for downloading (e.g., via an application store) the fifth application, and an affordance 684B for continuing the configuration/setup process without downloading the fifth application. While displaying affordances 682B and 684B, computer system 600B receives (e.g., detects) an input 615B on affordance 682B.

In some embodiments, the fifth application corresponding to complication preview 644A/644B is installed on computer system 600A but is not installed on computer system 600B. In some embodiments, in accordance with a determination that the fifth application is installed on computer system 600A but is not installed on computer system 600B (e.g., and where computer system 600A (e.g., a smartphone) and computer system 600B (e.g., a smartwatch) are paired systems), computer system 600B does not visually highlight complication preview 644B corresponding to the fifth application, forgoes displaying affordance 682B for downloading the fifth application and affordance 684B for continuing the configuration/setup process without downloading the fifth application, and instead automatically downloads (e.g., without user input) the fifth application (directly) from computer system 600A (e.g., via a short-range connection (e.g., Bluetooth)).

In some embodiments, in accordance with a determination that the fifth application corresponding to complication preview 644A/644B is installed on computer system 600A but is not installed on computer system 600B (e.g., and where computer system 600A (e.g., a smartphone) and computer system 600B (e.g., a smartwatch) are paired systems), computer system 600B still visually highlights representation 644B corresponding to the fifth application and displays affordance 682B and affordance 684B as in FIG. 6N. In some embodiments, in accordance with (e.g., in response to) an input on affordance 682B, computer system 600B downloads the fifth application (directly) from computer system 600A (e.g., via a short-range connection (e.g., Bluetooth)) (e.g., instead of downloading the fifth application via the Internet).

In some embodiments, while displaying user interface 632A as in FIG. 6N, if computer system 600A does not detect an input on affordance 682A for a predetermined time period (e.g., 10 seconds; 15 seconds; 30 seconds), computer system 600A automatically (e.g., without any user input) proceeds with the configuration/setup process without downloading the fifth application corresponding to complication preview 644A. Similarly, in some embodiments, while displaying user interface 632B as in FIG. 6N, if computer system 600B does not detect an input on affordance 682B for the predetermined time period (e.g., 10 seconds; 15 seconds; 30 seconds), computer system 600B automatically (e.g., without any user input) proceeds with the configuration/setup process without downloading the fifth application corresponding to complication preview 644B on computer system 600B.

Figure 6O:
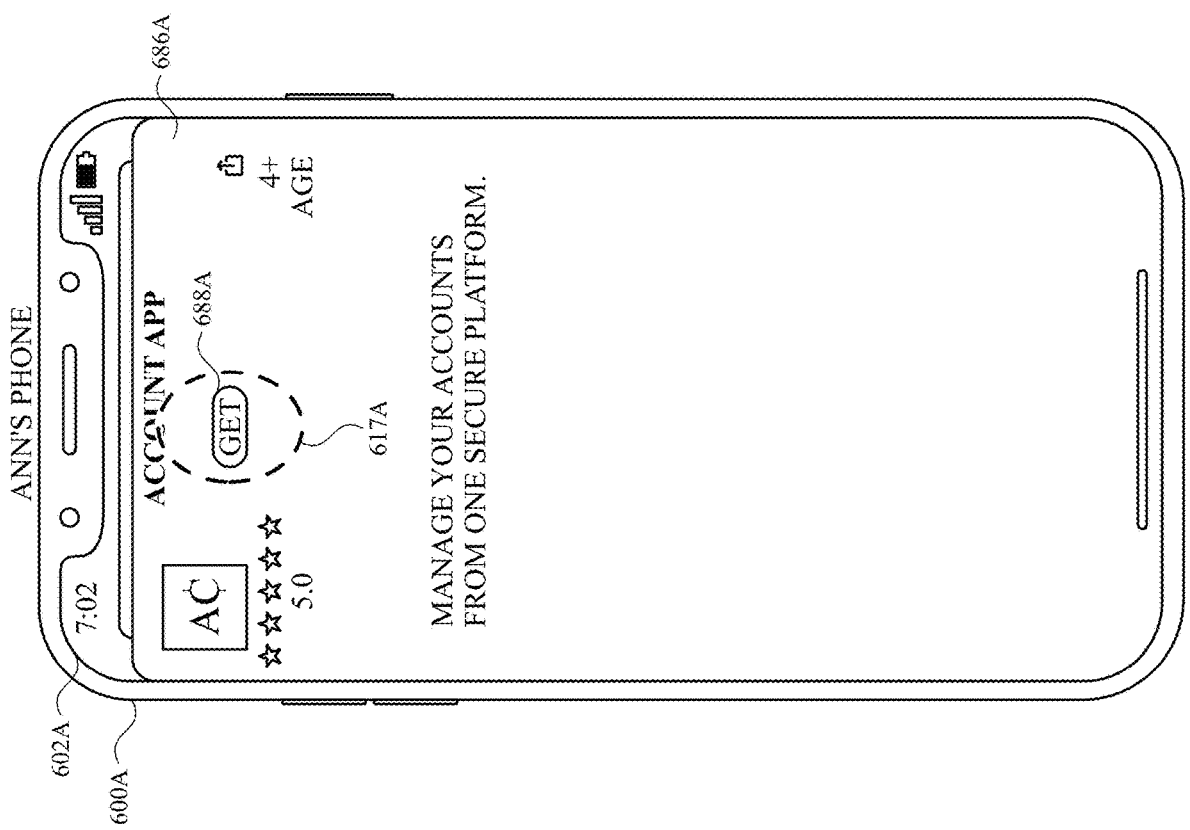

In response to receiving input 615A, computer system 600A displays, via display generation component 602A, user interface 632A as in FIG. 6O. Similarly, in response to receiving input 615B, computer system 600B displays, via display generation component 602B, user interface 632B as in FIG. 6O.

In FIG. 6O, computer system 600A displays, via display generation component 602A, a user interface 686A of an application store, where user interface 686A corresponds to a page of the application store relating to the fifth application, and where user interface 686A includes an affordance 688A for downloading the fifth application onto computer system 600A. In some embodiments, the application store is a first-party application developed and controlled by the same entity controlling the operating system of computer system 600A, and from which first-party and/or third-party applications can be downloaded onto computer system 600A. In some embodiments, applications that are downloaded onto computer system 600A can also be installed on the respective computer system (e.g., on computer system 600B) (e.g., directly from computer system 600A to computer system 600B via a companion application on computer system 600A). While displaying user interface 686A, computer system 600A receives (e.g., detects) an input 617A on affordance 688A. In some embodiments, input 617A is a touch input on display generation component 602A.

Similarly, in FIG. 6O, computer system 600B displays, via display generation component 602B, a user interface 686A of the application store, where user interface 686A corresponds to the page of the application store relating to the fifth application, and where user interface 686B includes an affordance 688B for downloading the fifth application onto computer system 600B. While displaying user interface 686B, computer system 600B receives (e.g., detects) an input 617B on affordance 688B. In some embodiments, input 617B is a touch input on display generation component 602B.

In response to receiving input 617A on affordance 688A, computer system 600A initiates a process for downloading the fifth application onto computer system 600A, as in FIG. 6P. Similarly, in response to receiving input 617B on affordance 688B, computer system 600B initiates a process for downloading the fifth application onto computer system 600B, as in FIG. 6P.

In FIG. 6P, computer system 600A displays, overlaid on a portion of user interface 686A, an authorization user interface 690 for authorizing the downloading (and installing) of the fifth application onto computer system 600A. In some embodiments, authorization user interface 690 includes instructions 692A for how to authorize and/or initiate the downloading (and installing) of the fifth application onto computer system 600A. In some embodiments, while displaying authorization user interface 690, computer system 600A receives, via an input device 694A, an input 619A (e.g., a double-press input on a mechanical input button of computer system 600A) in accordance with instructions 692A.

Similarly, in FIG. 6P, computer system 600B displays, overlaid on user interface 686B, instructions 692B for how to authorize and/or initiate the downloading (and installing) of the fifth application onto computer system 600B. In some embodiments, while displaying instructions 692B, computer system 600B receives, via an input device 694B, an input 619B (e.g., a double-press input on a mechanical input button of computer system 600B) in accordance with instructions 692B.

In response to receiving input 619A while displaying authorization user interface 690, computer system 600A downloads and installs the fifth application on computer system 600A (e.g., and, after having downloaded (and installed) the fifth application onto computer system 600A, causes the fifth application to be installed on the respective computer system (e.g., on computer system 600B)). Similarly, in response to receiving input 619B while displaying instructions 692B, computer system 600B downloads and installs the fifth application on computer system 600B.

FIG. 6Q illustrates computer system 600A displaying, via display generation component 602A, user interface 623A showing preview 634A after (e.g., in response to) downloading and installing the fifth application on the respective computer system (e.g., on computer system 600B). In FIG. 6Q, preview 634A includes complication preview 644A corresponding to the fifth application that is not visually highlighted, thereby indicating that the respective complication corresponding to complication preview 644A can be used on the watch user interface corresponding to preview 634A once the configuration/setup process has been completed. As also shown in FIG. 6Q, preview 634A still includes display of the other complication previews corresponding to respective complications that can be used (e.g., because their respective applications were already available on (e.g., installed on) the respective computer system (e.g., on computer system 600B)) on the watch user interface corresponding to preview 634A once the configuration/setup process has been completed.

While displaying user interface 623A showing preview 634A as in FIG. 6Q, computer system 600A concurrently displays, in user interface 632A, an affordance 696A for completing the configuration/setup process for enabling the user interface corresponding to the first user interface template for use on the respective computer system (e.g., on computer system 600B) without the first watch complication, and an affordance 698A for continuing the configuration/setup process to initiate the downloading of one or more applications that had not been downloaded (e.g., the first application).

While displaying affordances 696A and 698A, computer system 600A receives (e.g., detects) an input 621A on affordance 696A for completing the configuration/setup process. In some embodiments, input 621A is a touch input on display generation component 602A. In response to detecting input 621A on affordance 696A, computer system 600A completes the configuration/setup process. In some embodiments, in response to (e.g., or subsequent to) completing the configuration/setup process, computer system 600A displays, via display generation component 602A, user interface 654 of the companion application (first described above with reference to FIG. 6K), where user interface 654 includes a watch user interface preview corresponding to the new watch user interface created in FIG. 6Q.

Similarly, FIG. 6Q also illustrates computer system 600B displaying, via display generation component 602B, user interface 623B showing preview 634B after (e.g., in response to) downloading and installing the fifth application on computer system 600B. In FIG. 6Q, preview 634B includes complication preview 644B corresponding to the fifth application that is not visually highlighted, thereby indicating that the respective complication corresponding to complication preview 644B can be used on the watch user interface corresponding to preview 634B once the configuration/setup process has been completed. As also shown in FIG. 6Q, preview 634B still includes display of the other complication previews corresponding to respective complications that can be used (e.g., because their respective applications were already available on (e.g., installed on) computer system 600B) on the watch user interface corresponding to preview 634A once the configuration/setup process has been completed.

While displaying user interface 623B showing preview 634B as in FIG. 6Q, computer system 600B concurrently displays, in user interface 632B, an affordance 696B for completing the configuration/setup process for enabling the user interface corresponding to the first user interface template for use on computer system 600B without the first watch complication, and an affordance 698B for continuing the configuration/setup process to initiate the downloading of one or more applications that had not been downloaded (e.g., the first application).

While displaying affordances 696B and 698B, computer system 600B receives (e.g., detects) an input 621A on affordance 696B for completing the configuration/setup process. In some embodiments, input 621B is a touch input on display generation component 602B. In response to detecting input 621B on affordance 696B, computer system 600B completes the configuration/setup process. In some embodiments, in response to (e.g., or subsequent to) completing the configuration/setup process, computer system 600B displays, via display generation component 602B, the new watch user interface created in FIG. 6Q as the current watch user interface.

As described above with reference to FIG. 6B, in some embodiments, the first user interface template can be downloaded and/or received via the application store on the computer (computer system 600A or computer system 600B). In some embodiments, in response to receiving (e.g., detecting) a request to download/receive the first user interface template via the application store, in accordance with a determination that one or more respective applications corresponding to the first user interface template is not installed on (e.g., is not available on) the respective computer system (e.g., on computer system 600B), the computer system displays an indication (e.g., a notification; a prompt; a request) indicating that that the one or more respective applications (e.g., the first application and the fifth application) are not installed, and requesting authorization to download the one or more respective applications (e.g., the first application and the fifth application) that are not installed (e.g., via the application store; concurrently as part of the process of downloading the first user interface template from the application store). In some embodiments, in response to receiving (e.g., detecting) a request to download/receive the first user interface template via the application store, the computer system downloads the first user interface template via the application store. In some embodiments, after (e.g., immediately after, in response to) downloading (e.g., and installing) the first user interface template and in accordance with a determination that one or more respective applications corresponding to the first user interface template is not installed on (e.g., is not available on) the respective computer system (e.g., on computer system 600B), the computer system displays an indication (e.g., a notification; a prompt; a request) indicating that that the one or more respective applications (e.g., the first application and the fifth application) are not installed, and requests authorization to download the one or more respective applications that are not installed.

Figure 6R:
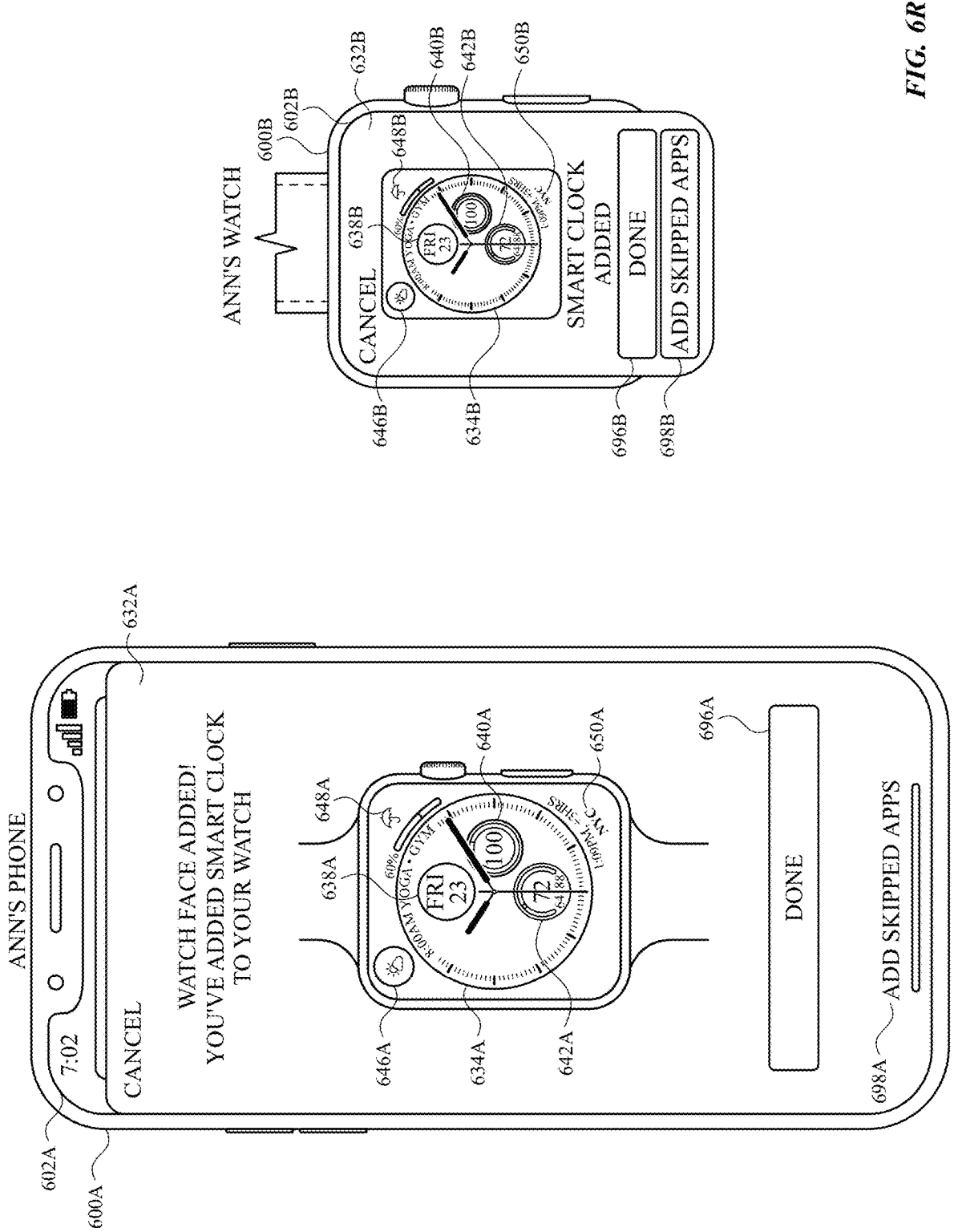

FIG. 6R illustrates computer system 600A displaying, via display generation component 602A, user interface 632A, where user interface 632A includes preview 634A corresponding to the first user interface template if the fifth application corresponding to complication preview 644A had not been downloaded onto computer system 600A (e.g., because affordance 684A, instead of affordance 682A, had been activated in FIG. 6N).

In FIG. 6R, because the fifth application had not been downloaded, preview 634A does not include complication preview 636A corresponding to the first application and does not include complication preview 644A corresponding to the fifth application. As in FIG. 6Q, because a decision has been made (as to whether to download each of the respective applications that were not available on the respective computer system (e.g., on computer system 600B)) for each of the respective applications that were not available on the respective computer system (e.g., on computer system 600B), computer system 600A displays, in user interface 632A, affordance 696A for completing the configuration/setup process for enabling the user interface corresponding to the first user interface template for use on the respective computer system (e.g., on computer system 600B) without the complications corresponding to the first and fifth applications, and affordance 698A for returning to the configuration/setup process to initiate the downloading of one or more applications that had not been downloaded.

Similarly, in FIG. 6R, because the fifth application had not been downloaded, preview 634B does not include complication preview 636B corresponding to the first application and does not include complication preview 644B corresponding to the fifth application. As in FIG. 6Q, because a decision has been made (as to whether to download each of the respective applications that were not available on computer system 600B) for each of the respective applications that were not available on computer system 600B, computer system 600B displays, in user interface 632B, affordance 696B for completing the configuration/setup process for enabling the user interface corresponding to the first user interface template for use on computer system 600B without the complications corresponding to the first and fifth applications, and affordance 698B for returning to the configuration/setup process to initiate the downloading of one or more applications that had not been downloaded.

Figure 6S:
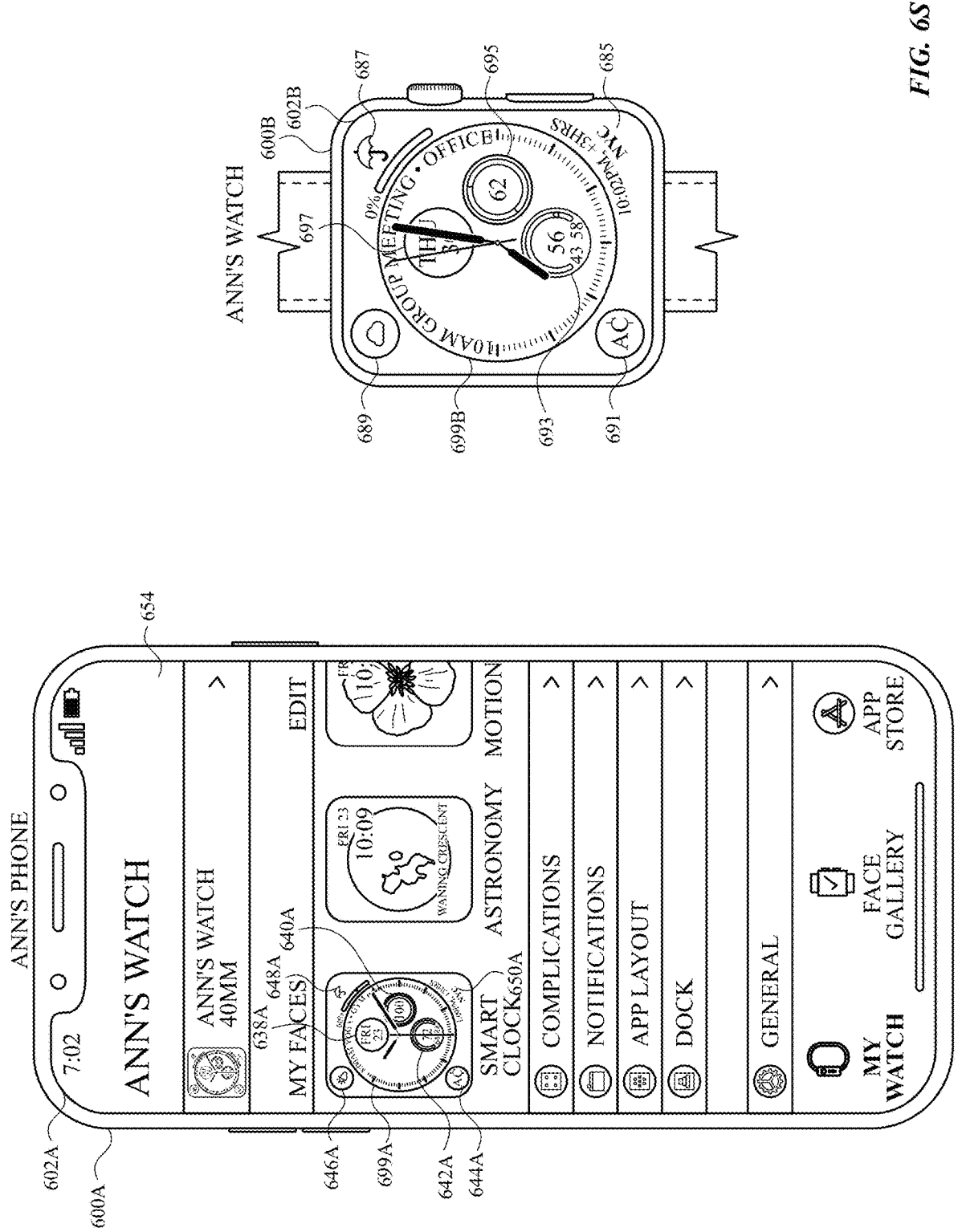

In response to receiving input 621A on affordance 696A in FIG. 6Q, computer system 600A displays, via display generation component 602A, user interface 654 that includes watch user interface preview 699A as in FIG. 6S. Similarly, in response to receiving input 621B on affordance 696B in FIG. 6Q, computer system 600B displays, via display generation component 602B, a watch user interface 699B (corresponding to watch user interface preview 699A) as in FIG. 6S.

In FIG. 6S, user interface 654 includes watch user interface preview 699A (including complication previews 638A-650A) corresponding to the user interface for which configuration/setup was completed in FIG. 6Q, thereby indicating that the watch user interface corresponding to preview 699A is available for use on the respective computer system (e.g., on computer system 600B). Computer system 600B shows the corresponding watch user interface (watch user interface 699B) being used on computer system 600B as the current watch user interface, where watch user interface 699B includes complications 697-685 corresponding to complication previews 638A-650A, respectively.

FIG. 6T illustrates a computer system 600C (e.g., a smartphone) and a computer system 600D (e.g., a smartwatch). In some embodiments, computer system 600C is paired with computer system 600D. In some embodiments, computer system 600C can be used to control and/or manage configurations and settings on computer system 600D (e.g., via a companion application for computer system 600D that is accessible on computer system 600C).

In FIG. 6T, computer system 600C displays, via a display generation component 602C, a user interface 683 (e.g., similar to user interface 654 first described above with reference to FIG. 6F) for setting and/or editing user interface settings for a respective computer system (e.g., for computer system 600D), including selecting a watch user interface for use on the respective computer system (e.g., on computer system 600D). In some embodiments, user interface 683 includes a watch user interface preview 681 corresponding to watch user interface 679 displayed by computer system 600B in FIG. 6T.

While displaying user interface 683, computer system 600C receives (e.g., detects) an input 623A on watch user interface preview 681 corresponding to watch user interface 679. In some embodiments, input 623A is a touch input on display generation component 602A. While displaying watch user interface 679, computer system 600D receives (e.g., detects) an input 623B on watch user interface 679. In some embodiments, input 623B is a touch input on display generation component 602B. In some embodiments, input 623B is a press input (e.g., a press-and-hold input) on display generation component 602B.

Figure 6U:
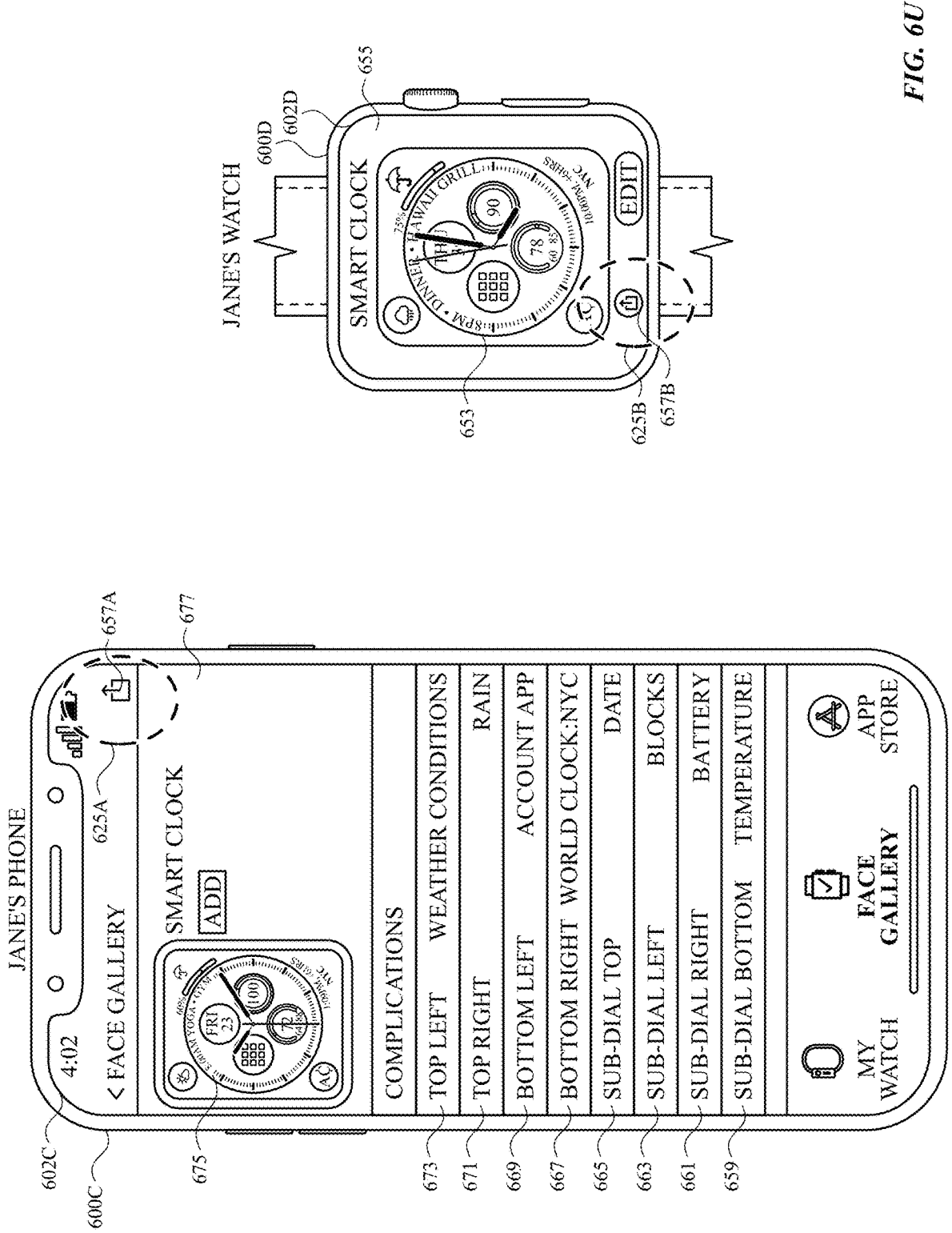

In response to receiving input 623A, computer system 600C displays, via display generation component 602C, a user interface 677 for managing settings associated with watch user interface 679, as shown in FIG. 6U. In response to receiving input 623B, computer system 600D displays, via display generation component 602D, a user interface 655 for editing one or more features (e.g., complication types) of watch user interface 679.

In FIG. 6U, user interface 677 displayed in computer system 600A includes a watch user interface preview 675 of watch user interface 679. In some embodiments, user interface 677 includes user interface elements 673-659 for setting a complication type for a respective complication included in watch user interface 679. In some embodiments, user interface 677 includes an affordance 657A for initiating a sharing of watch user interface 679 (e.g., initiating a process for sending/transmitting watch user interface 679, as a user interface template, to a different computer system). While displaying user interface 677, computer system 600C receives (e.g., detects) an input 625A on affordance 657A. In some embodiments, input 625A is a touch input on affordance 657A.

In FIG. 6U, user interface 655 displayed in computer system 600B includes a watch user interface preview 653 of watch user interface 679 an affordance 657B (corresponding to affordance 657A) for initiating a sharing of watch user interface 679 (e.g., initiating a process for sending/transmitting watch user interface 679, as a user interface template, to a different computer system). While displaying user interface 655, computer system 600D receives (e.g., detects) an input 625B on affordance 657B. In some embodiments, input 625B is a touch input on affordance 657B.

In response to receiving input 625A on affordance 657A, computer system 600C displays, via display generation component 602C, a user interface 651A for selecting a recipient (e.g., from a contactable users list) of the user interface template corresponding to watch user interface 679 being shared and/or for selecting a type of communication channel to transmit the user interface template, as shown in FIG. 6V. Similarly, in response to receiving input 625B on affordance 657B, computer system 600D displays, via display generation component 602D, a user interface 651B for selecting a recipient (e.g., from a contactable users list) of the user interface template corresponding to watch user interface 679 being shared and/or for selecting a type of communication channel to transmit the user interface template, as shown in FIG. 6V.

In some embodiments, the user interface template (corresponding to watch user interface 679) being shared can be transmitted from computer system 600C to a computer system (e.g., an electronic device, such as a smartphone or a smartphone) of the recipient (e.g., an electronic device logged into an account associated with the recipient) via a messaging application (e.g., as an attachment of a message). In some embodiments, the user interface template being shared can be transmitted via a chat application. In some embodiments, the user interface template being shared can be transmitted via an electronic mail application (e.g., as an attachment). In some embodiments, the user interface template being shared can be transmitted via short-range communication (e.g., via NFC; via Bluetooth). In some embodiments, the user interface template being shared can be transmitted by uploading the user interface template to the Internet, from which the template is available for download by the recipient (e.g., by selecting a hyperlink corresponding to the uploaded template).

In FIG. 6V, user interface 651A includes a plurality of contactable users that can be selected as the recipient, including contactable users 649A, 647A, and 645A. While displaying the plurality of contactable users, computer system 600C receives (e.g., detects) an input 627A directed to selecting contactable user 649A. In some embodiments, input 627A is a touch input on display generation component 602A.

Similarly, in FIG. 6V, user interface 651B includes corresponding contactable users available for selection as the recipient, including a contactable users 649B, 647B, and 645B. While displaying the plurality of contactable users, computer system 600D receives (e.g., detects) an input 627B directed to selecting contactable user 649B. In some embodiments, input 627B is a touch input on display generation component 602B.

Figure 6W:
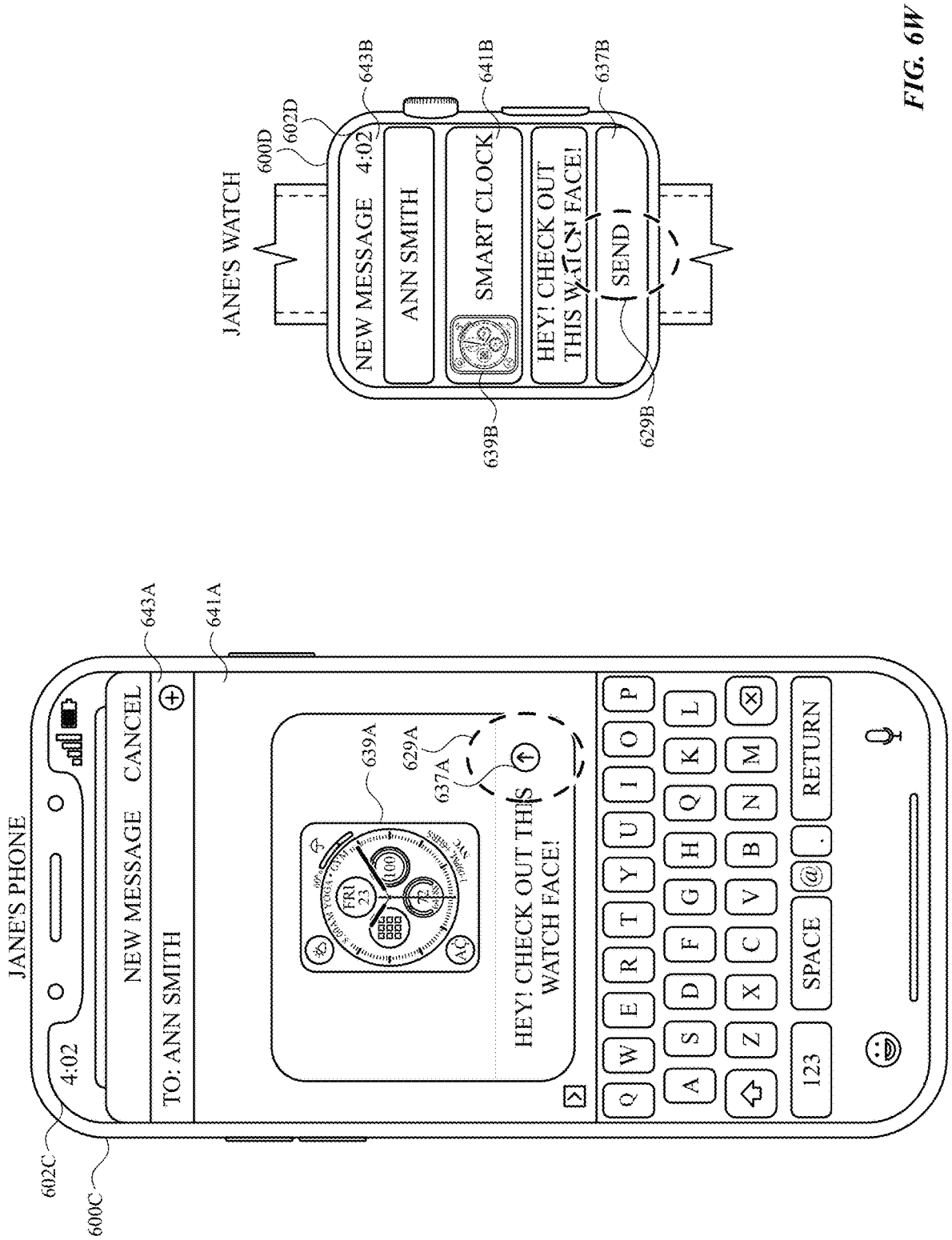

In response to receiving input 627A, computer device 600C displays, via display generation component 602C, a user interface 643A of a messaging application, where user interface 643A includes a message conversation 641A with contactable user 649A, as shown in FIG. 6W. Similarly, in response to receiving input 627B, computer system 600D displays, via display generation component 602D, a user interface 643B of a messaging application, where user interface 643B includes a message conversation 641B with contactable user 649B, as shown in FIG. 6W. As mentioned, sharing a watch user interface via a messaging application is one of several different communication channels through which the watch user interface can be shared with a different user.

In FIG. 6W, computer system 600C displays, in message conversation 641A, a preview 639A of the user interface template (corresponding to watch user interface 679) being shared and an affordance 637A for initiating the transmittal of a message that includes the user interface template to the recipient's computer system. While displaying message conversation 641A, computer system 600C receives (e.g., detects) an input 629A on affordance 637A. In some embodiments, input 629A is a touch input on display generation component 602A. In response to receiving input 629A on affordance 637A, computer system 600C transmits the message that includes the user interface template corresponding to watch user interface 679 to the recipient's computer system (e.g., similar to how computer system 600A received the first user interface template in FIG. 6E). Once received, the recipient can go through a process corresponding to the process described above with reference to FIGS. 6F-6S to configure/setup a new watch user interface based on the shared user interface template for use on the recipient's computer system.

Similarly, in FIG. 6W, computer system 600D displays, in message conversation 641B, a preview 639B of the user interface template (corresponding to watch user interface 679) being shared and an affordance 637B for initiating the transmittal of a message that includes the user interface template to the recipient's computer system. While displaying message conversation 641B, computer system 600D receives (e.g., detects) an input 629B on affordance 637B. In some embodiments, input 629B is a touch input on display generation component 602B. In response to receiving input 629B on affordance 637B, computer system 600D transmits the message that includes the user interface template corresponding to watch user interface 679 to the recipient's computer system for use by the recipient.

Figure 6Y:
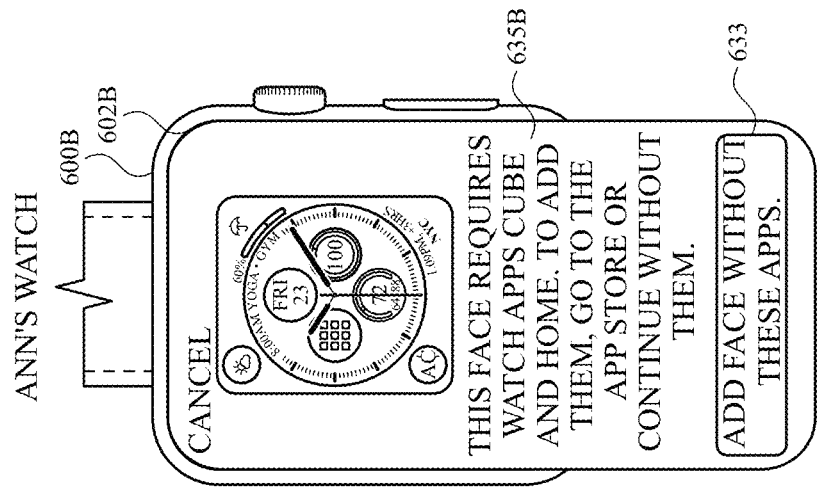
Figure 6X:
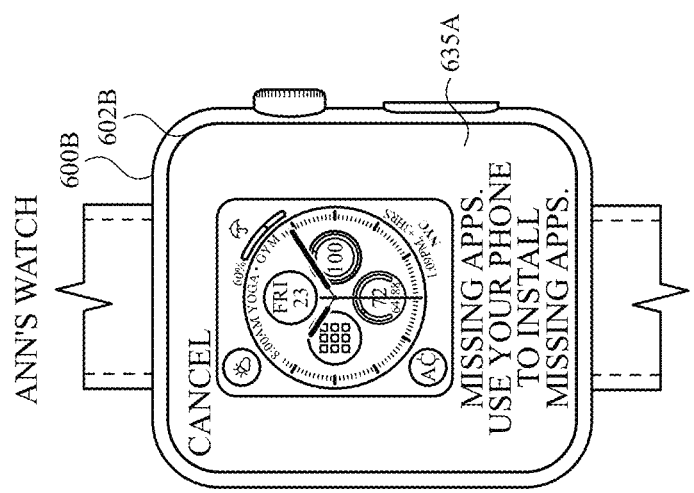
Figure 6A:
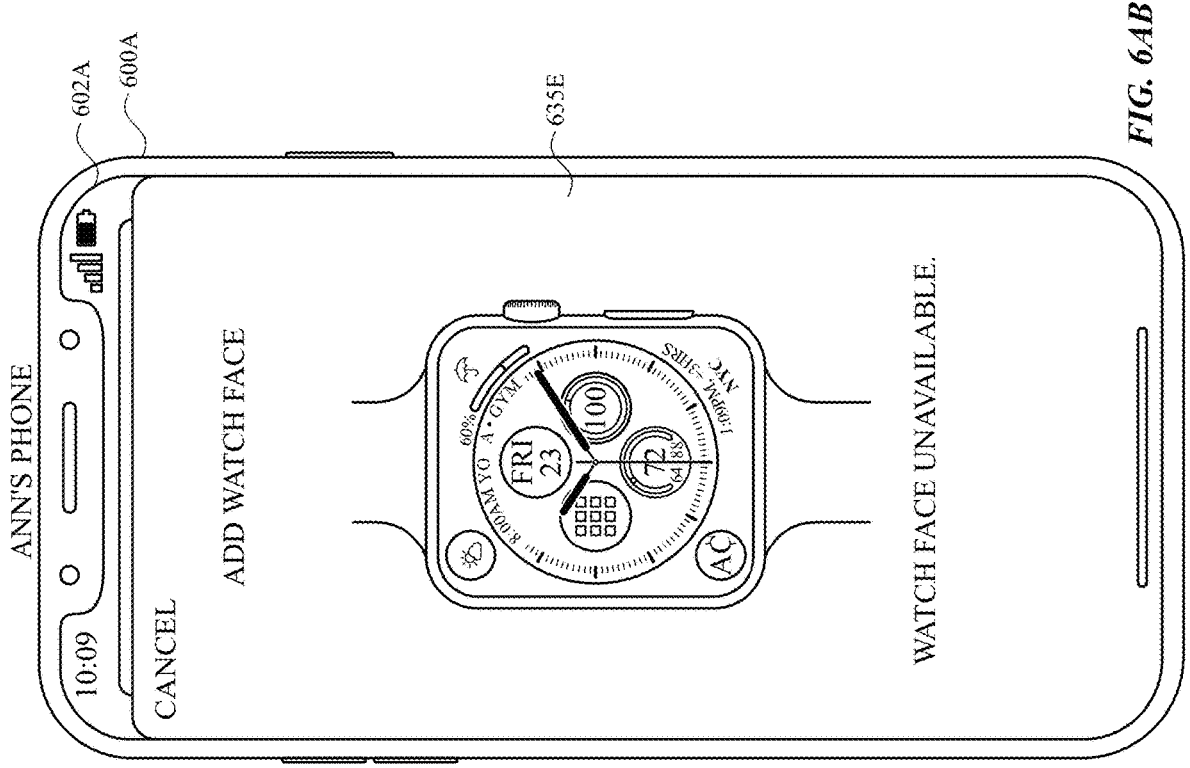
Figure 6A:
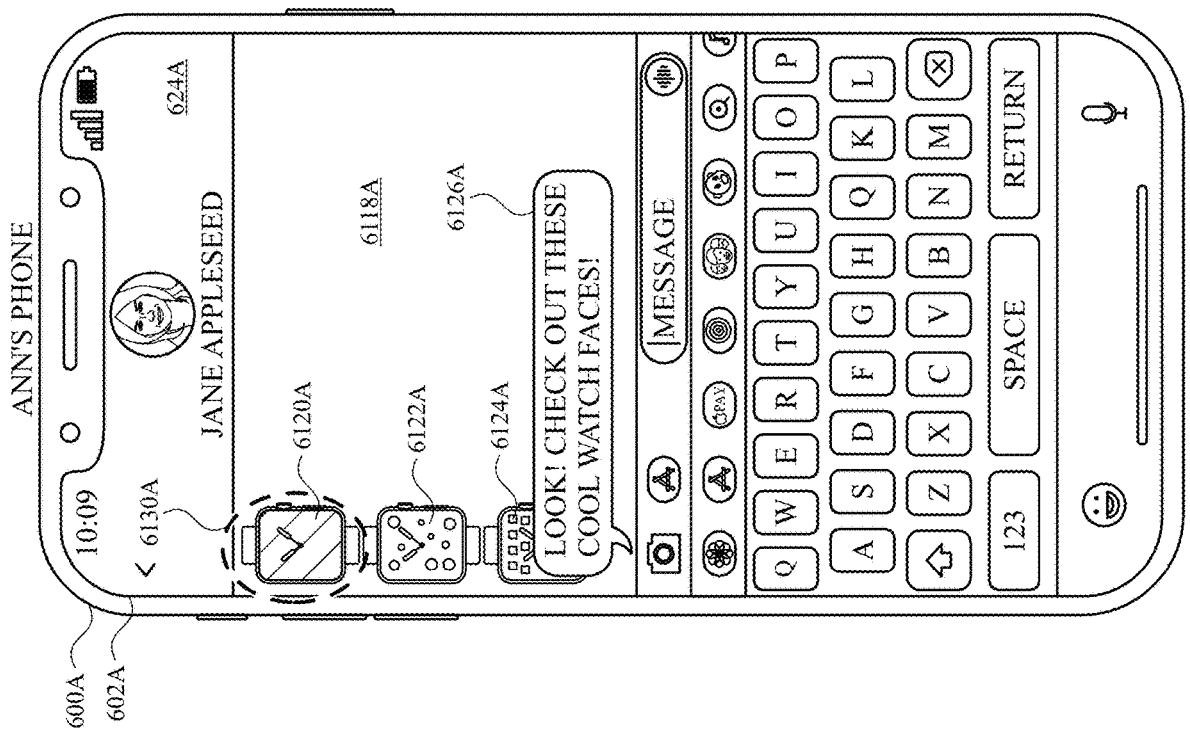
Figure 6A:
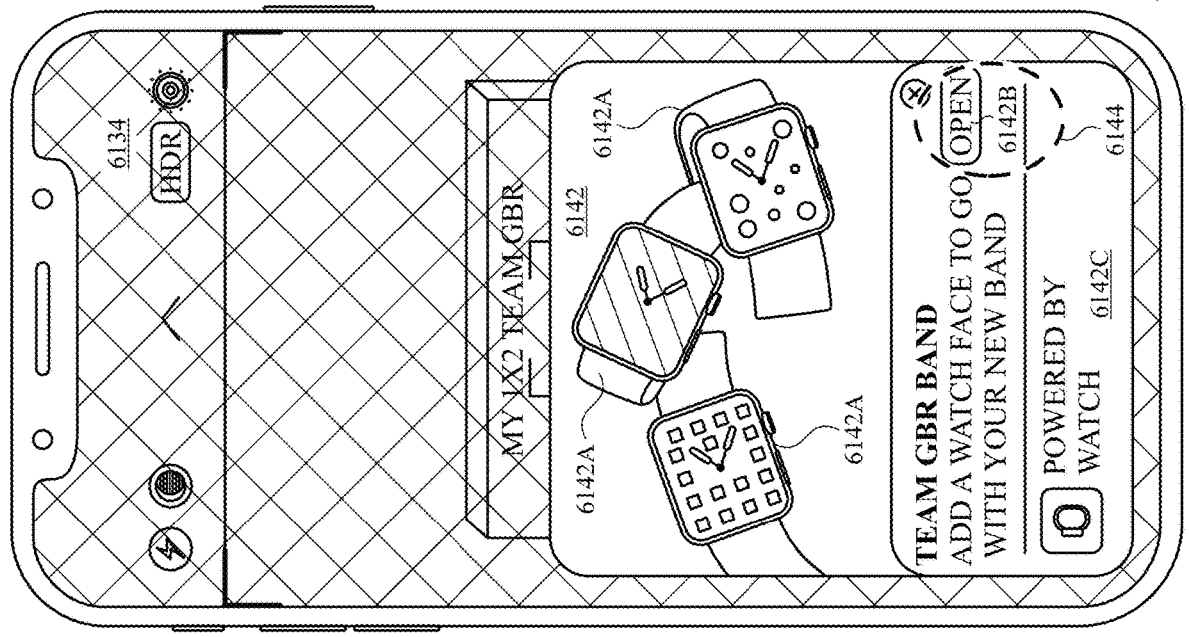
Figure 6A:
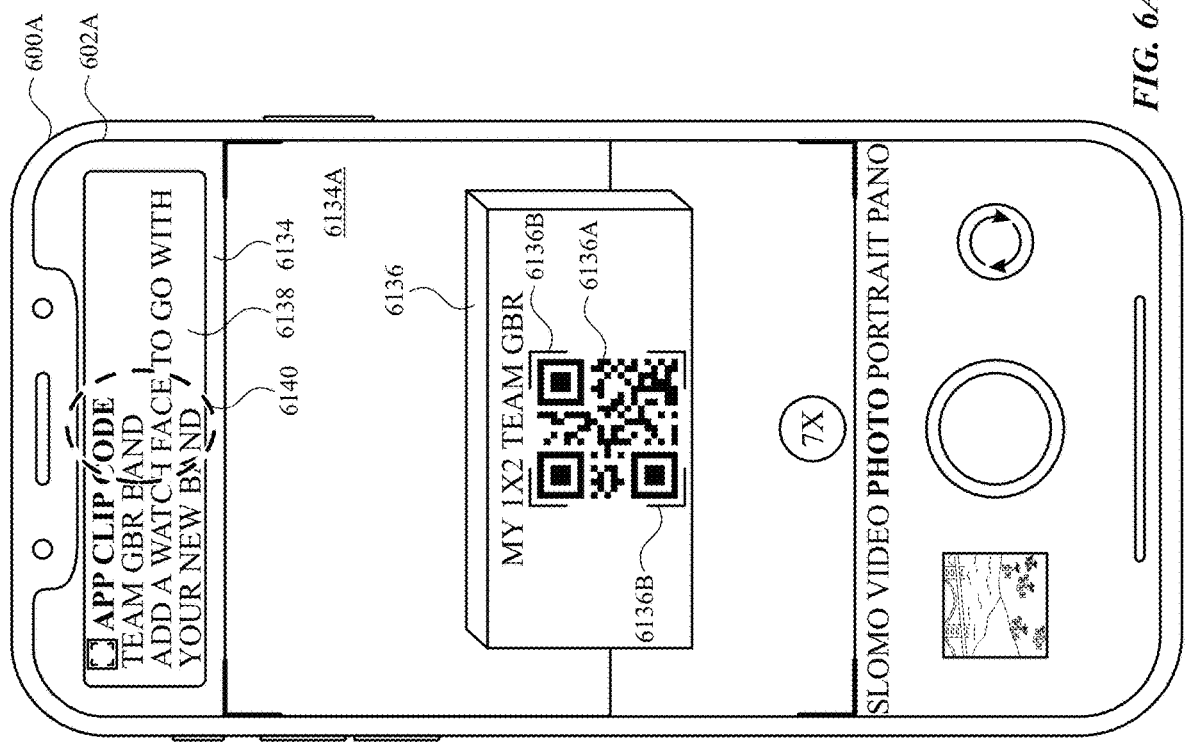
Figure 6A:
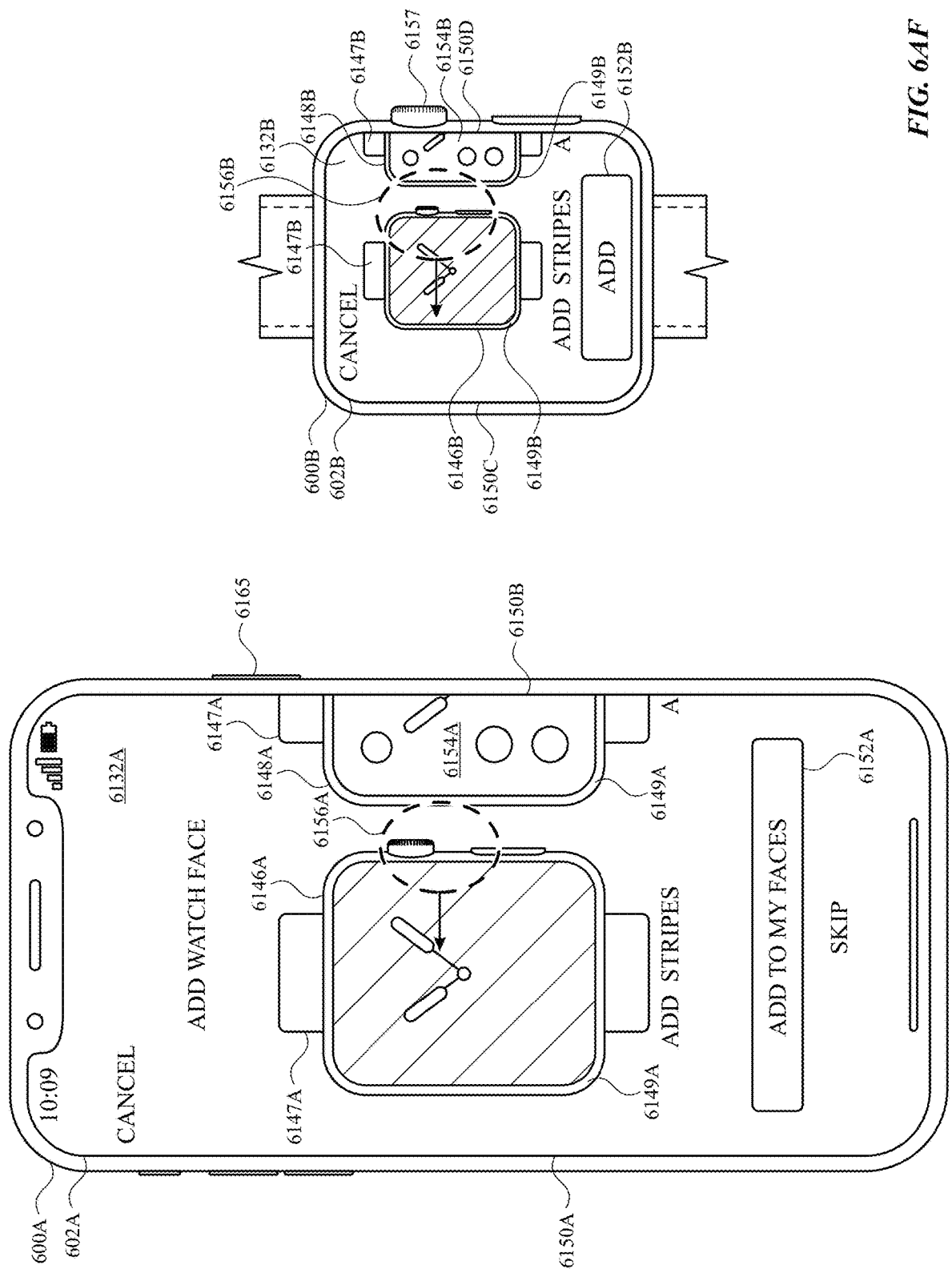
Figure 6A:
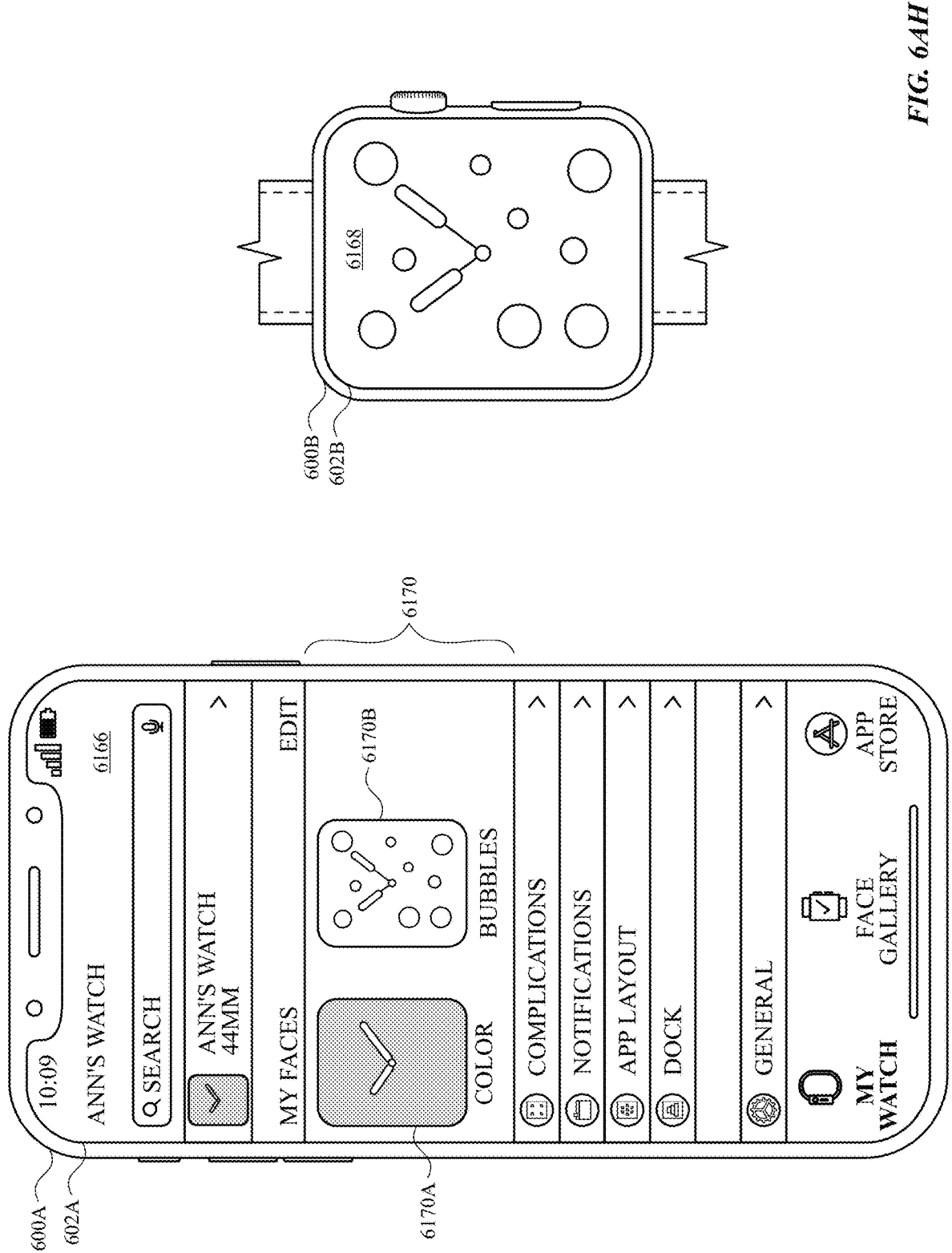

FIG. 6X illustrates computer system 600B displaying, via display generation component 602B, a first type of notification 635A (e.g., a prompt) concerning the configuration/setup process for a downloaded, received, and/or detected user interface template. In some embodiments, computer system 600B is not capable of directly downloading applications (e.g., from an application store or a website) onto computer system 600B (e.g., because computer system 600B does not have direct access to the Internet). In some embodiments, in accordance with a determination that computer system 600B is not capable of directly downloading applications onto computer system 600B (e.g., and upon detecting a request to initiate the process for configuring/setting up a new user interface template using computer system 600B), computer system 600B displays notification 635A indicating that that the process should be initiated on a different computer system (e.g., a computer system that is paired with computer system 600B, such as computer system 600A (e.g., a smartphone)) and/or indicating that one or more applications associated with the user interface template that are not currently available on computer system 600B should first be downloaded onto the different computer system (e.g., a computer system that is paired with computer system 600B, such as computer system 600A).

FIG. 6Y illustrates computer system 600B displaying, via display generation component 602B, a second type of notification 635B (e.g., a prompt) concerning the configuration/setup process for the downloaded, received, and/or detected user interface template. In some embodiments, computer system 600B is not capable of directly downloading applications (e.g., from a website or an application store) onto computer system 600B (e.g., because computer system 600B does not have direct access to the Internet). In some embodiments, in accordance with a determination that computer system 600B is not capable of directly downloading applications from an application store onto computer system 600B (e.g., and upon detecting a request to initiate the process for configuring/setting up a user interface template using computer system 600B), computer system 600B displays notification 635B indicating that one or more applications associated with the user interface template that are not currently available on computer system 600B should first be downloaded via an application store accessed on the different computer system (e.g., a computer system that is paired with computer system 600B, such as computer system 600A). In some embodiments, notification 635B also includes an affordance 633 (e.g., a selectable user interface object; an activatable user interface object) which, when activated (e.g., when selected), (e.g., immediately) completes the configuration/setup process and adds the user interface corresponding to the new user interface template to a user interface library of computer system 600B.

FIG. 6Z illustrates computer system 600A displaying, via display generation component 602A, a third type of notification 635C (e.g., a notification user interface) indicating that the type of user interface corresponding to the downloaded, received, and/or detected user interface template can only be used on certain types (e.g., certain models) of computer systems, and that the type of user interface corresponding to the user interface template cannot be used on (e.g., the new user interface template is not compatible with) the respective computer system (e.g., computer system 600B).

FIG. 6AA illustrates computer system 600A displaying, via display generation component 602A, a fourth type of notification 635D (e.g., a notification user interface) indicating that software (e.g., operating system software; operating system version) on the respective computer system (e.g., computer system 600B) for which the user interface corresponding to the downloaded, received, and/or detected user interface template is to be used needs to be updated in order for the user interface corresponding to the user interface template to be able to be used on the respective computer system (e.g., on computer system 600B). In some embodiments, notification 635D includes an affordance 631 (e.g., a selectable user interface object; an activatable user interface object) that, when activated, initiates a process for updating the software (e.g., operating system software; operating system version) on the respective computer system (e.g., on computer system 600B).

FIG. 6AB illustrates computer system 600A displaying, via display generation component 602A, a fifth type of notification 635E (e.g., a notification user interface) indicating that (e.g., for a miscellaneous reason) the user interface (e.g., or the type of user interface) corresponding to the downloaded, received, and/or detected user interface template cannot be used on the respective computer system (e.g., on computer system 600B).

In some embodiments, computer system 600A and/or computer system 600B are configured to enable selection of a watch face (e.g., a user interface corresponding to a user interface template) from a user interface that includes a plurality of watch faces (e.g., graphical representations of watch faces). For example, a user can select a particular watch face to add to a library of watch faces for computer system 600A and/or computer system 600B via selection of a watch face from the plurality of watch faces displayed on the user interface. As set forth below, in some embodiments, computer system 600A and/or computer system 600B receives a request to display the user interface including the plurality of watch faces. The request can include a message received via the messaging application, scanning of a QR code, scanning an NFC code, and/or information received from packaging of an accessory for computer system 600A and/or computer system 600B. The request can include information associated with one or more watch faces. When the request includes information associated with a single watch face, computer system 600A and computer system 600B display user interface 632A and user interface 632B, respectively, as set forth above with reference to FIG. 6F. When the request includes information associated with more than one watch face (e.g., two or more watch faces), computer system 600A and computer system 600B display user interface 6132A and user interface 6132B, respectively, as set forth below with reference to FIGS. 6AF and 6AG.

For instance, at FIG. 6AC, computer system 600A displays, via display generation component 602A, user interface 624A of the messaging application (e.g., a text messaging application, a chat application, an electronic mail application). User interface 624A of the messaging application displays a message conversation 6118A with a message participant (e.g., "Jane Appleseed"), where message conversation 6118A includes a received electronic communication that includes (e.g., as an attachment) first graphical representation 6120A of a first watch face, second graphical representation 6122A of a second watch face, and third graphical representation 6124A of a third watch face (e.g., third graphical representation 6124A is partially obscured by message 6126A) in message conversation 6118A. At FIG. 6AC, message conversation 6118A includes message 6126A associated with first graphical representation 6120A, second graphical representation 6122A, and/or third graphical representation 6124A (e.g., a message from the message participant that was received as part of the electronic communication that includes information associated with the first watch face corresponding to first graphical representation 6120A, the second watch face corresponding to second graphical representation 6122A, and/or the third watch face corresponding to third graphical representation 6124A). At FIG. 6AC, the first watch face corresponding to first graphical representation 6120A, the second watch face corresponding to second graphical representation 6122A, and the third watch face corresponding to third graphical representation 6124A are each different from one another.

Similarly, at FIG. 6AC, computer system 600B displays, via display generation component 602B, user interface 624B of the messaging application, where user interface 624B of the messaging application displays a message conversation 6118B with the message participant (e.g., "Jane Appleseed"). Message conversation 6118B includes a received electronic communication that includes (e.g., as an attachment) first graphical representation 6120B of the first watch face and second graphical representation 6122B of the second watch face (e.g., second graphical representation 6122B is partially obscured by message 6126B) in message conversation 6118B. In some embodiments, the received electronic communication also includes a third graphical representation of the third watch face. At FIG. 6AC, message conversation 6118B includes message 6126B associated with first graphical representation 6120B, second graphical representation 6122B, and/or third graphical representation (e.g., a message from the message participant that was received as part of the electronic communication that includes information associated with the first watch face corresponding to first graphical representation 6120B, the second watch face corresponding to second graphical representation 6122B, and/or the third watch face corresponding to third graphical representation).

At FIG. 6AC, while displaying message conversation 6118A, computer system 600A receives (e.g., detects) an input 6130A directed to downloading and/or adding one or more of the first watch face, the second watch face, and/or the third watch face. In some embodiments, input 6130A includes a touch input (e.g., or a press-and-hold input) on first graphical representation 6120A, as shown at FIG. 6AC. In some embodiments, input 6130A includes a touch input on a download affordance associated with the electronic communication and/or a touch input on second graphical representation 6122A and/or third graphical representation 6124A. Subsequent to (e.g., or in response to) receiving input 6130A, computer system 600A displays, via display generation component 602A, user interface 6132A for adding one or more of the first watch face, the second watch face, and/or the third watch face to the respective computer system (e.g., computer system 600B and/or a library of watch faces stored on computer system 600A and/or 600B), as shown in FIGS. 6AF and 6AG.

Similarly, at FIG. 6AC, while displaying message conversation 6118B, computer system 600B receives (e.g., detects) an input 6130B directed to downloading and/or adding one or more of the first watch face, the second watch face, and/or the third watch face. In some embodiments, input 6130B includes a touch input (e.g., or a press-and-hold input) on first graphical representation 6120B, as shown at FIG. 6AC. In some embodiments, input 6130B includes a touch input on a download affordance associated with the electronic communication and/or a touch input on second graphical representation 6122B and/or third graphical representation (e.g., when third graphical representation is displayed). Subsequent to (e.g., or in response to) receiving input 6130B, computer system 600B displays, via display generation component 602B, user interface 6132B for adding one or more of the first watch face, the second watch face, and/or the third watch face to the respective computer system (e.g., computer system 600B and/or a library of watch faces stored on computer system 600A and/or 600B), as shown in FIGS. 6AF and 6AG.

FIG. 6AD illustrates computer system 600A receiving a request to display user interface 6132A via receiving (e.g., scanning and/or capturing an image of) a QR code. For instance, at FIG. 6AD, computer system 600A displays, via display generation component, user interface 6134 of a scanning application (e.g., a camera application) of computer system 600A. At FIG. 6AD, user interface 6134 includes field of view representation 6134A, which includes a visual representation of an area surrounding computer system 600A and that is within a field of view of a camera of computer system 600A. Field of view representation 6134A includes packaging 6136 within the field of view of the camera of computer system 600A. At FIG. 6AD, packaging 6136 includes QR code 6136A on a side of packaging 6136. In some embodiments, packaging 6136 includes an indication (e.g., textual indication) that provides instructions to a user to scan QR code 6136A using the camera of computer system 600A (e.g., via user interface 6134). In some embodiments, packaging 6136 is a box, case, and/or container for an accessory of computer system 600B, such as a watch band. The accessory is included in the box, case, and/or container by the manufacturer for sale to consumers. As set forth below, the manufacturer of the accessory can generate and/or offer watch faces that are unique to the accessory (e.g., watch faces that include a particular color scheme, layout, and/or pattern that is similar to and/or compliments visual characteristics of the accessory). For instance, QR code 6136A includes information and/or data (e.g., data including color schemes and/or layouts of the watch faces and/or a link to download the data including color schemes and/or layouts of the watch faces) associated with the watch faces unique to the accessory.

At FIG. 6AD, computer system 600A detects QR code 6136A (e.g., via the camera) and displays indicator 6136B around QR code 6136A. Indicator 6136B provides at least an initial confirmation to the user that computer system 600A detects QR code 6136A and/or that computer system 600A will perform an action based on QR code 6136A. For instance, at FIG. 6AD, computer system 600A displays notification 6138 (e.g., a push notification) in response to detecting QR code 6136A. Notification 6138 includes textual indications related to information about the accessory (e.g., product included in packaging 6136), related to information about one or more watch faces associated with the accessory, and/or provides additional confirmation that computer system 600A detected QR code 6136A. At FIG. 6AD, computer system 600A detects user input 6140 (e.g., a tap gesture) corresponding to selection of notification 6138. In response to detecting user input 6140, computer system 600A displays user interface 6142 (e.g., a user interface graphical object overlaid over user interface 6134), as shown at FIG. 6AE. While FIGS. 6AD and 6AE illustrate an embodiment of a request to display the user interface including the plurality of watch faces from QR code 6136A, in some embodiments, computer system 600A and/or computer system 600B receive the request by scanning (e.g., via a camera and/or a sensor) another type of code and/or another technique for communicating with a component (e.g., a chip) of packaging 6136, such as an NFC code.

At FIG. 6AE, user interface 6142 includes visual indicator 6142A of one or more watch faces (e.g., generic watch faces and/or watch faces associated with the accessory and QR code 6136A), user interface object 6142B, and information indicator 6142C. In some embodiments, visual indicator 6142A of the one or more watch faces provides a visual preview of the watch faces that are associated with packaging 6136 and associated with QR code 6136A. In some embodiments, visual indicator 6142A of the one or more watch faces provides a generic image and/or illustration of watch faces that are not necessarily associated with packaging 6136 and/or QR code 6136A. In addition, information indicator 6142C includes information related to a computer system (e.g., computer system 600B) that is configured to receive, add, and/or display the one or more watch faces.

At FIG. 6AE, computer system 600A detects user input 6144 (e.g., a tap gesture) corresponding to selection of user interface object 6142B. In response to detecting user input 6144, computer system 600A displays user interface 6132A and/or computer system 600B displays user interface 6132B, as shown at FIG. 6AF.

At FIG. 6AF, computer system 600A displays user interface 6132A for adding a watch face to the respective computer system (e.g., computer system 600B) and computer system 600B displays the corresponding user interface 6132B for adding a watch face to the respective computer system (e.g., computer system 600B). At FIG. 6AF, user interface 6132A includes first graphical representation 6146A of a first watch face (e.g., the first watch face corresponding to first graphical representation 6120A) and second graphical representation 6148A of a second watch face (e.g., the second watch face corresponding to second graphical representation 6122A). The first watch face and the second watch face can be used on a type of computer system (e.g., a smartwatch), where the first watch face and/or the second watch face includes one or more complications that correspond to respective applications of the computer system. In some embodiments, message conversation 6118A and/or 6118B and/or information associated with QR code 6136A corresponds to a single watch face (e.g., instead of multiple watch faces, such as three watch faces shown in FIG. 6AC). In some such embodiments, computer system 600A and computer system 600B display user interface 632A and 632B (e.g., user interfaces that include a single graphical representation associated with a single watch face), respectively, instead of user interface 6132A and 6132B, as shown at FIG. 6AF.

As set forth above, in some embodiments, computer system 600A displays user interface 6132A in response to detecting QR code 6136A and/or user inputs 6140 and/or 6144. QR code 6136A can correspond to an accessory for the respective computer system that ultimately displays the first watch face and/or the second watch face. In some embodiments, first graphical representation 6146A and/or second graphical representation 6148A include an indication 6147A (e.g., a visual indication, a graphical representation) of the accessory (e.g., a watch band) that corresponds to QR code 6136A and/or packaging 6136. For example, indication 6147A can include a visual depiction of a watch band (e.g., the accessory) and include particular features, such as a color, a size, and/or a pattern, of the watch band. As such, first graphical representation 6146A and/or second graphical representation 6148A can provide a visual indication of how the first watch face and/or the second watch face, respectively, will appear with the particular accessory (e.g., appear with the particular features and/or characteristics of the accessory). In some embodiments, first graphical representation 6146A and/or second graphical representation 6148A can also include indication 6149A (e.g., a visual indication, a graphical representation) of one or more characteristics of the respective computer system (e.g., computer system 600B) configured to display the first watch face and/or the second watch face. For instance, indication 6149A can include a particular color of a housing and/or case of the respective computer system (e.g., computer system 600B) configured to display the first watch face and/or the second watch face. As such, indication 6149A enables a user to view a preview of the first watch face and/or the second watch face on the particular computer system that is ultimately configured to display the first watch face and/or the second watch face.

At FIG. 6AF, first graphical representation 6146A is in a first position with respect to display generation component 602A (or user interface 3132A). First graphical representation 6146A is substantially centered with respect to opposing edges 6150A and 6150B of display generation component 602A and is fully displayed (e.g., not obscured, hidden, and/or partially off of display generation component 602A) when at the first position. In addition, user interface 6132A includes add user interface object 6152A. As set forth below, in response to user input corresponding to selection of add user interface object 6152A, computer system 600A is configured to initiate a process for adding a watch face corresponding to a respective graphical representation that is in the first position of user interface 6132A. In some embodiments, computer system 600A initiates the process for adding a watch face corresponding to a respective graphical representation after (e.g., in response to) receiving user input, such as a tap gesture, corresponding to selection of the respective graphical representation. In some embodiments, computer system 600A initiates the process for adding a watch face corresponding to the graphical representation that is in the first position after (e.g., in response to) receiving user input, such as a press, corresponding to side button 6165 of computer system 600A.

At FIG. 6AF, second graphical representation 6148A is displayed in a second position with respect to display generation component 602A that is different from the first position. Second graphical representation 6148A is not substantially centered between opposing edges 6150A and 6150B of display generation component 602A. Additionally, second graphical representation 6148A is partially displayed on user interface 6132A at FIG. 6AF. For example, first portion 6154A of second graphical representation 6148A is displayed via display generation component 602A while a second portion of second graphical representation 6148A is not displayed and appears to be off of display generation component 602A (e.g., hidden and/or outside of edge 6150B of display generation component 602A). Partial display of second graphical representation 6148A provides visual feedback to a user that the second watch face corresponding to second graphical representation 6148A is not available for selection via add user interface object 6152A (e.g., second graphical representation 6148A is only partially visible signaling to the user that second graphical representation will not be added in response to selection of add user interface object 6152A).

Similar to computer system 600A, computer system 600B displays user interface 6132B for adding a watch face to the respective computer system (e.g., computer system 600B), as shown at FIG. 6AF. At FIG. 6AF, user interface 6132B includes first graphical representation 6146B of a first watch face (e.g., the first watch face corresponding to first graphical representation 6120B) and second graphical representation 6148B of a second watch face (e.g., the second watch face corresponding to second graphical representation 6122B). The first watch face and the second watch face can be used on a type of computer system (e.g., a smartwatch), where the first watch face and/or the second watch face includes one or more complications that correspond to respective applications of the computer system.

As set forth above, in some embodiments, computer system 600B displays user interface 6132B in response to detecting QR code 6136A and/or user inputs 6140 and/or 6144. QR code 6136A can correspond to an accessory for the respective computer system that ultimately displays the first watch face and/or the second watch face. In some embodiments, first graphical representation 6146B and/or second graphical representation 6148B include an indication 6147B (e.g., a visual indication, a graphical representation) of the accessory (e.g., a watch band) that corresponds to QR code 6136A and/or packaging 6136. For example, indication 6147B can include a visual depiction of a watch band (e.g., the accessory) and include particular features, such as a color, a size, and/or a pattern, of the watch band. As such, first graphical representation 6146B and/or second graphical representation 6148B can provide a visual indication of how the first watch face and/or the second watch face, respectively, will appear with the particular accessory (e.g., appear with the particular features and/or characteristics of the accessory). In some embodiments, first graphical representation 6146B and/or second graphical representation 6148B can also include indication 6149B (e.g., a graphical representation) of one or more characteristics of the respective computer system (e.g., computer system 600B) configured to display the first watch face and/or the second watch face. For instance, indication 6149B can include a particular color of a housing and/or case of the respective computer system (e.g., computer system 600B) configured to display the first watch face and/or the second watch face. As such, indication 6149B enables a user to view a preview of the first watch face and/or the second watch face on the particular computer system that is ultimately configured to display the first watch face and/or the second watch face.

At FIG. 6AF, first graphical representation 6146B is in a first position with respect to display generation component 602B (or user interface 6132B). First graphical representation 6146B is substantially centered with respect to opposing edges 6150C and 6150D of display generation component 602B and is fully displayed (e.g., not obscured, hidden, and/or partially off of display generation component 602A) when at the first position. In addition, user interface 6132B includes add user interface object 6152B. As set forth below, in response to user input corresponding to selection of add user interface object 6152B, computer system 600B is configured to initiate a process for adding and/or displaying a watch face corresponding to a respective graphical representation that is in the first position of user interface 6132B. In some embodiments, computer system 600B initiates the process for adding a watch face corresponding to a respective graphical representation after (e.g., in response to) receiving user input, such as a tap gesture, corresponding to selection of the respective graphical representation. In some embodiments, computer system 600B initiates the process for adding a watch face corresponding to the graphical representation that is in the first position of user interface 6132B after (e.g., in response to) receiving user input, such as a press, corresponding to rotatable input mechanism 6157 of computer system 600B.

At FIG. 6AF, second graphical representation 6148B is displayed in a second position with respect to display generation component 602B that is different from the first position. Second graphical representation 6148B is not substantially centered between opposing edges 6150C and 6150D of display generation component 602B. Additionally, second graphical representation 6148B is partially displayed on user interface 6132B at FIG. 6AF. For example, a first portion 6154B of second graphical representation 6148B is displayed via display generation component 602B while a second portion of second graphical representation 6148B is not displayed and appears to be off of display generation component 602B (e.g., hidden and/or outside of edge 6150D of display generation component 602A). Partial display of second graphical representation 6148B provides visual feedback to a user that the second watch face corresponding to second graphical representation 6148B is not available for selection via add user interface object 6152B (e.g., second graphical representation 6148B is only partially visible signaling to the user that second graphical representation will not be added in response to selection of add user interface object 6152B).

At FIG. 6AF, while displaying user interface 6132A, computer system 600A detects user input 6156A (e.g., a swipe gesture, a tap gesture on second graphical representation 6148A). In response to detecting user input 6156A, computer system 600A translates first graphical representation 6146A and second graphical representation 6148A on user interface 6132, as shown at FIG. 6AG. Similarly, while displaying user interface 6132B, computer system 600B detects user input 6156B (e.g., a swipe gesture, a rotation of rotatable input mechanism 6157, a tap gesture on second graphical representation 6148B). In response to detecting user input 6156B, computer system 600B translates first graphical representation 6146B and second graphical representation 6148B on user interface 6132B, as shown at FIG. 6AG.

At FIG. 6AG, computer system 600A displays first graphical representation 6146A at a third position on user interface 6132A. While in the third position, computer system 600A partially displays first graphical representation 6146A on user interface 6132A. For instance, first portion 6158A of first graphical representation 6146A is displayed on display generation component 602A, but a second portion of first graphical representation 6146A is not displayed and spears to be off of display generation component 602A (e.g., the second portion is hidden from view on display generation component 602A; the second portion extends beyond edge 6150A). In addition, at FIG. 6AG, computer system 600A displays third graphical representation 6160A of a third watch face (e.g., the third watch face corresponding to third graphical representation 6124A) at the second position. As set forth above, when in the second position, computer system 600A partially displays third graphical representation 6160A on display generation component 602A. For example, first portion 6162A of third graphical representation 6160A is displayed on display generation component 602A and a second portion of third graphical representation 6160A is not displayed and appears to be off of display generation component 602A (e.g., the second portion is hidden from view on display generation component 602A; the second portion extends beyond edge 6150B).

Further, at FIG. 6AG, computer system 600A displays second graphical representation 6148A at the first position, which is a substantially centered position on display generation component 602A with respect to opposing edges 6150A and 6150B of display generation component 602A (e.g., a substantially centered position on user interface 6132A). In response to detecting user input 6156A, computer system 600 maintains display of add user interface object 6152A at the same position on user interface 6132A. For example, add user interface object 6152A does not change positions on display generation component 602A and/or on user interface 6132A even when computer system 600A adjusts positions of (e.g., translates, scrolls) graphical representations 6146A, 6148A, and/or 6160A. As set forth above, in response to detecting user input corresponding to selection of add user interface object 6152A, computer system 600A initiates a process for adding a watch face corresponding to the graphical representation that is in the first position. For example, at FIG. 6AG, computer system 600A detects user input 6164A (e.g., a tap gesture) on add user interface object 6152A. In response to detecting user input 6164A, computer system 600A adds the second watch face corresponding to second graphical representation 6148A to a watch face library of computer system 600A and/or computer system 600B. After detecting user input 6164A, computer system 600A displays watch face library user interface 6166, as shown at FIG. 6AH. In some embodiments, computer system 600A initiates the process for adding a watch face corresponding to a respective graphical representation after (e.g., in response to) receiving user input, such as a tap gesture, corresponding to selection of the respective graphical representation. In some embodiments, computer system 600A initiates the process for adding a watch face corresponding to the graphical representation that is in the first position after (e.g., in response to) receiving user input, such as a press, corresponding to side button 6165 of computer system 600A.

Similar to computer system 600A, at FIG. 6AG, computer system 600B displays first graphical representation 6146B at a third position on user interface 6132B in response to detecting user input 6156B. While in the third position, computer system 600B partially displays first graphical representation 6146B on user interface 6132B. For instance, first portion 6158B of first graphical representation 6146B is displayed on display generation component 602B, but a second portion of first graphical representation 6146B is not displayed and appears to be off of display generation component 602B (e.g., the second portion is hidden from view on display generation component 602A; the second portion extends beyond edge 6150C). In addition, at FIG. 6AG, computer system 600B displays third graphical representation 6160B of a third watch face (e.g., the third watch face corresponding to third graphical representation 6124A) at the second position. As set forth above, when in the second position, computer system 600B partially displays third graphical representation 6160B on display generation component 602B. For example, first portion 6162B of third graphical representation 6160B is displayed on display generation component 602B and a second portion of third graphical representation 6160B is not displayed and appears to be off of display generation component 602B (e.g., the second portion is hidden from view on display generation component 602B; the second portion extends beyond edge 6150D).

Further, at FIG. 6AG, computer system 600B displays second graphical representation 6148B at the first position, which is a substantially centered position on display generation component 602B with respect to opposing edges 6150C and 6150D of display generation component 602B (e.g., a substantially centered position on user interface 6132B). In response to detecting user input 6156B, computer system 600 maintains display of add user interface object 6152B at the same position on user interface 6132B. For example, add user interface object 6152B does not change positions on display generation component 602B and/or on user interface 6132B even when computer system 600B adjusts positions of (e.g., translates, scrolls) graphical representations 6146B, 6148B, and/or 6160B. As set forth above, in response to detecting user input corresponding to selection of add user interface object 6152B, computer system 600B initiates a process for adding a watch face corresponding to the graphical representation that is in the first position. For example, at FIG. 6AG, computer system 600B detects user input 6164B (e.g., a tap gesture) on add user interface object 6152B. In response to detecting user input 6164B, computer system 600B adds the second watch face corresponding to second graphical representation 6148B to a watch face library of computer system 600A and/or computer system 600B. In some embodiments, after detecting user input 6164B, computer system 600B displays watch face user interface 6168 corresponding to the second watch face, as shown at FIG. 6AH. In some embodiments, computer system 600B initiates the process for adding a watch face corresponding to a respective graphical representation after (e.g., in response to) receiving user input, such as a tap gesture, corresponding to selection of the respective graphical representation. In some embodiments, computer system 600B initiates the process for adding a watch face corresponding to the graphical representation that is in the first position after (e.g., in response to) receiving user input, such as a press, corresponding to rotatable input mechanism 6157 of computer system 600B.

At FIG. 6AH, computer system 600A displays watch face library user interface 6166. Watch face library user interface 6166 includes available watch faces region 6170, which includes first graphical representation 6170A (e.g., labeled "Color") of a first watch face and second graphical representation 6170B (e.g., labeled "Bubbles") of a second watch face. In response to detecting user input 6164A, computer system 600A displays second graphical representation 6170B of the second watch face in available watch faces region 6170 of watch face library user interface 6166. Second graphical representation 6170B corresponds to the second watch face of second graphical representation 6148A. For example, computer system 600A adds and/or makes available the second watch face for display on computer system 600B, via display generation component 600B. In some embodiments, in response to detecting user input corresponding to selection of second graphical representation 6170B, computer system 600A causes (e.g., transmits a signal to and/or otherwise communicates with) computer system 600B to display, via display generation component 600B, the second watch face. In some embodiments, computer system 600B displays the second watch face in response to user input 6164B (e.g., without user input corresponding to selection of second graphical representation 6170B).

At FIG. 6AH, computer system 600B displays, via display generation component 600B, watch face user interface 6168, which corresponds to the second watch face. Therefore, computer system 600B is configured to ultimately display a watch face in response to receiving a request to obtain information associated with the watch face, such as a request via message conversation 6118A and/or 6118B and/or a request received via scanning an image of QR code 6136A, and in response to detecting user input on user interface 6132A and/or user interface 6132B (e.g., user interfaces displaying multiple watch faces that are available for adding to the respective computer system (e.g., computer system 600B)).

FIGS. 7A-7F are a flow diagram illustrating a method for managing user interface sharing using a computer system (e.g., an electronic device), in accordance with some embodiments. Method 700 is performed at a computer system (e.g., an electronic device (e.g., 100, 300, 500, 600A, 600B)) that is in communication with a display generation component (e.g., a display, a touch-sensitive display (e.g., 112)). Some operations in method 700 are, optionally, combined, the orders of some operations are, optionally, changed, and some operations are, optionally, omitted.

As described below, method 700 provides an intuitive way for managing user interface sharing. The method reduces the cognitive burden on a user for managing user interface sharing, thereby creating a more efficient human-machine interface. For battery-operated computer systems (e.g., computing devices; electronic devices), enabling a user to manage user interface sharing faster and more efficiently conserves power and increases the time between battery charges.

The computer system (e.g., 600A; 600B) receives (702) (e.g., from a second computer system (e.g., a second electronic device; a second smart device, such as a second smartphone or a second smartwatch; an external server)), a representation (e.g., 634A; 634B) of a first user interface template (e.g., a template of a watch face or clock user interface created by and/or shared by another user; a template of a watch face or clock user interface created on a different computer system or electronic device and received from the different computer system or electronic device) that specifies an arrangement of user interface elements (e.g., previews/images of watch complications; where the user interface elements can include one or more of 636A, 638A, 640A, 642A, 644A, 646A, 648A, 650A; 636B, 638B, 640B, 642B, 644B, 646B, 648B, and/or 650B) including a first user interface element (e.g., a first watch complication) corresponding to a first application (e.g., the application that controls the corresponding first watch complication) and one or more other user interface elements (e.g., one or more other/different watch complications corresponding to other/different applications; an indication of a time and/or date; or one or more other watch complications corresponding to a system feature) corresponding to software that is different from the first application. Receiving a representation of a first user interface template that specifies an arrangement of user interface elements (e.g., as opposed to creating a user interface with the first user interface template on the computer system) enables convenient creation of user interfaces and reduces the number of inputs needed to create a user interface. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the representation (e.g., 634A; 634B) of the first user interface template is received via a message in a message conversation (e.g., 626A; 626B; as an attachment file). In some embodiments, the representation of the first user interface template is received via NFC from a second computer system (e.g., 612; a second electronic device). In some embodiments, the representation of the first user interface template is received via a QR code scan (e.g., via 618). In some embodiments, the representation of the first user interface template is downloaded via a link (e.g., 610A; 610B) from a webpage (e.g., 606A; 606B). Providing various different methods to receive/access to a user interface template enables convenient access to the various different user interface templates. Providing additional control options/access to different operations for accessing the user interface templates enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

Subsequent to receiving the representation (e.g., 634A, 634B) of the first user interface template (e.g., and while displaying the representation of the first user interface template (or an indication or preview of the first user interface template)), the computer system (e.g., 600A; 600B) receives (708) a request (e.g., 609A; 609B; 611A; 611B) to use the first user interface template for a respective computer system (e.g., 600B; the current computer system (e.g., the current electronic device), a different computer system (e.g., 600B; a different electronic device) that is paired with the current computer system (e.g., the current electronic device)) that includes a plurality of installed applications.

In response to receiving (710) the request (e.g., 609A; 609B; 611A; 611B) to use the first user interface template for the respective computer system (e.g., 600B), the computer system (e.g., 600A; 600B) initiates (712) a process for (e.g., as shown in FIGS. 6F-6G, 6I-6J, and/or 6L-6R) creating a user interface for the respective computer system using the first user interface template. Initiating the process for creating a user interface for the respective computer system using the first user interface template provides quick and easy access to the process for creating the user interface. In some embodiments, the process for creating the user interface is initiated automatically without user input. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

The process for (e.g., as shown in FIGS. 6F-6G, 6I-6J, and/or 6L-6R) creating the user interface for the respective computer system (e.g., 600B) using the first user interface template includes (714), in accordance with a determination that the first application is not available on (e.g., not installed on; not downloaded onto; not locally accessible on) the respective computer system, the computer system (e.g., 600A; 600B) displaying (716), via the display generation component (e.g., 602A; 602B), an alert (e.g., user interface 632A of FIG. 6M; user interface 632B of FIG. 6M; user interface 632A of FIG. 6N; user interface 632B of FIG. 6N; a notification; a prompt; a message; an affordance) indicating that the first application needs to be installed on the respective computer system in order for the first user interface template to be used to create a user interface for the respective computer system that includes the first user interface element from the first user interface template; and in accordance with a determination that the first application is available on (e.g., downloaded onto; installed on; locally accessible on) the respective computer system, the computer system forgoing displaying (718), via the display generation component, the alert indicating that the first application needs to be installed on the respective computer system in order for the first user interface template to be used to create a user interface for the respective computer system that includes the first user interface element from the first user interface template. Displaying the alert indicating that the first application needs to be installed on the respective computer system in accordance with the determination that the first application is not available on the respective computer system enables a user to quickly and easily recognize that further action must be taken to enable use of the user interface on the computer system. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the process for (e.g., as shown in FIGS. 6F-6G, 6I-6J, and/or 6L-6R) creating the user interface for the respective computer system (e.g., 600B) using the first user interface template includes (714), in accordance with the determination (724) that the first application is not available on the respective computer system, the computer system (e.g., 600A; 600B) displaying (724), via the display generation component (e.g., 602A; 602B), an affordance (e.g., 678A; 678B; 682A; 682B; an install affordance or an install prompt that can be selected to initiate the download and/or installing of the first application on the computer system) that, when activated, initiates a process (e.g., displays an application store) for installing the first application on the respective computer system (e.g., downloading the first application (e.g., from the application store; from an external server) onto the respective computer system and installing the first application on the respective computer system). Displaying the affordance that, when activated, initiates the process for installing the first application on the respective computer system enables a user to easily control, during the configuration/setup process, whether or not the first application should be installed on the respective computer. Providing easily accessible control options enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the affordance (e.g., 678A; 678B; 682A; 682B) is displayed after (e.g., in response to) receiving the request to use the first user interface template for the respective computer system (e.g., 600B). In some embodiments, the affordance is displayed concurrently with the alert (e.g., user interface 632A of FIG. 6M; user interface 632B of FIG. 6M; user interface 632A of FIG. 6N; user interface 632B of FIG. 6N) indicating that the first application needs to be installed on the respective computer system in order for the first user interface template to be used to create a user interface for the respective computer system that includes the first user interface element from the first user interface template. Displaying the affordance concurrently with the alert enables a user to quickly and easily recognize that the affordance relates to the first user interface element that is indicated (e.g., highlighted) via the alert. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the process for (e.g., as shown in FIGS. 6F-6G, 6I-6J, and/or 6L-6R) creating the user interface for the respective computer system (e.g., 600B) using the first user interface template includes, in accordance with a determination that the affordance (e.g., 678A; 678B; 682A; 682B) was not activated (e.g., the user affirmatively chooses to proceed without installing the first application (e.g., by selecting an affordance to continue without installing the first application on the respective computer system or by selecting an affordance to dismiss the affordance for installing the first application on the respective computer system), the user does not select the affordance for a predetermined time period (e.g., 5 seconds; 10 seconds) while the affordance was displayed), the computer system (e.g., 600A; 600B) continuing (728) the process for creating the user interface for the respective computer system using the first user interface template without installing (e.g., without downloading and installing) the first application on the respective computer system, where the first user interface template is configured to (e.g., set to; modified to) not include the first user interface element (e.g., the first watch complication) corresponding to the first application. Continuing (e.g., automatically, without further user input) the process for creating the user interface for the respective computer system if the user does not select the affordance for a predetermined time period optimizes the configuration/setup process by enabling the process to proceed if a user input is not detected for a prolonged period of time. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, during the process for (e.g., as shown in FIGS. 6F-6G, 6I-6J, and/or 6L-6R) creating the user interface for the respective computer system (e.g., 600B) using the first user interface template, while displaying the affordance (e.g., 678A; 678B; 682A; 682B), the computer system (e.g., 600A; 600B) detects (e.g., via one or more input devices of the computer system, such as a touch-sensitive surface that is integrated with the display generation component (e.g., 602A; 602B)) an activation (e.g., 615A; 615B) of (e.g., user selection of) the affordance, and in response to detecting the activation of the affordance, initiates (730) the process for installing the first application on the respective computer system. Enabling the initiation of the process for installing the first application via the affordance provided during the configuration/setup process enables a user to quickly and easily install the first application. Providing easily accessible control options enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the process for (e.g., as shown in 6N-6O) installing the first application on the respective computer system (e.g., 600B) includes displaying (e.g., on the computer system (e.g., 600A; 600B) and/or on the respective computer system) an application store (e.g., 6100A; 6100B; 686A; 686B) for downloading the first application onto the respective computer system and/or downloading (e.g., automatically, without displaying the application store) the first application onto the respective computer system.

In some embodiments, the one or more other user interface elements (e.g., where the user interface elements can include one or more of 636A, 638A, 640A, 642A, 644A, 646A, 648A, 650A; 636B, 638B, 640B, 642B, 644B, 646B, 648B, and/or 650B) include (704) a second user interface element (different from the first user interface element and arranged at a different location/position within the first user interface template than the first user interface element) (e.g., a second watch complication) corresponding to a second application different from the first application, where the process for creating the user interface for the respective computer system (e.g., 600B) using the first user interface template includes (e.g., after displaying the alert (732) indicating that the first application needs to be installed on the respective computer system or forgoing displaying the alert): in accordance with a determination that the second application (e.g., that controls the second user interface element) is not available on (e.g., not installed on; not downloaded onto; not locally accessible on) the respective computer system, the computer system (e.g., 600A; 600B) displaying (720), via the display generation component (e.g., 602A; 602B), a second alert (e.g., user interface 632A of FIG. 6H; user interface 632B of FIG. 6H; user interface 732A of FIG. 6I; user interface 632B of FIG. 6I; a notification; a prompt; a message) indicating that the second application needs to be installed on the respective computer system in order for the first user interface template to be used to create a user interface for the respective computer system that includes the second user interface element from the first user interface template (e.g., the second alert is displayed after the computer system has displayed and is no longer displaying the alert); and in accordance with a determination that the second application is available on (e.g., downloaded onto; installed on; locally accessible on) the respective computer system, the computer system forgoing displaying (722), via the display generation component, the second alert indicating that the second application needs to be installed on the respective computer system in order for the first user interface template to be used to create a user interface for the respective computer system that includes the second user interface element from the first user interface template.

In some embodiments, the one or more other user interface elements (e.g., where the user interface elements can include one or more of 636A, 638A, 640A, 642A, 644A, 646A, 648A, 650A; 636B, 638B, 640B, 642B, 644B, 646B, 648B, and/or 650B) include a second user interface element (different from the first user interface element and arranged at a different location/position within the first user interface template than the first user interface element) (e.g., a second watch complication) corresponding to a second application different from the first application and a third user interface element (different from the first and second user interface elements and arranged at a different location/position within the first user interface template than the first and second user interface elements) (e.g., a third watch complication) corresponding to a third application different from the first application and the second application, where the process for creating the user interface for the respective computer system (e.g., 600B) using the first user interface template includes subsequent to (e.g., after) displaying the alert (e.g., user interface 632A of FIG. 6H; user interface 632B of FIG. 6H; user interface 732A of FIG. 6I; user interface 632B of FIG. 6I) (e.g., and while no longer displaying the alert), in accordance with a determination that the second application (e.g., that corresponds to the second user interface element) is not available on (e.g., not installed on; not downloaded onto; not locally accessible on) the respective computer system, the computer system (e.g., 600A; 600B) displaying (734), via the display generation component (e.g., 602A; 602B), a second alert (736) (e.g., user interface 632A of FIG. 6H; user interface 632B of FIG. 6H; user interface 732A of FIG. 6I; user interface 632B of FIG. 6I; a notification; a prompt; a message) indicating that the second application needs to be installed on the respective computer system in order for the first user interface template to be used to create a user interface for the respective computer system that includes the second user interface element from the first user interface template (e.g., the second alert is displayed after the computer system has displayed and is no longer displaying the alert), and subsequent to (e.g., after) displaying the second alert (e.g., and while no longer displaying the second alert), in accordance with a determination that the third application (e.g., that controls the second user interface element) is not available on (e.g., not installed on; not downloaded onto; not locally accessible on) the respective computer system, the computer system displaying (738), via the display generation component, a third alert (e.g., user interface 632A of FIG. 6H; user interface 632B of FIG. 6H; user interface 732A of FIG. 6I; user interface 632B of FIG. 6I; a notification; a prompt; a message) indicating that the third application needs to be installed on the respective computer system in order for the first user interface template to be used to create a user interface for the respective computer system that includes the third user interface element from the first user interface template (e.g., the third alert is displayed after the computer system has displayed and is no longer displaying the second alert). Displaying the alert, second alert, and third alert sequentially during the configuration/setup process enables the user to quickly and easily recognize a missing application for each respective stage, and therefore make an informed decision on whether or not to download the missing application. Providing improved control options enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the representation (e.g., 634A; 634B) of the user interface specifies (706) elements for the first application that is not available on (e.g., not installed on; not downloaded onto; not locally accessible on) the respective computer system and a second application that is not available on (e.g., not installed on; not downloaded onto; not locally accessible on) the respective computer system (e.g., 600B). In some embodiments, the process for (e.g., as shown in FIGS. 6F-6G, 6I-6J, and/or 6L-6R) creating the user interface for the respective computer system using the first user interface template includes the computer system (e.g., 600A; 600B) displaying (740), via the display generation component (e.g., 602A; 602B), a user interface for the first user interface element that includes a representation (e.g., 634A; 634B) of the first user interface template and one or more selectable user interface objects associated with the first user interface element, where the representation of the first user interface template includes the first user interface element corresponding to the first application (e.g., the representation of the first user interface template optionally includes a second user interface element (different from the first user interface element) corresponding to the second application). Displaying the user interface for the first user interface element that includes a representation of the first user interface template and one or more selectable user interface objects associated with the first user interface element during the configuration/setup process enables a user to quickly and easily recognize which, if any, applications may need to be installed on the computer system, and also recognize updates to the user interface as the user is making decisions for each of the user interface objects for which user action is needed. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the representation (e.g., 634A; 634B) of the first user interface template is displayed in a setup user interface (e.g., 623A; 623B) for configuring different user interface templates to be used to create different user interfaces for use (e.g., for use as a watch face user interface) on the respective computer system (e.g., 600B).

In some embodiments, while displaying the representation (e.g., 634A; 634B) of the first user interface template, and after receiving one or more inputs corresponding to a decision as to whether to make the first application available (e.g., install the first application), the computer system (e.g., 600A; 600B) receives (742) an input corresponding to a request to display a user interface for a second user interface element that includes a representation of the first user interface template and one or more selectable user interface objects associated with the second user interface element.

In some embodiments, in response to receiving (744) the request to display a user interface for the second user interface element, in accordance with a determination that (e.g., in accordance with receiving a request (e.g., detecting a user input)) the first application was selected for installation (e.g., based on the one or more inputs corresponding to the decision as to whether to install the first application) on the respective computer system (e.g., 600B), the computer system displaying (746) the user interface for the second user interface element includes displaying a representation of the first user interface element (e.g., as shown by watch user interface preview 634A in FIG. 6Q and watch user interface preview 634B in FIG. 6Q); and in accordance with a determination that (e.g., in accordance with receiving a request (e.g., detecting a user input); in accordance with a predetermined time period having passed) the first application was not selected for installation (e.g., based on the one or more inputs corresponding to the decision as to whether to install the first application) on the respective computer system, the computer system displaying (748) the user interface for the second user interface element includes displaying the representation of the first user interface template without displaying the first user interface element (e.g., as shown by watch user interface preview 634A and watch user interface preview 634B in FIG. 6N). Displaying the representation of the first user interface element in accordance with a determination that the first application was selected for installation and displaying the representation of the first user interface template without displaying the first user interface element in accordance with a determination that the first application was not selected for installation provides improved visual feedback about user action taken during the configuration/setup process, which in turn enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the representation (e.g., 634A; 634B) of the user interface specifies elements for a third application that is not available on (e.g., not installed on; not downloaded onto; not locally accessible on) the respective computer system (e.g., the representation of the first user interface template includes a third user interface element (different from the first user interface element and from the second user interface element) corresponding to the third application). In some embodiments, the process for creating the user interface for the respective computer system (e.g., 600B) using the first user interface template includes, while displaying the representation of the first user interface template, and after receiving one or more inputs corresponding to a decision as to whether to make the second application available (e.g., install the first application), the computer system (e.g., 600A; 600B) receiving (750) an input corresponding to a request to display a user interface for a third user interface element that includes a representation of the first user interface template and one or more selectable user interface objects associated with the third user interface element.

In some embodiments, in response to receiving (752) the request to display a user interface for the third user interface element, in accordance with a determination that (e.g., in accordance with receiving a request (e.g., detecting a user input)) the second application was selected for installation (e.g., based on the one or more inputs corresponding to the decision as to whether to install the first application) on the respective computer system (e.g., to be downloaded and installed on the respective computer system; to be made available on the respective computer system), the computer system displaying (754) the user interface for the third user interface element includes displaying a representation of the second user interface element (e.g., no longer highlighting; dimming; blurring) (e.g., as shown by watch user interface preview 634A in FIG. 6Q and watch user interface preview 634B in FIG. 6Q); and in accordance with a determination that (e.g., in accordance with receiving a request (e.g., detecting a user input); in accordance with a predetermined time period having passed) the second application was not selected for installation (e.g., based on the one or more inputs corresponding to the decision as to whether to install the first application) on the respective computer system (e.g., to not be downloaded and/or not be installed on the respective computer system), the computer system displaying (756) the user interface for the third user interface element includes displaying the representation of the first user interface template without displaying the second user interface element (e.g., as shown by watch user interface preview 634A and watch user interface preview 634B in FIG. 6N). Displaying the representation of the second user interface element in accordance with a determination that the second application was selected for installation and displaying the representation of the first user interface template without displaying the second user interface element in accordance with a determination that the second application was not selected for installation provides improved visual feedback about user action taken during the configuration/setup process, which in turn enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the process for (e.g., as shown in FIGS. 6F-6G, 6I-6J, and/or 6L-6R) creating the user interface for the respective computer system (e.g., 600B) using the first user interface template includes the computer system (e.g., 600A; 600B) displaying, via the display generation component (e.g., 602A; 602B), the representation (e.g., 634A; 634B) of the first user interface template. In some embodiments, the representation of the first user interface template is displayed in a setup user interface (e.g., 632A; 632B) for configuring different user interface templates to be used to create different user interfaces for use (e.g., for use as a watch face user interface) on the respective computer system. In some embodiments, while displaying the representation of the first user interface template, in accordance with the determination that the first application is not available on the respective computer system, the computer system displays, in the representation of the first user interface template, the first user interface element with a first visual characteristic (e.g., highlighted, brightened, and/or otherwise visually indicated such that the first user interface element is more visible/recognizable within the representation of the first user interface template) (e.g., as shown via complication previews 636A and 636B in FIG. 6M and complication previews 644A and 644B in FIG. 6N); and in accordance with the determination that the first application is available on the respective computer system, the computer system displays, in the representation of the first user interface template, the first user interface element with a second visual characteristic (e.g., not highlighted; dimmed; blurred) different from the first visual characteristic (e.g., as shown via complication previews in FIG. 6L other than complication previews 636A, 644A and 636B, 644B). Displaying the first user interface element with the first visual characteristic in accordance with the determination that the first application is not available on the respective computer system enables a user to quickly and easily recognize that the first application is not available (e.g., is not installed). Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, if the representation (e.g., 634A; 634B) of the first user interface template includes a plurality of respective user interface elements (e.g., 636A, 638A, 640A, 642A, 644A, 646A, 648A, 650A; 636B, 638B, 640B, 642B, 644B, 646B, 648B, 650B) corresponding to respective applications that are unavailable on the respective computer system (e.g., 600B), the computer system (e.g., 600A; 600B) displays, in the representation of the first user interface template, the plurality of respective user interface elements with the first visual characteristic (e.g., highlighted; brightened).

In some embodiments, receiving the representation (e.g., 634A; 634B) of the first user interface template comprises receiving (e.g., as an attachment; as a download link) the representation of the first user interface template via a messaging application (e.g., 624A; 624B; a text messaging application; a chat application; an electronic mail application). Receiving the representation of the first user interface template via the messaging application enables a user to conveniently receive the first user interface template from a different user. Providing convenient control options enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, receiving the representation (e.g., 634A; 634B) of the first user interface template includes the computer system (e.g., 600A; 600B) displaying, via the display generation component (e.g., 602A; 602B), a messaging user interface (e.g., 624A; 624B) showing a messaging conversation (e.g., 626A; 626B) with one or more other participants of a messaging application (e.g., a text messaging application; a chat application; an email application). In some embodiments, the computer system (e.g., 600A; 600B) displays, in the messaging user interface, a first message (e.g., 628A; 628B) corresponding to the representation of the first user interface template, where the first message includes an image (e.g., a preview image) showing the representation of the first user interface template. Displaying the first message where the message includes the image showing the representation of the first user interface template enables a user to quickly and easily view the first user interface template without needing to first download/store the first user interface template. Reducing the number of inputs needed to perform an operation enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the computer system more quickly and efficiently.

In some embodiments, receiving the request (e.g., 609A; 609B; 6105A; 6105B; 621A; 621B) to use the first user interface template for the respective computer system (e.g., 600B) includes detecting (e.g., via one or more input devices of the computer system, such as a touch-sensitive surface that is in communication with the device generation component) user selection of the image showing the representation (e.g., 628A; 628B) of the first user interface template in the first message. In some embodiments, receiving the request to use the first user interface template for the respective computer system includes detecting (e.g., via one or more input devices of the computer system, such as a touch-sensitive surface that is in communication with the device generation component) user selection of a link corresponding to the representation of the first user interface template.

In some embodiments, the process for (e.g., as shown in FIGS. 6F-6G, 6I-6J, and/or 6L-6R) creating the user interface for the respective computer system (e.g., 600B) using the first user interface template includes, in accordance with the determination that the first application is not available on (e.g., not downloaded on; not installed on; not accessible on) the respective computer system (e.g., as shown in 632B in FIG. 6M and 632B in FIG. 6N) (e.g., where the respective computer system is the same system as the computer system) (e.g., in response to receiving the request to use the first user interface template for the respective computer system), the computer system (e.g., 600A; 600B) initiating (e.g., via a short-range communication radio that is in communication with the computer system) a communication to a second computer system (e.g., 600B; 600A; a second electronic device (e.g., a smartphone)) that is coupled to (e.g., paired with) the computer system (e.g., an electronic device), where the communication includes instructions to continue the process for creating the user interface for the respective computer system using the first user interface template on the second computer system (instead of on the computer system). Enabling the process for creating the user interface to continue on the second computer system enables a user to conveniently complete the process on a different computer system if, for example, the process cannot be completed on the current computer system (e.g., because the current computer system does not have access to the Internet to download applications). Providing convenient control options enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the respective computer system (e.g., 600B) is the same system as the computer system (e.g., the respective computer system is the same device as the electronic device). In some embodiments, the computer system (e.g., 600B) is a wearable electronic device (e.g., a smartwatch). In some embodiments, the computer system does not have a direct connection with or direct access to the Internet. In some embodiments, the computer system is paired with (e.g., via a Bluetooth connection) a second computer system (e.g., 600A; a smartphone).

In some embodiments, the process for (e.g., as shown in FIGS. 6F-6G, 6I-6J, and/or 6L-6R) creating the user interface for the respective computer system (e.g., 600B) using the first user interface template includes, in accordance with the determination that the first application is not available on (e.g., not downloaded on; not installed on; not accessible on) the respective computer system (e.g., as shown in 632B in FIG. 6M and 632B in FIG. 6N) (e.g., where the respective computer system is the same system as the computer system) (e.g., in response to receiving the request to use the first user interface template for the respective computer system), the computer system (e.g., 600A; 600B) continuing the process for creating the user interface for the respective computer system using the first user interface template without installing (e.g., without downloading and installing) the first application on the respective computer system (e.g., as shown via 632A and 632B in FIG. 6M), where the first user interface template no longer includes the first user interface element corresponding to the first application (e.g., as shown in 632A and 632B in FIG. 6M). Enabling the process creating the user interface for the respective computer system using the first user interface template to continue without installing the first application provides user control over which applications should be installed and used for the user interface, and enables completion of the process even if not all unavailable (e.g., not installed) applications are installed. Providing improved control options enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, if the process for creating the user interface for the respective computer system (e.g., 600B) using the first user interface template is continued without installing the first application on the respective computer system, the first user interface, once used on the respective computer system (e.g., as a watch face user interface), does not include the first user interface element (e.g., where the user interface elements can include one or more of 636A, 638A, 640A, 642A, 644A, 646A, 648A, 650A; 636B, 638B, 640B, 642B, 644B, 646B, 648B, and/or 650B) corresponding to the first application. In some embodiments, if the process for creating the user interface for the respective computer system using the first user interface template is continued without installing the first application on the respective computer system but with installing a second application on the respective computer system, where the second application corresponds to a second user interface element (e.g., where the user interface elements can include one or more of 636A, 638A, 640A, 642A, 644A, 646A, 648A, 650A; 636B, 638B, 640B, 642B, 644B, 646B, 648B, and/or 650B) of the first user interface template, then the first user interface, once used on the respective computer system (e.g., as a watch face user interface), does not include the first user interface element corresponding to the first application but includes the second user interface element corresponding to the second application. Not including the first user interface element if the process for creating the user interface for the respective computer system using the first user interface template is continued without installing the first application on the respective computer system prevents the user interface from being created with a feature that may not properly function (e.g., because the corresponding first application is not installed), thereby enhancing the operability of the computer system and making the user-system interface more efficient.

In some embodiments, in accordance with the determination that the first application is not available on (e.g., not downloaded on; not installed on; not accessible on) the respective computer system (e.g., 600B) (e.g., as shown in FIG. 6N), the computer system (e.g., 600A; 600B) continues the process for (e.g., as shown in FIGS. 6F-6G, 6I-6J, and/or 6L-6R) creating the user interface for the respective computer system using the first user interface template, where continuing the process includes installing (e.g., by downloading and/or purchasing the respective application (e.g., from an app store)) the first application on the respective computer system (e.g., as shown in FIGS. 6N-6P). In some embodiments, the first user interface template maintains the first user interface element corresponding to the first application.

In some embodiments, in response to completing the process (e.g., as shown in FIGS. 6F-6G, 6I-6J, and/or 6L-6R) for creating the user interface for the respective computer system (e.g., 600B) using the first user interface template, the computer system (e.g., 600A; 600B) adds (e.g., initiating a process for adding) the user interface created using the first user interface template to a user interface library (e.g., a watch face library; a library of available watch faces that can be set as the current watch face for the respective computer system) for the respective computer system (e.g., a smartwatch). In some embodiments, in response to completing the process for creating the user interface and/or upon determining that the process for creating the user interface has been completed, the respective computer system automatically sets the user interface created using the first user interface template as a currently selected user interface (e.g., as shown by 656B in FIG. 6G, 6114B in FIG. 6K, and 699B in FIG. 6S) from the user interface library for the respective computer system (e.g., as the current watch face of the computer system). In some embodiments, in response to completing the process for creating the user interface for the respective computer system using the first user interface template, the computer system also displays (or causes display of), via the display generation component, an option to install one or more applications on the respective computer system corresponding to applications that were not available on the respective computer system and were, during the process for creating the user interface for the respective computer system using the first user interface template, not selected to be made available on the respective computer system. Providing the option to install one or more applications on the respective computer system corresponding to applications that are still not available on the respective computer system in response to completing the process for creating the user interface enables a user to quickly and easily download the unavailable applications even after the process has been completed. Providing improved control options enhances the operability of the computer system and makes the user-system interface more efficient In some embodiments, the representation (e.g., 600A; 600B) of the user interface specifies elements (e.g., 636A; 636B; 644A; 644B) for the first application that is not available on (e.g., not installed on; not downloaded onto; not locally accessible on) the respective computer system (e.g., 600B). In some embodiments, the process for creating the user interface for the respective computer system includes, in accordance with a determination that the first application is to be made available (e.g., installed) on (e.g., to be downloaded and installed on) the respective computer system (e.g., based on receiving a user indication or detecting one or more user inputs to install the first application on the respective computer system), the computer system initiating a process for making the first application available (e.g., installing) on the respective computer system, where, after completing the process for creating the user interface for the respective computer system using the first user interface template, the user interface created using the first user interface template is displayed on the respective computer system with the first user interface element (e.g., the first watch complication) corresponding to the first application; and in accordance with a determination that the first application is not to be made available on (e.g., not to be downloaded and/or installed on) the respective computer system (e.g., based on receiving a user indication or detecting one or more user inputs to not install the first application on the respective computer system), the computer system forgoing initiating the process for making the first application available (e.g., installing) on the respective computer system, where, after completing the process for creating the user interface for the respective computer system using the first user interface template, the user interface created using the first user interface template is displayed on the respective computer system without the first user interface element.

In some embodiments, the computer system (e.g., 600A; 600B) displays (or causes display of) the representation (e.g., 634A; 634B) of the first user interface template during the process for creating the user interface for the respective computer system using the first user interface template. In some embodiments, the first user interface template includes the first user interface element (e.g., the first watch complication) corresponding to the first application at a first location within the first user interface template. In some embodiments, the first user interface template includes one or more additional user interface elements (e.g., corresponding to different watch complication previews). In some embodiments, the one or more additional user interface elements are displayed at particular defined locations within the first user interface template.

In some embodiments, after creating the user interface using the first user interface template, the respective computer system (e.g., 600B) displays the user interface (e.g., 697; 679; as a watch face) created using the first user interface template, where the user interface includes the first user interface element (e.g., the first watch complication) corresponding to the first application at the first location (e.g., at the same location within the user interface that the first user interface element was displayed within the first user interface template). In some embodiments, other user interface elements are also displayed at corresponding locations within the user interface displayed on the respective computer system.

In some embodiments, if the first application was not available on the respective computer system (e.g., 600B) and the first application was not subsequently installed on the respective computer system, the respective computer system displays the user interface (e.g., 697; 679; as a watch face) created using the first user interface template, where the user interface does not include the first user interface element (e.g., the first watch complication) corresponding to the first user interface element and the first application at the first location (e.g., the same location within the user interface that the first user interface element was located in the first user interface template). In some embodiments, the other user interface elements (e.g., if their corresponding applications had been or were made available on the respective computer system) are still displayed at their corresponding locations within the user interface displayed on the respective computer system.

In some embodiments, after completing the process for (e.g., as shown in FIGS. 6F-6G, 6I-6J, and/or 6L-6R) creating the user interface for the respective computer system (e.g., 600B) using the first user interface template (e.g., and thus the user interface created using the first user interface template is ready to be displayed or used as a watch face), the computer system (e.g., 600A; 600B) causes display of (e.g., on the respective computer system; if the computer system is the same system as the respective computer system, on the computer system) the user interface created using the first user interface template (e.g., as shown by 656A and 656B in FIG. 6G, 6106A and 6114B in FIG. 6K, and 699A and 699B in FIG. 6S), where the first user interface element displayed in the user interface includes information (e.g., location information; date/time information; weather information; calendar information) obtained from the first application (e.g., related to a feature of the first application). In some embodiments, prior to causing display of the user interface created using the first user interface template, the computer system (e.g., 600) completes the process for creating the user interface for the respective computer system using the first user interface template. Displaying information obtained from the first application in the first user interface element displayed in the user interface provides a user with quick and easy access to the information without requiring an input to launch the application to obtain the information. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the information (e.g., location information; time/date information) included in the first user interface element displayed in the user interface (e.g., 697; 679) corresponds to location information (e.g., and the first application corresponds to a map application or a GPS-based application), and the information is determined (e.g., selected) based on a location setting (e.g., a pre-set location configuration or setting) from the first user interface template, where the location setting is configured to be a current location of the respective computer system (e.g., 600B). Configuring (e.g., automatically) the location setting to be a current location of the respective computer system enables a user to not have to provide additional inputs to manually set the location setting to the current location. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first user interface template, when received, was configured/setup for location information to be based on a current location of its source computer system or source device; in some embodiments in which this is the case, in the user interface created using the first user interface template, the information is automatically set to include location information that is based on the current location of the respective computer system (e.g., 600B).

In some embodiments, the information (e.g., location information; time/date information) included in the first user interface element displayed in the user interface (e.g., 697; 679) corresponds to location information (e.g., and the first application corresponds to a map application or a GPS-based application), and the information is determined (e.g., selected) based on a location setting (e.g., a pre-set location configuration or setting) from the first user interface template, where the location setting is configured to be a designated location different from a current location of the respective computer system (e.g., 600B). In some embodiments, the first user interface template, when received, was configured/setup for location information to be based on a location different from the current location of its source computer system or source device; in some embodiments in which this is the case, in the user interface created using the first user interface template, the information is automatically set to include location information that corresponds to that same different location from the source computer system or source device. Automatically (e.g., without user input) setting the information to include location information that corresponds to that same different location from the source computer system or source device results in the user interface maintaining a setting from the first user interface template, as may have been the user's preference, thereby enhancing the operability of the computer system and making the user-system interface more efficient.

In some embodiments, the information included in the first user interface element displayed in the user interface (e.g., 697; 679) corresponds to calendar information (e.g., schedule information; meeting information), and the information is determined based on application information from the first application accessed via the respective computer system (e.g., 600B), where the first application corresponds to a calendar application. In some embodiments, in the user interface created using the first user interface template, the information is automatically set to include schedule information that is based on a calendar application that is accessible on or by the respective computer system. Automatically setting the information to include schedule information that is based on the calendar application that is accessible on or by the respective computer system enables a user to not have to provide additional inputs to manually set the calendar settings for the user interface. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the first user interface template, when received, is configured to (e.g., set to) include (e.g., automatically include) a visual characteristic (e.g., a color, such as a background color and/or color scheme) that is selected based on context information accessible by (e.g., determinable by; detectable by) the respective computer system (e.g., 600B). In some embodiments, the visual characteristic includes a background color or background color scheme for the user interface, and the context information includes a color or color scheme of a housing of the computer system (e.g., an electronic device) or of a device accessory (e.g., case; cover) detected by (e.g., using one or more image sensors) the respective computer system.

In some embodiments, the respective computer system (e.g., 600B; a respective device) is a particular type or model within a device type category (e.g., a particular type or model of smartwatch). In some embodiments, in accordance with the determination that the first application is not available on the respective computer system, the computer system (e.g., 600A; 600B) detects (e.g., via one or more input devices that are in communication with the computer system) a request (e.g., user selection of the alert or an affordance in the alert indicating that the first application needs to be installed on the respective computer system in order for the first user interface template to be used to create a user interface for the respective computer system that includes the first user interface element from the first user interface template) to install (e.g., download and install) the first application on the respective computer system. In some embodiments, in response to detecting the request to install the first application on the respective computer system, in accordance with a determination that the first application cannot be installed on the respective computer system (e.g., because the first application cannot be downloaded on the respective computer system; because the first application is not compatible with the respective computer system), the computer system displays, via the display generation component, an indication (e.g., 635C; 635D; 635E; a notification; an error message) that the first application cannot be installed on the respective computer system. Displaying the indication that the first application cannot be installed on the respective computer system enables a user to quickly and easily recognize that the operation cannot be performed on the computer system. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. In some embodiments, in accordance with a determination that the first application can be installed on the respective computer system (e.g., 600B), the computer system (e.g., 600A; 600B) (if the computer system is the respective computer system) automatically downloads and installs the first application or causes (if the computer system is different from the respective computer system) the respective computer system to download and install the first application.

FIGS. 8A-8B are a flow diagram illustrating a method for managing user interface sharing using a computer system (e.g., an electronic device), in accordance with some embodiments. Method 800 is performed at a computer system (e.g., an electronic device (e.g., 100, 300, 500, 600A, 600B)) that is in communication with a display generation component (e.g., a display, a touch-sensitive display (e.g., 112, 602A, 602B)). Some operations in method 800 are, optionally, combined, the orders of some operations are, optionally, changed, and some operations are, optionally, omitted.

As described below, method 800 provides an intuitive way for managing user interface sharing. The method reduces the cognitive burden on a user for managing user interface sharing, thereby creating a more efficient human-machine interface. For battery-operated computer systems (e.g., computing devices; electronic devices), enabling a user to manage user interface sharing faster and more efficiently conserves power and increases the time between battery charges.

The computer system (e.g., 600A and/or 600B) (e.g., an electronic device; a smart device, such as a smartphone or a smartwatch; a mobile device; a wearable device) is in communication with a display generation component (e.g., 602A and/or 602B) and one or more input devices (e.g., 602A and/or 602B). The computer system (e.g., 600A and/or 600B) receives (802) a request (e.g., 6130A, 6130B, and/or 6144) to display a user interface (e.g., 6132A and/or 6132B) for selecting one or more watch faces to add to a library of watch faces for a respective computer system (e.g., 600B) (e.g., a request initiated by the computer system and/or an external computer system to transmit and/or receive data associated with one or more watch faces, such as scanning a code (e.g., via a camera of the computer system and/or the external computer system) and/or via a message (e.g., a message transmitted and/or received via the computer system and/or the external computer system).

In some embodiments, the request (e.g., 6130A, 6130B, and/or 6144) to display the user interface (e.g., 6132A and/or 6132B) for selecting the one or more watch faces to add to a library of watch faces for the respective computer system (e.g., 600B) includes a sequence of inputs (e.g., 6140 and/or 6144) received via the one or more input devices (e.g., 602A and/or 602B). For instance, the sequence of inputs includes scanning a code (e.g., 6136A) followed by one or more tap gestures (e.g., 6140 and/or 6144) on one or more user selectable user interface graphical elements (e.g., 6138, 6142, and/or 6142B) (e.g., a first user selectable user interface graphical element (e.g., 6138) is displayed in response to scanning the code (e.g., 6136A), a second user selectable user interface graphical element (e.g., 6142 and/or 6142B) is displayed in response to a tap gesture (e.g., 6140) corresponding to the first user selectable user interface graphical element (e.g., 6138), and the user interface (e.g., 6132A and/or 6132B) for selecting the one or more watch faces to add to the library of watches for the respective computer system is displayed in response to a tap gesture (e.g., 6144) corresponding to the second user selectable user interface graphical element (e.g., 6142 and/or 6142B)).

In response to receiving the request to display the user interface (e.g., 6132A and/or 6132B) for selecting one or more watch faces to add to a library of watch faces for the respective computer system (e.g., 600B) (804) and in accordance with a determination that the request is associated with two or more watch faces (e.g., the request includes a request to receive and/or transmit data associated with multiple (e.g., more than one) watch faces), the computer system (e.g., 600A and/or 600B) displays (806), via the display generation component (e.g., 602A and/or 602B), the user interface (e.g., 6132A and/or 6132B) for selecting one or more watch faces to add to a library of watch faces for the respective computer system (e.g., 600B).

Displaying the user interface (e.g., 6132A and/or 6132B) for selecting one or more watch faces to add to the library of watch faces for the respective computer system (e.g., 600B) includes the computer system (e.g., 600A and/or 600B) displaying a first graphical representation (808) (e.g., 6146A and/or 6146B) of a first watch face of the two or more watch faces associated with the request (e.g., a first graphical representation of a watch face or clock user interface created by and/or shared by another user, a first graphical representation of a watch face or clock user interface created on a different computer system or electronic device and received from the different computer system or electronic device, and/or a first graphical representation of a template of the first watch face that specifies a first arrangement of user interface elements (e.g., previews/images of one or more first watch complications)).

Displaying the user interface (e.g., 6132A and/or 6132B) for selecting one or more watch faces to add to the library of watch faces for the respective computer system (e.g., 600B) includes the computer system (e.g., 600A and/or 600B) displaying a second graphical representation (810) (e.g., 6146A, 6146B, 6160A, and/or 6160B) of a second watch face of the two or more watch faces associated with the request (e.g., a second graphical representation of a watch face or clock user interface created by and/or shared by another user, a second graphical representation of a watch face or clock user interface created on a different computer system or electronic device and received from the different computer system or electronic device, and/or a second graphical representation of a template of the second watch face that specifies a second arrangement of user interface elements (e.g., previews/images of one or more second watch complications)).

In some embodiments, in response to the computer system (e.g., 600A and/or 600B) receiving the request to display the user interface for selecting one or more watch faces to add to a library of watch faces for the respective computer system and in accordance with a determination that the request is associated with a single watch face (e.g., 634A and/or 634B) (e.g., the request includes a request to receive and/or transmit data associated with only one watch face), the computer system (e.g., 600A and/or 600B) displays (812), via the display generation component (e.g., 602A and/or 602B), the user interface (e.g., 632A and/or 632B) for selecting one or more watch faces to add to a library of watch faces for the respective computer system. Displaying the user interface (e.g., 632A and/or 632B) for selecting one or more watch faces to add to the library of watch faces for the respective computer system includes the computer system (e.g., 600A and/or 600B) displaying a third graphical representation (e.g., 634A and/or 634B) of a third watch face (e.g., the first graphical representation of the first watch face, the second graphical representation of the second watch face, or a third graphical representation of a third watch face that is different from the first graphical representation and the second graphical representation) associated with the request, without displaying another graphical representation of another watch face (e.g., the user interface for selecting one or more watch faces to add to a library of watch faces for the respective computer system includes a single (e.g., only one) graphical representation of a single (e.g., only one) watch face and does not include other graphical representations of other watch faces).

Distinguishing between requests that are associated with two or more watch faces versus requests that are associated with a single watch face causes the computer system to display only the watch faces associated with a particular request, thereby reducing an amount of graphical elements displayed on the display generation component and avoiding confusing the user. Providing additional control options without cluttering the UI with additional displayed controls improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While the computer system (e.g., 600A and/or 600B) displays the user interface for selecting one or more watch faces to add to a library of watch faces for the respective computer system, the computer system (e.g., 600A and/or 600B) receives (814), via the one or more input devices (e.g., 602A and/or 602B), an input (e.g., 6156A, 6156B, 6164A, and/or 6164B) (e.g., a tap gesture on the first graphical representation or the second graphical representation, a swipe gesture on the user interface to cause the first graphical representation or the second graphical representation to be centered with respect to the display generation component, and/or a tap gesture on a user selectable user interface graphical element (e.g., an "add" button)).

In some embodiments, while the computer system (e.g., 600A and/or 600B) displays the user interface for selecting one or more watch faces to add to a library of watch faces for the respective computer system, the computer system (e.g., 600A and/or 600B), displays (816), via the display generation component (e.g., 602A and/or 602B), the first graphical representation (e.g., 6146A and/or 6146B) at a first position (e.g., the position of first graphical representation 6146A and/or 6146B at FIG. 6AF) (e.g., a first position with respect to the display generation component; a position that is substantially centered with respect to a pair of opposing sides of a display generation component; and/or displaying the first graphical representation with a visual emphasis, such as by being displayed larger and/or brighter than other graphical representations, to indicate that the first watch face corresponding to the first graphical representation is the current target watch face) and the second graphical representation (e.g., 6148A and/or 6148B) at a second position (e.g., the position of second graphical representation 6148A and/or 6148B at FIG. 6AF) different from the first position (e.g., a second position with respect to the display generation component different from the first position so that the second graphical representation and the first graphical representation do not overlap with one another; a position that is not substantially centered with respect to the pair of opposing sides of the display generation component).

In some embodiments, while the computer system (e.g., 600A and/or 600B) displays the user interface for selecting one or more watch faces to add to a library of watch faces for the respective computer system, the computer system (e.g., 600A and/or 600B) receives (818), via the one or more input devices (e.g., 602A and/or 602B), a second input (e.g., 6156A and/or 6156B) (e.g., a swipe gesture).

In some embodiments, in response to receiving the second input (e.g., 6156A and/or 6156B), the computer system (e.g., 600A and/or 600B) displays (e.g., 820), via the display generation component (e.g., 602A and/or 602B), the first graphical representation (e.g., 6146A and/or 6146B) at a third position (e.g., the position of first graphical representation 6146A and/or 6146B at FIG. 6AG) (e.g., a position different from the first position and the second position; a position that is not substantially centered with respect to the pair of opposing sides of the display generation component) and the second graphical representation (e.g., 6148A and/or 6148B) at the first position (e.g., the position of second graphical representation 6148A and/or 6148B at FIG. 6AG) (e.g., a position that is substantially centered with respect to the pair of opposing sides of the display generation component).

Replacing display of the first graphical representation with the second graphical representation at the first position in response to the second input enables a user to quickly and efficiently select a desired watch face for adding to the library of watch faces, thereby reducing a number of inputs required by the user for adding a watch face to the library. Reducing the number of inputs required to perform an operation improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to receiving the input (822) and in accordance with a determination that the input (e.g., 6156A, 6156B, 6164A, and/or 6164B) corresponds to selection of the first watch face (e.g., 6146A and/or 6146B) (e.g., user input corresponding to selection of the first graphical representation), the computer system (e.g., 600A and/or 600B), initiates (824) a process for adding the first watch face (e.g., 6146A and/or 6146B) to a library of watch faces (e.g., 6170) (e.g., to add the first watch face to a watch face library of the computer system and/or an external computer system and/or to display the first watch face on the computer system and/or the external computer system) for the respective computer system (e.g., 600B) (e.g., the current computer system (e.g., the current electronic device); a different computer system (e.g., a different electronic device) that is paired with the current computer system (e.g., the current electronic device)).

In response to receiving the input (822) and in accordance with a determination that the input (e.g., 6156A, 6156B, 6164A, and/or 6164B) corresponds to selection of the second watch face (e.g., 6148A, 6148B, 6160A, and/or 6160B) (e.g., user input corresponding to selection of the second graphical representation), the computer system (e.g., 600A and/or 600B) initiates (826) a process for adding the second watch face (e.g., 6148A, 6148B, 6160A, and/or 6160B) to a library of watch faces (e.g., 6170) (e.g., to add the second watch face to a watch face library of the computer system and/or an external computer system and/or to display the second watch face on the computer system and/or the external computer system) for the respective computer system (e.g., 600B) (e.g., the current computer system (e.g., the current electronic device); a different computer system (e.g., a different electronic device) that is paired with the current computer system (e.g., the current electronic device)).

Displaying the first graphical representation of the first watch face and the second graphical representation of the second watch face enables a user to view multiple watch faces in response to the request to display the user interface for selecting one or more watch faces to add to a library of watch faces without the computer system receiving multiple data transmissions and/or requests. Reducing the number of data transmissions received by the computer system improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Initiating a process for selecting a first watch face or initiating a process for selecting a second watch face to add to a library of watch faces for the respective computer system in response to an input reduces a number of inputs needed for a user to find and add a particular watch face to the respective computer system. Reducing the number of inputs needed to perform an operation improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, receiving the request to display the user interface for selecting one or more watch faces to add to a library of watch faces for a respective computer system includes the computer system (e.g., 600A and/or 600B) receiving, via the one or more input devices (e.g., a camera and/or a scanner), a QR code (e.g., 618 and/or 6136A) (e.g., an image and/or information associated with a quick response code) including information associated with one or more watch faces (e.g., the QR code includes information (e.g., visual characteristics, such as color, background color, color scheme, complications, complication positions, font, and/or sizes of various graphical user interface objects) that is associated with one or more watch faces associated with the request).

In some embodiments, in addition to receiving the QR code (e.g., 6136A), receiving the request to display the user interface (e.g., 6132A and/or 6132B) for selecting one or more watch faces to add to a library of watch faces for a respective computer system (e.g., 600B) includes receiving one or more user inputs (e.g., 6140 and/or 6144) subsequent to receiving the QR code (e.g., 6136A). For instance, in response to receiving the QR code (e.g., 6136A), the computer system displays a first notification (e.g., 6138), and, while displaying the first notification (e.g., 6138), the computer system receives first user input (e.g., 6140) corresponding to selection of the first notification (e.g., 6138). In response to receiving the first user input (e.g., 6140), the computer system displays a second notification (e.g., 6142) (e.g., an overlay that partially overlaps with a currently displayed user interface), and, while displaying the second notification (e.g., 6142), the computer system receives second user input (e.g., 6144) corresponding to selection of the second notification (e.g., 6142 and/or 6142B) (e.g., selection of a user interface object of the second notification). In response to receiving the second user input (e.g., 6144), the computer system displays the user interface (e.g., 6132A and/or 6132B) for selecting one or more watch faces to add to the library of watch faces for a respective computer system.

Receiving the request to display the user interface for selecting one or more watch faces to add to a library of watch faces by receiving a QR code reduces the number of inputs required by the user for displaying the user interface. Reducing the number of inputs needed to perform an operation improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, receiving the request to display the user interface for selecting one or more watch faces to add to a library of watch faces for a respective computer system includes the computer system (e.g., 600A and/or 600B) receiving, via the one or more input devices (e.g., an NFC scanner, an NFC tag, and/or an NFC chip), NFC information (e.g., 612) (e.g., data associated with a Near Field Communication tag, code, and/or chip) including information associated with one or more watch faces (e.g., the NFC code includes information (e.g., visual characteristics, such as color, background color, color scheme, complications, complication positions, font, and/or sizes of various graphical user interface objects) that is associated with one or more watch faces associated with the request). In some embodiments, in addition to receiving the NFC code, receiving the request to display the user interface for selecting one or more watch faces to add to a library of watch faces for a respective computer system includes receiving one or more user inputs subsequent to receiving the NFC code (e.g., as described with reference to receiving a QR code).

Receiving the request to display the user interface for selecting one or more watch faces to add to a library of watch faces by receiving NFC information reduces the number of inputs required by the user for displaying the user interface. Reducing the number of inputs needed to perform an operation improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, receiving the request to display the user interface for selecting one or more watch faces to add to a library of watch faces for a respective computer system includes the computer system (e.g., 600A and/or 600B) receiving, via the one or more input devices (e.g., a camera, a scanner, an NFC scanner, an NFC tag, and/or an NFC chip), information associated with one or more watch faces (e.g., data corresponding to one or more watch faces associated with the accessory and/or data corresponding to the accessory (e.g., type of accessory, size of accessory, color of accessory, and/or pattern associated with the accessory)) from packaging (e.g., 6136) (e.g., an image of a visual code printed on packaging in which the accessory is provided by a manufacturer and/or data transmitted from a chip embedded within the packaging in which the accessory is provided by the manufacturer) of an accessory (e.g., a watch band) of the respective computer system (e.g., 600B).

Receiving the request to display the user interface for selecting one or more watch faces to add to a library of watch faces by receiving information from packaging of an accessory enables a user to quickly find and retrieve information pertaining to the one or more watch faces, thereby reducing the number of inputs required to display the user interface. Reducing the number of inputs needed to perform an operation improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, one or more of the first graphical representation (e.g., 6146A and/or 6146B) of the first watch face of the two or more watch faces associated with the request or the second graphical representation (e.g., 6148A, 6148B, 6160A, and/or 6160B) of the second watch face of the two or more watch faces associated with the request includes a visual indication (e.g., 6147A and/or 6147B) of an appearance of the accessory for the respective computer system (e.g., 600B) (e.g., the computer system receives information associated with the appearance of the accessory with the information received from the packaging of the accessory and displays the first graphical representation and/or the second graphical representation with a visual indication of a visual characteristics of the accessory, such as a color, size, shape, and/or pattern of the accessory).

Including a visual indication of an appearance of the accessory in the first graphical representation and/or the second graphical representation provides confirmation to a user that the first watch face and the second watch face are associated with the accessory, thereby providing improved feedback to the user that the request was successful. Providing improved feedback improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, one or more of the first graphical representation (e.g., 6146A and/or 6146B) of the first watch face of the two or more watch faces associated with the request or the second graphical representation (e.g., 6148A, 6148B, 6160A, and/or 6160B) of the second watch face of the two or more watch faces associated with the request includes a characteristic graphical representation (e.g., 6149A and/or 6149B) of a housing of the respective computer system (e.g., 600B) (e.g., the first graphical representation and/or the second graphical representation includes a graphical representation of the housing of the respective computer system, such as a color, size, shape, and/or pattern of the housing, where information associated with the graphical representation of the housing of the respective computer system is received from the respective computer system).

Including a characteristic graphical representation of the housing of the respective computer system in the first graphical representation and/or the second graphical representation provides confirmation to a user that the first watch face and the second watch face are and/or will be associated with the respective computer system, thereby providing improved feedback to the user that the request was successful. Providing improved feedback improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, computer system (e.g., 600A and/or 600B) displays, via the display generation component (e.g., 602A and/or 602B), the first graphical representation (e.g., 6146A and/or 6146B) at the first position and the second graphical representation (e.g., 6148A and/or 6148B) at the second position different from the first position and displays, via the display generation component (e.g., 602A and/or 602B), a user-selectable graphical user interface object (e.g., 6152A and/or 6152B) (e.g., a graphical object including the text "Add") at a fourth position (e.g., the position of user-selectable graphical user interface object 6152A and/or 6152B at FIGS. 6AF and 6AG) (e.g., the fourth position is positioned above and/or below the first position and is substantially centered with respect to the pair of opposing sides of the display generation component; the user-selectable graphical user interface object corresponds to adding the first watch face corresponding to the first graphical representation when the first graphical representation is at the first position).

In some embodiments, computer system (e.g., 600A and/or 600B) displays, via the display generation component (e.g., 602A and/or 602B), the first graphical representation (e.g., 6146A and/or 6146B) at the third position and the second graphical representation at the first position and displays, via the display generation component (e.g., 602A and/or 602B), the user-selectable graphical user interface object (e.g., 6152A and/or 6152B) at the fourth position (e.g., the position of user-selectable graphical user interface object 6152A and/or 6152B at FIGS. 6AF and 6AG) (e.g., maintaining the position of the user-selectable graphical user interface object in response to receiving the second input) (e.g., the fourth position is positioned above and/or below the first position and is substantially centered with respect to the pair of opposing sides of the display generation component; the user-selectable graphical user interface object corresponds to adding the second watch face corresponding to the second graphical representation when the second graphical representation is at the first position).

Maintaining display of the user-selectable graphical user interface object at the fourth position in response to the second input reduces the amount of graphical elements displayed on the display generation component, while still enabling the user to select either the first watch face or the second watch face for adding to the library of watch faces. Providing additional control options without cluttering the UI with additional displayed controls improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the input (e.g., 6164A and/or 6164B) corresponds to selection of the user-selectable graphical user interface object (e.g., 6152A and/or 6152B) (e.g., a tap gesture on the user-selectable graphical user interface object). In some embodiments, the determination that the input (e.g., 6164A and/or 6164B) corresponds to selection of the first watch face includes a determination that the input is received while the first graphical representation (e.g., 6146A and/or 6146B) is at the first position (e.g., the position of first graphical representation 6146A and/or 6146B at FIG. 6AF). In some embodiments, the determination that the input (e.g., 6164A and/or 6164B) corresponds to selection of the second watch face includes a determination that the input is received while the second graphical representation (e.g., 6148A and/or 6148B) is at the first position (e.g., the position of second graphical representation 6148A and/or 6148B at FIG. 6AG).

Displaying a single user-selectable graphical user interface object reduces the amount of graphical elements displayed on the display generation component, while still enabling the user to select either the first watch face or the second watch face for adding to the library of watch faces. Providing additional control options without cluttering the UI with additional displayed controls improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600A and/or 600B) displays, via the display generation component (e.g., 602A and/or 602B), the user interface (e.g., 6132A and/or 6132B) for selecting one or more watch faces to add to a library of watch faces for the respective computer system, and the computer system (e.g., 600A and/or 600B) partially displays the second graphical representation (e.g., 6148A and/or 6148B) of the second watch face of the two or more watch faces associated with the request (e.g., when the second graphical representation is initially displayed in response to the request, at least a first portion of the second graphical representation appears to be hidden and/or off of the display generation component and a second portion of the second graphical representation is displayed and/or visible on the display generation component).

Partially displaying the second graphical representation provides additional space on the display generation component so that the first graphical representation is clearly visible, thereby enabling a user to quickly find and select a desired watch face and reducing the number of inputs for adding the desired watch face to the library of watch faces. Reducing the number of inputs required to perform an operation improves the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A computer system, comprising:
a display generation component;
one or more input devices;
one or more processors; and
memory storing one or more programs configured to be executed by the one or more processors, the one or more programs including instructions for:

receiving a request to display a user interface for selecting one or more watch faces to add to a library of watch faces for a respective computer system;
in response to receiving the request to display the user interface for selecting one or more watch faces to add to a library of watch faces for the respective computer system:
in accordance with a determination that the request is associated with two or more watch faces, displaying, via the display generation component, the user interface for selecting one or more watch faces to add to a library of watch faces for the respective computer system, including displaying:
a first graphical representation of a first watch face of the two or more watch faces associated with the request; and
a second graphical representation of a second watch face of the two or more watch faces associated with the request; and
in accordance with a determination that the request is associated with a single watch face, displaying, via the display generation component, the user interface for selecting one or more watch faces to add to a library of watch faces for the respective computer system, including displaying a third graphical representation of a third watch face associated with the request, without displaying another graphical representation of another watch face;
while displaying the user interface for selecting one or more watch faces to add to a library of watch faces for the respective computer system, receiving, via the one or more input devices, an input; and
in response to receiving the input:
in accordance with a determination that the input corresponds to selection of the first watch face, initiating a process for adding the first watch face to a library of watch faces for the respective computer system; and
in accordance with a determination that the input corresponds to selection of the second watch face, initiating a process for adding the second watch face to a library of watch faces for the respective computer system.

2. The computer system of claim 1, wherein receiving the request to display the user interface for selecting one or more watch faces to add to a library of watch faces for a respective computer system includes receiving, via the one or more input devices, a QR code including information associated with one or more watch faces.

3. The computer system of claim 1, wherein receiving the request to display the user interface for selecting one or more watch faces to add to a library of watch faces for a respective computer system includes receiving, via the one or more input devices, NFC information including information associated with one or more watch faces.

4. The computer system of claim 1, wherein receiving the request to display the user interface for selecting one or more watch faces to add to a library of watch faces for a respective computer system includes receiving, via the one or more input devices, information associated with one or more watch faces from packaging of an accessory of the respective computer system.

5. The computer system of claim 4, wherein one or more of the first graphical representation of the first watch face of the two or more watch faces associated with the request or the second graphical representation of the second watch face of the two or more watch faces associated with the request includes a visual indication of an appearance of the accessory for the respective computer system.

6. The computer system of claim 1, wherein one or more of the first graphical representation of the first watch face of the two or more watch faces associated with the request or the second graphical representation of the second watch face of the two or more watch faces associated with the request includes a characteristic graphical representation of a housing of the respective computer system.

7. The computer system of claim 1, the one or more programs further including instructions for:
while displaying the user interface for selecting one or more watch faces to add to a library of watch faces for the respective computer system:
displaying, via the display generation component, the first graphical representation at a first position and the second graphical representation at a second position different from the first position; and
receiving, via the one or more input devices, a second input; and
in response to receiving the second input, displaying, via the display generation component, the first graphical representation at a third position and the second graphical representation at the first position.

8. The computer system of claim 7, wherein:
displaying, via the display generation component, the first graphical representation at the first position and the second graphical representation at the second position different from the first position includes displaying, via the display generation component, a user-selectable graphical user interface object at a fourth position; and
displaying, via the display generation component, the first graphical object at the third position and the second graphical representation at the first position includes displaying, via the display generation component, the user-selectable graphical user interface object at the fourth position.

9. The computer system of claim 8, wherein:
the input corresponds to selection of the user-selectable graphical user interface object;
the determination that the input corresponds to selection of the first watch face includes a determination that the input is received while the first graphical representation is at the first position; and
the determination that the input corresponds to selection of the second watch face includes a determination that the input is received while the second graphical representation is at the first position.

10. A non-transitory computer-readable storage medium storing one or more programs configured to be executed by one or more processors of a computer system that is in communication with a display generation component and one or more input devices, the one or more programs including instructions for:
receiving a request to display a user interface for selecting one or more watch faces to add to a library of watch faces for a respective computer system;
in response to receiving the request to display the user interface for selecting one or more watch faces to add to a library of watch faces for the respective computer system:
in accordance with a determination that the request is associated with two or more watch faces, displaying, via the display generation component, the user interface for selecting one or more watch faces to add to a library of watch faces for the respective computer system, including displaying:
  a first graphical representation of a first watch face of the two or more watch faces associated with the request; and
  a second graphical representation of a second watch face of the two or more watch faces associated with the request; and
in accordance with a determination that the request is associated with a single watch face, displaying, via the display generation component, the user interface for selecting one or more watch faces to add to a library of watch faces for the respective computer system, including displaying a third graphical representation of a third watch face associated with the request, without displaying another graphical representation of another watch face;
while displaying the user interface for selecting one or more watch faces to add to a library of watch faces for the respective computer system, receiving, via the one or more input devices, an input; and
in response to receiving the input:
  in accordance with a determination that the input corresponds to selection of the first watch face, initiating a process for adding the first watch face to a library of watch faces for the respective computer system; and
  in accordance with a determination that the input corresponds to selection of the second watch face, initiating a process for adding the second watch face to a library of watch faces for the respective computer system.

11. The non-transitory computer-readable storage medium of claim 10, wherein receiving the request to display the user interface for selecting one or more watch faces to add to a library of watch faces for a respective computer system includes receiving, via the one or more input devices, a QR code including information associated with one or more watch faces.

12. The non-transitory computer-readable storage medium of claim 10, wherein receiving the request to display the user interface for selecting one or more watch faces to add to a library of watch faces for a respective computer system includes receiving, via the one or more input devices, NFC information including information associated with one or more watch faces.

13. The non-transitory computer-readable storage medium of claim 10, wherein receiving the request to display the user interface for selecting one or more watch faces to add to a library of watch faces for a respective computer system includes receiving, via the one or more input devices, information associated with one or more watch faces from packaging of an accessory of the respective computer system.

14. The non-transitory computer-readable storage medium of claim 13, wherein one or more of the first graphical representation of the first watch face of the two or more watch faces associated with the request or the second graphical representation of the second watch face of the two or more watch faces associated with the request includes a visual indication of an appearance of the accessory for the respective computer system.

15. The non-transitory computer-readable storage medium of claim 10, wherein one or more of the first graphical representation of the first watch face of the two or more watch faces associated with the request or the second graphical representation of the second watch face of the two or more watch faces associated with the request includes a characteristic graphical representation of a housing of the respective computer system.

16. The non-transitory computer-readable storage medium of claim 10, the one or more programs further including instructions for:
while displaying the user interface for selecting one or more watch faces to add to a library of watch faces for the respective computer system:
  displaying, via the display generation component, the first graphical representation at a first position and the second graphical representation at a second position different from the first position; and
  receiving, via the one or more input devices, a second input; and
in response to receiving the second input, displaying, via the display generation component, the first graphical representation at a third position and the second graphical representation at the first position.

17. The non-transitory computer-readable storage medium of claim 16, wherein:
displaying, via the display generation component, the first graphical representation at the first position and the second graphical representation at the second position different from the first position includes displaying, via the display generation component, a user-selectable graphical user interface object at a fourth position; and
displaying, via the display generation component, the first graphical object at the third position and the second graphical representation at the first position includes displaying, via the display generation component, the user-selectable graphical user interface object at the fourth position.

18. The non-transitory computer-readable storage medium of claim 17, wherein:
the input corresponds to selection of the user-selectable graphical user interface object;
the determination that the input corresponds to selection of the first watch face includes a determination that the input is received while the first graphical representation is at the first position; and
the determination that the input corresponds to selection of the second watch face includes a determination that the input is received while the second graphical representation is at the first position.

19. A method, comprising:
at a computer system that is in communication with a display generation component and one or more input devices:
  receiving a request to display a user interface for selecting one or more watch faces to add to a library of watch faces for a respective computer system;
  in response to receiving the request to display the user interface for selecting one or more watch faces to add to a library of watch faces for the respective computer system:
    in accordance with a determination that the request is associated with two or more watch faces, displaying, via the display generation component, the user interface for selecting one or more watch faces to add to a library of watch faces for the respective computer system, including displaying:
      a first graphical representation of a first watch face of the two or more watch faces associated with the request; and a second graphical representation of a second watch face of the two or more watch faces associated with the request; and in accordance with a determination that the request is associated with a single watch face, displaying, via the display generation component, the user interface for selecting one or more watch faces to add to a library of watch faces for the respective computer system, including displaying a third graphical representation of a third watch face associated with the request, without displaying another graphical representation of another watch face;

while displaying the user interface for selecting one or more watch faces to add to a library of watch faces for the respective computer system, receiving, via the one or more input devices, an input; and in response to receiving the input:

in accordance with a determination that the input corresponds to selection of the first watch face, initiating a process for adding the first watch face to a library of watch faces for the respective computer system; and in accordance with a determination that the input corresponds to selection of the second watch face, initiating a process for adding the second watch face to a library of watch faces for the respective computer system.

20. The method of claim 19, wherein receiving the request to display the user interface for selecting one or more watch faces to add to a library of watch faces for a respective computer system includes receiving, via the one or more input devices, a QR code including information associated with one or more watch faces.

21. The method of claim 19, wherein receiving the request to display the user interface for selecting one or more watch faces to add to a library of watch faces for a respective computer system includes receiving, via the one or more input devices, NFC information including information associated with one or more watch faces.

22. The method of claim 19, wherein receiving the request to display the user interface for selecting one or more watch faces to add to a library of watch faces for a respective computer system includes receiving, via the one or more input devices, information associated with one or more watch faces from packaging of an accessory of the respective computer system.

23. The method of claim 22, wherein one or more of the first graphical representation of the first watch face of the two or more watch faces associated with the request or the second graphical representation of the second watch face of the two or more watch faces associated with the request includes a visual indication of an appearance of the accessory for the respective computer system.

24. The method of claim 19, wherein one or more of the first graphical representation of the first watch face of the two or more watch faces associated with the request or the second graphical representation of the second watch face of the two or more watch faces associated with the request includes a characteristic graphical representation of a housing of the respective computer system.

25. The method of claim 19, further comprising:

while displaying the user interface for selecting one or more watch faces to add to a library of watch faces for the respective computer system:

displaying, via the display generation component, the first graphical representation at a first position and the second graphical representation at a second position different from the first position; and receiving, via the one or more input devices, a second input; and in response to receiving the second input, displaying, via the display generation component, the first graphical representation at a third position and the second graphical representation at the first position.

26. The method of claim 25, wherein:

displaying, via the display generation component, the first graphical representation at the first position and the second graphical representation at the second position different from the first position includes displaying, via the display generation component, a user-selectable graphical user interface object at a fourth position; and displaying, via the display generation component, the first graphical object at the third position and the second graphical representation at the first position includes displaying, via the display generation component, the user-selectable graphical user interface object at the fourth position.

27. The method of claim 26, wherein:

the input corresponds to selection of the user-selectable graphical user interface object;

the determination that the input corresponds to selection of the first watch face includes a determination that the input is received while the first graphical representation is at the first position; and the determination that the input corresponds to selection of the second watch face includes a determination that the input is received while the second graphical representation is at the first position.

* * * * *